United States Patent
Levin et al.

(10) Patent No.: US 9,931,697 B2
(45) Date of Patent: *Apr. 3, 2018

(54) ACCURATE THREE-DIMENSIONAL PRINTING

(71) Applicant: Velo3D, Inc., Campbell, CA (US)

(72) Inventors: Evgeni Levin, Rehovot (IL); Tasso Lappas, Pasadena, CA (US); Benyamin Buller, Cupertino, CA (US); Alan Rick Lappen, San Jose, CA (US)

(73) Assignee: VELO3D, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,120

(22) Filed: Feb. 16, 2017

(65) Prior Publication Data
US 2017/0239720 A1    Aug. 24, 2017

Related U.S. Application Data

(60) Provisional application No. 62/297,067, filed on Feb. 18, 2016, provisional application No. 62/320,334, (Continued)

(51) Int. Cl.
    *B22F 3/105* (2006.01)
    *B29C 67/00* (2017.01)
    (Continued)

(52) U.S. Cl.
    CPC ........ *B22F 3/1055* (2013.01); *B23K 15/0013* (2013.01); *B23K 15/0086* (2013.01);
    (Continued)

(58) Field of Classification Search
    CPC ............ B22F 3/1055; B22F 2003/1056; B22F 2003/1067
    See application file for complete search history.

(56) References Cited

U.S. PATENT DOCUMENTS

| 4,177,087 A | 12/1979 | Hills et al. |
| 4,863,538 A | 9/1989 | Deckard |

(Continued)

FOREIGN PATENT DOCUMENTS

| CN | 101835554 A | 9/2010 |
| CN | 102076456 A | 5/2011 |

(Continued)

OTHER PUBLICATIONS

Adam, et al. Design for additive manufacturing—element transitions and aggregated structures. CIRP Journal of Manufacturing Science and Technology. Nov. 2014; 7:20-28.

(Continued)

*Primary Examiner* — Ryan Ochylski
(74) *Attorney, Agent, or Firm* — Velo3D, Inc.

(57) ABSTRACT

The present disclosure provides three-dimensional (3D) printing methods, apparatuses, and systems using, inter alia, a controller that regulates formation of at least one 3D object (e.g., in real time during the 3D printing); and a non-transitory computer-readable medium facilitating the same. For example, a controller that regulates a deformation of at least a portion of the 3D object. The control may be in situ control. The control may be real-time control during the 3D printing process. For example, the control may be during a physical-attribute pulse. The present disclosure provides various methods, apparatuses, systems and software for estimating the fundamental length scale of a melt pool, and for various tools that increase the accuracy of the 3D printing.

30 Claims, 37 Drawing Sheets

Related U.S. Application Data filed on Apr. 8, 2016, provisional application No. 62/325,402, filed on Apr. 20, 2016, provisional application No. 62/401,534, filed on Sep. 29, 2016, provisional application No. 62/444,069, filed on Jan. 9, 2017.

(51) Int. Cl.

| | | |
|---|---|---|
| B28B 1/00 | (2006.01) | |
| B28B 17/00 | (2006.01) | |
| B33Y 10/00 | (2015.01) | |
| B33Y 30/00 | (2015.01) | |
| B33Y 50/02 | (2015.01) | |
| B23K 15/00 | (2006.01) | |
| B23K 15/02 | (2006.01) | |
| B23K 26/03 | (2006.01) | |
| B23K 26/342 | (2014.01) | |
| B23K 26/04 | (2014.01) | |

(52) U.S. Cl.
CPC ............ *B23K 15/02* (2013.01); *B23K 26/032* (2013.01); *B23K 26/034* (2013.01); *B23K 26/04* (2013.01); *B23K 26/342* (2015.10); *B28B 1/001* (2013.01); *B28B 17/0081* (2013.01); *B29C 67/0077* (2013.01); *B29C 67/0088* (2013.01); *B33Y 10/00* (2014.12); *B33Y 30/00* (2014.12); *B33Y 50/02* (2014.12); *B22F 2003/1056* (2013.01); *B22F 2003/1057* (2013.01)

(56) References Cited

U.S. PATENT DOCUMENTS

| | | |
|---|---|---|
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,876,550 A | 3/1999 | Feygin et al. |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 6,042,774 A | 3/2000 | Wilkening et al. |
| 6,066,285 A | 5/2000 | Kumar |
| 6,085,122 A | 7/2000 | Manning |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,376,148 B1 | 4/2002 | Liu et al. |
| 6,391,251 B1 | 5/2002 | Keicher et al. |
| 6,483,596 B1 | 11/2002 | Philippi et al. |
| 6,531,086 B1 | 3/2003 | Larsson |
| 6,554,600 B1 | 4/2003 | Hofmann et al. |
| 6,636,676 B1 | 10/2003 | Renn |
| 6,656,409 B1 | 12/2003 | Keicher et al. |
| 6,656,410 B2 | 12/2003 | Hull et al. |
| 6,672,343 B1 | 1/2004 | Perret et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,905,645 B2 | 6/2005 | Iskra |
| 6,932,935 B1 | 8/2005 | Oberhofer et al. |
| 6,945,638 B2 | 9/2005 | Teung et al. |
| 6,955,023 B2 | 10/2005 | Rotheroe |
| 6,986,654 B2 | 1/2006 | Imiolek et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |
| 7,326,377 B2 | 2/2008 | Adams |
| 7,419,632 B2 | 9/2008 | Keller |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |

(56) References Cited

U.S. PATENT DOCUMENTS

| | | |
|---|---|---|
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |
| 7,863,544 B2 | 1/2011 | Serruys et al. |
| 7,871,551 B2 | 1/2011 | Wallgren et al. |
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | Muller et al. |
| 8,303,886 B2 | 11/2012 | Philippi |
| 8,308,466 B2 | 11/2012 | Ackelid et al. |
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 | 8/2013 | Uckelmann |
| 8,524,142 B2 | 9/2013 | Uckelmann et al. |
| 8,525,071 B2 | 9/2013 | Leuterer |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 | 5/2014 | Jones et al. |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,399,256 B2 | 7/2016 | Buller et al. |
| 9,403,235 B2 | 8/2016 | Buller et al. |
| 9,415,443 B2 | 8/2016 | Ljungblad et al. |
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 2002/0020945 A1 | 2/2002 | Cho et al. |
| 2002/0041818 A1 | 4/2002 | Abe et al. |
| 2002/0104973 A1 | 8/2002 | Kerekes |
| 2002/0152002 A1 | 10/2002 | Lindemann et al. |
| 2002/0158054 A1 | 10/2002 | Manetsberger et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0061260 A1 | 4/2004 | Heugel |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0217095 A1 | 11/2004 | Herzog |
| 2004/0262261 A1 | 12/2004 | Fink et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0207901 A1 | 9/2005 | Klobucar et al. |
| 2005/0258570 A1 | 11/2005 | Kong et al. |
| 2005/0278933 A1 | 12/2005 | Macke, Jr. et al. |
| 2005/0287031 A1 | 12/2005 | Macke, Jr. et al. |
| 2006/0003095 A1 | 1/2006 | Bullen et al. |
| 2006/0054079 A1 | 3/2006 | Withey et al. |
| 2006/0118532 A1 | 6/2006 | Chung et al. |
| 2006/0192322 A1 | 8/2006 | Abe et al. |
| 2006/0208396 A1 | 9/2006 | Abe et al. |
| 2006/0228248 A1 | 10/2006 | Larsson |
| 2006/0249485 A1 | 11/2006 | Partanen et al. |
| 2006/0280866 A1 | 12/2006 | Marquez et al. |
| 2007/0001342 A1 | 1/2007 | Oberhofer et al. |
| 2007/0003656 A1 | 1/2007 | Labossiere et al. |
| 2007/0023977 A1 | 2/2007 | Braun et al. |
| 2007/0035069 A1 | 2/2007 | Wust et al. |
| 2007/0051704 A1 | 3/2007 | Husmann et al. |
| 2007/0057412 A1 | 3/2007 | Weiskopf et al. |
| 2007/0122562 A1 | 5/2007 | Adams |
| 2007/0142914 A1 | 6/2007 | Jones et al. |

(56) References Cited

U.S. PATENT DOCUMENTS

| | | |
|---|---|---|
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0131540 A1 | 6/2008 | Perret et al. |
| 2008/0138515 A1 | 6/2008 | Williams |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0314391 A1 | 12/2009 | Crump et al. |
| 2010/0006228 A1 | 1/2010 | Abe et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0052927 A1 | 3/2011 | Martinoni et al. |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0293771 A1 | 12/2011 | Oberhofer et al. |
| 2012/0010741 A1 | 1/2012 | Hull et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0145806 A1 | 6/2012 | Yang |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0251378 A1 | 10/2012 | Abe et al. |
| 2012/0267347 A1 | 10/2012 | Arjakine et al. |
| 2012/0308781 A1 | 12/2012 | Abe et al. |
| 2013/0064706 A1 | 3/2013 | Schwarze et al. |
| 2013/0112672 A1 | 5/2013 | Keremes et al. |
| 2013/0134637 A1 | 5/2013 | Wiesner et al. |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0330470 A1 | 12/2013 | Gersch et al. |
| 2014/0034626 A1 | 2/2014 | Illston |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0150992 A1 | 6/2014 | Koontz et al. |
| 2014/0154088 A1 | 6/2014 | Etter et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1 | 9/2014 | Burris et al. |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |
| 2014/0329953 A1 | 11/2014 | Paternoster |
| 2014/0332507 A1 | 11/2014 | Fockele et al. |
| 2014/0335313 A1 | 11/2014 | Chou et al. |
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0088295 A1 | 3/2015 | Hellestam |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0198052 A1 | 7/2015 | Pavlov et al. |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0306667 A1 | 10/2015 | Yao |

(56) References Cited

U.S. PATENT DOCUMENTS

| | | |
|---|---|---|
| 2015/0306820 A1 | 10/2015 | Colin et al. |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367417 A1 | 12/2015 | Buller et al. |
| 2015/0367418 A1 | 12/2015 | Buller et al. |
| 2015/0367419 A1 | 12/2015 | Buller et al. |
| 2015/0367446 A1 | 12/2015 | Buller et al. |
| 2015/0367447 A1 | 12/2015 | Buller et al. |
| 2015/0367448 A1 | 12/2015 | Buller et al. |
| 2015/0367453 A1 | 12/2015 | Herzog |
| 2016/0001401 A1 | 1/2016 | Dimter et al. |
| 2016/0022336 A1 | 1/2016 | Bateman |
| 2016/0059352 A1 | 3/2016 | Sparks et al. |
| 2016/0067779 A1 | 3/2016 | Dautova et al. |
| 2016/0114431 A1 | 4/2016 | Cheverton et al. |
| 2016/0121399 A1 | 5/2016 | Buller et al. |
| 2016/0129502 A1 | 5/2016 | Varetti |
| 2016/0136896 A1 | 5/2016 | Wighton |
| 2016/0179064 A1 | 6/2016 | Arthur et al. |
| 2016/0185048 A1 | 6/2016 | Dave et al. |
| 2016/0193696 A1 | 7/2016 | McFarland et al. |
| 2016/0193790 A1 | 7/2016 | Shuck et al. |
| 2016/0207109 A1 | 7/2016 | Buller et al. |
| 2016/0214175 A1 | 7/2016 | Nordstrom |
| 2016/0236279 A1 | 8/2016 | Ashton et al. |
| 2016/0236419 A1 | 8/2016 | Griffin et al. |
| 2016/0246908 A1 | 8/2016 | Komzsik |
| 2016/0250717 A1 | 9/2016 | Kruger et al. |
| 2016/0271698 A1 | 9/2016 | Schmidt |
| 2016/0271884 A1 | 9/2016 | Herzog |
| 2016/0279706 A1 | 9/2016 | Domrose et al. |
| 2016/0297006 A1 | 10/2016 | Buller et al. |
| 2016/0297007 A1 | 10/2016 | Buller et al. |
| 2016/0303687 A1 | 10/2016 | Ljungblad |
| 2016/0311025 A1 | 10/2016 | Kaneko |
| 2016/0320771 A1 | 11/2016 | Huang |
| 2016/0332384 A1 | 11/2016 | De Pena et al. |
| 2017/0001379 A1 | 1/2017 | Long |
| 2017/0021420 A1 | 1/2017 | Buller et al. |
| 2017/0021455 A1 | 1/2017 | Dallarosa et al. |
| 2017/0036404 A1 | 2/2017 | Rengers et al. |
| 2017/0066052 A1 | 3/2017 | Abe et al. |
| 2017/0066084 A1 | 3/2017 | Ladewig et al. |
| 2017/0090461 A1 | 3/2017 | Chong et al. |
| 2017/0102689 A1 | 4/2017 | Khajepour et al. |
| 2017/0136574 A1 | 5/2017 | Zenzinger et al. |
| 2017/0136703 A1 | 5/2017 | Hayes et al. |
| 2017/0145586 A1 | 5/2017 | Xiao |
| 2017/0157845 A1 | 6/2017 | Bihari et al. |
| 2017/0266887 A1 | 9/2017 | Roviaro et al. |
| 2017/0341143 A1 | 11/2017 | Abe et al. |

FOREIGN PATENT DOCUMENTS

| | | |
|---|---|---|
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| DE | 19939616 A1 | 3/2001 |
| DE | 102004061836 A1 | 7/2006 |
| DE | 102007029142 A1 | 1/2009 |
| DE | 102010048335 A1 | 4/2012 |
| DE | 102013208651 A1 | 11/2014 |
| DE | 102014204528 A1 | 9/2015 |
| EP | 0296818 B1 | 4/1993 |
| EP | 1466718 A2 | 10/2004 |
| EP | 1622086 B1 | 9/2008 |
| EP | 1992709 A1 | 11/2008 |
| EP | 2277687 A1 | 1/2011 |
| EP | 2361704 A1 | 8/2011 |
| EP | 2522446 A1 | 11/2012 |
| EP | 2620241 A1 | 7/2013 |
| EP | 2789413 A1 | 10/2014 |
| EP | 2832473 A1 | 2/2015 |
| EP | 3208077 A1 | 8/2017 |
| EP | 3263316 A1 | 1/2018 |
| JP | 2003502184 A | 1/2003 |
| JP | 2006150977 A | 6/2006 |
| JP | 2008291318 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| NO | 317085 B1 | 8/2004 |
| SE | 524467 C2 | 8/2004 |
| WO | WO-9208592 A1 | 5/1992 |
| WO | WO-9511100 A1 | 4/1995 |
| WO | WO-9711837 A1 | 4/1997 |
| WO | WO-9933641 A1 | 7/1999 |
| WO | WO-0177988 A2 | 10/2001 |
| WO | WO-2004037469 A1 | 5/2004 |
| WO | WO-2006066939 A1 | 6/2006 |
| WO | WO-2008028443 A2 | 3/2008 |
| WO | WO-2008049384 A1 | 5/2008 |
| WO | WO-2008064620 A1 | 6/2008 |
| WO | WO-2008067496 A2 | 6/2008 |
| WO | WO-2008074287 A1 | 6/2008 |
| WO | WO-2008096105 A1 | 8/2008 |
| WO | WO-2008128502 A2 | 10/2008 |
| WO | WO-2009015619 A2 | 2/2009 |
| WO | WO-2009096750 A2 | 8/2009 |
| WO | WO-2013092997 A1 | 6/2013 |
| WO | WO-2013160188 A1 | 10/2013 |
| WO | WO-2013167903 A1 | 11/2013 |
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO-2017079091 A1 | 5/2017 |
| WO | WO-2017100695 A1 | 6/2017 |
| WO | WO-2017179001 A1 | 10/2017 |
| WO | WO-2018005439 | 1/2018 |

OTHER PUBLICATIONS

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

(56) References Cited

OTHER PUBLICATIONS

Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR_kR6ua0GOMlyJ1mpCKh342iLl.

Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.

Childs, et al. Raster scan of selective laser melting of the surface layer of a tool steel powder bed. Proc. IMechE. Jan. 26, 2005; vol. 219, Part B, pp. 379-384.

Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.

Chivel, et al. On-line temperature monitoring in selective laser sintering/melting. Physics Procedia. Dec 31, 2010; (5):515-521.

Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.

Co-pending U.S. Appl. No. 15/288,251, filed Oct. 7, 2016.
Co-pending U.S. Appl. No. 15/339,712, filed Oct. 31, 2016.
Co-pending U.S. Appl. No. 15/339,759, filed Oct. 31, 2016.
Co-pending U.S. Appl. No. 15/339,775, filed Oct. 31, 2016.
Co-pending U.S. Appl. No. 15/374,318, filed Dec. 9, 2016.
Co-pending U.S. Appl. No. 15/374,442, filed Dec. 9, 2016.
Co-pending U.S. Appl. No. 15/374,535, filed Dec. 9, 2016.
Co-pending U.S. Appl. No. 15/374,616, filed Dec. 9, 2016.
Co-pending U.S. Appl. No. 15/374,821, filed Dec. 9, 2016.
Co-pending U.S. Appl. No. 15/399,186, filed Jan. 5, 2017.
Co-pending U.S. Appl. No. 15/435,065, filed Feb. 16, 2017.
Co-pending U.S. Appl. No. 15/435,078, filed Feb. 16, 2017.
Co-pending U.S. Appl. No. 15/435,090, filed Feb. 16, 2017.
Co-pending U.S. Appl. No. 15/435,110, filed Feb. 16, 2017.
Co-pending U.S. Appl. No. 15/435,128, filed Feb. 16, 2017.
Co-pending U.S. Appl. No. 15/436,558, filed Feb. 17, 2017.
Co-pending U.S. Appl. No. 15/490,219, filed Apr. 18, 2017.

Craeghs, et al. Feedback control of layerwise laser melting using optical sensors. Physics Procedia. Dec. 2010; 5:505-514.

Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.

Direct Manufacturing: ARCAM. Uploaded on Jun. 6, 2011. 2 pages. https://www.youtube.com/watch?v=M_qSnjKN7f8.

EOS. Direct Metal Laser Sintering Published Aug. 22, 2012. https://www.youtube.com/watch?v=cRE-Pzl6uZA.

*Ex Parte Quayle* Action dated Apr. 19, 2017 for U.S. Appl. No. 15/374,821.

Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.

Gibson, et al. Additive Manufacturing Technologies, Springer 2010, Chapter 5, pp. 103-142. ISBN978-1-4419-1193-3 (Print978-1-4419-1120-9 (Online), Published: Dec. 14, 2009.

Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.

Hauser, et al. Further Developments in Process Mapping and modelling in direct metal selective laser melting. Aug. 2004, 15th solid Free Form Fabrication Proceedings. Austin, Texas, pp. 448-459.

Hussein. The development of Lightweight Cellular Structures for Metal Additive Manufacturing. Nov. 2013, thesis of University of Exeter, pp. 1-228.

International Search Report and Written Opinion dated Jan. 16, 2017 for International PCT Patent Application No. PCT/US2016/059781.

International search report and written opinion dated Feb. 19, 2016 for PCT/US2015/059790.

International Search Report and Written Opinion dated Apr. 5, 2017 for International PCT Patent Application No. PCT/US2016/066000.

International search report and written opinion dated Apr. 11, 2016 for PCT/US2015/065297.

International search report and written opinion dated Sep. 20, 2016 for PCT/US2016/034454.

International search report and written opinion dated Oct. 30, 2015 for PCT Application No. PCT/US2015/036802.

International search report and written opinion dated Sep. 13, 2016 for PCT Application No. PCT/US2016/034857.

Kannatey-Asibu Jr, Elijah. Principles of laser materials processing. John Wiley & Sons, 2009, Chapter 10, pp. 231-405. Published: Apr. 20, 2009.

Kannatey-Asibu Jr, Elijah. Principles of laser materials processing. John Wiley & Sons, 2009, Chapter 16, pp. 502-668. Published: Apr. 20, 2009.

Kruth, et al. Feedback control of selective laser melting. Proceedings of the 3rd International Conference on Advanced Research in Virtual and Rapid Prototyping, Leiria, Portugal, Sep. 2007. 521-527.

Kruth, et al. Selective laser melting of iron-based power. Journal of Materials Processing Technology. Nov. 2004; 149:616-622.

Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).

Kumar, et al. Designing and slicing heterogeneous components for rapid prototyping. Department of Mechanical Engineering, University of Florida. Aug. 2000; 428-436.

Kumar, et al. Electrophotographic Layered Manufacturing. J. Manuf. Sci. Eng 126(3), 571-576 (Sep. 7, 2004) (6 pages) doi:10.1115/1.1765146.

Kumar, et al. Electrophotographic powder deposition for freeform fabrication. Department of Mechanical Engineering, University of Florida. Aug. 1999; 647-654.

Kumar, et al. Electrophotographic printing of part and binder powders. Rapid Prototyping Journal. Jul. 2004; 10(1):7-13.

Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.

Kumar, et al. Solid freeform fabrication by electrophotographic printing. Department of Mechanical and Aerospace Engineering, University of Florida. Aug. 2003; 39-49.

Kumar. Powder deposition and sintering for a two-powder approach to solid freeform fabrication. Department of Mechanical Engineering, University of Florida. Aug. 1998; 169-173.

Laser Engineered Net Shaping (LENS) 850-R system overview. System features and example application video clips. Published Jun. 3, 2012. https://www.youtube.com/watch?v=mkUVURLkxS4.

Leirvag. Additive Manufacturing for Large Products. Feb. 2013, thesis. Norwegian University of Science and Technology.

Lyckfeldt. Powder rheology of steel powders for additive manufacturing. Swerea IVF. Oct. 24, 2013.

Manfredi, et al. From Powders to Dense Metal Parts: Characterization of a Commercial AlSiMg Alloy Processed through Direct Metal Laser Sintering. Mar. 2013, Materials, vol. 6, pp. 856-869.

(56) References Cited

OTHER PUBLICATIONS

Manzhirov, et al. Mathematical Modeling of Additive Manufacturing Technologies. Proc. of the World Congress of Engineering 2014, vol. II. WCE 2014, Jul. 2-4, 2014, London, U.K. 6 pages.
Mertens, et al. Optimization fo scan strategies in selective laser melting of aluminum parts with downfacing areas. Journal of Manufacturing Science and Technology. Dec. 2014; 136:061012-1-7.
Moridi, et al. Cold spray coating: review of material systems and future perspectives. Surface engineering. Jun. 2014; 36(6):36*-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Netfabb-Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of allowance dated Jan. 5, 2017 for U.S. Appl. No. 15/085,884.
Notice of allowance dated Mar. 1, 2016 for U.S. Appl. No. 14/745,108.
Notice of Allowance dated Mar. 16, 2017 for U.S. Appl. No. 15/339,775.
Notice of Allowance dated Mar. 20, 2017 for U.S. Appl. No. 15/339,759.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.
Notice of Allowance dated Dec. 9, 2016 for U.S. Appl. No. 15/188,939.
Notice of allowance dated Dec. 14, 2015 for U.S. Appl. No. 14/745,081.
Notice of allowance dated Dec. 15, 2015 for U.S. Appl. No. 14/745,081.
Notice of Allowance (second) dated Apr. 6, 2017 for U.S. Appl. No. 15/339,759.
Office action dated Jan. 7, 2016 for U.S. Appl. No. 14/744,859.
Office action dated Jan. 11, 2016 for U.S. Appl. No. 14/745,032.
Office Action dated Feb. 7, 2017 for U.S. Appl. No. 14/744,988.
Office Action dated Feb. 8, 2017 for U.S. Appl. No. 14/744,859.
Office action dated Feb. 10, 2016 for U.S. Appl. No. 14/744,910.
Office action dated Feb. 16, 2016 for U.S. Appl. No. 14/744,955.
Office action dated Mar. 4, 2016 for U.S. Appl. No. 14/744,988.
Office Action dated Mar. 6, 2017 for U.S. Appl. No. 14/744,910.
Office action dated Mar. 7, 2017 for U.S. Appl. No. 15/339,712.
Office action dated Mar. 10, 2016 for U.S. Appl. No. 14/744,675.
Office Action dated Mar. 23, 2017 for U.S. Appl. No. 15/399,186.
Office action dated Jun. 29, 2016 for U.S. Appl. No. 14/744,859.
Office action dated Jul. 1, 2016 for U.S. Appl. No. 14/745,032.
Office action dated Jul. 19, 2016 for U.S. Appl. No. 15/085,884.
Office action dated Jul. 21, 2016 for U.S. Appl. No. 14/744,910.
Office action dated Aug. 25, 2016 for U.S. Appl. No. 14/744,988.
Office action dated Sep. 10, 2015 for U.S. Appl. No. 14/744,675.
Office action dated Sep. 13, 2016 for U.S. Appl. No. 15/188,939.
Office action dated Oct. 2, 2015 for U.S. Appl. No. 14/744,955.
Office action dated Nov. 1, 2016 for U.S. Appl. No. 15/085,884.
Office action dated Nov. 12, 2015 for U.S. Appl. No. 14/745,108.
Office action dated Nov. 18, 2016 for U.S. Appl. No. 15/188,939.
Papadakis, et al. Numerical computation of component shape distortion manufactured by selective laser melting. Procedia CIRP. Aug. 2014; 18:90-95.
Proto Labs. Direct Metal Laser Sintering (DMLS). Published Sep. 10, 2014. https://www.protolabs.com/additive-manufacturing/direct-metal-laser-sintering 2 pages.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Selective Laser Sintering (SLS) Process at Loughborough University. Published May 4, 2015. 2 pages. https://www.youtube.com/watch?v=oO77VKDB89I.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Van Der Eijk, et al. Metal printing process: development of a new rapid manufacturing process for metal parts. Proceedings of the World PM 2004 conference held in Vienna. Oct. 17-21, 2004. 5 pages.
Wang, et al. Research on the fabricating quality optimization of the overhanging surface in SLM process. Int J Adv Manuf Technol (2013) 65:1471-1484 DOI 10.1007/s00170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 7, 2012.
Wright, Roger. Wire Technology, Process Engineering and Metallurgry, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
Yin. Accurately quantifying process-relevant powder properties for AMPM applications. Freeman Technology. May 2014. 39 pages.
Co-pending U.S. Appl. No. 15/668,662, filed Aug. 3, 2017.
Extended European Search Report dated Jul. 7, 2017 for European Patent Application No. EP17156707.6.
Notice of Allowance dated Aug. 7, 2017 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
International Search Report and Written Opinion dated May 18, 2017 for International PCT Patent Application No. PCT/US2017/018191.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Office Action dated Apr. 28, 2017 for U.S. Appl. No. 15/374,616.
Office Action dated Jun. 15, 2017 for U.S. Appl. No. 15/288,251.
Office Action dated Jun. 29, 2017 for U.S. Appl. No. 15/435,128.
Co-pending U.S. Appl. No. 15/719,084, filed Sep. 28, 2017.
Co-pending U.S. Appl. No. 15/719,133, filed Sep. 28, 2017.
Co-pending U.S. Appl. No. 15/719,229, filed Sep. 28, 2017.
Co-pending U.S. Appl. No. 15/788,364, filed Oct. 19, 2017.
Co-pending U.S. Appl. No. 15/788,418, filed Oct. 19, 2017.
Co-pending U.S. Appl. No. 15/788,463, filed Oct. 19, 2017.
Co-pending U.S. Appl. No. 15/788,495, filed Oct. 19, 2017.
Co-pending U.S. Appl. No. 15/788,532, filed Oct. 19, 2017.
Co-pending U.S. Appl. No. 15/788,568, filed Oct. 19, 2017.

(56) References Cited

OTHER PUBLICATIONS

Co-pending U.S. Appl. No. 15/788,662, filed Oct. 19, 2017.
International Search Report and Written Opinion dated Aug. 30, 2017 for International PCT Patent Application No. PCT/US2017/039422.
Notice of Allowability dated Oct. 17, 2017 for U.S. Appl. No. 14/744,910.
Office Action dated Aug. 25, 2017 for U.S. Appl. No. 15/339,712.
Office Action dated Sep. 11, 2017 for U.S. Appl. No. 15/374,821.
Office Action dated Sep. 15, 2017 for U.S. Appl. No. 15/374,616.
Office Action dated Oct. 19, 2017 for U.S. Appl. No. 15/399,186.
Anusci, Victor. Aerosint Is Developing the First Commercial Multi-powder SLS 3D Printer. 3D Printing Media Network. Web. Published Jan. 28, 2018. 4 pages. URL:<https://www.3dprintingmedia.network/aerosint-multi-powder-sls-3d-printer/>.
Co-pending U.S. Appl. No. 15/830,421, filed Dec. 4, 2017.
Co-pending U.S. Appl. No. 15/830,470, filed Dec. 4, 2017.
Co-pending U.S. Appl. No. 15/853,700, filed Dec. 22, 2017.
Co-pending U.S. Appl. No. 15/855,744, filed Dec. 27, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/870,561, filed Jan. 12, 2018.
Co-pending U.S. Appl. No. 15/871,763, filed Jan. 15, 2018.
Co-pending U.S. Appl. No. 15/873,832, filed Jan. 17, 2018.
Co-pending U.S. Appl. No. 15/886,544, filed Feb. 1, 2018.
Dahotre et al. Laser Fabrication and Machining of Materials. Springer. 2008. 561 pages. DOI: 10.1007/978-0-387-72344-0.
David et al. Welding: Solidification and microstructure. The Journal of The Minerals, Metals & Materials Society (TMS). Jun. 2003, vol. 55, Issue 6, pp. 14-20.
European Search Report and Search Opinion dated Nov. 30, 2017 for European Patent Application No. EP17178143.8.
International Search Report and Written Opinion dated Jan. 9, 2018 for International PCT Patent Application No. PCT/2017/054043.
Merriam-Webster. Definition of "reservoir". Retrieved Dec. 21, 2017. 13 pages. URL:<https://merriam-webster.com/dictionary/reservoir>.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Notice of Allowance dated Dec. 8, 2017 for U.S. Appl. No. 15/435,128.
Notice of Allowance dated Dec. 11, 2017 for U.S. Appl. No. 15/435,120.
Office Action dated Jan. 2, 2018 for U.S. Appl. No. 15/288,251.
Office Action dated Jan. 24, 2018 for U.S. Appl. No. 15/615,004.
Office Action dated Jan. 25, 2018 for U.S. Appl. No. 15/634,727.
Office Action dated Feb. 7, 2018 for U.S. Appl. No. 15/614,979.
Office Action dated Feb. 7, 2018 for U.S. Appl. No. 15/719,229.
Office Action dated Nov. 16, 2017 for U.S. Appl. No. 15/634,267.
Office Action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. Lens 850R 3D Printer for Structual Metals. Optomec. YouTube—Web. Published on Jun. 3, 2012. 3 pages. URL:<https://www.youtube.com/watch?v=mkUVURLkxS4>.
Rhinehart, R.R. §2.13 Control Theory: Mode-Based Control, in Bela G. Liptak, Instrument Engineers' Handbook, vol. 2: Process Control and Optimization, 209-213 (4th ed., CRC Press (part of Taylor & Francis Group), 2006), ISBN-13: 978-0849310812.
Saunders, Marc. Real-time AM monitoring opens up new process control opportunities. Web: LinkedIn. Published on Jan. 3, 2018. 12 pages. URL:< https://www.linkedin.com/pulse/real-time-am-monitoring-opens-new-process-control-marc-saunders/>.
Schott. Tie-19: Temperature Coefficient of the Refractive Index. Technical Information: Advanced Optics. SCHOTT AG. Jul. 2016. 10 pages.
Schott. Tie-19: Temperature Coefficient of the Refractive Index. Technical Information: Advanced Optics. SCHOTT North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Wang et al. Effects of thermal cycles on the microstructure evolution of Inconel 718 during selective laser melting process. Additive Manufacturing. vol. 18, Dec. 2017, pp. 1-14.

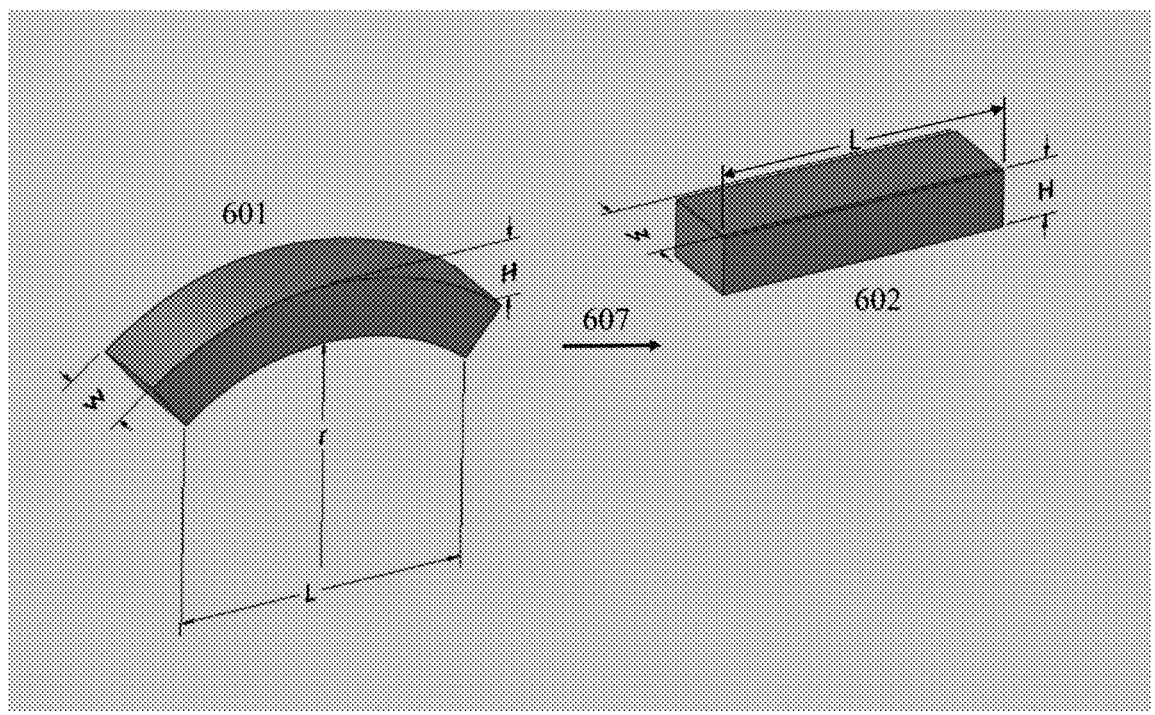
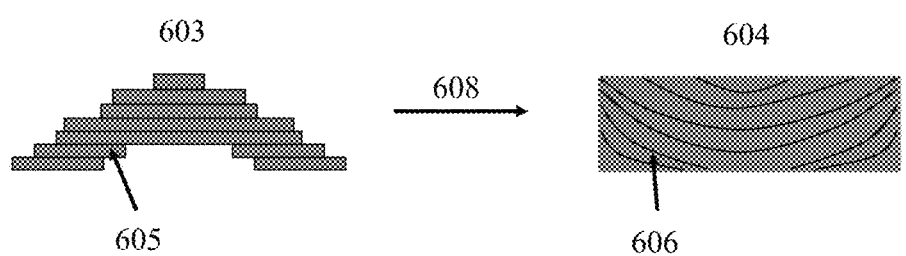
Fig. 6

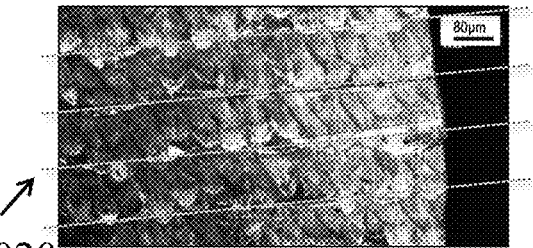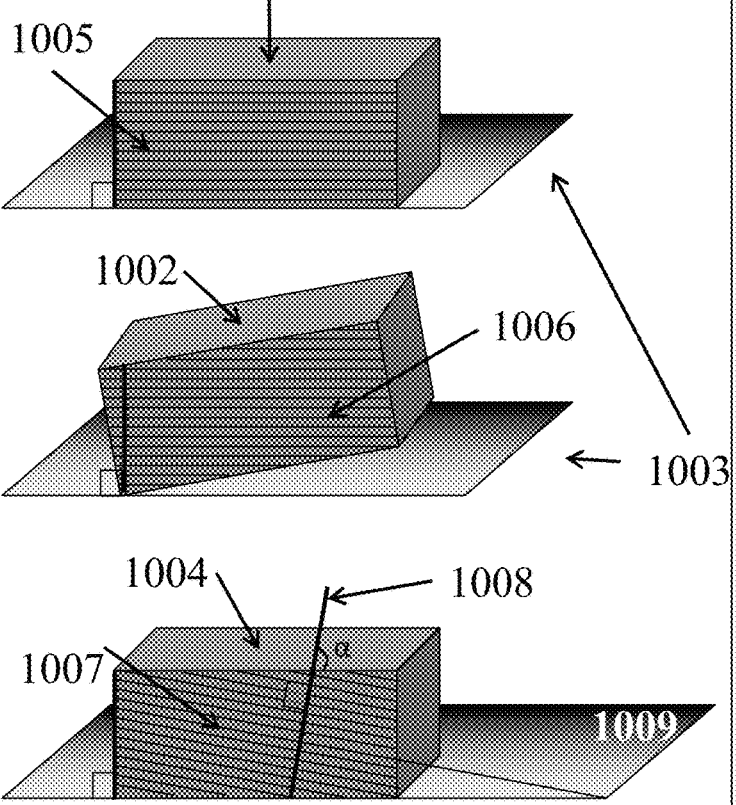

2107

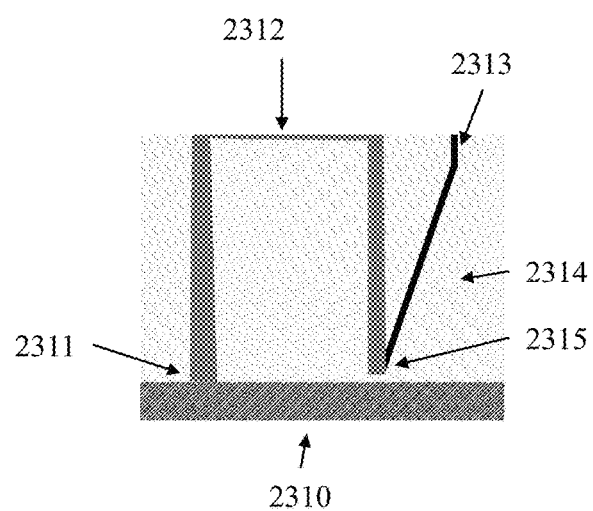
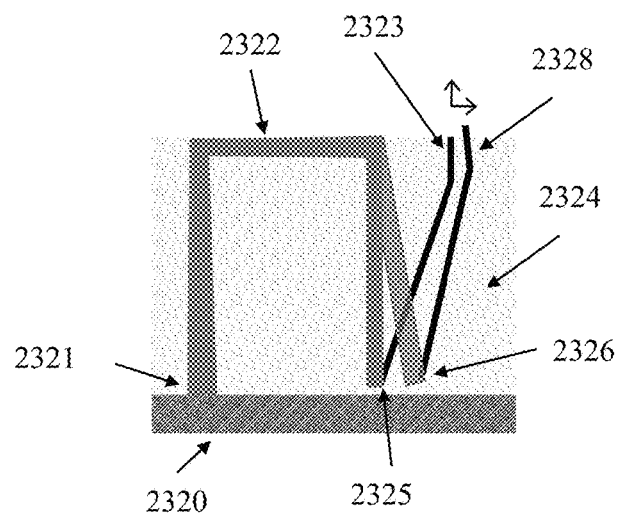

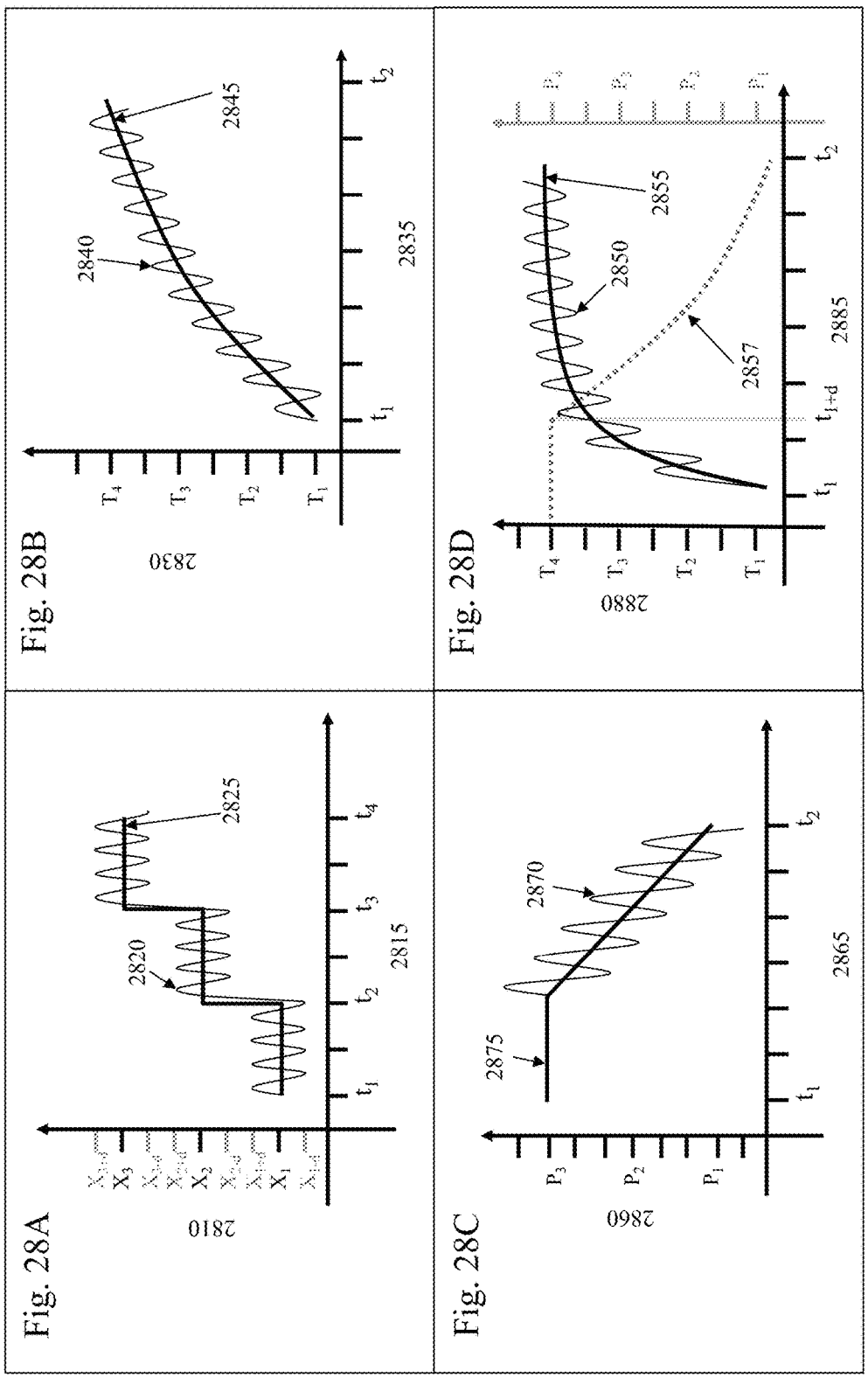

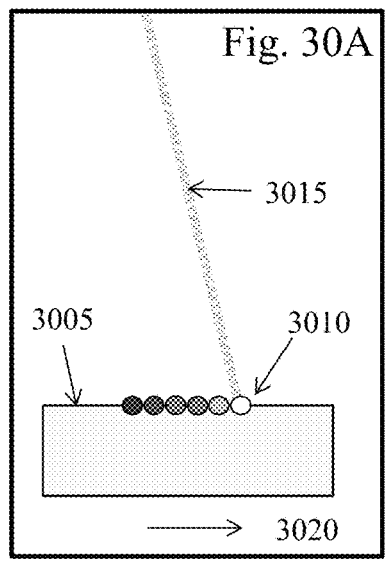
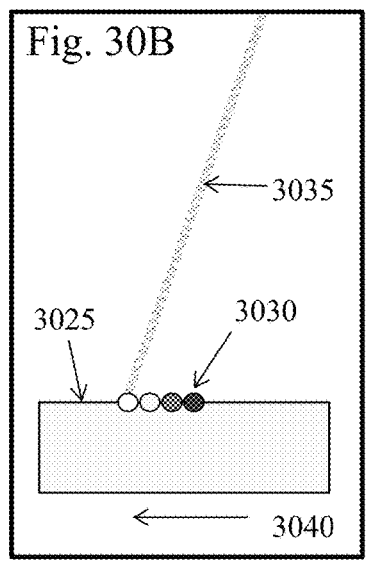
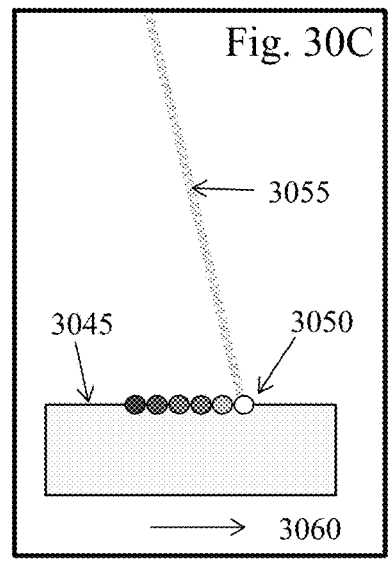
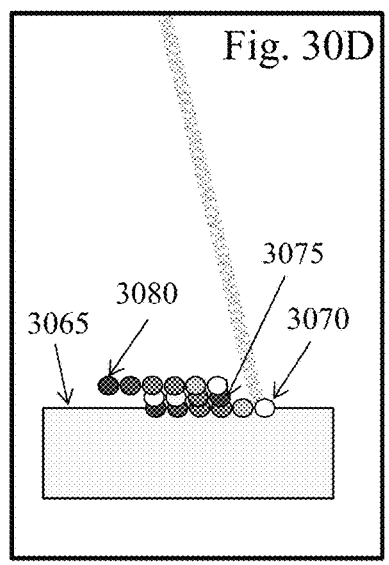
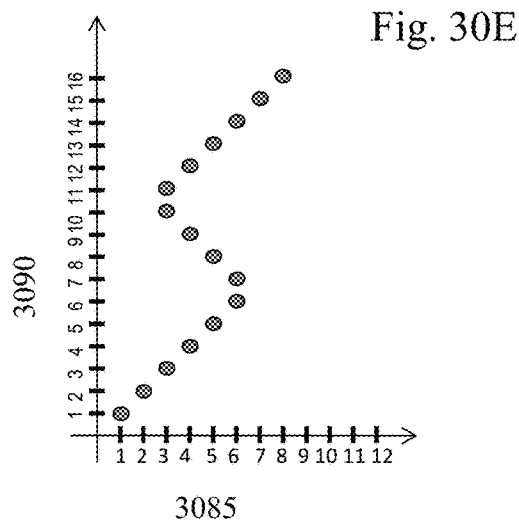

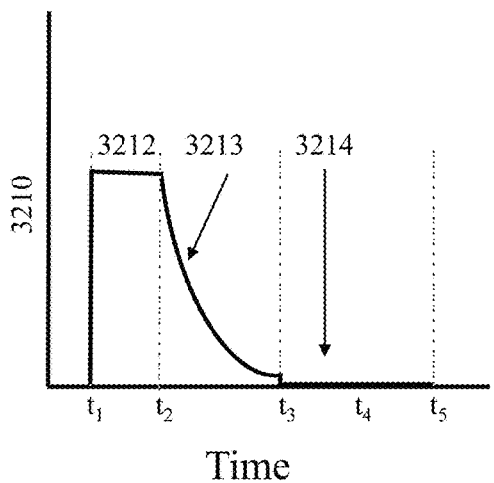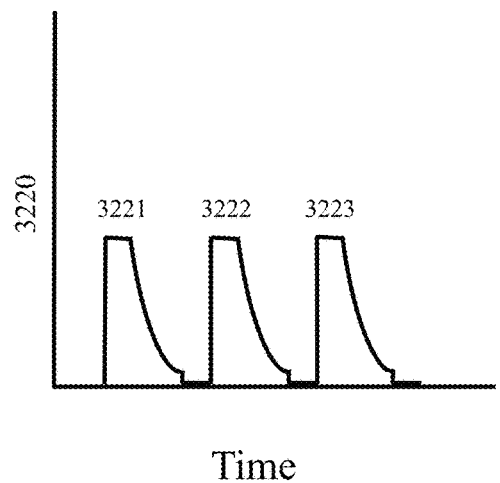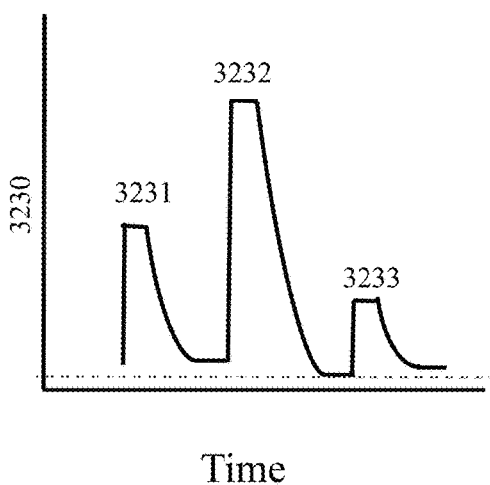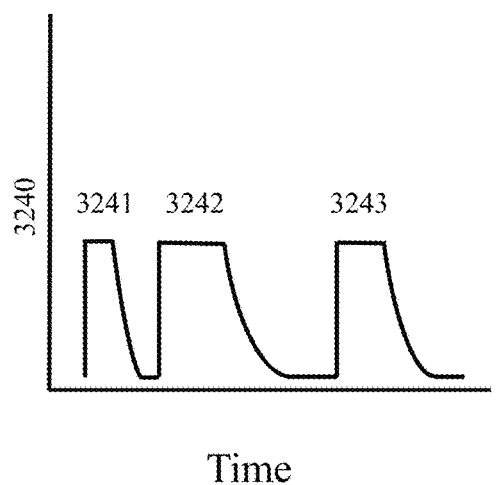

ACCURATE THREE-DIMENSIONAL PRINTING

CROSS-REFERENCE

This application claims priority to U.S. Provisional Patent Application Ser. No. 62/297,067, filed on Feb. 18, 2016, U.S. Provisional Patent Application Ser. No. 62/320,334, filed on Apr. 8, 2016, and U.S. Provisional Patent Application Ser. No. 62/325,402, filed on Apr. 20, 2016 all three titled "METHODS, SYSTEMS, APPARATUSES, AND SOFTWARE FOR ACCURATE THREE-DIMENSIONAL PRINTING;" and U.S. Provisional Patent Application Ser. No. 62/401,534, filed on Sep. 29, 2016, and U.S. Provisional Patent Application Ser. No. 62/444,069, filed on Jan. 9, 2017, which last two provisional patent applications are titled "ACCURATE THREE-DIMENSIONAL PRINTING," which all five provisional patent applications are entirely incorporated herein by reference.

BACKGROUND

Three-dimensional (3D) printing (e.g., additive manufacturing) is a process for making three-dimensional (3D) objects of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of each other. This process may be controlled (e.g., computer controlled, manually controlled, or both). A 3D printer can be an industrial robot.

3D printing can generate custom parts quickly and efficiently. A variety of materials can be used in a 3D printing process including elemental metal, metal alloy, ceramic, elemental carbon, resin, or polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is materialized.

3D models may be created utilizing a computer aided design package or via 3D scanner. The manual modeling process of preparing geometric data for 3D computer graphics may be similar to plastic arts, such as sculpting or animating. 3D scanning is a process of analyzing and collecting digital data on the shape and appearance of a real object. Based on this data, 3D models of the scanned object can be produced. The 3D models may include computer-aided design (CAD).

Many additive processes are currently available. They may differ in the manner layers are deposited to create the materialized structure. They may vary in the material or materials that are used to generate the designed structure. Some methods melt or soften material to produce the layers. Examples for 3D printing methods include selective laser melting (SLM), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (made inter alia of paper, polymer, metal) are cut to shape and joined together.

SUMMARY

At times, at least a portion of a layer within the printed three-dimensional (abbreviated herein as "3D") object may bend, warp, roll, curl, or otherwise deform during the 3D printing process. In some instances, it is desired to control the way at least a portion of a layer of hardened material (e.g., 3D object) is formed. For example, at times it is desired to control the deformation of at least a layer within the 3D object. The control may include control of the degree and/or direction of the deformation. In some instances, it may be desired to control the deformation of at least a surface of the 3D object. It may be desired to control the 3D object during its formation (e.g., in real time). At times, it may be desired to control the formation of the 3D object using open loop control, closed loop control, or any combination thereof. At times, it may be desired to control the formation of the 3D object using feed forward control, feed back control, or any combination thereof. The present disclosure delineates detection, control, or both detection and control, of at least the (e.g., afore-mentioned) deformations disclosed herein using at least one of the (e.g., afore-mentioned) control methodologies disclosed herein. The present disclosure delineates reduction (e.g., attenuation and/or prevention) of at least the (e.g., afore-mentioned) degree and/or direction of deformations disclosed herein, using various detection and/or control methodologies.

In some embodiments, the present disclosure delineates methods, systems, apparatuses, and/or software that allow modeling of 3D objects with a reduced amount of design constraints (e.g., no design constraints). The present disclosure delineates methods, systems, apparatuses, and software that allow materialization (e.g., printing) of these 3D object models.

In an aspect described herein are methods, systems, apparatuses, and/or software for generating a 3D object with a controlled degree of deformation. The controlled degree may comprise controlling the amount and/or direction of deformation. The controlled degree may comprise controlling the type of deformation. The deformation may comprise a curvature. The curvature may be a curvature of at least a portion of a layer within the 3D object.

In another aspect described herein are methods, systems, apparatuses, and/or software for generating a 3D object with a reduced degree of deformation (e.g., substantially non-deformed). The 3D object can be devoid of auxiliary support (e.g., devoid of one or more auxiliary supports), or comprise of one or more auxiliary supports. The 3D object can be devoid of a mark indicating the prior presence of auxiliary support (e.g., one or more auxiliary supports).

In another aspect described herein are methods, systems, apparatuses, and/or software for generating a 3D object with a smooth (e.g., polished, continuous, or regular) and/or planar (e.g., non-warped) bottom surface.

In another aspect, a method for generating a multi layered object from a desired model comprises: transforming at least a portion of a powder bed with an energy beam to form a portion of the multi layered object, measuring a measured curvature deformation in the multi layered object, and controlling the measured curvature deformation of the multi layered object to achieve a target deformation curvature by altering at least one parameter of the transforming, wherein the measuring and the controlling occurs during the transforming of the portion of the layer of the powder bed, and wherein the multi layered object substantially corresponds to the desired model.

The curvature may comprise a warpage. The curvature may comprise a deviation of at least a portion of the multi layered object in a location away from the energy beam. Away may be away from the position at which the energy beam interacts with the powder bed. Away may be at least about 2 millimeters. The controlling may comprise controlling the energy beam. The measured deformation curvature may comprise a deformation in the vertical direction. The measured deformation curvature may comprise a deformation in the horizontal direction. The target deformation curvature may be substantially zero. The target deformation curvature may be positive. The target deformation curvature may be substantially zero. The target deformation curvature may be negative. The method may further comprise a deformed model, wherein the deformed model comprises one or more deformation of the desired model. The multi layered object may be generated according to the deformed model. The generated multi layered object may substantially correspond to the desired model. The deformed model may be generated such that the generation of the multi layered object comprising the target deformation curvature will incorporate a corrective deformation. The target deformation may comprise the corrective deformation. The target deformation may substantially correspond to the corrective deformation. The target deformation may substantially correspond to a modeling of a hardening and/or cooling of a transformed material having a shape of the corrective deformation. The deformed model may be generated such that the generation of the multi layered object with the target deformation curvature will substantially result in the multi layered object (e.g., upon hardening and/or cooling) such that the multi layered object substantially corresponds to the desired model (e.g., upon cooling and/or hardening). The desired model may be a model of a desired 3D object. The curvature deformation may be a curvature that materialized (e.g., came about) due to deformation of a transformed material (e.g., upon cooling and/or hardening of the transformed material). The hardening may be solidifying. The transforming may be melting. The controlling operation may comprise controlling the at least a portion such that it will substantially correspond to the target deformation. The target deformation may correspond to a modeling of the at least a portion that is hardened.

In another aspect, a method for generating a multi layered object comprises: dispensing a first layer of powder material to form a powder bed; transforming at least a portion of the first layer of powder material with an energy beam to form a first transformed material portion; dispensing a second layer of powder material adjacent to the first layer of powder material; transforming at least a portion of the second layer of powder material with the energy beam to form a second transformed material portion, wherein at least a fraction of the second transformed material portion is connected to the first transformed material portion to form at least a portion of the multi layered object; and deforming the multi layered object to comprise a curvature, which curvature is measured and controlled during the transforming of the at least a portion of the second layer of powder material.

The curvature can be positive or negative. The multi layered object may protrude from the exposed surface of the powder bed. The measured may comprise measuring at least a portion of a protrusion of the multi layered object that protrudes from the material bed. The measured may comprise measuring a height of the powder bed. The measured may comprise measuring a height of one or more positions at the exposed surface of the powder bed. The measured may comprise measuring a transformed material portion in the powder bed. The measured may comprise measuring a transformed material portion in the powder bed. The transformed material portion may comprise the first transformed material portion or the second transformed material portion. The measured may comprise measuring a height of an area having a radius of at least 5 mm around a location of the transforming. The controlled may comprise controlling a power of an energy source producing the energy beam. The controlled may comprise measuring a temperature of a location of the transforming. The controlled may comprise controlling the power of the energy source while measuring the temperature of a location of the transforming. The controlled may comprise controlling a power density of the energy beam while measuring the temperature of a location of the transforming. The controlled may comprise controlling the energy per unit area of the energy beam. Controlled may comprise controlling the energy per unit area of the energy beam while measuring the temperature of a location of the transforming. Transforming may comprise fusing. Fusing may comprise melting. Controlled may comprise controlling a size of a molten area on the surface of the second layer of powder material. Controlled may comprise controlling a size of the second transformed material portion. Dispensing may comprise using a layer dispensing mechanism comprising a cyclonic separator.

In another aspect, a system for forming a multi layered object comprises: a powder dispenser that is configured to dispense a first layer of powder material to form a powder bed; an energy source that is configured to generate an energy beam, which energy beam is configured to transform (e.g., is capable of transforming) at least a portion of the powder bed to form a first transformed material portion as part of the multi layered object; and at least one controller operatively coupled to the powder dispenser, and energy source, and is programmed to: (i) direct the powder dispenser to dispense a first layer of powder material to form a powder bed; (ii) direct the energy beam to transform at least a portion of the first layer of powder material to form a first transformed material portion; (iii) direct the powder dispenser to dispense a second layer of powder material adjacent to the first layer of powder material; (iv) direct the energy beam to transform at least a portion of the second layer of powder material to form a second transformed material portion, wherein at least a fraction of the second transformed material portion is connected to the first transformed material portion to form at least a portion of the multi layered object, and (v) direct the energy beam to deform the multi layered object to comprise a curvature, which curvature is measured and controlled during the transforming at least a portion of the second layer of powder material. The at least one controller may comprise a plurality of controllers. At least two of operations (i) to (v) may be directed by the same controller. At least two of operations (i) to (v) may be directed by different controllers.

In another aspect, an apparatus for forming a multi layered object from a desired (e.g., requested) model comprises at least one controller that is programmed to: (a) direct a powder dispenser to dispense a first layer of powder material to form a powder bed; (b) direct an energy beam to transform at least a portion of the first layer of powder material to form a first transformed material portion; (c) direct the powder dispenser to dispense a second layer of powder material adjacent to the first layer of powder material; (d) direct the energy beam to transform at least a portion of the second layer of powder material to form a second transformed material portion, wherein at least a fraction of the second transformed material portion is connected to the first transformed material portion to form at least a portion of the multi layered object; and (e) direct deforming the multi layered object to comprise a curvature, which curvature is measured and controlled during the transforming at least a portion of the second layer of powder material, wherein the controller is operatively coupled to the energy beam, and powder dispenser. The direct deforming in operation (e) may be effectuated by using the energy beam. The at least one controller may comprise a plurality of controllers. At least two of operations (a) to (e) may be directed by the same controller. At least two of operations (a) to (e) may be directed by different controllers.

In another aspect, a method for generating a multi layered object from a desired model comprises: transforming at least a portion of a powder bed with an energy beam to form at least a portion of the multi layered object, measuring a (e.g., curvature) deformation in the at least a portion of the multi layered object, and controlling the (e.g., curvature) deformation of the at least a portion of the multi layered object to achieve a target deformation curvature by altering at least one parameter of the transforming, wherein the measuring and the controlling occurs during the transforming of the portion of the powder bed, and wherein the multi layered object substantially corresponds to the desired model.

Measuring the deformation and controlling the deformation may occur during formation of one or more melt pools as part of the transforming. The curvature may comprise a warpage. The curvature may comprise a deviation of the at least a portion of the multi layered object with respect to the requested model, which deviation is in a location away from the energy beam. Away may be at least 2 millimeters. Away may be away from the position at which the energy beam interacts with the powder bed. Controlling may comprise controlling the energy beam. The deformation curvature may comprise a deformation in the vertical direction. The deformation curvature may comprise a deformation in the horizontal direction. The target deformation curvature may be (e.g., substantially) zero. The target deformation curvature may be positive. Substantially may be relative to the intended purpose of the multi layered (e.g., 3D) object. The method may further comprise a deformed model. The deformed model may comprise the desired model that underwent at least one deviation, wherein the multi layered object is generated according to the deformed model, and wherein the generated multi layered object (e.g., substantially) corresponds to the desired model. The deformed model may be generated such that the generation of the multi layered object with the target deformation curvature will (e.g., substantially) result in the desired model. Controlling may comprise controlling the at least a portion of the multi layered object such that it will (e.g., substantially) correspond to the target deformation. The target deformation may correspond to a modeling of the at least a portion of the multi layered object (e.g., that is hardened). Hardened may comprise solidified.

In another aspect, a system for forming a multi layered object from a desired model comprises: (e.g., an enclosure configured to contain) a powder bed; an energy source that is configured to generate an energy beam, which energy beam is configured to transform at least a portion of the powder bed to form a transformed material as part of the multi layered object; a detector that is configured to detect a (e.g., curvature) deformation in the multi layered object; and a controller operatively coupled to the powder bed, energy source, and to the detector, which controller is programmed to: (i) direct the energy beam to transform at least a portion of the powder bed to form the transformed material as at least a portion of the multi layered object; (ii) direct the detector to detect the (e.g., curvature) deformation; (iii) evaluate the degree of (e.g., curvature) deformation and produce a result; and (iv) use the result to control the (e.g., curvature) deformation of the multi layered object to achieve a target deformation (e.g., curvature) by altering at least one parameter of the transform in (i), wherein the detect in (ii) and the control in (iv) occurs during the transform in (i), and wherein the multi layered object (e.g., substantially) corresponds to the desired model. The detector may be calibrated (e.g., in situ) using a stationary position adjacent to the powder bed. Measuring the deformation and controlling the deformation may occur during formation of one or more melt pools as part of the transforming. The energy source, detector, and/or controller may be operatively coupled to the powder bed.

In another aspect, an apparatus for forming a multi layered object from a desired model comprises: at least one controller that is programmed to (a) direct an energy beam to transform at least a portion of a powder bed to form a transformed material, which transformed material forms at least a portion of the multi layered object; (b) direct the detector to detect a (e.g., curvature) deformation in the at least a portion of the multi layered object; (c) evaluate the degree of (e.g., curvature) deformation to produce a result; and (d) use the result to control the (e.g., curvature) deformation of the multi layered object to achieve a target deformation (e.g., curvature) by altering at least one parameter of the transform in (i), wherein the detect in (ii) and the control in (iv) occurs during the transform in (i), and wherein the multi layered object (e.g., substantially) corresponds to the desired model, wherein the controller is operatively coupled to the energy beam, and detector. The control may be closed loop control. Substantially may be relative to the intended purpose of the multi layered object. The at least one controller may comprise a plurality of controllers. At least two of operations (a) to (d) may be directed by the same controller. At least two of operations (a) to (d) may be directed by different controllers. Measuring the deformation and controlling the deformation may occur during formation of one or more melt pools as part of the transforming.

In another aspect, a computer software product for forming a multi layered object from a desired model, which computer software product comprises a non-transitory computer-readable medium in which program instructions are stored, which instructions, when read by a computer, cause the computer to perform operations comprising: (a) receive an input signal from a sensor that measures a (e.g., curvature) deformation of at least a portion of the multi layered object during its formation from at least a portion of a powder bed by projecting an energy beam to the powder bed, wherein the non-transitory computer-readable medium is operatively coupled to the sensor; (b) direct controlling the (e.g., curvature) deformation of the at least a portion of the multi layered object to achieve a target deformation curvature by altering at least one parameter of the formation, wherein the receive an input signal in (a) and the direct controlling in (b) occur during the formation, and wherein the multi layered object substantially corresponds to the desired model.

Altering at least one parameter of the formation may comprise altering at least one characteristic of an energy beam based on a comparison of the input signal with a desired (e.g., curvature) deformation, wherein the non-transitory computer-readable medium is operatively coupled to the energy beam. The direct in (b) may be during the forming. The computer software product may comprise sub-computer software products (e.g., modules). At least two of instructions relating to (a) to (b) may be carried out by the same sub-computer software product. At least two of instructions relating to (a) to (b) may be carried out by different sub-computer software products. Measuring the deformation and controlling the deformation may occur during formation of one or more melt pools as part of the transforming.

In another aspect, a method for printing a 3D object comprising disposing a pre-transformed material towards a platform (e.g., in an enclosure to form a material bed); transforming the pre-transformed material (e.g., which constitutes at least a portion of the material bed) with an energy beam to form a transformed material portion as part of the 3D object, which transforming over time yields a plurality of physical-attribute pulses, wherein the transformed material portion comprises a plurality of melt pools that correspond to the plurality of physical-attribute pulses; and controlling at least a portion of a physical-attribute pulse within the plurality of physical-attribute pulses in real time during the transforming.

Controlling may comprise controlling one or more mechanism of the 3D printer and/or components of the 3D printing to affect the at least a portion of the phenomenon pulse. Controlling may comprise controlling the process of detecting the phenomenon. At least two of the plurality of physical-attribute pulses may be (e.g., controllably and/or purposefully) different. The physical-attribute may comprise a detectable energy. The detectable energy may be an irradiated energy. The transformed material portion may comprise a plurality of melt pools that correspond to the plurality of measurable energy pulses. The physical-attribute can correspond to a temperature of the plurality of melt pools, temperature adjacent to the plurality of melt pools, power of an energy source that generates the energy beam, power density of the energy beam, or any combination thereof. The physical attribute can relate to a temperature comprising a temperature of the melt pool, or a temperature of an area adjacent to the melt pool. The method may further comprise measuring an intensity and/or wavelength of a radiation. The method may further comprise correlating the intensity and/or wavelength of the radiation to a temperature. The radiation may be from the melt pool, or from an area adjacent to the melt pool. The radiation may be from a footprint of the energy beam on the at least a portion, or from an area adjacent to the footprint of the energy beam on the at least a portion. The method may further comprise detecting the plurality of physical-attribute pulses by detecting one or more wavelengths irradiated (e.g., emitted) from the at least a portion. The method may further comprise detecting a radiation characteristics comprising wavelength or intensity, which radiation is emitted from the melt pool, from an area adjacent to the melt pool, or from any combination thereof. The method may further comprise detecting a radiation characteristics comprising wavelength or intensity, which radiation is emitted from a footprint of the energy beam on the at least a portion, from an area adjacent to the footprint of the energy beam on the at least a portion, or from any combination thereof. The method may further comprise correlating the intensity of the radiation, wavelength of the radiation, or both the intensity and wavelength of the radiation to a temperature value. Adjacent to the melt pool can be at a distance of at most about two, three, four, five, or six melt pool diameters from the circumference of the melt pool. The plurality of melt pools may have a substantially identical respective fundamental length scale. Real time can comprise during formation of one or more of the plurality of melt pools. Real time can comprise during formation of two of the plurality of melt pools. Real time can comprise during formation of one of the plurality of melt pools. The method may further comprise detecting the physical-attribute pulse with a detector. The detector can comprise a single pixel detector. The detector can comprise an image detector. The detector can comprise an optical measurement. The detector can comprise an optical fiber. The detector can comprise an optical position sensor. The detector can comprise a photo detector. The detector can comprise a photodiode. The physical-attribute may correspond to the temperature of the material bed (e.g., exposed surface thereof), power of the energy source, or power density of the energy beam. The measurable (e.g., detectable) energy may be the temperature of the material bed (e.g., exposed surface thereof), power of the energy source, or power density of the energy beam. The temperature of the material bed may be along the trajectory of the energy beam on the exposed surface of the material bed. Real time may be during at least a portion of the 3D printing. Real time may be during formation of a layer of the 3D object. Real time may be during formation of a hatch line. Real time may be during formation of two melt pools as part of the 3D object. Real time may be during formation of a melt pool as part of the 3D object. The pre-transformed material may be a powder material. The pre-transformed material can be at least a portion of a material bed. The material bed can be planarized during the printing using a layer dispensing mechanism comprising a cyclonic separator. The material bed may be a powder bed. The pre-transformed material may be selected from at least one member of the group consisting of metal alloy, elemental metal, ceramic, and an allotrope of elemental carbon. Dispensing may comprise using a layer dispensing mechanism. The layer dispensing mechanism may comprise a cyclonic separator. The transformed material portion may comprise at least one melt pool, and wherein the physical-attribute may comprise melt pool temperature, fundamental length scale (FLS), or reflectivity. The fundamental length scale (FLS) may comprise height, depth, or diameter (e.g., or diameter equivalence). The physical-attribute pulse may comprise a dwell time and an intermission. The dwell time may comprise a leading edge and/or a tailing edge. The method may further comprise using the controlling to maintain (e.g., over time) a substantially identical leading edge, or tailing edge of the plurality of physical-attribute pulses over time. The method may further comprise maintaining over time a substantially identical leading-edge, trailing edge, plateau, or any combination thereof (e.g., by using the controlling). The dwell time may comprise a plateau. The method may further comprise maintaining a substantially identical plateau of the plurality of physical-attribute pulses over time (e.g., by using the controlling). Identical may comprise identical in terms of intensity, time span, or any combination thereof. Controlling may comprise close loop control. The close loop control may comprise a loop sample time of at most about 20 milliseconds. Controlling may comprise calculating. Calculating can be performed during the dwell time (e.g., of the energy beam). The calculating can be performed during the intermission (e.g., of the energy beam). The calculating may not be performed during the dwell time. The calculating may not be performed during the intermission. The calculating may occur during at most about 20 microseconds. The method may further comprise maintaining a substantially identical profile of the plurality of physical-attribute pulses over time (e.g., by using the controlling). The profile may comprise an energy profile of the energy beam. The profile may comprise a temperature profile of the portion of the material bed (e.g., along the trajectory of the energy beam) over time. The profile may comprise a power density profile of the energy beam over time. The energy profile may comprise a power profile of the energy source over time. The transformed material portion may comprise at least one melt pool. The profile may comprise a temperature of the melt pool. The transformed material portion may comprise at least one melt pool. The profile may comprise a fundamental length scale (e.g., depth, diameter, or diameter equivalent) of the melt pool. The profile can comprise (i) a temperature profile of the plurality of melt pools, or (ii) a temperature profile of a position adjacent to the plurality melt pools. Adjacent may be at a distance from a circumference of the melt pool, which distance is of at most about six diameters of a melt pool generated by the energy beam, which melt pool is of the plurality of melt pools. The profile can comprise a power density profile of the energy beam. The profile can comprise a power profile of an energy source generating the energy beam. The controlling may comprise using a processor. The processor may comprise parallel processing. The processor may comprise a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, or a field programmable gate array (FPGA). The processor may comprise a graphical processing unit (GPU). The processor may comprise a field programmable gate array (FPGA). The processor may comprise a multiplicity of processing units in a single physical processing unit. The multiplicity of processing units may be parallel processing units. The multiplicity of parallel processing units can comprise at least about 200 parallel processing units. The multiplicity of parallel processing units can comprise a core or a digital signal processing slice. The multiplicity of parallel processing units may comprise a first processing unit and a second processing unit, wherein the processor may comprise low latency in data transfer from the first processing unit to the second processing unit. Latency is sufficiently low to allow a number of floating point operations per second (FLOPS) of at least about 10 Tera FLOPS. Latency is sufficiently low to allow a number of multiply-accumulate operations per second (MACs) of at least about 10 Tera MACs.

In another aspect, a system for forming a 3D object comprises: an enclosure configured to contain material bed; an energy source that is configured to generate an energy beam, which energy beam is configured to transform at least a portion of the material bed to form a transformed material as part of the 3D object, which transform over time forms a pulsing physical-attribute comprising a plurality of physical-attribute pulses (e.g., plurality of detectable energy pulses), which energy source is operatively coupled to the material bed; a detector that is configured to detect the physical-attribute, which detector is operatively coupled to the material bed; and at least one controller operatively coupled to the material bed, energy source, and detector and is programmed to: (i) direct the energy beam to generate the 3D object from at least a portion of the material bed; (ii) evaluates (e.g., or directs evaluation of) the physical-attribute detected by the detector; and (iii) using the evaluation to alter at least one characteristic of the energy beam to form the 3D object. The energy source may be operatively coupled to the material bed.

Alter may comprise maintain a substantially identical physical-attribute pulses within the multiplicity of pulses. The detector may be calibrated using at least one stationary position adjacent to the material bed (e.g., to the exposed surface thereof). The transformed material portion may comprise a plurality of melt pools that correspond to the plurality of physical-attribute pulses. The at least one controller may comprise a plurality of controllers. At least two of operations (i) to (iii) may be controlled by the same controller. At least two of operations (i) to (iii) may be controlled by different controllers. The physical-attribute may correspond to or comprise temperature of the material bed (e.g., exposed surface thereof), power of the energy source, or power density of the energy beam. The temperature of the material bed may be along the trajectory of the energy beam on the exposed surface of the material bed. The physical-attribute pulses may comprise a variation in temperature, energy source power, or energy beam power density, over time. The physical-attribute may correspond to a (I) temperature of the plurality of melt pools, (II) temperature adjacent to the plurality of melt pools, (III) power of an energy source that generates the energy beam, (IV) power density of the energy beam, or (V) any combination thereof. Adjacent to the melt pool can be at a distance of at most about six melt pool diameters from the circumference of the melt pool. Alter can comprise maintain a (e.g., substantially) identical physical-attribute pulses within the multiplicity of pulses. The detected physical-attribute (e.g., comprising a detectable energy, or a measurable energy) can comprise one or more wavelengths that are emitted from the at least a portion. The detected physical-attribute can comprise a wavelength of a radiation or an intensity of the radiation, which radiation is emitted (I) from an area occupied by the footprint of the energy beam on the at least a portion, (II) from an area adjacent to the area occupied by the footprint of the energy beam on the at least a portion, or (III) from any combination thereof. The detected physical-attribute may comprise wavelength or intensity, which radiation is emitted (I) from the melt pool, (II) from an area adjacent to the melt pool, or (III) from any combination thereof. The detector may further correlate, or directs correlation of, (A) the intensity of the radiation, (B) wavelength of the radiation, or (C) both the intensity and wavelength of the radiation, to a temperature value. The controlling can comprise using a processor. The processor can comprise a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, or a field programmable gate array (FPGA). The processor comprises a multiplicity of processing units in a single physical processing unit that are parallel processing units. The multiplicity of parallel processing units can comprise at least about 200 parallel processing units. The multiplicity of parallel processing units can comprise a first processing unit and a second processing unit, wherein the processor comprises low latency in data transfer from the first processing unit to the second processing unit. Latency may be sufficiently low to allow a number of floating point operations per second (FLOPS) of at least about 10 Tera FLOPS.

In another aspect, a system for printing a 3D object comprising: an enclosure configured to contain a platform;

an energy source that is configured to generate an energy beam that transforms the pre-transformed material to a transformed material as part of the 3D object, which transforms over time yields a plurality of physical-attribute pulses, wherein the transformed material comprises a plurality of melt pools that correspond to the plurality of physical-attribute pulses, which the energy source is operatively coupled to the platform; a detector that is configured to detect the plurality of physical-attribute pulses, which detector is operatively coupled to the platform; and at least one controller operatively coupled to the platform, energy source, and detector and is programmed to: (i) direct the energy beam to transform the pre-transformed material into a transformed material as a first portion of the 3D object; (ii) evaluate, or directs evaluation of, the plurality of physical-attribute pulses by the detector; and (iii) use the evaluate to alter at least one characteristic of the energy beam to print a second portion of the 3D object.

The physical attribute may comprise a detectable and/or measurable energy. The physical-attribute may correspond to a (I) temperature of the plurality of melt pools, (II) temperature adjacent to the plurality of melt pools, (III) power of an energy source that generates the energy beam, (IV) power density of the energy beam, or (V) any combination thereof. Adjacent to the melt pool can be at a distance of at most about six melt pool diameters from the center of the melt pool. Alter can comprise maintain a substantially identical physical-attribute pulses within the multiplicity of pulses. The physical-attribute can comprise one or more wavelengths that are emitted from the at least a portion. The physical-attribute can comprise a wavelength of a radiation or an intensity of the radiation, which radiation is emitted (I) from a footprint of the energy beam on the at least a portion, (II) from an area adjacent to the footprint of the energy beam on the at least a portion, or (III) from any combination thereof. The physical-attribute can comprise wavelength or intensity, which radiation is emitted (I) from the melt pool, (II) from an area adjacent to the melt pool, or (III) from any combination thereof. The detector may further correspond to, or directs a correlation of (A) the intensity of the radiation, (B) wavelength of the radiation, or (C) both the intensity and wavelength of the radiation, to a temperature value. The at least two of (i) to (iii) may be controlled by the same controller. The at least two of (i) to (iii) may be controlled by different controllers. The controlling can comprise using a processor. The processor can comprise a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, or a field programmable gate array (FPGA). The processor can comprise a multiplicity of processing units in a single physical processing unit that are parallel processing units. The multiplicity of parallel processing units can comprise at least about 200 parallel processing units. The multiplicity of parallel processing units can comprise a first processing unit and a second processing unit, wherein the processor comprises low latency in data transfer from the first processing unit to the second processing unit. Latency can be sufficiently low to allow a number of floating point operations per second (FLOPS) of at least about 10 Tera FLOPS. The system may further comprise a layer dispensing mechanism that includes a cyclonic separator, which layer dispensing mechanism is configured to planarize a material bed disposed adjacent to the platform, which material bed comprises the pre-transformed material.

In another aspect, an apparatus for forming a 3D object comprises at least one controller that is programmed to (a) direct an energy beam to generate a transformed material from a pre-transformed material (e.g., that is at least a portion of a material bed), which transformed material forms at least a portion of the 3D object, which generate the transformed material over time forms a plurality of physical-attribute pulses; (c) direct a detector to detect the physical-attribute; and (d) control at least a portion within a physical-attribute pulse of the plurality of physical-attribute pulses, which control is during (a) and takes into account the detect in (c), and wherein the at least one controller is operatively coupled to the detector, and to the energy beam.

The control can be closed loop control. The at least one controller may direct an alteration in at least one characteristic of the energy beam according to the detect in (c). The transformed material portion can comprise a plurality of melt pools that relate to the plurality of physical-attribute pulses. The at least one controller may comprise a plurality of controllers. At least two of operations (a) to (d) may be controlled by the same controller. At least two of operations (a) to (d) may be controlled by different controllers. The physical-attribute may comprise temperature of the material bed (e.g., exposed surface thereof), power of the energy source, or power density of the energy beam. The temperature of the material bed may be along the trajectory of the energy beam on the exposed surface of the material bed. The physical-attribute pulses may comprise a variation in temperature, energy source power, or energy beam power density, over time.

In another aspect, a computer software product for forming at least one 3D object, comprises a non-transitory computer-readable medium in which program instructions are stored, which instructions, when read by a computer, cause the computer to perform operations comprising: (a) receive an input signal from a sensor that comprises a pulsing physical-attribute that arises during the formation of the 3D object from a pre-transformed material (e.g., that is at least a portion of a material bed) by projecting an energy beam to the material bed, wherein the non-transitory computer-readable medium is operatively coupled to the sensor; (b) direct controlling at least a portion of a physical-attribute pulse within the plurality of physical-attribute pulses in real time during the formation of the 3D object.

Direct controlling may comprise altering at least one characteristic of the energy beam based on a comparison of the input signal with a physical-attribute setpoint, wherein the non-transitory computer-readable medium is operatively coupled to the energy beam. Direct may be during the physical-attribute pulse. The transformed material portion comprises a plurality of melt pools that relate to the plurality of physical-attribute pulses. The physical-attribute may comprise temperature of the material bed (e.g., exposed surface thereof), power of the energy source, or power density of the energy beam. The temperature of the material bed may be along the trajectory of the energy beam on the exposed surface of the material bed. The physical-attribute pulses may comprise a variation in temperature, energy source power, or energy beam power density, over time.

In another aspect, a method for printing a 3D object comprises: (a) disposing a pre-transformed material towards a platform; (b) transforming the pre-transformed material with an energy beam to form a first melt pool as part of the 3D object, which first melt pool is disposed on a target surface (e.g., that is disposed at or above the platform); (c) detecting a physical attribute of the first melt pool to obtain a first physical attribute value during the printing; (d) detecting the physical attribute of a vicinity of the first melt pool to obtain a second physical attribute value during the printing; and (e) controlling the energy beam using the first physical attribute value, the second physical attribute value, or the first physical attribute value and the second physical attribute value, which controlling is during the printing.

Controlling the energy beam may be by using the first physical attribute value and the second physical attribute value. The physical attribute value can be correlated to the temperature. The physical attribute value can comprise an amplitude, or a wavelength of an electromagnetic beam that irradiates from the target surface. The electromagnetic beam can comprise an infra-red beam. The physical attribute value can comprise an amplitude, or a wavelength of an electromagnetic beam that is reflected from the target surface. The detecting (e.g., in operations (c) and/or (d)) can comprise using an optical fiber that is coupled to a detector. The detecting in operation (c) can comprise using a first detector. The detecting in operation (d) can comprise using a second detector. The first detector can be different from the second detector. The detecting in operation (c) can comprise using a first detector, and wherein the detecting in operation (d) can comprise using a second detector set, wherein the first detector is different from the second detector set. The second detector set can comprise an optical fiber bundle comprising a plurality of optical fibers. The plurality of optical fibers can be operatively coupled to a plurality of detectors (e.g., respectively). The detecting in operation (d) can comprise averaging the signal detected from the second detector set to obtain the second physical attribute value. During the printing can comprise during formation of a layer, a plurality of melt pools within a layer, the first melt pool, or any combination thereof. The layer can be a portion of the 3D object. Controlling can comprise altering at least one characteristic of the energy beam. At least one characteristic of the energy beam can comprise (i) the power density, (ii) the cross-section beam, (iii) the dwell time, or (iv) the focus. Controlling can comprise comparing the first physical attribute value with the second physical attribute value. Controlling can comprise comparing (i) the first physical attribute value with a respective first physical attribute threshold value, (ii) the second physical attribute value with a respective second physical attribute threshold value, or (iii) the first physical attribute value with the second physical attribute threshold value. The printing can comprise using a printing instruction to control the energy beam, and wherein the method further can comprise altering the printing instruction using the comparing. Altering can be during the printing. Altering can be during the transforming to form the first melt pool. The pre-transformed material can be at least a portion of a material bed, and wherein the material bed is planarized during the printing using a layer dispensing mechanism comprising a cyclonic separator. The vicinity can be an area having a radius of at most about six fundamental length scales (e.g., diameters) of the first melt pool, that is concentric with the first melt pool. The first melt pool can be substantially isotropic, homogenous, or isotropic and homogenous. Isotropic may be in terms of shape, cross section (e.g., vertical and/or horizontal), aspect ratio (e.g. retaining substantially the same radius in the horizontal and vertical cross section), material property (e.g., microstructures), or any combination thereof. Homogenous may be in terms of material property (e.g., microstructures. The method may further comprise repeating at least operation (b) to form a second melt pool. The first melt pool and the second melt pool may be (e.g., substantially) identical in their shape, cross section (e.g., horizontal and/or vertical), fundamental length scale, material property (e.g., microstructures), or any combination thereof.

In another aspect, a system for printing a 3D object comprises: an enclosure configured to contain a platform; an energy source that is configured to generate an energy beam that transforms a pre-transformed material into a transformed material comprising a melt pool, which melt pool is a part of the 3D object, wherein the energy source is operatively coupled to the platform; a first detector that is configured to detect a physical-attribute of the melt pool, which detector is operatively coupled to the platform; a second detector that is configured to detect the physical-attribute of a vicinity of the melt pool, which second detector is operatively coupled to the platform; and at least one controller operatively coupled to the platform, energy source, and detector and is programmed to: (i) direct the energy beam to transform the pre-transformed material to form a melt pool as part of the 3D object; (ii) direct detecting the physical-attribute of the melt pool by the first detector to obtain a first physical-attribute value; (iii) direct detecting the physical-attribute of the melt pool vicinity by the second detector to obtain a second physical-attribute value and (iv) use, or direct use of, the first physical-attribute value, second physical-attribute value, or the first physical-attribute value and the second physical-attribute value, to alter at least one characteristic of the energy beam during the printing.

The vicinity can be an area having a radius of at most about six fundamental length scales (e.g., diameters) of the melt pool, that is concentric with the melt pool. The system may further comprise a layer dispensing mechanism that includes a cyclonic separator, which layer dispensing mechanism is configured to planarize a material bed disposed adjacent to the platform, which material bed can comprise the pre-transformed material. During the printing can comprise during formation of the melt pool. The physical attribute value may be correlated to the temperature. The physical attribute value can comprise an amplitude, or wavelength of an electromagnetic beam that irradiates from the target surface. The electromagnetic beam can comprise an infra-red beam. The physical attribute value can comprise an amplitude, or wavelength of an electromagnetic beam that is reflected from the target surface. The detecting can comprise using an optical fiber that is coupled to a detector. The first detector can be different from the second detector. The second detector can comprise a second detector set. The second detector set can comprise an optical fiber bundle comprising a plurality of optical fibers. The plurality of optical fibers can be operatively coupled to a plurality of detectors (e.g., respectively). The detecting in operation (iii) can comprise averaging the signal detected from the second detector set to obtain the second physical attribute value. During the printing can comprise during formation of a layer, a plurality of melt pools within a layer, or the melt pool. The layer can be a portion of the 3D object. The printing can comprise using a printing instruction to control the energy beam. The system may further comprise altering the printing instruction using the comparing.

The at least one characteristic of the energy beam can comprise (I) the power density, (II) the cross-section beam, (III) the dwell time, or (IV) the focus, of the energy beam. Alter in operation (iv) can be during the transforming to form the melt pool. Alter in operation (iv) can comprise comparing (I) the first physical attribute value with a respective first physical attribute threshold value, (II) the second physical attribute value with a respective second physical attribute threshold value, or (III) the first physical attribute value with the second physical attribute threshold value. Alter in operation (iv) can be to control the temperature distribution profile in the volume comprising the melt pool or the vicinity of the melt pool. The use, or direct use of, in operation (iv) can (e.g., respectively) comprise estimate, or direct estimation of, a temperature distribution profile in the in the volume comprising the melt pool or the vicinity of the melt pool. The use, or direct use of, in operation (iv) can (e.g, respectively) comprise adjust, or direct adjustment of, a printing instruction of the 3D model. The use, or direct use of, in operation (iv) can (e.g, respectively) comprise alter, or direct alteration of, a physical model of the printing. The use, or direct use of, in operation (iv) can (e.g, respectively) comprise alter, or direct alteration of, at least one parameter of a physical model of the printing. At least two of operations (i) to (iv) may be directed by the same controller. At least two of operations (i) to (iv) may be directed by different controllers.

An apparatus for 3D printing comprising at least one controller that is programmed to: (i) direct an energy beam to transform a pre-transformed material to form a melt pool as part of the 3D object, wherein the at least one controller is operatively coupled to the energy beam; (ii) direct a first detector to detect the physical-attribute of the melt pool to obtain a first physical-attribute value, wherein the at least one controller is operatively coupled to the first detector; (iii) direct a second detector to detect the physical-attribute of a melt pool vicinity to obtain a second physical-attribute value and (iv) use, or direct use of, the first physical-attribute value, second physical-attribute value, or the first physical-attribute value and the second physical-attribute value, to alter at least one characteristic of the energy beam during the printing. At least two of operations (i) to (iv) may be directed by the same controller. At least two of operations (i) to (iv) may be directed by different controllers.

A computer software product for printing a 3D object from a desired model, which computer software product comprises a non-transitory computer-readable medium in which program instructions are stored, which instructions, when read by a computer, cause the computer to perform operations comprising: (a) receive an input signal from a first detector that measures a physical attribute of a melt pool formed by irradiating a pre-transformed material by an energy beam, wherein the non-transitory computer-readable medium is operatively coupled to the first detector; (b) receive an input signal from a second detector that measures a physical attribute of a vicinity of the melt pool, wherein the non-transitory computer-readable medium is operatively coupled to the second detector; and (c) use the first physical-attribute value, second physical-attribute value, or the first physical-attribute value and the second physical-attribute value, to alter a printing instruction of the 3D object. Alter a printing instruction can comprise alter at least one characteristic of the energy beam. Alter may be during the printing (e.g., during formation of the melt pool). Alter can comprise altering a computer model of the printing. Alter can comprise alter at least one parameter in the computer model.

In another aspect, a method for generating a 3D object comprises: generating in a material bed at least a first portion of a 3D object and a physical marker (e.g., flag), wherein the 3D object is generated according to a model of a requested (e.g., desired) 3D structure, wherein the physical marker (e.g., flag) is an addition to the desired 3D structure, wherein the three dimensional object may comprise a portion that is prone to deformation, wherein the flag is attached to the portion that is prone to deformation; and detecting at least a portion of the physical marker (e.g., flag) (e.g., during the generating).

The method may further comprise altering the manner of generating at least a second portion of the 3D object using the detecting of the at least a portion of the physical marker. The detecting can be during the generating (e.g., printing). The detecting of the at least a portion of the physical marker (e.g., flag) can be in real time. The detection of the deviation can be during the generating (e.g., in real time). Detecting at least a portion of the physical marker may be during the formation of the 3D object (e.g., in real time). Detecting may be from a position outside the material bed. Outside can comprise above. Detecting may comprise optically detecting. Optically detecting may comprise capturing by a camera (e.g., stills and/or video camera). Optically detecting may comprise lasing. Optically detecting may comprise metrology mapping. Optically detecting may comprise a height mapping. The mapping may be a two dimensional or a 3D mapping.

Optically detecting may comprise using an oscillating radiation beam to form repeating projected areas of relative low and relative high intensity. Relative may be with respect to each to other. The method may further comprise detecting a deviation from the oscillating radiating beam. The physical marker (e.g., flag) may be attached to the portion that is prone to deformation at a position that is buried in the material bed (e.g., during at least a portion of the 3D object formation, such as, during the deformation of that portion). Buried may be during the deformation of that portion (e.g., and during the printing). The method may further comprise controlling the deformation by the detection of the at least a portion of the physical marker. Controlling may comprise reducing. Controlling may comprise monitoring. Controlling the deformation can comprise altering at least one characteristic of the energy beam or of an energy source that generates the energy beam. The at least one characteristic of the energy beam can comprise dwell time, intermission time, speed, trajectory, cross section, footprint on an exposed surface of the material bed, fluence, focus, or power density. The at least one characteristic of the energy source can comprise power. The method may further comprise detaching the physical marker (e.g., flag) (e.g., in situ and/or in real-time). In situ may comprise in the powder bed. In real-time may comprise during at least a portion of the 3D printing, e.g., during occurrence of the deformation. The material bed may comprise a particulate material. For example, the material bed may be a powder bed. The powder material can be selected from at least one member of the group consisting of metal alloy, elemental metal, ceramic, and an allotrope of elemental carbon. The material can comprise a particulate material. The particulate material can comprise at least one member selected from the group consisting of metal alloy, elemental metal, ceramic, an allotrope of elemental carbon, and an organic material. The method may further comprise planarizing the exposed surface of the material bed using a layer dispensing mechanism comprising a cyclonic separator.

In another aspect, a system for printing a 3D object comprises: (e.g., an enclosure configured to contain) a material bed; an energy source that is configured to generate an energy beam, which energy beam is configured to transform at least a portion of the material bed into both a transformed material as part of the three dimensional object and a physical marker, which 3D object comprises a portion that is prone to deformation, wherein the physical marker is connected to the portion, wherein the 3D object is formed according to a model of a requested 3D structure, wherein the physical marker is an addition to the requested 3D structure, wherein upon deformation a position of the at least a portion of the physical marker deviates, wherein the energy source is operatively coupled to the material bed; a detector that detects at least a portion of the physical marker, wherein the detector is operatively coupled to the material bed; and a controller operatively coupled to the material bed, first energy source, second energy source, and detector and is programmed to: (i) direct the energy beam to generate a first portion of the 3D object and the physical marker from at least a portion of the material bed, (ii) evaluate any deviation from the position of the at least a portion of the physical marker, and (iii) use the evaluate to control at least one characteristic of the (I) energy beam, (II) energy source, or (III) energy beam and energy source, to form a second portion of 3D object. The energy source, and/or detector may be operatively coupled to the material bed The evaluate in operation (ii) can be during the printing. The evaluate in operation (ii) can be in real time. The physical marker can be connected to the portion upon its formation. The at least one characteristic of the energy beam can comprise dwell time, intermission time, speed, trajectory, cross section, footprint on an exposed surface of the material bed, fluence, focus, or power density. The at least one characteristic of the energy source can comprise power. The system may further comprise controlling the deformation by using the evaluate in operation (iii). The controlling can comprise reduce. The control can comprise monitor. The physical marker can be attached to the portion that is prone to deformation at a position that is buried in the material bed, which buried is during the deformation. The material bed can comprise a particulate material. The particulate material can comprise at least one member selected from the group consisting of metal alloy, elemental metal, ceramic, an allotrope of elemental carbon, and an organic material. The system may further comprise a layer dispensing mechanism comprising a cyclonic separator, which layer dispensing mechanism is configured to planarize an exposed surface of the material bed during at least a portion of the printing.

In another aspect, a system for printing a 3D object comprising: an enclosure configured to contain a material bed; an energy source configured to generate an energy beam that transforms at least a portion of the material bed into (A) a transformed material as part of the three dimensional object and (B) a physical marker, which 3D object comprises a portion that is deformable, wherein the physical marker is connected to the portion, wherein the 3D object is formed according to a model of a requested 3D object, wherein the physical marker is an addition to the requested 3D object, wherein upon deformation a position of the at least a portion of the physical marker deviates, wherein the energy source is operatively coupled to the material bed; a detector that detects at least a portion of the physical marker, wherein the detector is operatively coupled to the material bed; and at least one controller that is operatively coupled to the material bed, first energy source, second energy source, and detector, and is separately or collectively programmed to: (i) direct the energy beam to generate a first portion of the 3D object and the physical marker from at least a portion of the material bed, and (ii) evaluate, or direct evaluation of, any deviation from the position of the at least a portion of the physical marker.

The at least one controller can be (separately or collectively) programmed to use the evaluate to control at least one characteristic of the (I) energy beam, (II) energy source, (III) energy beam and energy source, or (IV) any combination thereof, to form a second portion of 3D object. The evaluate or evaluation in (ii) can be during the printing. The evaluate or evaluation in (ii) can be in real time. The at least one characteristic of the energy beam can comprise dwell time, intermission time, speed, trajectory, cross section, footprint on an exposed surface of the material bed, fluence, focus, or power density. The at least one characteristic of the energy source can comprise power. The physical marker can be connected to the portion upon its formation (e.g, and during the printing). The system may further comprise controlling the deformation by using the evaluate (or evaluation) in operation (ii). The controlling can comprise reducing. The controlling can comprise monitoring. The physical marker can be attached to the portion that is prone to deformation at a position that is buried in the material bed (e.g., during the printing), which buried is during the deformation. The material bed can comprise a particulate material. The particulate material can comprise at least one member selected from the group consisting of metal alloy, elemental metal, ceramic, an allotrope of elemental carbon, and an organic material. The system may further comprise a layer dispensing mechanism comprising a cyclonic separator, which layer dispensing mechanism is configured to planarize an exposed surface of the material bed during at least a portion of the printing.

In another aspect, a system for forming a 3D object comprises: (e.g., an enclosure configured to contain) a material bed; an energy source that is configured to generate an energy beam, which energy beam is configured to transform at least a portion of the material bed into (a) a transformed material as part of the 3D object and (b) a flag, which 3D object comprises a portion that is prone to deformation, wherein the flag is connected to the portion, wherein the 3D object is formed according to a model of a desired 3D structure, wherein the flag is an addition to the desired 3D structure, wherein upon deformation a position of the at least a portion of the flag deviates from an expected position of the at least a portion of the flag; a detector that is configured to detect at least a portion of the flag; and a controller operatively coupled to the material bed, first energy source, second energy source, and detector and is programmed to: (i) direct the energy beam to generate the 3D object and the flag from at least a portion of the material bed; (ii) evaluate any deviation from the expected position of the at least the portion of the flag (e.g., during the forming); and (iii) using the evaluate to control at least one characteristic of the energy beam to form the 3D object. The flag can be connected to the portion upon its formation. The expected position of the at least a portion of the flag corresponds to the attached flag to the non-deformed 3D object. The flag may be a physical marker. The energy source and/or the detector may be operatively coupled to the material bed.

In another aspect, an apparatus for forming a 3D object comprises: at least one controller that is programmed to (a) direct disposal of a material bed; (b) direct an energy beam to generate a transformed material from at least a portion of the material bed, which transformed material forms at least a portion of the 3D object and a flag, wherein the 3D object comprises a portion that is prone to deformation, wherein the flag is connected to the portion that is prone to deformation; and (c) direct a detector to detect a deviation in the position of at least a portion of the flag from an expected position of the at least a portion of the flag (e.g., during the forming), which deviation is indicative of the deformation, and wherein the at least one controller is operatively coupled to the material bed, the detector, and the energy beam. The at least one controller may evaluate a degree of the deformation according to the deviation. The at least one controller may direct an alteration in at least one characteristic of the energy beam according to the deviation. The alteration may result in a reduced deformation. The expected position of the at least a portion of the flag corresponds to the attached flag to the non-deformed 3D object. The at least one controller may comprise a plurality of controllers. At least two of (a) to (c) may be directed by the same controller. At least two of (a) to (c) may be directed by different controllers.

In another aspect, a computer software product for forming at least one 3D object, comprises a non-transitory computer-readable medium in which program instructions are stored, which instructions, when read by a computer, cause the computer to perform operations comprising: (a) receive a first input signal from a sensor that comprises a location of at least a portion of a flag that is connected to at least a portion of the 3D object (e.g., during the forming), which portion is prone to deformation, which 3D object is buried at least in part in the material bed; (b) receive a second input signal (e.g., during the forming) from the sensor that comprises a deviation from the location of the at least a portion of the flag; and (c) compare the first input signal with the second input signal to generate a result, which result is indicative of a deformation of the portion of the 3D object. The computer software product may further cause the computer to perform operations comprising: directing an energy beam to alter at least one characteristic of the energy beam based on the result, which energy beam transforms at least a portion of the material bed to form at least a portion of the 3D object, wherein the non-transitory computer-readable medium is operatively coupled to the energy beam. The non-transitory computer-readable medium can be operatively coupled to the energy beam. Compare may be during formation of the 3D object.

In another aspect, a method for forming (e.g., printing) at least one 3D object comprises: (a) generating the at least one 3D object in a material bed, wherein the top surface of the 3D object is buried at least in part in the material bed, which material bed comprises an exposed surface having an average planar surface, wherein the at least one 3D object causes at least a portion of the exposed surface to deviate from the average planar surface; (b) projecting a detectable shape (e.g., projecting an image of a detectable shape) on the exposed surface using a scanning energy beam; and (c) detecting a deviation in the detectable shape from an expected shape (e.g., during the forming, e.g., during the printing).

The shape may be projected on the exposed surface. The method may further comprise controlling (e.g., altering) the function of one or more components (e.g., mechanism) of the printing using the deviation. The top surface of the 3D object can be buried (e.g., at least in part) in the material bed. Detecting may comprise optically detecting. The deviation in the shape may comprise intensity deviation. The deviation in the (e.g., projected and subsequently detected) shape may comprise frequency deviation. The deviation in the shape may comprise deviation in a fundamental length scale (FLS) of the shape. The deviation may be in the type of shape (e.g., the expected shape may be a rectangle and the detected shape may be an oval). The shape may be an area that is projected on the exposed surface of the material bed. The FLS may comprise a cross section, shape, or area. The FLS may comprise a length, or width. The shape projected on the exposed surface of the material bed may comprise a region having a first intensity that is detectably different from an area that does not occupy the projected shape, having a second intensity (e.g., that has (e.g., substantially) no detectable radiation of the scanning energy beam). The first intensity can be higher than the second intensity, which higher is detectable. Detectable may comprise optically detectable. The deviation may comprise deviation in the shape type (e.g., deviation in shape from an expected rectangular shape). The deviation may comprise deviation in the first intensity or second intensity. The deviation can be used in detecting a position of the 3D object (e.g., in the material bed. For example, with respect to the exposed surface of the material bed). The position may comprise a vertical or horizontal position. The deviation can be used in detecting a deformation in the 3D object. The deviation can be used in detecting and/or assessing a deformation in the top surface of the 3D object. The deviation can be used in detecting and/or assessing a deformation in the top surface of the 3D object. The shape type and/or its position with respect to the exposed surface, may vary in time. The position of the scanning shape with respect to the exposed surface may vary as a function of time. The shape may appear traveling on the exposed surface (e.g., over time). The projected shape type (e.g., area on the target surface that is occupied by the projected shape) may vary over time. The projected shape type may be (e.g., substantially) constant over time. The shape may vary in different areas of the exposed surface. The projected shape may be (e.g., substantially) the same over the (e.g., entire) exposed surface. The projected shape may comprise electromagnetic radiation. The projected shape may comprise a first wavelength that is different from a second wavelength of a transforming energy beam used in the formation of the 3D object. The shape may be projected at a first angle onto the exposed surface, and the transforming energy beam may be projected at a second angle onto the exposed surface. The first angle may be different from the second angle. The first angle may be (e.g., substantially) the same as the second angle. The scanning energy beam producing the projected shape may be separated from a transforming energy beam that is used in the formation of the 3D object. Separated may be in terms of location and/or wavelength. Separated may be in terms of detection. Separated may be in terms of beam trajectory. The scanning energy beam may coincide with the transforming energy beam. Coincide may be in terms of trajectory.

In another aspect, a system for forming a 3D object comprises: a material bed (e.g., disposed in an enclosure configured to contain it) comprising an exposed surface having an average planarity; a first energy source that generates (e.g., is configured to generate) a first energy beam, which first energy beam transforms (e.g., is configured to transform) at least a portion of the material bed into a transformed material as part of the 3D object, which 3D object is buried at least in part in the material bed, wherein the 3D object causes at least a portion of the exposed surface to deviate from the average planarity (wherein the first energy source is operatively coupled to the material bed); a second energy source that is configured to generate a second energy beam, which second energy beam is configured to project a detectable-shape on the exposed surface (wherein the second energy source is operatively coupled to the material bed); a detector that is configured to detect a deviation between an expected shape of the detectable-shape and a detected shape of the detectable-shape, wherein the detected is from the exposed surface (wherein the detector is operatively coupled to the material bed); and a controller (or at least one controller) that is operatively coupled to the material bed, first energy source, second energy source, and detector, and is programmed to: (i) direct the first energy beam to generate the 3D object from at least a portion of the material bed; (ii) direct the second energy beam to generate the detectable-shape (e.g., during the forming); (iii) evaluate the deviation to produce a result.

The controller (or at least one controller) may further be programmed to (iv) use (e.g., at least in part) the result to control at least one characteristic of the first energy beam and/or at least one mechanism to form the 3D object. The system may comprise controlling (e.g., altering) the function of one or more components (e.g., mechanism) of the printing using the evaluation. Use in operation (iv) may be in real time during the formation of the 3D object. The first energy source may be different from the second energy source. The first energy source and second energy source may be the same energy source. The first energy beam may be different from the second energy beam. The first energy source may have (e.g., substantially) the same characteristics as the second energy source. The first energy beam may have (e.g., substantially) the same characteristics as the second energy beam. The first energy beam may have different characteristics as compared to the second energy beam. At least two of the at least one controller programmed to effectuate (i) to (iv), may be the same controller. The at least one controller may be a plurality of controllers. At least two of the at least one controller programmed to effectuate (i) to (iv), may be different controllers. The second energy beam, the first energy beam, or both the first energy beam and the second energy beam, may comprise electromagnetic radiation. The first energy beam may be a laser beam. The second energy beam may be a light emitting diode beam. The second energy beam may be a visible light beam. The first energy beam may comprise a laser beam. The second energy beam may comprise a LED. The second energy source may comprise a digital mirror.

In another aspect, an apparatus for detecting a 3D object comprises: a material bed comprising an exposed surface having an average planarity; a first energy source configured to generate a first energy beam, which first energy is configured to transform at least a portion of the material bed into a transformed material as part of the 3D object, which 3D object is buried at least in part in the material bed, wherein the 3D object causes at least a portion of the exposed surface to deviate from the average planarity, wherein the first energy source is operatively coupled and/or disposed adjacent to the material bed; a second energy source configured to generate (e.g., during formation of the three-dimensional object) a second energy beam, which second energy beam that is configured to project a detectable-shape on the exposed surface, wherein the second energy source is operatively coupled and/or disposed adjacent to the material bed; and a detector that is configured to detect a deviation between an expected shape of the detectable-shape and a detected shape of the detectable-shape, which deviation is indicative of a change from a requested structure and/or position of the 3D object. The change may be indicative of a deformation in at least a portion of the 3D object. The apparatus may comprise using the deviation to control (e.g., alter) the function of one or more components (e.g., mechanism) of the formation of the 3D object (e.g., as part of the transformation).

In another aspect, a computer software product for forming at least one 3D object, comprises a non-transitory computer-readable medium in which program instructions are stored, which instructions, when read by a computer, cause the computer to perform operations comprising: (a) receive a first input signal from a sensor that comprises a detectable-shape that is projected on an exposed surface of a material bed, wherein the non-transitory computer-readable medium is operatively coupled to the sensor; (b) receive a second input signal from the sensor that comprises a deviation between an expected shape of the detectable-shape and a detected shape of the detectable-shape (e.g., during the forming), wherein the material bed comprises at least a portion of a 3D object that is buried at least in part in the material bed; and (c) compare the first input signal with the second input signal to generate a result, which result is indicative of a change from a requested structure or position of the 3D object. The computer software product may further cause the computer to perform operations comprising: direct an energy beam to alter at least one characteristic of the energy beam based on the result, which energy beam transforms at least a portion of the material bed to form at least a portion of the 3D object. The non-transitory computer-readable medium may be operatively coupled to the energy beam. The non-transitory computer-readable medium may be operatively coupled to the energy beam. Compare may be during formation of the 3D object. The operations may comprise using the result to control (e.g., alter) the function of one or more components (e.g., mechanism) of the formation of the 3D object. The computer software product may further cause the computer to perform operations comprising: direct a mechanism of the forming to alter at least one characteristic based on the result. The mechanism may comprise a layer dispensing mechanism, or an optical system. The projected scanning energy beam may translate along at least a portion of the exposed surface over time. The detectable-shape may translate along the exposed surface over time. The expected shape of the detectable-shape may remain unaltered over time. The expected shape of the detectable-shape may change (e.g., in a known and/or predetermined way) over time.

In another aspect, a method for forming (e.g., printing) at least one 3D object comprises: (a) generating the at least one 3D object in a material bed, wherein the top surface of the 3D object is buried at least in part in the material bed, which material bed comprises an exposed surface having an average planar surface, wherein the at least one 3D object causes at least a portion of the exposed surface to deviate from the average planar surface; (b) projecting an oscillating beam on the exposed surface, which oscillating beam comprises a detectable oscillation pattern; and (c) detecting a deviation in the detectable oscillation pattern (e.g., during the forming).

The method may further comprise controlling (e.g., altering) the function of one or more components (e.g., mechanism) of the printing using the deviation. The top surface of the 3D object can be buried (e.g., at least in part) in the material bed. Detecting may comprise optically detecting. The deviation in the oscillation pattern may comprise intensity deviation. The deviation in the oscillation pattern may comprise frequency deviation. The deviation in the oscillation pattern may comprise deviation in a fundamental length scale (FLS) of a repeating area within the oscillating pattern. The repeating area can be an area that is projected on the exposed surface of the material bed. The FLS may comprise a cross section, shape, or area. The FLS may comprise a length, or width. The oscillation pattern projected on the exposed surface of the material bed may comprise a region having a first intensity and a first shape and a region having a second intensity and a second shape. The first intensity can be higher than the second intensity, which higher is detectable. Detectable may comprise optically detectable. The deviation may comprise deviation in the first shape or second shape. The deviation may comprise deviation in the first intensity or second intensity. The deviation can be used in detecting a position of the 3D object (e.g., in the material bed. E.g., with respect to the exposed surface of the material bed). The position may comprise a vertical or horizontal position. The deviation can be used in detecting a deformation in the 3D object. The deviation can be used in detecting a deformation in the top surface of the 3D object. The deviation can be used in detecting a deformation in the top surface of the 3D object. The method may further comprise detecting a deviation in the first intensity or in the second intensity. The oscillating beam may alter in time. The projected oscillating pattern may vary as a function of time. The oscillating beam may appear traveling on the exposed surface (e.g., over time). The oscillating beam may vary over time. The oscillating beam may be (e.g., substantially) constant over time. The oscillating beam may vary in different areas of the exposed surface. The oscillating beam may be (e.g., substantially) the same over the (e.g., entire) exposed surface. The oscillating beam may comprise electromagnetic radiation. The oscillating beam may comprise a first wavelength that is different from a second wavelength of a transforming energy beam used in the formation of the 3D object. The oscillating beam may be projected at a first angle onto the exposed surface, and the transforming energy beam may be projected at a second angle onto the exposed surface. The first angle may be different from the second angle. The first angle may be (e.g., substantially) the same as the second angle. The oscillating beam may be separated from a transforming energy beam that is used in the formation of the 3D object. Separated may be in terms of location and/or wavelength. Separated may be in terms of detection. Separated may be in terms of beam trajectory. The oscillating beam may coincide with the transforming energy beam. Coincide may be in terms of trajectory.

In another aspect, a system for forming a 3D object comprises: a material bed (e.g., disposed in an enclosure configured to contain it) comprising an exposed surface having an average planarity; a first energy source that generates (e.g., is configured to generate) a first energy beam, which first energy beam transforms (e.g., is configured to transform) at least a portion of the material bed into a transformed material as part of the 3D object, which 3D object is buried at least in part in the material bed, wherein the 3D object causes at least a portion of the exposed surface to deviate from the average planarity (wherein the first energy source is operatively coupled to the material bed); a second energy source that is configured to generate a second energy beam, which second energy beam is an oscillating beam that is configured to project on the exposed surface and is configured to form at least one detectable pattern (wherein the second energy source is operatively coupled to the material bed); a detector that is configured to detect a deviation from the detectable pattern (wherein the detector is operatively coupled to the material bed); and a controller (or at least one controller) that is operatively coupled to the material bed, first energy source, second energy source, and detector, and is programmed to: (i) direct the first energy beam to generate the 3D object from at least a portion of the material bed; (ii) direct the second energy beam to generate the detectable pattern (e.g., during the forming); (iii) evaluate the deviation from the detectable pattern; and (iv) using (e.g., at least in part) the evaluation (e.g., evaluate) to control at least one characteristic of the first energy beam to form the 3D object.

The system may comprise controlling (e.g., altering) the function of one or more components (e.g., mechanism) of the printing using the evaluation. Using in operation (iv) may be in real time during the formation of the 3D object. The first energy source may be different from the second energy source. The first energy source and second energy source may be the same energy source. The first energy beam may be different from the second energy beam. The first energy source may have (e.g., substantially) the same characteristics as the second energy source. The first energy beam may have (e.g., substantially) the same characteristics as the second energy beam. The first energy beam may have different characteristics as compared to the second energy beam. At least two of the at least one controller programmed to effectuate (i) to (iv), may be the same controller. The at least one controller may be a plurality of controllers. At least two of the at least one controller programmed to effectuate (i) to (iv), may be different controllers. The second energy beam, the first energy beam, or both the first energy beam and the second energy beam, may comprise electromagnetic radiation. The first energy beam may be a laser beam. The second energy beam may be a light emitting diode beam. The second energy beam may be a visible light beam. The first energy beam may comprise a laser beam. The second energy beam may comprise a LED. The second energy source may comprise a digital mirror.

In another aspect, a system for printing a three-dimensional object comprises: an enclosure configured to contain a material bed comprising an exposed surface having an average planarity; a first energy source that is configured to generate a first energy beam that transforms at least a portion of the material bed into a transformed material as part of the three-dimensional object, which three-dimensional object is buried at least in part in the material bed, wherein the three-dimensional object causes at least a portion of the exposed surface to deviate from the average planarity, wherein the first energy source is operatively coupled to the material bed; a second energy source that is configured to generate a second energy beam, which second energy beam is an oscillating beam that is projected on the exposed surface to form a detectable pattern, wherein the second energy source is operatively coupled to the material bed; a detector that is configured to detect a deviation from the detectable oscillating pattern, wherein the detector is operatively coupled to the material bed; and at least one controller operatively coupled to the material bed, first energy source, second energy source, and detector and is programmed to: (i) direct the first energy beam to generate the three-dimensional object from at least a portion of the material bed; (ii) direct the second energy beam to generate the detectable pattern, for example, during the forming; (iii) evaluate any deviation from the detectable oscillating pattern; and (iv) control at least one characteristic of the first energy beam based at least in part on any deviation from the detectable oscillating pattern, to form the three-dimensional object. Control in operation (iv) may be in real time during the formation of the three-dimensional object. The second energy beam, the first energy beam, or both the first energy beam and the second energy beam, can comprise electromagnetic radiation. The first energy source can comprise a laser. The second energy source can comprise a digital mirror. The first energy source can be different from the second energy source. The first energy beam can be different from the second energy beam. The oscillating beam can comprise a first wavelength that is different from a second wavelength of a transforming energy beam used in the formation of the 3D object. The oscillating beam can be projected at a first angle onto the exposed surface, and the transforming energy beam may be projected at a second angle onto the exposed surface. The first angle may be different from the second angle. The second energy beam can be separated from the first energy. Separated can be in terms of location, wavelength, detection, beam trajectory, or any combination thereof. At least two of (i) to (iv) may be performed by the same controller. At least two of (i) to (iv) may be performed by different controllers.

In another aspect, an apparatus for detecting a 3D object comprises: a material bed comprising an exposed surface having an average planarity; a first energy source configured to generate a first energy beam, which first energy is configured to transform at least a portion of the material bed into a transformed material as part of the 3D object, which 3D object is buried at least in part in the material bed, wherein the 3D object causes at least a portion of the exposed surface to deviate from the average planarity, wherein the first energy source is operatively coupled and/or disposed adjacent to the material bed; a second energy source configured to generate (e.g., during formation of the three-dimensional object) a second energy beam, which second energy beam is an oscillating beam that is configured to project on the exposed surface to form at least a detectable pattern, wherein the second energy source is operatively coupled and/or disposed adjacent to the material bed; and a detector that is configured to detect a deviation from the detectable pattern, which deviation is indicative of a change from a desired structure and/or position of the 3D object. The change may be indicative of a deformation in at least a portion of the 3D object. The apparatus may comprise using the deviation to control (e.g., alter) the function of one or more components (e.g., mechanism) of the formation of the 3D object (e.g., as part of the transformation).

In another aspect, an apparatus for forming a 3D object comprises: a controller (e.g., or at least one controller) that is programmed to direct: (a) disposal of a material bed having an average planar exposed surface; (b) a first energy beam to generate a transformed material from at least a portion of the material bed as part of the three dimensional object, which 3D object is buried at least in part in the material bed, wherein the 3D object causes at least a portion of the exposed surface to deviate from the average planarity; (c) a second energy beam to generate a pattern projected on the exposed surface (e.g., during the forming); and (e) a detector to detect a deviation from the pattern on the exposed surface, which deviation is indicative of a change from a desired structure or position of the 3D object, and wherein the controller is operatively coupled to the material bed, the detector, the first energy beam, and the second energy beam. At least two of the at least one controller directing (a) to (e), may be the same controller. At least two of the at least one controller directing (a) to (e), may be different controllers. The at least one controller may be a plurality of controllers. The apparatus may comprise using the deviation to control (e.g., alter) the function of one or more components (e.g., mechanism) of the formation of the 3D object.

In another aspect, a computer software product for forming at least one 3D object, comprises a non-transitory computer-readable medium in which program instructions are stored, which instructions, when read by a computer, cause the computer to perform operations comprising: (a) receive a first input signal from a sensor that comprises a pattern projected on an exposed surface of a material bed, wherein the non-transitory computer-readable medium is operatively coupled to the sensor; (b) receive a second input signal from the sensor that comprises a deviation from the pattern projected on the exposed surface of the material bed (e.g., during the forming), wherein the material bed comprises at least a portion of a 3D object that is buried at least in part in the material bed; and (c) compare the first input signal with the second input signal to generate a result, which result is indicative of a change from a desired structure or position of the 3D object. The computer software product may further cause the computer to perform operations comprising: direct an energy beam to alter at least one characteristic of the energy beam based on the result. The energy beam may transform at least a portion of the material bed to form at least a portion of the 3D object. The non-transitory computer-readable medium may be operatively coupled to the energy beam. The non-transitory computer-readable medium may be operatively coupled to the energy beam. Compare may be during formation of the 3D object. The operations may comprise using the result to control (e.g., alter) the function of one or more components (e.g., mechanism) of the formation of the 3D object. The computer software product may further cause the computer to perform operations comprising: direct an energy beam to alter the function of at least one mechanism of the forming based on the result.

In another aspect, a method for generating a 3D object comprises: (a) generating a first portion of a first layer as part of the 3D object by 3D printing; (b) performing a measurement of at least one position of an exposed surface during the 3D printing; (c) assessing an alteration of at least one characteristic of the 3D printing based on the measuring, which assessing is during the 3D printing; and (d) generating a second portion of the first layer or of a second layer as part of the 3D object by the 3D printing, which generating is according to a result of the assessing.

The second layer can be different from the first layer. The second layer can be subsequent to the first layer. Subsequent can be directly subsequent. The at least a portion of the first layer can be in contact with at least a portion of the second layer. The at least a portion of the first portion can be in contact with at least a portion of the second portion. The 3D printing can be a powder based 3D printing. The powder can comprise elemental metal, metal alloy, ceramics, or an allotrope of elemental carbon. The 3D printing can comprise fusing the powder. The fusing can comprise melting or sintering. The fusing can comprise using an energy beam to fuse at least a portion of the powder to form a transformed material, which transformed material hardens into a hardened material as part of the 3D object. The energy beam can be an electromagnetic beam or a charged particle beam. The electromagnetic beam can be a laser. The charged particle beam can be an electron gun. The 3D printing can be additive manufacturing. The additive manufacturing can comprise selective laser melting, selective laser sintering, or direct metal laser sintering. The first portion can be disposed in a material bed and wherein the exposed surface can comprise an exposed surface of the material bed. The first portion can be disposed in a material bed and wherein the exposed surface can comprise an exposed surface of the 3D object. The exposed surface of the 3D object can comprise an exposed surface of the first portion. The performing a measurement can comprise in-situ performing the measurement. The performing a measurement can comprise performing the measurement in real time during the 3D printing. The performing a measurement can comprise optically measuring. The optical measuring can comprise using a photosensitive material that alters at least one of its properties as a response to radiation. The photosensitive material can comprise p-doped metal-oxide-semiconductor (MOS), or complementary MOS (CMOS). The optical measuring can comprise using a charge-coupled device (CCD) camera.

The optical measuring can comprise using superimposed waves. The optical measuring can comprise using an interferometer. The performing a measurement can comprise measuring a temperature of the at least one position. The performing a measurement can comprise measuring a location and a temperature of the at least one position. The performing a measurement can comprise performing a location measurement of at the at least one position. The position can comprise vertical or horizontal position. Performing a measurement can comprise measuring a curvature of the at least one position. Performing a measurement can be at a frequency of at least about every one second (1 Hertz). Performing a measurement can comprise scanning the exposed surface with a scanning energy beam. The scanning energy beam may comprise a shape. The scanning energy beam may comprise a fluctuating pattern. The fluctuating pattern may fluctuate in time and/or space. The scanning energy beam may produce a fluctuating pattern on the exposed surface. The scanning energy beam may comprise a detectable radiation. The assessing may comprise comparing a detected shape of the scanning energy beam, with an expected shape of the scanning energy beam to produce a result. The method may further comprise control at least one characteristic of the 3D printing based on the result. The at least one characteristic may comprise controlling the layer dispensing mechanism (e.g., material dispenser, leveling mechanism, and/or material removal mechanism), energy beam, energy source, and/or optical system. The assessing can comprise using a processing unit to process at least one signal obtained from the measuring to generate the result. The processing unit generates the result during a time of at most one minute. The process can comprise image processing. The assessing can comprise generating a map based on the measuring of the at least one position. The map can be a topological map. The map can be a temperature map. The map can be a map of the material bed, exposed surface of the material bed, 3D object, layer of hardened material, melt pool, or any combination thereof. The topological map may be formed using a metrological sensor. The metrological sensor may comprise projection of a striped pattern. The metrological sensor may comprise a fringe projection profilometry device. The metrological sensor may be a height mapper. The metrological sensor may comprise a sensing energy beam (e.g., emitter) and a receiver. The emitter may comprise a projector. The emitter may project the sensing energy beam on a target surface. The target surface may comprise an expose surface of a material bed, a layer of hardened material, a 3D object, or a melt pool. The sensing energy beam may form a pattern on the exposed surface. The pattern may comprise areas of various levels of light intensity. The light intensity profile may comprise an on off pattern. The light intensity profile may comprise a fluctuating pattern. The fluctuating pattern may comprise gradually fluctuating intensity pattern or abruptly fluctuating intensity pattern. The fluctuating pattern may be a superposition of a multiplicity of sinusoidal waves. The fluctuating pattern may be a superposition of a multiplicity of frequency functions (e.g., sine function and/or cosine function). The fluctuating pattern may comprise a superposition of a sinusoidal wave a decreasing function. The decreasing function may be decreasing linearly, logarithmically, exponentially, or any combination thereof. The fluctuating pattern may comprise multiplicity of functions (e.g., that are superpositioned). The multiplicity of functions may be shifted (e.g., by a phase). The detector may comprise a multiplicity of sensing energy beam. The multiplicity of energy beams may form an interference pattern. The fluctuating pattern may comprise an interference pattern. The projected sensing energy beams may be of the same or of different colors. The projected sensing energy beams may be of the same or of different frequencies. The various multiplicity of projected sensing energy beams may be projected simultaneously or sequentially. A detection system may comprise a multiplicity of detectors (e.g., a multiplicity of receivers and/or transmitters). The multiplicity of receivers and/or transmitters may view the target location from a multiplicity of spatial position. The multiplicity of spatial positions may form a multi perspective image. The metrological detector (e.g., height mapper) may determine a uniformity of the target surface (e.g., exposed surface of the powder bed, 3D object, or melt pool). The uniformity may comprise standard deviation, mean, or average height of target surface. The uniformity may comprise height skew, trend, or step within the target surface. The metrological detector may differentiate between uniformity along the length and the width of the powder bed. The length of the powder bed may be a direction along which the layer dispenser mechanism translates. The width of the powder bed may be a direction perpendicular to the direction along which the layer dispenser mechanism translates.

The 3D printing can comprise using an energy beam to transform at least a portion of a material bed to form a transformed material as part of the 3D object. The transformation operation may be melt, sinter, or solidify. The at least one characteristic can comprise an area transformed by the energy beam. The at least one characteristic can comprise the size of a melt pool in the transformed material. The at least one characteristic can be of the energy beam, or material bed. The at least one characteristic can comprise the relative position of the energy beam and the material bed. The at least one characteristic can comprise the temperature of the material bed. The at least one characteristic of the energy beam can comprise its translational speed, translational acceleration, beam focus, hatching, path, wavelength, energy per unit area, power, cross section, cross sectional energy profile, or homogeneity. The homogeneity characteristics can comprise homogeneity of the energy flux over dwell time, or across a cross section of the energy beam. The 3D printing further can comprise altering the relative position between the energy beam and the material bed using a scanner, and wherein the at least one characteristic can comprise a characteristics of the scanner. The at least one characteristic of the scanner can comprise its translational speed, acceleration, path, or hatching. The path characteristics can comprise path continuity, curvature, or direction. The hatch characteristics can comprise hatch spacing, curvature, or direction. The at least one position comprise substantially all positions of the exposed surface. The at least one position can be at a distance of about one millimeter away from the energy beam. The performing a measurement may further comprise measuring a temperature of the transformed material at or adjacent to its interaction with the energy beam. The at least one characteristic can comprise the energy per unit area of the energy beam. The 3D printing can comprise using an energy beam to transform at least a portion of a material bed to form a transformed material as part of the second portion, and wherein the at least one characteristic can comprise the fundamental length scale of the transformed material. The 3D printing can comprise using an energy beam to transform at least a portion of a material bed to form a transformed material as part of the second portion, and wherein the at least one characteristic comprises the fundamental length scale of a melt pool formed in the transformed material. The alteration of the at least one characteristic of the 3D printing may comprise altering at least one characteristic of a generation device that is used to generate the at least one 3D object. The generation device may generate the 3D object under at least one formation parameter in the 3D printing. Altering at least one characteristic may comprise altering at least one formation parameter of the generation device. The formation parameter may be a parameter related to the forming of the 3D object.

In another aspect, a system for printing at least one 3D object, comprises: (a) a platform that accepts a material bed, wherein during use, at least a portion of the material bed is used to generate at least one 3D object, wherein the material bed is adjacent to the platform; (b) a device that generates a signal, which device comprises a first sensor that senses one or more input signals and generates a first output signal, which signal is generated during the generation of a first portion of (e.g., a first layer as part of) the 3D object; (c) a generation device used to generate the 3D object under at least one formation parameter using 3D printing, wherein the generation device is disposed adjacent to the material bed; and (d) a controller comprising a processing unit that is programmed to: (i) process the output signal to generate a result indicative of the formation parameter during the generation of the first layer as part of the 3D object; and (ii) direct the generation device to alter a function of the generation device based on the result during the generation of a second portion of the first layer or of a second layer as part of the 3D object. The generation device can comprise an energy beam or a material bed. The generation device can comprise a scanner. The generation device can comprise a layer dispensing mechanism or a heat sink.

In another aspect, an apparatus for printing one or more 3D objects comprises a controller that is programmed to: (a) direct a processing unit to process an output signal received from a sensor and generate a result indicative of a formation parameter during formation of a first portion (e.g., layer) as part of the 3D object formed by a 3D printing methodology, wherein the sensor senses an input signal during formation of a first portion of the first layer, wherein the controller is operatively coupled to the sensor, and to the processing unit; and (b) direct a mechanism used in the 3D printing (e.g., methodology) to alter a function of the mechanism based on the result before or during formation of a second portion (e.g., of the first layer or of a second layer) of the three-dimensional object, wherein the controller is operatively coupled to the mechanism.

In another aspect, a device comprises: a computer-readable medium and one or more processors that are coupled to the computer-readable medium and that are configured to cause the device to: (a) obtain a first tap event that was generated in response to receiving a message from at least one sensing device through a first communication channel, which sensing device senses a first exposed surface, which one or more processors are operatively coupled to the at least one sensing device through the first communication channel; (b) extract a first sensing-device identifier from the first tap event; (c) obtain a second tap event that was generated in response to receiving a message from the at least one sensing device through the first communication channel, which second tap event is obtained from a second exposed surface, which second tap event is obtained during formation of a first portion of a first layer as part of the 3D object that is generated by 3D printing; (d) extract a second sensing-device identifier from the second tap event; (e) compare the second sensing-device identifier to the first sensing-device identifier to determine a variations; and (f) send through a second communication channel a printing-alteration-operation request to at least one mechanism used in the 3D printing to alter at least one function of the mechanism based on the variation, which printing-alteration-operation request is sent before or during formation of a second portion of the first layer or of a second layer as part of the three dimensional object, wherein the one or more processors are operatively coupled to the mechanism through the second communication channel. The sensing device comprises a positional or a temperature sensor. The mechanism can comprise an energy beam. The message can be a sensor output. The "compare" operation may comprise image comparison.

In another aspect, a computer program product comprises a non-transitory computer-readable medium having computer code thereon for manipulating a 3D printing process, the computer code comprising: (a) a first program code for receiving at least one first input from a sensor, wherein the sensor generates the first input signal before formation of a first portion of the first layer as at least a portion of a three dimensional object formed by the three dimensional printing process, wherein the non-transitory computer-readable medium is operatively coupled to the sensor; (b) a second program code for receiving at least one second input from a sensor, wherein the sensor generates the second input signal during formation of the first portion (e.g., of the first layer); (c) a third program code for comparing the first input signal with the second input signal and generate a result; and (d) a fourth program code for directing a mechanism used in the 3D printing process to alter a function of the mechanism based on the result before or during formation of a second portion (e.g., of the first layer or of a second layer) of the three dimensional object formed by the three dimensional printing process, wherein the non-transitory computer-readable medium is operatively coupled to the mechanism.

In another aspect, a computer software product, comprising a non-transitory computer-readable medium in which program instructions are stored, which instructions, when read by a computer, cause the computer to perform operations comprising: (a) receive a first input signal from a sensor, wherein the sensor generates the first input signal before formation of a first portion of the (e.g., first layer as at least a portion of the) three dimensional object formed by a three dimensional printing process, wherein the non-transitory computer-readable medium is operatively coupled to the sensor; (b) receive a second input signal from a sensor, wherein the sensor generates the second input signal during formation of the first portion (e.g., of the first layer); (c) compare the first input signal with the second input signal and generate a result; and (d) direct a mechanism used in the 3D printing process to alter a function of the mechanism based on the result before or during formation of a second portion of the (e.g., first layer or of a second layer of the) three dimensional object formed by the three dimensional printing process, wherein the non-transitory computer-readable medium is operatively coupled to the mechanism.

In another aspect, a method for generating a 3D object comprises: (a) generating a first portion (e.g., of a first layer as part) of the 3D object by 3D printing; (b) performing a measurement of at least one position of the exposed surface during the 3D printing; (c) assessing an alteration of at least one characteristic of the 3D printing based on the measuring, which assessing is during the 3D printing; and (d) generating a second portion (e.g., of the first layer or of a second layer as part) of the 3D object by the 3D printing, which generating is according to a result of the assessing.

The second layer can be different from the first layer. The second layer can be subsequent to the first layer. Subsequent can be directly subsequent. The at least a portion of the first layer can be in contact with at least a portion of the second layer. The at least a portion of the first portion can be in contact with at least a portion of the second portion. The 3D printing can be a powder based 3D printing. The powder can comprise elemental metal, metal alloy, ceramics, or an allotrope of elemental carbon. The 3D printing can comprise fusing the powder. The fusing can comprise melting or sintering. The fusing can comprise using an energy beam to fuse at least a portion of the powder to form a transformed material, which transformed material hardens into a hardened material as part of the 3D object. The energy beam can be an electromagnetic beam or a charged particle beam. The electromagnetic beam can be a laser. The charged particle beam can be an electron gun. The 3D printing can be additive manufacturing. The additive manufacturing can comprise selective laser melting, selective laser sintering, or direct metal laser sintering. The first portion can be disposed in a material bed and wherein the exposed surface can comprise an exposed surface of the material bed. The first portion can be disposed in a material bed and wherein the exposed surface can comprise an exposed surface of the 3D object. The exposed surface of the 3D object can comprise an exposed surface of the first portion. The performing a measurement can comprise in-situ performing the measurement. The performing a measurement can comprise performing the measurement in real time during the 3D printing. The performing a measurement can comprise optically measuring. The optical measuring can comprise using a photosensitive material that alters at least one of its properties as a response to radiation. The photosensitive material can comprise p-doped metal-oxide-semiconductor (MOS), or complementary MOS (CMOS). The optical measuring can comprise using a charge-coupled device (CCD) camera. The optical measuring can comprise using superimposed waves. The optical measuring can comprise using an interferometer. The performing a measurement can comprise measuring a temperature of the at least one position. The performing a measurement can comprise measuring a location and a temperature of the at least one position. The performing a measurement can comprise performing a location measurement of at the at least one position. The position can comprise vertical or horizontal position. The performing a measurement can comprise measuring a curvature of the at least one position. The performing a measurement can be at a frequency of at least about every one second (1 Hertz). The assessing can comprise using a processing unit to process at least one signal obtained from the measuring to generate the result. The processing unit generates the result during a time of at most one minute. The process can comprise image processing. The assessing can comprise generating a map based on the measuring of the at least one position. The map can be a topological map. The map can be a temperature map. The map can be a map of the material bed, exposed surface of the material bed, 3D object, layer of hardened material, melt pool, or any combination thereof.

The topological map may be formed using a metrological sensor. The metrological sensor may comprise projection of a striped pattern. The metrological sensor may comprise a fringe projection profilometry device. The metrological sensor may be a height mapper. The metrological sensor may comprise a sensing energy beam (e.g., emitter) and a receiver. The emitter may comprise a projector. The emitter may project the sensing energy beam on a target surface. The target surface may comprise an expose surface of a material bed, a layer of hardened material, a 3D object, or a melt pool. The sensing energy beam may form a pattern on the exposed surface. The pattern may comprise areas of various levels of light intensity. The light intensity profile may comprise an on off pattern. The light intensity profile may comprise a fluctuating pattern. The fluctuating pattern may comprise gradually fluctuating intensity pattern or abruptly fluctuating intensity pattern. The fluctuating pattern may be a superposition of a multiplicity of sinusoidal waves. The fluctuating pattern may be a superposition of a multiplicity of frequency functions (e.g., sine function and/or cosine function). The fluctuating pattern may comprise a superposition of a sinusoidal wave a decreasing function. The decreasing function may be decreasing linearly, logarithmically, exponentially, or any combination thereof. The fluctuating pattern may comprise multiplicity of functions (e.g., that are superpositioned). The multiplicity of functions may be shifted (e.g., by a phase). The detector may comprise a multiplicity of sensing energy beam. The multiplicity of energy beams may form an interference pattern. The fluctuating pattern may comprise an interference pattern. The projected sensing energy beams may be of the same or of different colors. The projected sensing energy beams may be of the same or of different frequencies. The various multiplicity of projected sensing energy beams may be projected simultaneously or sequentially. A detection system may comprise a multiplicity of detectors (e.g., a multiplicity of receivers and/or transmitters). The multiplicity of receivers and/or transmitters may view the target location from a multiplicity of spatial position. The multiplicity of spatial positions may form a multi perspective image. The metrological detector (e.g., height mapper) may determine a uniformity of the target surface (e.g., exposed surface of the powder bed, 3D object, or melt pool). The uniformity may comprise standard deviation, mean, or average height of target surface. The uniformity may comprise height skew, trend, or step within the target surface. The metrological detector may differentiate between uniformity along the length and the width of the powder bed. The length of the powder bed may be a direction along which the layer dispenser mechanism translates. The width of the powder bed may be a direction perpendicular to the direction along which the layer dispenser mechanism translates.

The 3D printing can comprise using an energy beam to transform at least a portion of a material bed to form a transformed material as part of the 3D object. The transformation operation may be melt, sinter, or solidify. The at least one characteristic can comprise an area transformed by the energy beam. The at least one characteristic can comprise the size of a melt pool in the transformed material. The at least one characteristic can be of the energy beam, or material bed. The at least one characteristic can comprise the relative position of the energy beam and the material bed. The at least one characteristic can comprise the temperature of the material bed. The at least one characteristic of the energy beam can comprise its translational speed, translational acceleration, beam focus, hatching, path, wavelength, energy per unit area, power, cross section, cross sectional energy profile, or homogeneity. The homogeneity characteristics can comprise homogeneity of the energy flux over dwell time, or across a cross section of the energy beam. The 3D printing further can comprise altering the relative position between the energy beam and the material bed using a scanner, and wherein the at least one characteristic can comprise a characteristic of the scanner. The at least one characteristic of the scanner can comprise its translational speed, acceleration, path, or hatching. The path characteristics can comprise path continuity, curvature, or direction. The hatch characteristics can comprise hatch spacing, curvature, or direction. The at least one position comprise substantially all positions of the exposed surface. The at least one position can be at a distance of about one millimeter away from the energy beam. The performing a measurement may further comprise measuring a temperature of the transformed material at or adjacent to its interaction with the energy beam. The at least one characteristic can comprise the energy per unit area of the energy beam. The 3D printing can comprise using an energy beam to transform at least a portion of a material bed to form a transformed material as part of the second portion, and wherein the at least one characteristic can comprise the fundamental length scale of the transformed material. The 3D printing can comprise using an energy beam to transform at least a portion of a material bed to form a transformed material as part of the second portion, and wherein the at least one characteristic comprises the fundamental length scale of a melt pool formed in the transformed material. The alteration of the at least one characteristic of the 3D printing may comprise altering at least one characteristic of a generation device that is used to generate the at least one 3D object. The generation device may generate the 3D object under at least one formation parameter in the 3D printing. Altering at least one characteristic may comprise altering at least one formation parameter of the generation device. The formation parameter may be a parameter related to the forming of the 3D object.

In another aspect, a system for printing at least one 3D object, comprises: (a) a platform that accepts a material bed, wherein during use, at least a portion of the material bed is used to generate at least one 3D object, wherein the material bed is adjacent to the platform; (b) a device that generates a signal, which device comprises a first sensor that senses one or more input signals and generates a first output signal, which signal is generated during the generation of a first portion of (e.g., a first layer as part of) the 3D object; (c) a generation device used to generate the 3D object under at least one formation parameter using 3D printing, wherein the generation device is disposed adjacent to the material bed; and (d) a controller comprising a processing unit that is programmed to: (i) process the output signal to generate a result indicative of the formation parameter during the generation of a first portion (e.g., layer) as part of the 3D object; and (ii) direct the generation device to alter a function of the generation device based on the result during the generation of a second portion (e.g., of the first layer or of a second layer as part) of the 3D object. The generation device can comprise an energy beam or a material bed. The generation device can comprise a scanner. The generation device can comprise a layer dispensing mechanism or a heat sink. The controller can be operatively coupled to the first device, and to the second device In another aspect, an apparatus for printing one or more 3D objects comprises a controller that is programmed to: (a) direct a processing unit to process an output signal received from a sensor and generate a result indicative of a formation parameter during formation of a first layer as part of the 3D object formed by a 3D printing methodology, wherein the sensor senses an input signal during formation of a first portion of the first layer, wherein the controller is operatively coupled to the sensor, and to the processing unit; and (b) direct a mechanism used in the 3D printing (e.g., methodology) to alter a function of the mechanism based on the result before or during formation of a second portion of the (e.g., first layer or of a second layer of the) 3D object, wherein the controller is operatively coupled to the mechanism.

In another aspect, a device comprises: a computer-readable medium and one or more processors that are coupled to the computer-readable medium and that are configured to cause the device to: (a) obtain a first tap event that was generated in response to receiving a message from at least one sensing device through a first communication channel, which sensing device senses a first exposed surface, which one or more processors are operatively coupled to the at least one sensing device through the first communication channel; (b) extract a first sensing-device identifier from the first tap event; (c) obtain a second tap event that was generated in response to receiving a message from the at least one sensing device through the first communication channel, which second tap event is obtained from a second exposed surface, which second tap event is obtained during formation of a first portion of a first layer as part of the 3D object that is generated by 3D printing; (d) extract a second sensing-device identifier from the second tap event; (e) compare the second sensing-device identifier to the first sensing-device identifier to determine a variations; and (f) send through a second communication channel a printing-alteration-operation request to at least one mechanism used in the 3D printing to alter at least one function of the mechanism based on the variation, which printing-alteration-operation request is sent before or during formation of a second portion of the first layer or of a second layer as part of the 3D object, wherein the one or more processors are operatively coupled to the mechanism through the second communication channel. The sensing device comprises a positional or a temperature sensor. The mechanism can comprise an energy beam. The message can be a sensor output. The "compare" operation may comprise image comparison.

In another aspect, a computer program product comprises a non-transitory computer-readable medium having computer code thereon for manipulating a 3D printing process, the computer code comprising: (a) a first program code for receiving at least one first input from a sensor, wherein the sensor generates the first input signal before formation of a first portion of the first layer as at least a portion of a 3D object formed by the 3D printing process, wherein the non-transitory computer-readable medium is operatively coupled to the sensor; (b) a second program code for receiving at least one second input from a sensor, wherein the sensor generates the second input signal during formation of the first portion (e.g., of the first layer); (c) a third program code for comparing the first input signal with the second input signal and generate a result; and (d) a fourth program code for directing a mechanism used in the 3D printing process to alter a function of the mechanism based on the result before or during formation of a second portion (e.g., of the first layer or of a second layer) of the 3D object formed by the 3D printing process, wherein the non-transitory computer-readable medium is operatively coupled to the mechanism.

In another aspect, a computer software product, comprising a non-transitory computer-readable medium in which program instructions are stored, which instructions, when read by a computer, cause the computer to perform operations comprising: (a) receive a (e.g., at least one) first input signal from a sensor, wherein the sensor generates the first input signal before formation of a first portion of the (e.g., first layer as at least a portion of the) 3D object formed by a 3D printing process, wherein the non-transitory computer-readable medium is operatively coupled to the sensor; (b)

receive a (e.g., at least one) second input signal from a sensor, wherein the sensor generates the second input signal during formation of the first portion (e.g., of the first layer); (c) compare the first input signal with the second input signal and generate a result; and (d) direct a mechanism used in the 3D printing process to alter a function of the mechanism based on the result before or during formation of a second portion of the (e.g., first layer or of a second layer of the) 3D object formed by the 3D printing process, wherein the non-transitory computer-readable medium is operatively coupled to the mechanism (e.g., and to the sensor).

In another aspect, a method for generating at least one 3D object comprises: disposing a pre-transformed material (e.g., in an enclosure to form a material bed); transforming the pre-transformed material (e.g., that is at least a portion of the material bed) with an energy beam to form a transformed material portion as part of the 3D object; and controlling at least one characteristic of the energy beam in real time during the transforming using closed loop control, wherein real time comprises a loop sample time of at most 20 microseconds.

The pre-transformed material can be a particulate material (e.g., powder material). The material bed can be a powder bed. The pre-transformed material can be selected from at least one member of the group consisting of a metal alloy, elemental metal, ceramic, allotrope of elemental carbon, resin, and a polymer. The pre-transformed material can be selected from at least one member of the group consisting of a metal alloy, elemental metal, ceramic, and an allotrope of elemental carbon. The at least one characteristic of the energy beam may comprise dwell time, cross-section, footprint, power per unit area, translation speed, fluence, flux, or intensity. The closed loop control may use a setpoint comprising a temperature, or FLS setpoint. The transformed material may comprise a melt pool. The temperature may comprise a temperature of the material bed, transformed material, melt pool, a position away from a footprint of the energy beam on an exposed surface of the material bed, or any combination thereof. Away may be at most about 20 millimeters away from the center of the footprint. Away may be at most about 10 millimeters away from the center of the footprint. Away may be at most about 5 millimeters away from the center of the footprint. Away may be at most about 1 millimeter away from the center of the footprint. The transformed material may comprise a melt pool, and wherein the FLS may comprise a FLS of the material bed, transformed material, or melt pool. The FLS may comprise height, depth, diameter, diameter equivalence, width, or length.

In another aspect, a system for forming a 3D object comprises: a pre-transformed material (e.g., that is at least a portion of a material bed) disposed above a platform; an energy source configured to generate an energy beam that transforms the pre-transformed material (e.g., that is at least a portion of the material bed into) a transformed material as part of the 3D object; a sensor that is configured to (a) sense a physical-attribute and (b) generate an output signal; and a controller operatively coupled to the target surface (e.g., and to the material bed), sensor, and energy beam, and is programmed to: (i) direct the energy beam to generate the 3D object from the transformed material (e.g., that is at least a portion of the material bed); and (ii) use the output signal to control at least one characteristic of the energy beam in real time during (i) by using closed loop control, wherein real time comprises a loop sample time of at most 20 microseconds.

In another aspect, an apparatus for forming a 3D object comprises: at least one controller that is programmed to (a) direct deposition of a pre-transformed material (e.g., and thus direct generation of a material bed); (b) direct an energy beam to generate a transformed material from the pre-transformed material (e.g., that is at least a portion of the material bed); (c) control in real time during (b) at least one characteristic of the energy beam by using a signal from a detector that detects a physical-attribute, which control comprises a closed loop control that uses the signal, which closed loop control has a sample time of at most 20 microseconds, and wherein the at least one controller is operatively coupled to the target surface (e.g., and to the material bed), the detector, and energy beam. At least two of (a) to (c) may be effectuated by the same controller. At least two of (a) to (c) may be effectuated by different controllers. The at least one controller may comprise a plurality of controllers.

In another aspect, a computer software product for forming at least one 3D object, comprises a non-transitory computer-readable medium in which program instructions are stored, which instructions, when read by a computer, cause the computer to perform operations comprising: (a) receive a first input signal from a sensor, wherein the sensor generates the first input signal during formation of the 3D object (e.g., in a material bed), wherein the sensor senses a physical-attribute relating (e.g., corresponding) to the formation of the 3D object (e.g., corresponding to the formation of one or more melt pools), wherein the formation comprises using an energy beam to transform a pre-transformed material (e.g., that is at least a portion of the material bed), wherein the non-transitory computer-readable medium is operatively coupled to the sensor; (b) compare the input signal with a setpoint of the physical-attribute and generate a result; (d) direct an energy source that generates the energy beam to alter at least one characteristic of the energy beam based on the result, which compare is (e.g., in real-time) during the formation of the 3D object, wherein the non-transitory computer-readable medium is operatively coupled to the energy source; and (e) receive a second input signal from the sensor, wherein the time lapsed from receiving the first input signal to receiving the second input signal is at most 20 microseconds. The non-transitory computer-readable medium may be operatively coupled to the energy beam.

In another aspect, a system for irradiation control comprises: a target surface that comprises a material type; an energy source that is configured to generate an energy beam that is configured to transform at least a portion of the target surface into a transformed material, which energy beam causes the at least a portion of the material type to part from the target surface; a detector that is configured to detect a temperature of the target surface; and at least one controller operatively coupled to the target surface, energy source, and detector and is programmed to: (i) direct the energy beam to irradiate the target surface at a position; (ii) direct the detector to detect a temperature at the position or adjacent to the position; (iii) evaluate a deviation between the temperature at the position and a target temperature value; and (iv) control at least one characteristic of the energy beam to alter an amount of the material type that parted from the material bed using the evaluate. The position may be within a footprint of the energy beam on the target surface. Adjacent to the position may comprise an area having a radius equal to at most about six footprint FLS (e.g., diameters) measured from the center of the footprint. At least two of (i) to (iv) can be controlled by the same controller. At least two of (i) to (iv) can be controlled by different controllers. The energy source and/or detector may be operatively coupled to the target surface.

In another aspect, A system for 3D printing of at least one 3D object comprising: an energy source that is configured to generate an energy beam directed to a target surface, which energy beam transforms a pre-transformed material into a transformed material as part of the 3D object, which energy beam optionally causes a fraction of the transformed material to separate from the target surface; a detector that is configured to detect a temperature at a position of the target surface, wherein the detector is operatively coupled to the target surface; and at least one controller that is operatively coupled to the target surface, energy source, and detector, wherein the at least one controller is programmed to: (i) direct the energy beam to irradiate the pre-transformed material; (ii) use the detector to detect a temperature at the position; (iii) evaluate a deviation between the detected temperature and a target temperature profile; and (iv) based at least in part on any deviation, control at least one characteristic of the energy beam to alter an amount of the fraction that separates from the target surface.

The detector may be operatively coupled to the energy source. The temperature profile may be a single value, a temperature range, or temperature function. The at least one controller can be programmed to control the at least one characteristic of the energy beam to substantially eliminate or prevent separation of the fraction from the target surface. Substantially can be relative to the intended operation of the energy beam. Substantially can be relative to the affects the transforms at least a portion of the pre-transformed material into a transformed material. At least two of (i) to (iv) can be controlled by the same controller. At least two of (i) to (iv) can be controlled by different controllers. The target surface can be an exposed surface of a material bed. The exposed surface can be planarized by a layer dispensing mechanism comprising a cyclonic separator. The pre-transformed material can comprise at least one member of the group consisting of an elemental metal, metal alloy, ceramic, an allotrope of elemental carbon, and an organic material. The pre-transformed material can comprise at least one member of the group consisting of an elemental metal, metal alloy, ceramic, and an allotrope of elemental carbon. The pre-transformed material can comprise a particulate material. The particulate material can comprise a powder material. Separate can comprise become gas-borne, evaporate, or form plasma. The position can comprise an area occupied by a footprint of the energy beam on the target surface, or a position adjacent to the area occupied by the footprint. Adjacent is in an area having a radius of at most about six fundamental length scales of the footprint that centers at the footprint. The at least a portion can comprise a melt pool. Alter can comprise reduce. Alter can comprise increase. The fraction that separated subsequently may form debris. The debris can comprise soot. The target surface is disposed in an enclosure. The fraction that separated may further react with one or more gasses in the enclosure. The one or more gasses can comprise oxygen or water. React can comprise chemically react. Chemically reacts can comprise oxidize. The debris can affect the transforms a pre-transformed material into a transformed material. Controlling can comprise using a processor. Controlling can comprise a computer model of a physical process of the 3D printing. The computer model may estimate a physical parameter of the physical process of the 3D printing. The target temperature value can be less than (I) at temperature at which the fraction separates (e.g., parts) from the target surface, (II) an evaporation temperature of the material type, (III) a plasma forming temperature of the material type, or (IV) any combination thereof. The at least one characteristic of the energy beam can comprise dwell time, footprint, cross section, power per unit area, translation speed, focus, fluence, flux, or intensity.

In another aspect, a system for 3D printing of at least one 3D object comprises: (e.g., an enclosure configured to contain) a material bed including a pre-transformed material that comprises a material type; an energy source that is configured to generate an energy beam that is configured to transform at least a portion of the pre-transformed material into a transformed material as part of the 3D object, which energy beam optionally causes the at least a portion of the material type to part from the material bed; a detector that is configured to detect a temperature of the material bed; and at least one controller operatively coupled to the material bed, energy source, and detector, and is programmed to: (i) direct the energy beam to irradiate the at least a portion of the pre-transformed material; (ii) direct the detector to detect a temperature at a position of the material bed; (iii) evaluate a deviation between the temperature at the position and a target temperature; and (iv) control at least one characteristic of the energy beam to alter an amount of the material type that parted from the material bed using the evaluate.

The detector may be operatively coupled to the material bed. The material bed may comprise an exposed surface. The exposed surface may have an average or mean planarity. The material type may comprise an element. The material type may comprise an elemental metal, metal alloy, ceramic or an allotrope of elemental carbon. The material type may comprise a polymer. The material type may comprise an organic material. The pre-transformed material may comprise a particulate material. The particulate material may comprise a powder material. The material type that parts from the material bed can be evaporate and/or form plasma. The position of the material bed may comprise a position adjacent to the at least a portion. The adjacent may comprise one or more FLS multipliers of the at least a portion. The at least a portion may comprise a melt pool. Alter may comprise reduce. Alter may comprise increase. The amount of the material type that parted from the material bed may subsequently form debris. The material bed may be disposed within an enclosure and the amount of the material type that parted from the material bed may further react with one or more gasses in the enclosure. The one or more gasses may comprise oxygen or water. Reacted may comprise chemically reacted. Chemically reacted may comprise oxidized. The debris may comprise soot. Alter may comprise substantially eliminate. Substantially may be relative to the intended operation of the energy beam. The debris may affect the transforms at least a portion of the pre-transformed material into a transformed material. Alter may comprise (e.g., substantially) reducing the amount of debris. Alter may comprise (e.g., substantially) eliminating the debris. Substantial may be relative to the affects the transforms at least a portion of the pre-transformed material into a transformed material. Controlling may comprise using a processor. The system may further comprise a computer model of a physical process of the 3D printing. The computer model may estimate a physical parameter of the physical process of the 3D printing. The target temperature may be less than a temperature at which the material type parts from the material bed. The target temperature may be less than an evaporation temperature of the material type. The target temperature may be less than a plasma forming temperature of the material type. The characteristics of the energy beam may comprise dwell time, footprint, cross section, power per unit area, translation speed, focus, fluence, flux, or intensity.

In another aspect, an apparatus for 3D printing of at least one 3D object comprises at least one controller that is programmed to: (a) direct generation of a material bed including a pre-transformed material that comprises a material type; (b) direct an energy source that generates an energy beam that transforms at least a portion of the pre-transformed material into a transformed material as part of the 3D object, which energy beam optionally causes the at least a portion of the material type to part from the material bed; (c) direct the energy beam to irradiate at least a portion of the pre-transformed material and transform the pre-transformed material to a transformed material as part of the 3D object; (d) direct a detector to detect a temperature at a position of the material bed; (e) evaluate a deviation between the temperature at the position and a target temperature; and (f) control at least one characteristic of the energy beam to alter an amount of the material type that parted from the material bed using the evaluate, wherein the at least one controller is operatively coupled to the material bed, the detector, and to the energy source. At least two of the at least one controller programed to perform (a) to (f) may be different controllers. At least two of (a) to (f) may be performed by the same controller. The at least one controller may be a plurality of controllers. The material bed may comprise an exposed surface. The exposed surface may have an average or mean planarity. The material type may comprise an element. The material type may comprise an elemental metal, metal alloy, ceramic or an allotrope of elemental carbon. The material type may comprise a polymer. The material type may comprise an organic material. The pre-transformed material may comprise a particulate material. The particulate material may comprise a powder material. The material type that parts from the material bed can evaporate and/or form plasma. The position of the material bed may comprise a position adjacent to the at least a portion. The adjacent may comprise one or more FLS multipliers of the at least a portion. The at least a portion may comprise a melt pool. Alter may comprise reduce. Alter may comprise increase. The amount of the material type that parted from the material bed may (e.g., subsequently) form debris. The material bed may be disposed within an enclosure and the amount of the material type that parted from the material bed may further react with one or more gasses in the enclosure. The one or more gasses may comprise oxygen or water. Reacted may comprise chemically reacted. Chemically reacted may comprise oxidized. The debris may comprise soot. Alter may comprise reducing (e.g., substantially eliminating, wherein substantially may be relative to the intended operation of the energy beam). The debris may affect the transformation of at least a portion of the pre-transformed material into a transformed material. Alter may comprise reducing the debris (e.g., substantially eliminating the debris, wherein substantial may be relative to the affects the transforms at least a portion of the pre-transformed material into a transformed material). Controlling may comprise using a processor. The apparatus may further comprise a computer model of a physical process of the 3D printing. The computer model may estimate a physical parameter of the physical process of the 3D printing. The target temperature may be less than a temperature at which the material type parts from the material bed. The target temperature may be less than an evaporation temperature of the material type. The target temperature may be less than a plasma forming temperature of the material type. The characteristics of the energy beam may comprise dwell time, footprint, cross section, power per unit area, translation speed, focus, fluence, flux, or intensity.

The controller (e.g., of he at least one controller) may comprise a processor. The controller may comprise a proportional-integral-derivative (PID) controller. The controller may comprise a nested controller. The controller may be programmed to perform closed loop control. The controller may be programmed to perform open loop control. The controller may comprise feedback control. The controller may comprise feed forward control. The PID controller may comprise a temperature controller. The PID controller may comprise a metrological controller. The nested controller may comprise a temperature controller or a metrological controller. The nested controller may comprise a first temperature controller or a second temperature controller. The nested controller may comprise a first metrological controller or a second metrological controller.

In another aspect, a method for irradiation control comprises: projecting an energy beam that transforms at least a portion of a target surface into a transformed material, which energy beam causes the at least a portion of the material type to part from the target surface; detecting a temperature at a position of the target surface; evaluating a deviation between the temperature at the position and a target temperature value; and controlling at least one characteristic of the energy beam to alter an amount of the material type that parted from the material bed, which controlling is using the evaluation. The position may be within a footprint of the energy beam on the target surface. Adjacent to the position may comprise an area having a radius equal to at most about six footprint FLS (e.g., diameters) measured from the center of the footprint.

In another aspect, a method for 3D printing of at least one 3D object comprises: (a) disposing a pre-transformed material above a platform; (b) directing an energy beam towards the pre-transformed material to transform the pre-transformed material into a transformed material that yields at least a portion of the 3D object; (c) irradiating the at least a portion of the 3D object with the energy beam at a position, wherein the energy beam optionally causes a fraction of the transformed material to separate from the at least a portion of the 3D object; (d) detecting a temperature at the position; (e) evaluating a deviation between the temperature detected in (d) at the position and a target temperature profile; and (f) controlling at least one characteristic of the energy beam using the evaluating, to alter an amount of the fraction that parts from the at least a portion of the 3D object.

In operation (f), the at least one characteristic of the energy beam can be controlled to substantially eliminate or prevent the fraction from separating from the at least a portion of the 3D object. Substantially can be relative to the intended operation of the energy beam. Substantially can be relative to the affects the transforms at least a portion of the pre-transformed material into a transformed material. The target surface can be an exposed surface of a material bed. The method may further comprise planarizing the exposed surface by using a layer dispensing mechanism that includes a cyclonic separator. The pre-transformed material can comprise at least one member of the group consisting of an elemental metal, metal alloy, ceramic, an allotrope of elemental carbon, and an organic material. The pre-transformed material can comprise at least one member of the group consisting of an elemental metal, metal alloy, ceramic, and an allotrope of elemental carbon. The pre-transformed material can comprise a particulate material. The particulate material can comprise a powder material. Separates can comprise become gas-borne, evaporate or form plasma. The position can comprise an area occupied by a footprint of the energy beam on the target surface, or a position adjacent to the area occupied by the footprint, wherein adjacent can be in an area having a radius of at most about six fundamental length scales of the footprint that centers at the footprint. The at least a portion can comprise a melt pool. The alter comprise reduce. The alter comprise increase. The fraction that separated subsequently forms debris. The debris can comprise soot. The target surface can be disposed in an enclosure, and wherein the fraction that separated further reacts with one or more gasses in the enclosure. The one or more gasses can comprise oxygen or water. Reacts can comprise chemically reacts. Chemically reacts can comprise oxidizes. The debris can affect (e.g., in operation (a)) the transforms a pre-transformed material into a transformed material. The target temperature value can be less than (I) a temperature at which the fraction separates from the target surface, (II) an evaporation temperature of the material type, (III) a plasma forming temperature of the material type, or (IV) any combination thereof. The at least one characteristic of the energy beam can comprise dwell time, footprint, cross section, power per unit area, translation speed, focus, fluence, flux, or intensity.

In another aspect, a method for 3D printing of at least one 3D object comprises: (a) disposing a pre-transformed material that comprises a material type in an enclosure to form a material bed; (b) projecting an energy beam that transforms at least a portion of the pre-transformed material into a transformed material as part of the 3D object, which energy beam optionally causes the at least a portion of the material type to part from the material bed; (c) directing the energy beam to irradiate at least a portion of the pre-transformed material and transform the pre-transformed material to a transformed material as part of the 3D object; (d) detecting a temperature at a position of the material bed; (e) evaluating a deviation between the temperature at the position and a target temperature; and (f) controlling at least one characteristic of the energy beam to alter an amount of the material type that parted from the material bed, which controlling is using the evaluation.

The material bed may comprise an exposed surface. The exposed surface may have an average or mean planarity. The material type may comprise an element. The material type may comprise an elemental metal, metal alloy, ceramic or an allotrope of elemental carbon. The material type may comprise a polymer. The material type may comprise an organic material. The pre-transformed material may comprise a particulate material. The particulate material may comprise a powder material. The material type that parts from the material bed can be evaporate or form plasma. The position of the material bed may comprise a position adjacent to the at least a portion. Adjacent may comprise one or more FLS multipliers of the at least a portion. The at least a portion may comprise a melt pool. Alter may comprise reduce. Alter may comprise increase. The amount of the material type that parted from the material bed may subsequently form debris. The material bed may be disposed within an enclosure and the amount of the material type that parted from the material bed may further react with one or more gasses in the enclosure. The one or more gasses may comprise oxygen or water. Reacted may comprise chemically reacted. Chemically reacted may comprise oxidized. The debris may comprise soot. Alter may comprise reduce (e.g., substantially eliminate wherein substantially may be relative to the intended operation of the energy beam). The debris may affect the transforms at least a portion of the pre-transformed material into a transformed material. Alter may comprise reducing (e.g., substantially eliminating) the debris, wherein substantial may be relative to the affects the transforms at least a portion of the pre-transformed material into a transformed material. Controlling may comprise using at least one processor. A computer model of a physical process of the 3D printing may estimate at least one physical parameter of the physical process of the 3D printing. The target temperature may be less than a temperature at which the material type parts from the material bed. The target temperature may be less than an evaporation temperature of the material type. The target temperature may be less than a plasma forming temperature of the material type. The characteristics of the energy beam may comprise dwell time, footprint (e.g., on the exposed surface of the material bed), cross section, power per unit area, translation speed, focus, fluence, flux, or intensity.

In another aspect, a method for generating a multi layered (e.g., 3D) object (from a physical model) comprises: (a) transforming at least a portion of a pre-transformed material (e.g., that forms a material bed) to a transformed material with an energy beam to form a portion of the multi layered object; (b) measuring a physical property at a position on the material bed, which position is adjacent to the portion of the multi layered object; (c) evaluating a deviation of the measured value of the physical property from a target value, which target value is obtained from a physical model (of the 3D object); and (d) controlling at least one characteristic of the energy beam to achieve the target value of the physical property, wherein controlling is using the evaluation.

The physical model may be an analogous model. The analogous model may comprise an electrical model. The analogous model may comprise an electronic model. The analogous model may comprise an electric circuit. The analogous model may comprise a resistor. The analogous model may comprise a capacitor. The analogous model may comprise a ground element. The analogous model may comprise a current source. The analogous model may comprise a voltage element. The analogous model may comprise an electrical branch. The electrical branch may comprise a resistor coupled (e.g., in parallel) to a capacitor. The electrical branch may represent a physical property of at least a portion of the multi-layered (e.g., 3D) object. The physical property may comprise a heat profile over time of (i) the energy beam (ii) the forming multi layered object, and/or (iii) the material bed. The physical property may comprise thermal history of (i) the energy beam (ii) the forming multi layered object, and/or (iii) the material bed. The physical property may comprise power profile over time of (i) the energy beam, (ii) the forming multi layered object, and/or (iii) the material bed. The physical property may comprise dwell time sequence of (i) the energy beam (ii) the forming multi layered object, and/or (iii) the material bed. The forming multi layered object (e.g., 3D object) may comprise the previously formed portion of the multi layered object. The electrical model electronically (e.g., substantially) imitates a physical property that affects the printing of the 3D object. The pre-transformed material can for (or be part of) a material bed. The material bed can be planarized using an apparatus comprising a cyclonic separator. The transforming can be during a directing of the pre-transformed material to a platform. The pre-transformed material can comprise a liquid, solid, or semi-solid. The pre-transformed material can comprise a particulate material. The particulate material can be selected from at least one member of the group consisting of elemental metal, metal alloy, ceramic, and an allotrope of elemental carbon. The physical property may be a physical attribute.

In another aspect, a system for forming at least one 3D object comprises: a platform disposed in an enclosure; an energy source that is configured to provide an energy beam that transforms a pre-transformed material to a transformed material, which energy beam is directed towards the platform, and which energy source is operatively coupled to the platform; a detector configured to detect a physical property of the transformed material, which detector is operatively coupled to the platform; and a controller operatively coupled to the energy source, and detector, wherein the controller is programmed to (i) direct the energy beam to transform at least a portion of a pre-transformed material to a transformed material to form a portion of the three-dimensional object; (ii) direct the detector to measure a physical property at a position that is at or adjacent to the portion of the 3D object; (iii) evaluate a deviation of the measured value of the physical property from a target value, which target value is obtained from a physical-model of the 3D object that comprises an electrical model; and (iv) use the evaluate in (iii) to control at least one characteristic of the energy beam to achieve the target value of the physical property.

The physical-model can be adjusted in real time during the forming of the at least one 3D object. Real time can be during a dwell time of the energy beam along a hatch line forming a melt pool. The controller can comprise a closed loop, open loop, feed forward, or feedback control. The physical-model can comprise one or more free parameters that are optimized in real time during the forming of the at least one 3D object. The controller can comprise an internal-state-model that provides an estimate of an internal state of the forming of the at least one 3D object. The internal state can be derived from one or more measurements comprising a measurement of the control variable or a measurement of the input parameters. The internal-state-model can comprise a state-observer. The controller can comprise a graphical processing unit (GPU), system-on-chip (SOC), application specific integrated circuit (ASIC), application specific instruction-set processor (ASIPs), programmable logic device (PLD), or field programmable gate array (FPGA). The electrical component can comprise an active, passive, or electromechanical components. The electromechanical component can comprise a piezoelectric device, crystal, resonator, terminal, connector, cable assembly, switch, protection device, mechanical accessory, printed circuit board, memristor, or a waveguide. The electronic component can comprise a variable or non-variable component. The electronic component may not be a variable. The control-model can comprise a plurality of electrical components. The control-model can comprise a software (e.g., a non-transitory computer-readable medium in which program instructions are stored) that simulates and/or imitates the operation of a plurality of electrical components. The pre-transformed material may be at least a portion of a material bed. The material bed may be planarized using layer dispensing mechanism comprising a cyclonic separator. The transforming can be during a directing of the pre-transformed material to a platform. The pre-transformed material may comprise a liquid, solid, or semi-solid. The pre-transformed material may comprise a particulate material. The particulate material can be selected from at least one member of the group consisting of elemental metal, metal alloy, ceramic, and an allotrope of elemental carbon.

In another aspect, a system for forming at least one 3D object, comprises: (a) an energy beam that transforms a pre-transformed material (e.g., that is at least a portion of a material bed) to a transformed material; and (b) a controller comprising a control-model that is related to a requested 3D object, which control-model is configured in the controller, which controller is operative coupled to the energy beam and is programmed to direct the energy beam to transform the pre-transformed material (e.g., that is at least a portion of the material bed) to form the at least one 3D object using the control-model the control-model comprises an electronic element.

The control-model may be adjusted in real time during the forming of the at least one 3D object. Real time may be during a dwell time of the energy beam along a hatch line forming a melt pool. The parameter may comprise a temperature, height, or power density. The at least one 3D object may be a plurality of 3D objects. The plurality of 3D objects may be formed in the same material bed. The plurality of 3D objects may be formed in parallel. The controller may comprise a closed loop or open loop control. The controller may comprise a feedback or feed-forward control. The control-model may comprise one or more free parameters that are optimized in real time during the forming of the at least one 3D object. The controller may comprise an internal-state-system (e.g., internal-state-model) that provides an estimate of an internal state of the forming of the at least one 3D object. The internal state may be derived from one or more measurements comprising a measurement of the control variable or a measurement of the input parameters. The internal-state-system may comprise a state-observer. The control-model may comprise a state-observer-model. The controller may comprise a graphical processing unit (GPU), system-on-chip (SOC), application specific integrated circuit (ASIC), application specific instruction-set processor (ASIPs), programmable logic device (PLD), or field programmable gate array (FPGA). The (at least one) 3D object may be substantially similar to the requested (at least one) 3D object. Substantially may be relative to the intended purpose of the (at least one) 3D object. The electrical component may comprise an active, passive, or electromechanical components. The active component may comprise a diode, transistor, integrated circuit, optoelectronic device, display device, vacuum tube, discharge device, or a power source. The passive component may comprise a resistor, capacitor, magnetic device, memristor, network, transducer, sensor, detector, antenna, oscillator, display device, filter, wire-wrap, or a breadboard. The electromechanical component may comprise a mechanical accessory, printed circuit board, or a memristor. The electronic component may be variable. The electronic component may not be variable. The control-model may comprise a plurality of electrical components. The control-model may electronically imitate substantially a physical property that affects the forming 3D object. Substantially may be relative to the intended purpose of the 3D object.

In another aspect, a system for 3D printing of at least one 3D object, comprises: (a) an energy beam that transforms a pre-transformed material to a transformed material; and (b) a controller comprising a computer-model that is related to a requested 3D object, which controller is operative coupled to the energy beam and is programmed to direct the energy beam to transform the pre-transformed material to a transformed material using the computer-model, which computer-model comprises an electronic element that imitates at least a portion of the 3D printing.

The computer-model comprising the electronic element may evolve during the 3D printing. Evolve may be in real-time. Real-time may comprise during formation of the 3D object. Real-time may comprise during formation of a layer of the 3D object. Real-time may comprise during a hatch line forming the layer of the 3D object. Real-time may be during a path along which the energy beam propagates to form the layer of the 3D object. Real-time may be during formation of at most two successive melt pools as part of the 3D object. Real time may be during formation of at most one melt pool as part of the 3D object. The computer model may comprise adaptive control. The computer model may comprise model predictive control. The computer model may evolve based on a time-span required to reach a threshold value. The threshold value may be a temperature of a melt pool as part of the 3D object. The temperature of the melt pool may be measured from the exposed surface of the melt pool. The threshold value may be a temperature of a position at a vicinity of the melt pool. The vicinity may be at most five FLS of the melt pool. The position at the vicinity may be in an exposed surface of the material bed. The computer-model may comprise a plurality of electronic elements that together imitate at least a portion of the 3D printing of at least a portion of the 3D object. The computer model may comprise an architecture of the plurality of electronic elements that imitates at least a portion of the 3D printing of at least a portion of the 3D object. The imitation may comprise mechanical or thermal behavior of the at least a portion of the 3D object during its 3D printing. The mechanical behavior may comprise plastic or elastic behavior. The computer-model may consider the material properties of the at least a portion of the 3D object. The control-model may be adjusted in real time during at least a portion of the 3D printing. Real time may be during a dwell time of the energy beam (e.g., along a hatch line) forming a melt pool. The parameter may comprise a temperature, height, or power density. The at least one 3D object may be a plurality of 3D objects. The plurality of 3D objects may be formed in the same material bed. The plurality of 3D objects may be formed in parallel. The controller may comprise a closed loop or open loop control. The controller may comprise a feedback or feed-forward control. The control-model may comprise one or more free parameters that are optimized in real time during the forming of the at least one 3D object. The controller may comprise an internal-state-system that provides an estimate of an internal state of the forming of the at least one 3D object. The control may comprise adaptive control. The control may comprise model predictive control. The control algorithm may evolve in real-time during the 3D printing. Real-time may be during formation of a layer of the 3D object. The internal state may be derived from one or more measurements comprising a measurement of the control variable or a measurement of the input parameters. The internal-state-system may comprise a state-observer. The control-model may comprise a state-observer-model. The controller may comprise a graphical processing unit (GPU), system-on-chip (SOC), application specific integrated circuit (ASIC), application specific instruction-set processor (ASIPs), programmable logic device (PLD), or field programmable gate array (FPGA). The 3D object may be (e.g., substantially) similar to the requested 3D object. Substantially may be relative to the intended purpose of the 3D object. The electrical component may comprise an active, passive, or electromechanical components. The active component may comprise a diode, transistor, integrated circuit, optoelectronic device, display device, vacuum tube, discharge device, or a power source. The passive component may comprise a resistor, capacitor, magnetic device, memristor, network, transducer, sensor, detector, antenna, oscillator, display device, filter, wire-wrap, or a breadboard. The electromechanical component may comprise a mechanical accessory, printed circuit board, or a memristor. The electronic component may be variable. The electronic component may not be variable. The control-model may comprise a plurality of electrical components. The control-model may electronically imitate substantially a physical property that affects the forming 3D object. Substantially may be relative to the intended purpose of the 3D object.

In another aspect, a method for forming a 3D object, comprises: (a) transforming a portion of a material bed with an energy beam to form at least a portion of the 3D object; and (b) controlling (e.g., in real time) at least one characteristic of the energy beam with a controller comprising a control-model related to a requested 3D object, which control-model is configured in the controller, wherein the 3D object is substantially similar to the requested 3D object, wherein the control-model comprises an electrical component.

The control-model may be adjusted in real time during the forming of the 3D object. Real time may be during a dwell time of the energy beam (e.g., along a hatch line) forming a melt pool. The controlling may use a processor comprising at least 3 Tera floating point operations per second, according to a benchmark. Transforming a portion of a material bed with an energy beam to form at least a portion of the 3D object and controlling in real time at least one characteristic of the energy beam with a controller comprising a control-model related to a requested 3D object, may be repeated after adjusting the at least one characteristic of the energy beam. The closed loop control may use at least one threshold value. The control-model may comprise a simplified model relative to the requested model of the 3D object. Substantially may be relative to the intended purpose of the 3D object. The control-model may comprise a state-observer-model. The control-model may comprise a simulation. The simulation may comprise a temperature or a mechanical simulation of the 3D printing (e.g., of the respective behavior of the forming 3D object during its 3D printing). The simulation may comprise a material property of the 3D object. The simulation may comprise a geometry of the 3D object. The physical model, control-model, and/or computer model may be dynamically adjusted in the real time during the forming of the 3D object (e.g., during the irradiation of the energy beam). The electrical component may comprise an active, passive, or electromechanical components. The active component may comprise a diode, transistor, integrated circuit, optoelectronic device, display device, vacuum tube, discharge device, or a power source. The passive component may comprise a resistor, capacitor, magnetic device, memristor, network, transducer, sensor, detector, antenna, oscillator, display device, filter, wire-wrap, or a breadboard. The electromechanical component may comprise a mechanical accessory, printed circuit board, or a memristor. The electronic component may be variable. The electronic component may not be variable. The physical-model may comprise a plurality of electrical components. The physical-model may electronically (e.g., substantially) imitate a physical property that affects the forming 3D object. Substantially may be relative to the intended purpose of the 3D object.

In another aspect, an apparatus for forming a 3D object comprises at least one controller that is programmed to (a) direct an energy beam to transform a portion of a material bed to form at least a portion of the 3D object; and (b) control (e.g., in real time) at least one characteristic of the energy beam, wherein the controller comprises a computer-model related to a requested 3D object, which computer-model is configured in the controller, wherein the 3D object is substantially similar to the requested 3D object, wherein the computer-model comprises an electrical component. Operations (a) and (b) may be directed by the same controller. Operations (a) and (b) may be directed by different controllers (e.g., that are operatively coupled to one another). The computer-model may imitate and/or be analogous to a thermo-mechanical model (e.g., of forming the 3D object).

In another aspect, a computer software product for forming at least one three dimensional object comprises a non-transitory computer-readable medium in which program instructions are stored, which instructions, when read by a computer, cause the computer to perform operations comprising: (a) direct an energy beam to transform a portion of a material bed to form at least a portion of the 3D object; and (b) use a computer model to control (e.g., in real time) at least one characteristic of the energy beam, which computer-model is related to a requested 3D object, which computer-model is operatively coupled to the controller, wherein the 3D object is substantially similar to the requested 3D object, wherein the computer-model comprises an electrical component. The computer-model may imitate and/or be analogous to a thermo-mechanical model (e.g., of forming the 3D object).

In another aspect, a method for estimating a fundamental length scale of a melt pool comprises: directing to a target surface an energy beam that is spatially oscillating by a spatial amplitude of at most about 50 percent of the energy beam footprint on the target surface; and during the oscillating: (a) using temperature values to estimate the fundamental length scale, comprising: (I) holding a power of an energy source that generates the energy beam at a constant value or at a substantially constant value; (II) measuring (e.g., in real time) a first temperature of a position at the target surface that coincides with the footprint as it oscillates, and collecting the temperature values by repeating the measuring over time until a melt pool is formed at the target surface; and (III) deriving the fundamental length scale of the melt pool by using an average minimum of the temperature values, and an average maximum of the temperature values; or (b) using power values to estimate the fundamental length scale, comprising: (i) controlling (e.g., in real-time) a second temperature at a constant temperature value, which second temperature is of a position of the target surface that coincides with the footprint as it oscillates; (ii) measuring (e.g., in real-time) the power of an energy source that generates the energy beam, and collecting power values by repeating the measuring over time until a melt pool is formed at the target surface; and (iii) deriving the fundamental length scale of the melt pool from an average minimum value of the measured power, and a maximum values of the measured power.

The target surface can be an exposed surface of the material bed. The material bed may comprise a particulate material. The particulate material can comprise powder. The material bed can comprise at least one material selected from the group consisting of elemental metal, metal alloy, ceramics, and an allotrope of elemental carbon. Transforming can comprise melting or sintering. Melting can comprise complete melting. The movement can be at most about 10 percent of the fundamental length scale of the footprint. The energy beam can comprise a laser beam or an electron beam. The energy beam can comprise a laser beam. The energy source can comprise a laser or an electron gun. The energy source can comprise a laser. In real time comprises during formation of the melt pool. The control can comprise closed loop control or feedback control. The using can comprise subtracting the average maximum of the temperature values from the average maximum of the temperature values. The using can comprise subtracting the average maximum of the power values from the average minimum of the temperature values. The energy beam can be oscillating by a spatial amplitude of at most about 30 percent of a footprint of the energy beam on the target surface. The energy beam can be oscillating by a spatial amplitude of at most about 20 percent of a footprint of the energy beam on the target surface. The energy beam can be oscillating by a spatial amplitude of at most about 10 percent of a footprint of the energy beam on the target surface. Substantially constant value in (a) is relative to inducing a negligent or undetectable effect on the measured temperature. Substantially constant value in (b) is relative to a negligent effect on a detectable power variation. Comprising in (III) considering the footprint position that is associated with the temperature value. Comprising in (III) considering the footprint position that is associated with the power value. Spatially oscillating can be a back and forth movement along a direction. The direction can be of a forming a line (e.g., file) of melt pools. At least two of the melt pools may overlap at least in part. The fundamental length scale may comprise a diameter or diameter equivalent.

In another aspect, a system for estimating a fundamental length scale of a melt pool comprises: a target surface; an energy source configured to generate an oscillating energy beam that irradiates the target surface, which cross section of the energy beam on the target surface is a footprint of the energy beam, which energy beam is configured to transform the target surface to form a melt pool, which energy beam is configured to spatially oscillate by a spatial amplitude of at most about 50 percent of the energy beam footprint on the target surface, wherein the energy source is operatively coupled to the target surface; a sensor comprising: (A) a power sensor configured to detect the power of the energy source, or (B) a temperature sensor configured to detect a temperature at a position of the footprint at the target surface, wherein the sensor is operatively coupled to the target surface; and at least one controller that is operatively coupled to the energy source, and to the energy beam, and is programmed to: direct the spatially oscillating energy beam to the target surface and estimate fundamental length scale, comprising: (a) (I) control operation of the power source at a constant value or at a substantially constant value, (II) direct measurement (e.g., in real time) of a first temperature of a position at the target surface that coincides with the footprint as it oscillates, and direct collection of temperature values by repeating the measurement over time until a melt pool is formed at the target surface by the oscillating energy beam; and (III) direct derivation of the fundamental length scale of the melt pool by using an average minimum of the temperature values, and an average maximum of the temperature values; or (b) (i) control (e.g., in real-time) a second temperature at a constant temperature value, which second temperature is of a position of the target surface that coincides with the footprint as it oscillates; (ii) direct measurement (e.g., in real-time) of a power value of the energy source, and direct collection of power values by repeating the measurement over time until a melt pool is formed at the target surface; and (iii) direct derivation of the fundamental length scale of the melt pool from an average minimum value of the measured power, and a maximum values of the measured power. At least two of (I) to (III) can be directed by the same controller. At least two of (I) to (III) can be directed by the different controllers. At least two of (i) to (iii) can be directed by the same controller. At least two of (i) to (iii) can be directed by the different controllers. At least one controller comprises closed loop control or feedback control. The target surface may be disposed in an enclosure.

In another aspect, an apparatus for estimating a fundamental length scale of a melt pool comprises at least one controller that is operatively coupled to (A) an energy source that is configured to generate an energy beam, and to (B) the energy beam that is configured to irradiate and transform a portion of a target surface to form a melt pool, which energy beam is configured to oscillate by a spatial amplitude of at most about 50 percent of the energy beam footprint on the target surface, which at least one controller is programmed to: direct the energy beam to the target surface and estimate the fundamental length scale of the melt pool, comprising: (a) (I) control an operation of the power source at a constant power value or at a substantially constant power value, (II) direct measurement (e.g., in real time) of a first temperature of a position at the target surface that coincides with the footprint as it oscillates, and direct collection of temperature values by repeating the measurement over time until a melt pool is formed at the target surface by the oscillating energy beam; and (III) direct derivation of the fundamental length scale of the melt pool by using an average minimum of the temperature values, and an average maximum of the temperature values; or (b) (i) control (e.g., in real-time) a second temperature at a constant temperature value, which second temperature is of a position of the target surface that coincides with the footprint as it oscillates; (ii) direct measurement (e.g., in real-time) of a power value of the energy source, and direct collection of power values by repeating the measurement over time until a melt pool is formed at the target surface; and (iii) direct derivation of the fundamental length scale of the melt pool from an average minimum value of the measured power, and a maximum values of the measured power. At least two of (I) to (III) can be directed by the same controller. At least two of (I) to (III) can be directed by the different controllers. At least two of (i) to (iii) can be directed by the same controller. At least two of (i) to (iii) can be directed by the different controllers. At least one controller can comprise closed loop control or feedback control. At least one controller can comprise open loop control or feed forward control.

In another aspect, a computer software product for estimating a fundamental length scale of a melt pool comprises a non-transitory computer-readable medium in which program instructions are stored, which instructions, when read by a computer, cause the computer to perform operations comprising: (a) derive the fundamental length scale of the melt pool by using an average minimum of temperature values, and an average maximum of the temperature values, wherein the temperature values are of positions at the target surface that coincide with footprints of a first energy beam that irradiates the target surface and spatially oscillates by a spatial amplitude of at most about 50 percent of the footprint on the target surface, which energy beam is generated by an energy source that is held at a constant or substantially constant power value; or (b) derive the fundamental length scale of the melt pool by using an average minimum of power values, and an average maximum of the power values, wherein the power values are of a second energy source that generates a second energy beam that irradiates the target surface, wherein the temperature at a position at the target surface that coincides with the footprint, is controlled to be at a constant temperature value, or at a substantially constant temperature value.

Another aspect of the present disclosure provides a non-transitory computer-readable medium comprising machine-executable code that, upon execution by one or more computer processors, implements any of the methods above or elsewhere herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIG. 6 shows a schematic views of 3D objects;

FIGS. 10A-10C shows various 3D objects and schemes thereof;

FIGS. 23A-23B show schematics 3D objects in material beds;

FIGS. 28A-28D show various schematic representations of measured physical profiles over times;

FIGS. 30A-30D schematically illustrate various steps in a 3D printing process; and FIG. 30E schematically illustrates a graph associated with a 3D printing process;

FIGS. 32A-32D show various schematic representations of measured physical-attribute profiles as a function of time;

Figure 1:
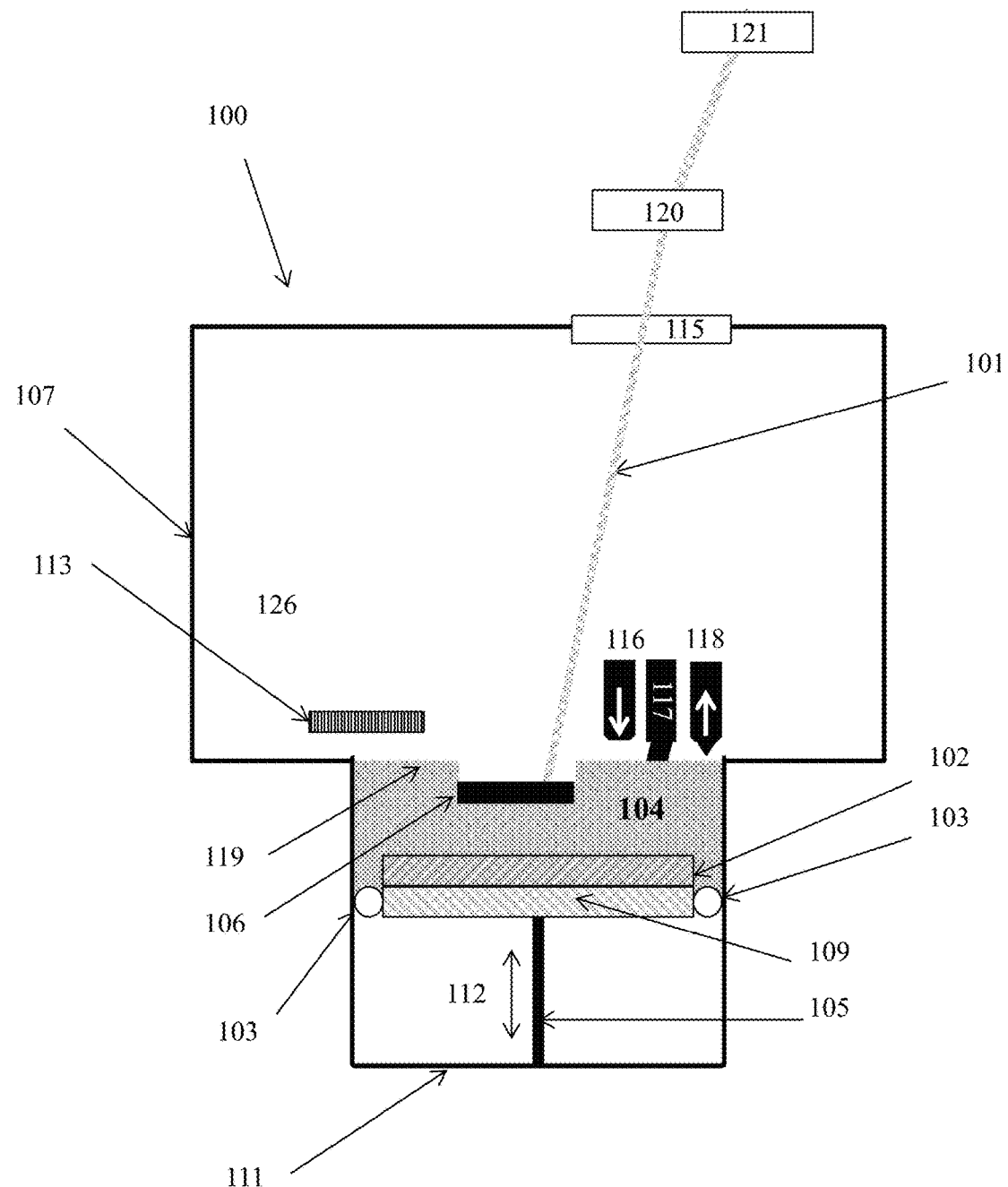
FIG. 1 shows a schematic side view of a 3D printing system and apparatuses.

The figures and components therein may not be drawn to scale. Various components of the figures described herein may not be drawn to scale. Any dimensions in the various drawings are for illustrative purposes only and are not intended to be limiting. Other dimensions and proportions not listed or visualized are contemplated and intended to be included within the scope of the invention.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an" and "the" are not intended to refer to only a singular entity, but include the general class of which a specific example may be used for illustration. The terminology herein is used to describe specific embodiments of the invention, but their usage does not delimit the invention.

When ranges are mentioned, the ranges are meant to be inclusive, unless otherwise specified. For example, a range between value1 and value2 is meant to be inclusive and include value1 and value2. The inclusive range will span any value from about value1 to about value2. The term "between" as used herein is meant to be inclusive unless otherwise specified. For example, between X and Y is understood herein to mean from X to Y. The term "adjacent" or "adjacent to," as used herein, includes 'next to,' 'adjoining,' 'in contact with,' and 'in proximity to.' In some instances, adjacent to may be 'above' or 'below.'

The term "operatively coupled" or "operatively connected" refers to a first mechanism that is coupled (or connected) to a second mechanism to allow the intended operation of the second and/or first mechanism.

Three-dimensional printing (also "3D printing") generally refers to a process for generating a 3D object. For example, 3D printing may refer to sequential addition of material layer or joining of material layers (or parts of material layers) to form a 3D structure, in a controlled manner. The controlled manner may include automated control. In the 3D printing process, the deposited material can be transformed (e.g., fused, sintered, melted, bound, or otherwise connected) to (e.g., subsequently) harden and form at least a part of the 3D object. Fusing (e.g., sintering or melting) binding, or otherwise connecting the material is collectively referred to herein as transforming the pre-transformed material (e.g., powder material). Fusing the pre-transformed material may include melting or sintering the pre-transformed material. Binding can comprise chemical bonding. Chemical bonding can comprise covalent bonding. Examples of 3D printing may include additive printing (e.g., layer by layer printing, or additive manufacturing). 3D printing may include layered manufacturing. 3D printing may include rapid prototyping. 3D printing may include solid freeform fabrication. 3D printing may include direct material deposition. The 3D printing may further comprise subtractive printing.

In some embodiments, the 3D object comprises a hanging structure. The hanging structure may be a plane like structure (referred to herein as "three-dimensional plane," or "3D plane"). The 3D plane may have a relatively small width as opposed to a relatively large surface area. For example, the 3D plane may have a small height relative to a large horizontal projection (e.g., plane). The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf. The 3D object may comprise a wire.

3D printing methodologies can comprise extrusion, wire, granular, laminated, light polymerization, or powder-bed-and-inkjet-head-3D-printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

3D printing methodologies may differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

The methods, apparatuses, software, and systems of the present disclosure can be used to form 3D objects for various uses and applications. Such uses and applications include, without limitation, electronics, components of electronics (e.g., casings), machines, parts of machines, tools, implants, prosthetics, fashion items, clothing, shoes, or jewelry. The implants may be directed (e.g., integrated) to a hard, a soft tissue, or to a combination of hard and soft tissues. The implants may form adhesion with hard and/or soft tissue. The machines may include a motor or motor part. The machines may include a vehicle. The machines may comprise aerospace related machines. The machines may comprise airborne machines. The vehicle may include an airplane, drone, car, train, bicycle, boat, or shuttle (e.g., space shuttle). The machine may include a satellite or a missile. The uses and applications may include 3D objects relating to the industries and/or products listed herein.

The present disclosure provides systems, apparatuses, software, and/or methods for 3D printing of a desired 3D object from a pre-transformed material (e.g., powder material). Pre-transformed material as understood herein is a material before it has been transformed by an energy beam (e.g., transforming energy beam) during the 3D printing process. The pre-transformed material may be a material that was, or was not, transformed prior to its use in the 3D printing process. The object can be pre-ordered, pre-designed, pre- modeled, or designed in real time (i.e., during the process of 3D printing). The 3D printing method can be an additive method in which a first layer of hardened material is printed, and thereafter a volume of a pre-transformed material is added to the first layer as separate sequential layer (or parts thereof). Each additional sequential layer (or part thereof) can be added to the previous layer of hardened material by transforming (e.g., fusing (e.g., melting)) a fraction of the pre-transformed material into a transformed material. The transformed material may be a hardened material. Alternatively, the transformed material may subsequently harden (e.g., a solid powder may melt and subsequently solidify). The hardened layer may be at least a portion of the (hard) 3D object. The hardening can be actively induced (e.g., by cooling) or can occur without intervention (i.e., naturally). The transformation of the pre-transformed material may be effectuated by using one or more energy beams. The pre-transformed material may be disposed in a material bed prior to its transformation (e.g., by the energy beam). At time, the pre-transformed material is injected onto a platform and be transform before contacting the platform (e.g., on its way to the platform), or just when contacting the platform. The layer of pre-transformed material may be deposited using a layer dispensing mechanism (e.g., comprising a material dispensing mechanism, leveling mechanism, and/or a material removal mechanism). The temperature of the material bed (e.g., interior, and/or exposed surface thereof) may be controlled by a controller.

The metrological parameters of the material bed (e.g., exposed surface thereof) may be controlled by a controller. The metrological parameters of the layer of hardened material (e.g., exposed surface thereof) may be controlled by a controller. The metrological parameters of the 3D object (e.g., exposed surface thereof) may be controlled by a controller. Metrological parameters may comprise height, width, or length. In some embodiments, the 3D printing comprises heating at least a portion of a material bed, and/or a previously formed area of hardened material using at least one transforming energy source. In some embodiments, the heated area may comprise an area of transformed material. The heated area may encompass the bottom skin layer. The heated area may comprise a heat affected zone (e.g., FIG. 26A, 2610). The heated area may allow a parallel position at the bottom skin layer to reach an elevated temperature that is above the solidus temperature (e.g., and at or below the liquidus temperature) of the material at the bottom skin layer, transform (e.g., sinter or melt), become liquidus, and/or plastically yield, which parallel position is parallel to the irradiated position at the exposed surface. For example, the heated area may allow the layers comprising the bottom skin layer to reach an elevated temperature that is above the solidus temperature of the material (e.g., and at or below the liquidus temperature of the material at the previously formed layer such as the bottom skin layer), transform, become liquidus, and/or plastically yield. The heating by the transforming energy beam may allow reaching an elevated temperature that is above the: solidus temperature of the material (e.g., and at or below its liquidus temperature), transforming (e.g., melting) temperature, liquefying temperature, temperature of becoming liquidus, and/or plastic yielding temperature of the heated layer of hardened material and/or one or more layers beneath the heated layer (e.g., the bottom skin layer). For example, the heating may penetrate one, two, three, four, five, six, seven, eight, nine, ten, or more layers of the hardened material (e.g., not only the layer that is exposed, but also deeper layers within the 3D object), or the entire 3D object (e.g., or unsupported portion thereof) reaching the bottom skin layer. For example, heating may penetrate one, two, three, four, five, six, seven, eight, nine, ten, or more layers of the pre-transformed material (e.g., not only the layer that is exposed in the material bed, but also deeper layers within the material bed), or the entire depth of the material bed (e.g., fuse the entire depth of the material bed).

The very first formed layer of hardened material in a 3D object is referred to herein as the "bottom skin." In some embodiments, the bottom skin layer is the very first layer in an unsupported portion of a 3D object. The unsupported portion may not be supported by auxiliary supports. The unsupported portion may be connected to the center (e.g., core) of the 3D object and may not be otherwise supported by, or anchored to, the platform. For example, the unsupported portion may be a hanging structure (e.g., a ledge) or a cavity ceiling.

Figure 36:
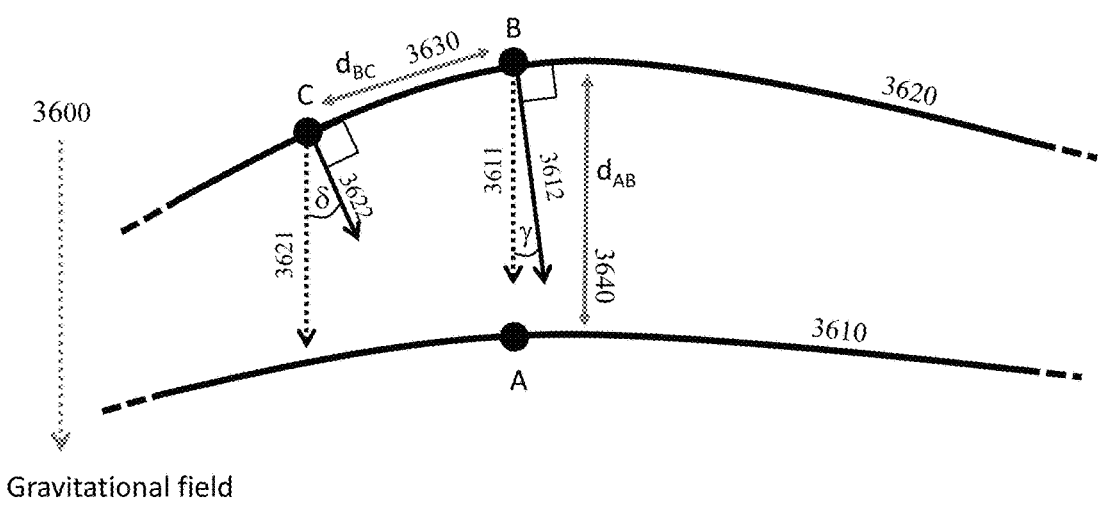
FIG. 36 schematically illustrates a cross section in portion of a 3D object.

In some embodiments, the 3D object comprises a first portion and a second portion. The first portion may be connected to a sub-structure (e.g., core) at one, two, or three sides (e.g., as viewed from the top). The sub-structure may be the rest of the 3D object. The second portion may be connected to the sub-structure at one, two, or three sides (e.g., as viewed from the top). For example, the first and second portion may be connected to a sub-structure (e.g., column, post, or wall) of the 3D object. For example, the first and second portion may be connected to an external cover that is a part of the 3D object. The first and/or second portion may be a wire or a 3D plane. The first and/or second portion may be different from a wire or 3D plane. The first and/or second portion may be a blade (e.g., turbine or impeller blade). The first and second portions may be (e.g., substantially) identical in terms of structure, geometry, volume, and/or material composition. The first and second portions may be (e.g., substantially) identical in terms of structure, geometry, volume, material composition, or any combination thereof. The first portion may comprise a top surface. Top may be in the direction away from the platform and/or opposite to the gravitational field. The second portion may comprise a bottom surface (e.g., bottom skin surface). Bottom may be in the direction towards the platform and/or in the direction of the gravitational field. FIG. 36 shows an example of a first (e.g., top) surface 3610 and a second (e.g., bottom) surface 3620. At least a portion of the first and second surfaces are separated by a gap. At least a portion of the first surface is separated by at least a portion of the second surface (e.g., to constitute a gap). The gap may be filled with pre-transformed or transformed (e.g., and subsequently hardened) material during the formation of the 3D object. The second surface may be a bottom skin layer. FIG. 36 shows an example of a vertical gap distance 3640 that separates the first surface 3610 from the second surface 3620. The vertical gap distance may be equal to the distance disclosed herein between two adjacent 3D planes. The vertical gap distance may be equal to the vertical distance of the gap as disclosed herein. The vertical distance of the gap may be at least about 30 µm, 35 µm, 40 µm, 50 µm, 60 µm, 70 µm, 80 µm, 90 µm, 100 µm, 150 µm, 200 µm, 0.05 mm, 0.1 mm, 0.25 mm, 0.5 mm, 1 mm, 2 mm, 3 mm, 4 mm, 5 mm, 6 mm, 7 mm, 8 mm, 9 mm, or 10 mm. The vertical distance of the gap may be at most about 0.05 mm, 0.1 mm, 0.25 mm, 0.5 mm, 1 mm, 2 mm, 3 mm, 4 mm, 5 mm, 6 mm, 7 mm, 8 mm, 9 mm, 10 mm, or 20 mm. The vertical distance of the gap may be any value between the afore-mentioned values (e.g., from about 30 µm to about 200 µm, from about 100 µm to about 200 µm, from about 30 µm to about 100 mm, from about 80 mm to about 150 mm, from about 0.05 mm to about 20 mm, from about 0.05 mm to about 0.5 mm, from about 0.2 mm to about 3 mm, from about 0.1 mm to about 10 mm, or from about 3 mm to about 20 mm). Point A (e.g., in FIG. 36) may reside on the top surface of the first portion. Point B may reside on the bottom surface of the second portion. The second portion may be a cavity ceiling or hanging structure as part of the 3D object. Point B (e.g., in FIG. 36) may reside above point A. The gap may be the (e.g., shortest) distance (e.g., vertical distance) between points A and B. FIG. 36 shows an example of the gap 3640 that constitutes the shortest distance d between points A and B. There may be a first normal to the bottom surface of the second portion at point B. FIG. 36 shows an example of a first normal 3612 to the surface 3620 at point B. The angle between the first normal 3612 and a direction of the gravitational acceleration vector 3600 (e.g., direction of the gravitational field) may be any angle γ. Point C may reside on the bottom surface of the second portion. There may be a second normal to the bottom surface of the second portion at point C. FIG. 36 shows an example of the second normal 3622 to the surface 3620 at point C. The angle between the second normal 3622 and the direction of the gravitational acceleration vector 3600 may be any angle δ. Vectors 3611, and 3621 are parallel to the gravitational acceleration vector 3600. The angles γ and δ may be the same or different. The angle between the first normal 3612 and/or the second normal 3622 to the direction of the gravitational acceleration vector 3600 may be any angle alpha. The angle between the first normal 3612 and/or the second normal 3622 with respect to the normal to the substrate may be any angle alpha. The angles γ and δ may be any angle alpha. For example, alpha may be at most about 45°, 40°, 30°, 20°, 10°, 5° 3° 2°, 1°, or 0.5°. The shortest distance between points B and C may be any value of the auxiliary support feature spacing distance mentioned herein. For example, the shortest distance BC (e.g., $d_{BC}$) may be at least about 0.1 millimeters (mm), 0.5 mm, 1 mm, 1.5 mm, 2 mm, 3 mm, 4 mm, 5 mm, 10 mm, 15 mm, 20 mm, 25 mm, 30 mm 35 mm, 40 mm, 50 mm, 100 mm, 200 mm, 300 mm, 400 mm, or 500 mm. As another example, the shortest distance BC may be at most about 500 mm, 400 mm, 300 mm, 200 mm, 100 mm, 50 mm, 40 mm, 35 mm, 30 mm, 25 mm, 20 mm, 15 mm, 10 mm, 5 mm, 4 mm, 3 mm, 2 mm, 1.5 mm, 1 mm, 0.5 mm, or 0.1 mm. FIG. 36 shows an example of the shortest distance BC (e.g., 3630, $d_{BC}$). The bottom skin layer may be the first surface and/or the second surface. The bottom skin layer may be the first formed layer of the 3D object. The bottom skin layer may be the first formed hanging layer in the 3D object (e.g., that is separated by a gap from a previously formed layer of the 3D object).

As understood herein: The solidus temperature of the material is a temperature wherein the material is in a solid state at a given pressure. The liquefying temperature of the material is the temperature at which at least part of the pre-transformed material transitions from a solid to a liquid phase at a given pressure. The liquefying temperature is equal to a liquidus temperature where the entire material is in a liquid state at a given pressure.

In some embodiments, the 3D printer comprises one or more sensors. The sensor may sense, detect, and/or observe a physical-attribute during the 3D printing. The physical-attribute may correlate to and/or directly detect (i) a temperature at one or more positions at the target surface, a power density of the (e.g., transforming) energy beam, (iii) a power of an energy source that generates the energy beam, or (iv) any combination thereof. The physical attribute may comprise an irradiation (e.g., reflection) of a beam (e.g., electromagnetic beam) from the target surface. For example, the physical attribute may comprise a wavelength, intensity, or duration, of the (e.g., electromagnetic) beam. The physical-attribute may be included in a spectroscopic measurement. The physical-attribute may be included in an (e.g., optical) image. The physical attribute may include a FLS of a melt pool formed at the target surface with the transforming energy beam (e.g., FIG. 26A, 2605), and/or its vicinity (e.g., 2610). The sensor measurement(s) may be used to: (i) provide quality assurance of the printed 3D object, (ii) provide historical data that may be used to adjust a computer model relating to the 3D printing, (iii) control in real-time one or more aspects of the 3D printing, or (iv) any combination thereof.

In some embodiments, the sensor measurement(s) and/or other 3D printing process parameter(s) may allow a user, client and/or customer to determine if a 3D object passes a performance threshold (e.g., to prevent failure and/or mistakes in the 3D object's performance in its intended purpose). The sensor measurement(s) and/or other 3D printing process parameter(s) may provide confidence that the quality requirements of the 3D object are fulfilled. The sensor measurement(s) and/or other 3D printing process parameter(s) may allow a user, client and/or customer to ensure the quality of a 3D object. The quality assurance may comprise (i) a comparison with a standard, (ii) monitoring of the 3D printing processes, or (iii) a feedback and/or closed loop control. The standard may be based on historical data of previously printed and/or otherwise manufactured respective 3D object. The standard may relate to an industrial standard. The quality assurance may comprise a quality control of the 3D object. The quality assurance may comprise a statistical process control of the 3D printing. The quality assurance may provide a fingerprint of the process for printing a resulting 3D object. The process fingerprint may allow a user, client, and/or customer to identify desired 3D object characteristics. The process fingerprint may allow a user, client and/or customer to sort the 3D object based on the process fingerprint. The process fingerprint may correlate to a 3D object build with the detected and/or recorded process parameters.

In some embodiments, the 3D printer comprises a computer model that is based on a requested 3D object. The computer model may comprise 3D printing instructions of the requested 3D object. The computer model may comprise a physical model that correspond to the behavior of the material (e.g., pre-transformed and/or transformed material) during the 3D printing, which at least part of the material forms the 3D object. The physical model may be based on a simulation (e.g., thermos-mechanical simulation). The physical model may comprise an imitation of the physical manifestations that take place during the 3D printing. The physical model may comprise an approximation of the physical manifestations that take place during the 3D printing. The approximation may be a rough approximation. The historical data may be used by the controller system (e.g., comprising the computer model) as a learning tool to form a learning control system. The historical data may be used to vary one or more parameters of the computer model (e.g., of the physical model). The historical data may be used to adjust one or more computer model (e.g., physical model) parameters in response to the sensor measurement(s) (e.g., as correlating to the respective process parameter(s)). The computer model (e.g., the physical model) may be adjusted, corrected, and/or fine-tuned using the historical data provides by the sensor measurement(s) (e.g., that relate to a of process parameter, or a set of process parameters).

In some embodiments, the 3D printer comprises a control system. The control system may be a real-time control system. The measurement(s) from the one or more sensors may be used to alter the printing instructions for the 3D object in real time, during its printing. The measurement may comprise (i) a measurement of signals accumulated during printing of one or more layers of the 3D object, (ii) a measurement of signals accumulated during printing of one or more paths (e.g., hatches, or vectors) within a layer of the 3D object, (iii) a measurement of signals accumulated during printing of a plurality of melt pools forming a path (e.g., hatch, or vector) within a layer of the 3D object, or (iv) a measurement of signal(s) during printing of a single of melt pool. The plurality of melt pools can ones (e.g., be less than ten melt pools), tens of melt pools, hundreds of melt pools, or thousands of melt pools. For example, the plurality of melt pools can be at least about 100, 200, 300, 400, or 500 melt pools. The plurality of melt pools can be any number of melt pools between the afore mentioned numbers (e.g., from ones to thousands of melt pool, from tens to hundreds of melt pools, or from 100 to 500 melt pools). The real-time measurement(s) may be used to (i) alter a parameter value prescribed by the 3D printing instruction, (ii) alter the computer model (e.g., alter one or more parameters of the computer model) by using the measured signals, (iii) alter one or more printing parameter in real-time (e.g., using a feedback and/or closed loop control). Alter a parameter value prescribed by the 3D printing instruction may comprise observing a systematic deviation from one or more printingparameters (e.g., power of the energy source and/or power density of the energy beam, that is required to reach a certain temperature threshold). For example, the printing instructions (e.g., comprising the computer model) may prescribed a first power value to reach a temperature threshold. During the 3D printing, a sensor indicates that the threshold temperature is reached with a second power value that is (e.g., systematically) lower by a percentage from the first prescribed power. The printing instructions may thus adjust the prescribed power to be lower. The adjustment may be after gaining confidence that the overall adjustment is required. The adjustment may be subsequent to (e.g., a real-time) observation of a systematic deviation from the computer model prediction. The adjustment may be bay a value (e.g., a percentage), or by a function. The function may comprise a linear, polynomial, or logarithmic function. In some embodiments, the computer model parameters may be adjusted based on the measurements. Confidence may relate to the noise level of the sensor measurements. For example, temperature measurements of the target surface may be affected by heating spattered material that parts from the target surface, and obstructs the detector. The unreliable measurements may be confined to certain angle (or angle range) of the energy beam with respect to the target surface. For example, to an angle of at least about 80° or 90° with the target surface; to an angle of at most about 90° or 100° with the target surface or to an angle range from about 80° to about 100° of the energy beam with respect to the target surface (e.g., FIG. 5, 510).

In some embodiments, the formation of a melt pool is control in real-time during the time of its formation. In some embodiments, the sensor (e.g., detector) may be coupled to at least one optical fiber (e.g., a fiber coupled to a detector). At times, the detector may comprise a multiplicity of detectors. Each of the multiplicity of detectors may be coupled to a different optical fiber respectively. At times, an optical fiber may be coupled to a single detector. At times, at least two detectors may be coupled to an optical fiber. At times, at least two optical fibers may be coupled to a detector. The different optical fibers may form an optical fiber bundle. The optical fiber detector may comprise a magnifier and/or a de-magnifier coupled to a fiber. The optical fiber bundle may be a coherent bundle of fiber. The optical fiber may split to two or more detectors. The optical fiber detector may be positioned prior to the detector and after the optical element (e.g., filter, mirror, or beam splitter, whichever disposed before the optical fiber). At times, the detector may be a single (e.g., pixel) detector. The detector may be devoid of (e.g., not include, or exclude) spatial information.

Figure 37:
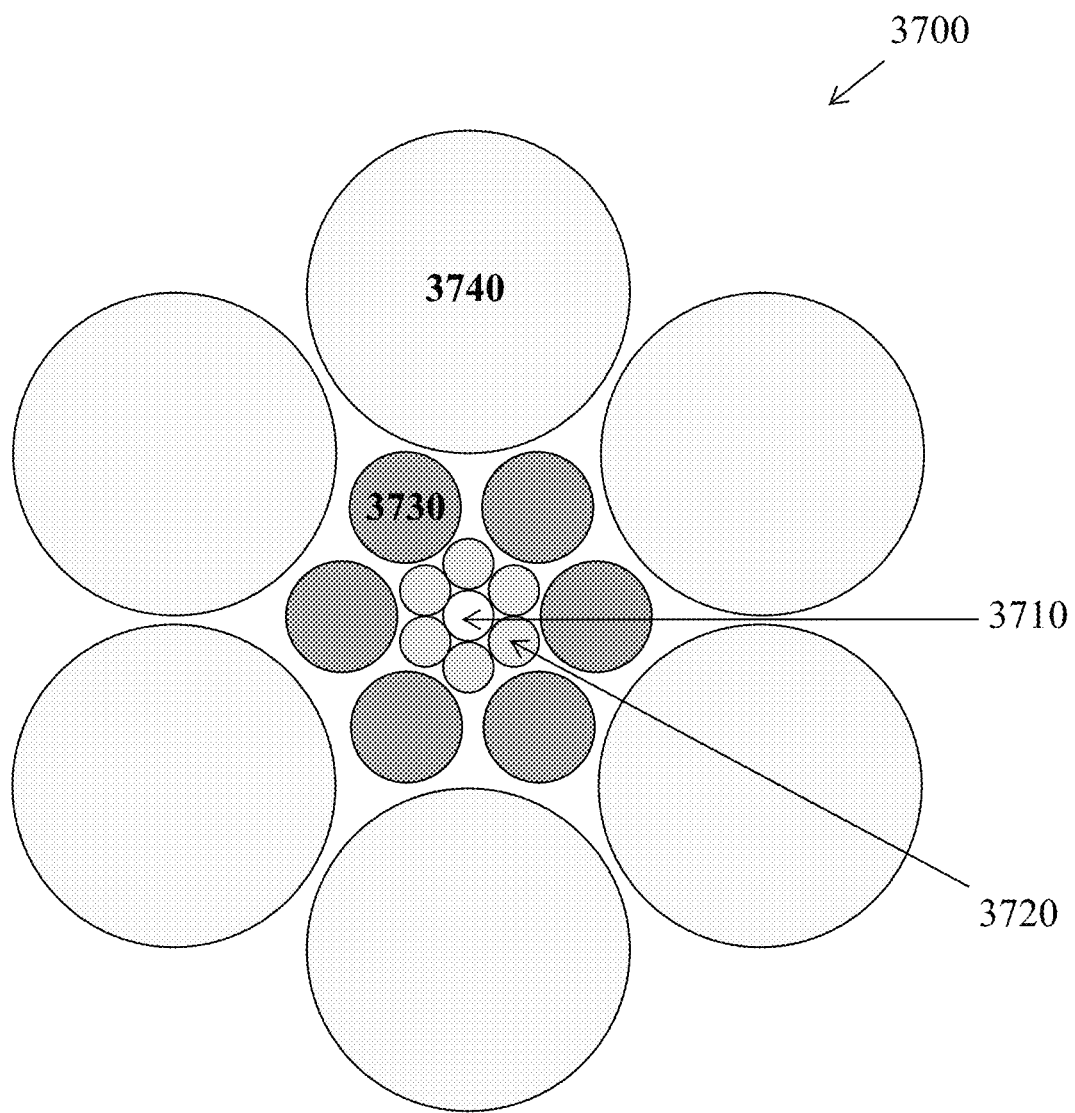
FIG. 37 schematically illustrates a vertical cross section in a portion of an optical detection system.

In some embodiments, different fiber groups within the fiber bundle sense different positions in the target surface. For example, the central fiber (e.g., FIG. 37, 3710) may sense the melt pool (e.g., FIG. 26A, 2605), and the surrounding fibers (e.g., FIG. 37, 3720) may sense the vicinity of the melt pool (e.g., FIG. 26A, 2610). FIG. 37 shows an example of an optical fiber bundle (e.g., 3700). In some examples, the central fiber (e.g., 3710) may detect the (e.g., forming) melt pool (e.g., FIG. 26A, 2605), while closely surrounding fibers (e.g., 3720) detect positions in a ring around the melt pool (e.g., that is distanced $d_1$ away from the center); more distant surrounding fibers (e.g., 3730) detect positions at a ring that is distanced $d_2$ from the center etc. At least two (e.g., each of the) fibers within the fiber bundle may have different cross sections (e.g., diameters thereof). At least two fibers within the fiber bundle may have (e.g., substantially) the same cross section. For example, at least two fibers within a ring of fibers (e.g., surrounding the central fiber) may have different cross sections (e.g., diameters thereof). At least two fibers within a ring of fibers (e.g., surrounding the central fiber) may have (e.g., substantially) the same cross section. In some embodiments, different fiber groups within the fiber bundle are directed to different detectors. For example, the central optical fiber (e.g., 3710) may be directed to a first detector. The first fiber ring (e.g., 3720) surrounding the central fiber may be directed to a second detector. The second fiber ring (e.g., 3730) surrounding the central fiber may be directed to a third detector. The third fiber ring (e.g., 3740) surrounding the central fiber may be directed to a fourth detector. The different detectors may form a group of detectors. At least two (e.g., each of the) detectors within the group of detectors may detect signals pertaining to different areas of the target surface respectively. For example, At least two (e.g., each of the) detectors within the group of detectors may detect signals pertaining to different distanced rings relative to the melt pool (e.g., center thereof) respectively. The detectors may be connected to the control system that may control one or more 3D printing parameters. For example, the one or more detectors may be used to control the temperature at one or more positions in the material bed.

The optical fiber bundle may include one or more single (e.g., pixel) detectors. Each pixel detector may be optionally coupled to an optical fiber. The optical fiber bundle may comprise a central fiber (e.g., 3710). One or more independent single detectors (e.g., at least 1, 2, 3, 4, 5, 6, 7, 8, 9 or 10 detectors) coupled to one or more independent optical fibers (e.g., at least 1, 2, 3, 4, 5, 6, 7, 8, 9 or 10 optical fibers) respectively may be disposed adjacent to the central fiber. For example, the one or more independent optical fibers may engulf (e.g., surround) the central fiber. The number of independent optical fibers that engulf the central fiber may vary (e.g., the central fiber may be engulfed by at least 1, 2, 3, 4, 5, 6, 7, 8, 9 or 10 optical fibers). The engulfed optical fibers may be engulfed by one or more independent optical fibers (e.g., the first one or more independent fibers adjacent to the central fiber may be engulfed by at least 1, 2, 3, 4, 5, 6, 7, 8, 9 or 10 optical fibers). Engulf may be in at least one cross-sectional circular arrangement (e.g., FIG. 37). In some embodiments, the optical fiber bundle comprises (i) another optical fiber that has a cross section that is (e.g., substantially) the same as the cross section of the central optical fiber, or (ii) another optical fiber that has a cross section that is different (e.g., smaller, or larger) from the cross section of the central optical fiber. In some embodiments, the one or more independent optical fibers have a cross section that is (e.g., substantially) the same (e.g., 3720) as the cross section of the central optical fiber (e.g., 3710). In some embodiments, the one or more independent optical fibers have a cross section that is different than the cross section of the central optical fiber. For example, the one or more independent optical fibers may have a cross section that is larger (e.g., 3730, 3740) than the cross section of the central optical fiber (e.g., 3710). The larger cross section of the optical fiber may facilitate detection of a returning energy beam striking a larger cross section of the optical fiber, and thus allowing for detection of a lower intensity energy beam. The adjacent one or more single detectors may allow detection of energy beam that strikes an area larger than the area detected by the central fiber. For example, the outermost single detector (e.g., 3740) may detect (e.g., collect irradiation from) an area that is larger than the area detected by the central fiber. Larger may comprise at least about 2, 3, 5, 10, 20, 25, 30, 35, 40, 45, 50, 55, 60, 65, 70, 75, 80, 85, 90, 95 or 100 times larger area than the area detected by the central fiber. Larger may comprise at most about 2, 3, 5, 10, 20, 25, 30, 35, 40, 45, 50, 55, 60, 65, 70, 75, 80, 85, 90, 95 or 100 times larger area than the area detected by the central fiber. The outermost single detector may detect an area larger than the area detected by the central fiber, wherein larger can be between any of the afore-mentioned values (e.g., 2 times to 100 times, from about 2 times to about 30 times, from about 35 times to about 70 times, or from about 75 times to about 100 times). The central fiber may detect a pixel at its highest resolution. As the detection area increases amongst the surrounding single detectors, the surrounding fiber may detect one or more lower resolution pixels. The at least one optical fiber in the bundle may be aligned with the portion of the energy beam that has the strongest signal intensity (e.g., radiation energy). The one optical fiber can be aligned (e.g., in real time) to be the central optical fiber. As the detection area of the fiber detectors increase, the signal intensity may drop. The increasing area of the detector may allow improvement of the signal (e.g., as the signal to noise ratio decreases). The fiber bundle may allow maximizing the collection rate of (e.g., optical) information (e.g., by selecting a sample of optical fiber detectors, by varying the sampling frequency of the detectors). The optical fiber bundle may be a lower cost alternative to thermal imaging detectors (e.g., InGaAs or Ge). The optical fiber bundle (e.g., having varied cross sectional optical fibers), may allow quicker focusing and/or signal detection.

In some embodiments, a first detector (e.g., operatively coupled to fiber FIG. 37, 3710) may sense at least one physical attribute of the melt pool (e.g., FIG. 26A, 2605), for example, during its formation. For example, the first detector may sense the radiation emitted and/or reflected from the melt pool. For example, the first detector may sense the temperature, shape, and/or FLS of the melt pool. The FLS may be of the exposed surface of the melt pool. The shape may be circular, oval, or irregular. The first detector may be coupled to the energy beam footprint on the target surface. In some embodiments, a second detector (e.g., FIG. 37, an equal radius ring of detectors operatively coupled to fibers comprising 3720) may sense at least one physical attribute of the melt pool vicinity (e.g., FIG. 26A, 2610), for example, during its heating. The second detector may comprise a set of sensor. For example, the second detector may comprise a ring of detectors. The second detector may be ring shaped. The second detector may be concentric to the first detector. The detected area of the second detector may be include or exclude the melt pool area. The signal that is detected by the detector set of the second detector may be averaged to produce a physical attribute value (e.g., amplitude value that correlates to a temperature value). The control system may compare the signal of the first detector to the second detector to receive a comparison value of a physical attribute. The comparison value may facilitate estimation of the (i) isotropy of heat distribution within the melt pool, (ii) isotropy of melt pool shape (e.g., the horizontal and/or vertical cross sections of the melt pool), (iii) temperature gradients within the melt pool, or (iv) any combination thereof.

At times, the melt pool may be controlled to reach a first maximum physical-attribute (e.g., temperature) threshold value. The first detector may facilitate (e.g., direct, in situ, and/or real time) controlling the physical-attribute (e.g., temperature) of the melt pool. For example, using the melt pool temperature, size, and/or shape, the energy beam and/or source may be attenuated. Attenuated may comprises altering at least one characteristic of the energy beam and/or energy source. For example, reducing (e.g., stopping) the power of the energy source when the temperature of the melt pool reaches a first temperature threshold value. For example, reducing (e.g., stopping) the power density of the energy beam when the temperature of the melt pool reaches the first temperature threshold value. For example, reducing (e.g., stopping) the cross section of the energy beam when the melt pool reaches the melt pool diameter threshold value.

At times, the melt pool may be controlled to reach a second maximum physical-attributer (e.g., temperature) threshold value. The second detector (e.g., detector set) may facilitate (e.g., direct, in situ, and/or real time) controlling the physical-attribute (e.g., temperature) of the melt pool vicinity. For example, using the temperature, size, and/or shape, of the heated vicinity of the melt pool, the energy beam and/or source may be attenuated. Attenuated may comprises altering at least one characteristic of the energy beam and/or energy source. For example, reducing (e.g., stopping) the power of the energy source when the temperature of the melt pool vicinity reaches a second temperature threshold value. For example, reducing (e.g., stopping) the power density of the energy beam when the temperature of the melt pool vicinity reaches the second temperature threshold value. For example, reducing (e.g., stopping) the cross section of the energy beam when the melt pool vicinity reaches the melt pool vicinity diameter threshold value.

In some embodiments, the first detector (detecting a physical attribute of the melt pool) and the second detector (detecting a physical attribute of the melt pool vicinity) are used. The control system may attenuate the energy beam and/or energy source to allow the melt pool to reach, maintain, and/or not exceed a first physical-attribute (e.g., temperature) threshold value, while allowing the vicinity of the melt pool to reach, maintain, and/or not exceed a second physical attribute (e.g., temperature) threshold value. The control may be by altering one or more characteristics of the energy beam and/or source. For example, the first detector (detecting a temperature of the melt pool) and the second detector (detecting a temperature of the melt pool vicinity) may be used. The control system may attenuate the energy beam to allow the melt pool to reach, maintain, and/or not exceed a first temperature threshold value, while allowing the vicinity of the melt pool to reach, maintain, and/or not exceed a second temperature threshold value. For example, by altering (e.g., reducing) the power density of the energy beam, by altering the power of the energy source, by altering the diameter of the energy beam, by altering the focus of the energy beam, by altering the dwell time of the energy beam, or any combination thereof. Altering may comprise, reducing or increasing. Reducing may comprise ceasing. In some embodiments, the resulting melt pool is homogenous in (i) temperature distribution gradient, (ii) shape, (iii) microstructure distribution, or (iv) any combination thereof. The real time melt pool control (e.g., using the two detectors) may allow formation of successive (e.g., substantially) homogenous and/or isotropic melt pools (e.g., FIG. 35). The (e.g., substantially) homogenous and/or isotropic melt pools may in a hatch line, path, layer, within the entire 3D object. At times, the usage of the two detectors may allow (e.g., controlled) formation of anisotropic melt pools, whose anisotropy may be requested. For example, at times it may be requested to form melt pools having aspect ratio that is different than 1:1 (in which the vertical cross sectional radius is equal to the horizontal cross sectional radius).

In some examples, the transforming energy beam irradiates (e.g., injects) energy into one or more pre-formed layers (e.g., deeper layers) of hardened material that are disposed below the target layer (e.g., layer of pre-transformed material) that is irradiated by the transforming energy beam. The injection of energy into the one or more deeper layers may heat those deeper layers up. Heating of the deeper layers may allow those deeper layers to release stress (e.g., elastically and/or plastically). For example, the heating of the deeper layers may allow those layers to deform beyond the stress point. For example, the heating of the deeper layers may allow a position of the deeper layer that is parallel to the irradiated position to reach an elevated temperature that is above the solidus temperature (e.g., and at or below the liquidus temperature), liquefy (e.g., become partially liquid), transform (e.g., melt), become liquidus (e.g., fully liquid), and/or plastically yield (e.g., stress-yield).

The control of the transforming energy beam may comprise substantially ceasing (e.g., stopping) to irradiate the target area when the temperature at the bottom skin reaches a target temperature. The target temperature may comprise a temperature at which the material (e.g., pre-transformed or hardened) reaches an elevated temperature that is above the solidus temperature, transforms (e.g., re-transforms, e.g., re-melts), become liquidus, and/or plastically yields. The control of the irradiating energy may comprise substantially reducing the energy supplied to (e.g., injected into) the target area when the temperature at the bottom skin reached a target temperature. The control of the irradiated energy may comprise altering the energy profile of the energy beam and/or flux respectively. The control may be different (e.g., may vary) for layers that are closer to the bottom skin layer as compared to layers that are more distant from the bottom skin layer (e.g., beyond the critical layer thickness as disclosed herein). The control may comprise turning the irradiated energy on and off (e.g., at specified and/or controlled times). The control may comprise reducing the power per unit area, cross section, focus, power, of the transforming energy beam. The control may comprise altering at least one property of the transforming energy beam, which property may comprise the power, power per unit area, cross section, energy profile, focus, scanning speed, pulse frequency (when applicable), or dwell time of the irradiated energy. During the intermission (e.g., "off") times, the power and/or power per unit area of the energy beam may be substantially reduced as compared to its value at the dwell times (e.g., "on" times). Substantially may be in relation to the transformation of the material at the target surface. During the intermission, the irradiated energy may relocate away from the area which was tiled, to a different area in the material bed that is substantially distant from area which was tiled (see examples 1). During the dwell times, the irradiated energy may relocate back to the position adjacent to the area which was just tiled (e.g., as part of the transforming energy beam path). The control may be real-time control (e.g., during the 3D printing process). The control may be dynamic control. The control may use at least one algorithm. The control may comprise closed loop control, or open loop control. The control may be closed loop control, open loop control or any combination thereof.

Figure 24:
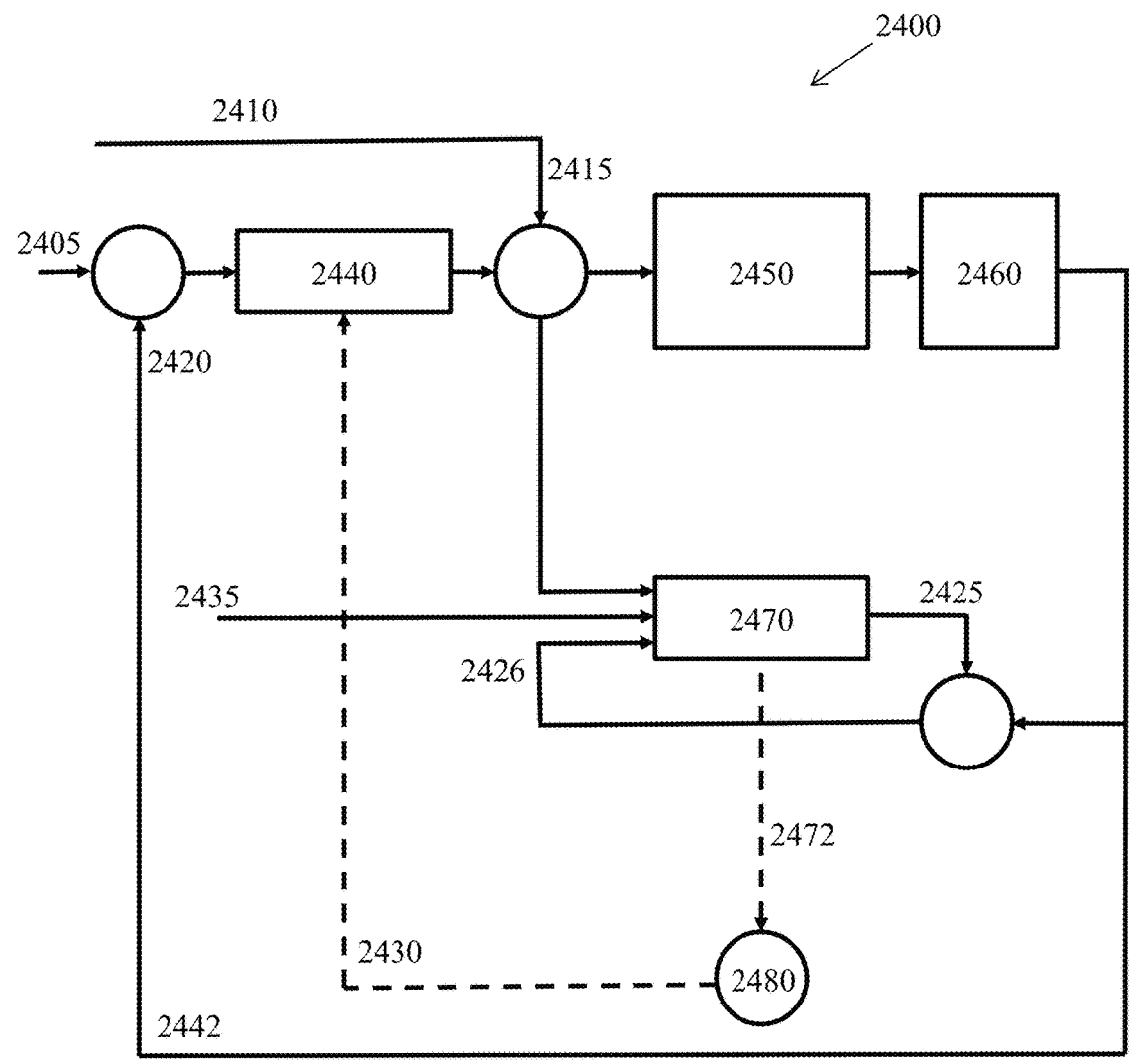
FIG. 24 schematically illustrates a control system used in the formation of one or more 3D objects.

FIG. 24 shows a schematic example of a (e.g., automatic) control system 2400 that is programmed or otherwise configured to facilitate the formation of one or more 3D objects. The control system 2400 includes a (e.g., PID) controller 2440, a forming 3D object 2450, one or more sensors (e.g. temperature sensor) 2460, one or more computer models for the physical process of 3D printing 2470 (e.g., comprising the physical model or the control model). The control system may optionally include a feedback control loop such as 2430 or 2442. The feedback control loop may comprise one or more logical switches (e.g., 2480). The logical switch may alter (e.g., turn "on" or "off") a feedback loop control. The alteration may utilize a calculated variable (e.g., temperature). The calculated variable may comprise a threshold value. The calculated variable may be compared to a respective measured variable. The calculated temperature may derive from the computer model (e.g., which at least part of the computer model may be in 2470). For example, the control scheme (e.g., FIG. 24) may comprise the control-model (e.g., included in 2470). The control model may comprise one or more calculations of the control variable (e.g., the temperature). The control model may comprise comparing a measured variable to its respective control variable (e.g., the calculated variable value, threshold variable value, and/or critical variable value).

Figure 26A:
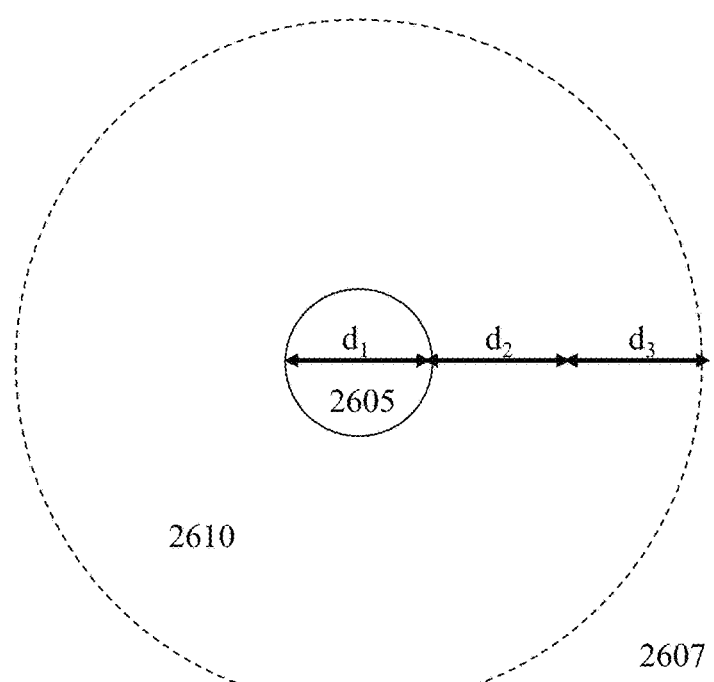
FIGS. 26A-26B show schematic representations of a material bed.
Figure 26B:
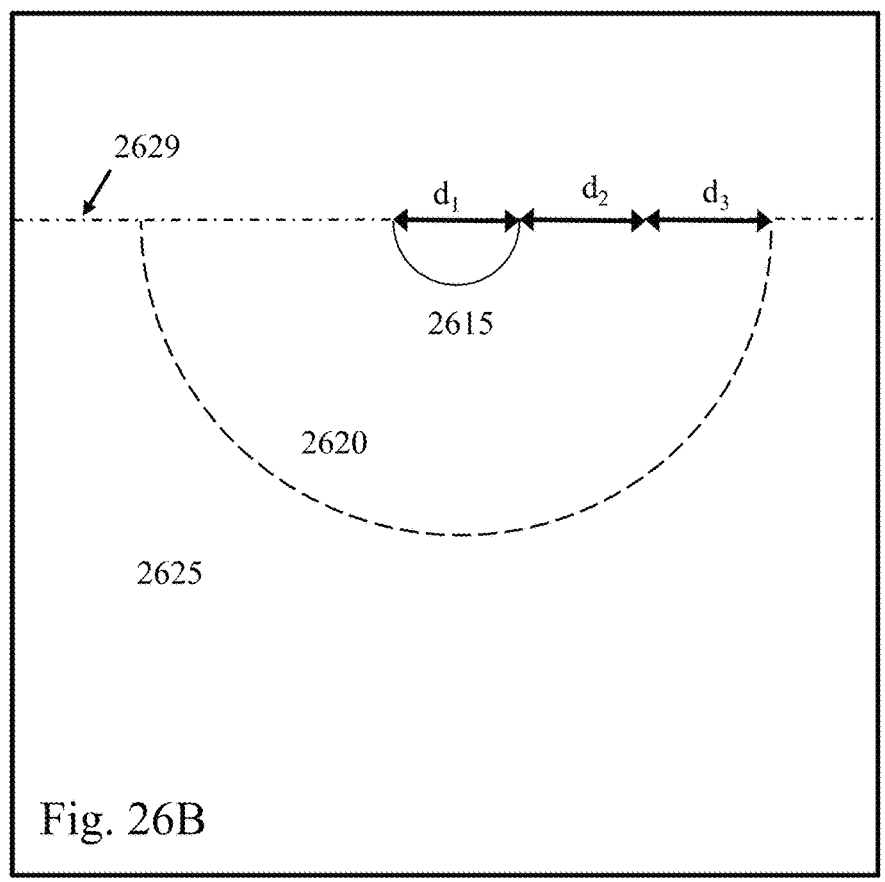

The control system (e.g., 2400) may be configured to control (e.g. in real time) a power of the energy source, speed of the energy beam, power density of the energy beam, dwell time of the energy beam, energy beam footprint (e.g., on the exposed surface of the material bed), and/or cross-section of the energy beam, to maintain a target parameter of one or more forming 3D objects. The target parameter may comprise a temperature, or power of the energy beam and/or source. In some examples, maintaining a target temperature for maintaining on one or more characteristics of one or more melt pools. The characteristics of the melt pool may comprise its FLS, temperature, fluidity, viscosity, shape (e.g., of a melt pool cross section), volume, or overall shape. The control system (e.g., 2400) may be configured to control (e.g. in real time) a temperature, to maintain a target parameter of one or more forming 3D objects, e.g., a target temperature of one or more positions of the material bed to maintain on one or more melt pools. The one or more positions may comprise a position within a melt pool, adjacent to the melt pool, or far from the melt pool. Adjacent to the melt pool may be within a distance (e.g., radius) of at least about 1, 2, 3, 4, or 5 average melt pool diameters. Adjacent to the melt pool may be within a distance of at most about 1, 2, 3, 4, or 5 average melt pool diameters. Adjacent to may be any distance between the afore mentioned distances (e.g., from about 1 to about 5 average melt pool diameters). FIG. 26A shows an example of a melt pool 2605 shown as a top view, having a diameter $d_1$. The melt pool 2605 in the example shown in FIG. 26A, is surrounded by an area that is centered at the melt pool, and extends (for example) two melt pool diameters after the edge of the melt pool 2605, designated as $d_2$ and $d_3$, wherein $d_1$, $d_2$ and $d_3$ are (e.g., substantially) equal. FIG. 26B shows an example of a vertical cross section in a material bed 2625 in which a melt pool 2615 is disposed, which to view of the melt pool 2615 has a diameter $d_1$. The material bed 2625 has an exposed surface 2629. The area surrounding the melt pool 2620 extends beyond the melt pool (e.g., into the material bed). The area 2620 extends away from the melt pool by (for example) two melt pool top view diameters $d_2$ and $d_3$, as measured from the edge of the melt pool 2615, wherein $d_1$, $d_2$ and $d_3$ are (e.g., substantially) equal. The control system may use one or more signals detected from one or more positions at the melt pool and/or from a position adjacent to the melt pool (e.g., FIG. 26A). The signals may be used to determine a temperature at the one or more positions. The one or more signals may be used in forming the physical-model (e.g., operatively coupled to the control-model). The material bed may be a box, a cylinder, or a prism (e.g., a right prism). The cylinder may be an elliptical cylinder (e.g., circular cylinder). The cylinder may be a right cylinder. The prism may have a polygonal cross section. For example, the prism may be a triangular, rectangular, pentagonal, hexagonal, or a heptagonal prism. The FLS (e.g., width, depth, and/or height) of the material bed can be at least about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m or 5 m. The FLS (e.g., width, depth, and/or height) of the material bed can be at most about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m or 5 m. The FLS of the material bed can be between any of the aforementioned values (e.g., from about 50 mm to about 5 m, from about 250 mm to about 500 mm, from about 280 mm to about 1 m, or from about 500 mm to about 5 m).

The one or more forming 3D objects can be formed (e.g., substantially) simultaneously, or sequentially. The one or more 3D objects can be formed in a (e.g., single) material bed. The controller may receive a target parameter (e.g., 2405) (e.g., temperature) to maintain at least one characteristic of the forming 3D object. Examples of characteristics of forming 3D objects include temperature and/or metrological attribute(s) (e.g., information) of a melt pool. The metrological attribute(s) (e.g., information) of the melt pool may comprise its FLS. Examples of characteristics of forming 3D objects include metrological attribute(s) (e.g., information) of the forming 3D object. For example, geometry attribute(s) (e.g., information. E.g. height) of the forming 3D object. Examples of characteristics of forming 3D objects include material characteristic such as hard, soft and/or fluid (e.g., liquidus) state of the forming 3D object. The target parameter may be time varying or location varying or a series of values per location or time. The target parameter may vary in time and/or location. The controller may (e.g., further) receive a pre-determined control variable (e.g. power per unit area of the energy beam) target value from a control loop such as, for example, a feed forward control (e.g., 2410). In some examples, the control variable controls the value of the target parameter of the forming 3D object. For example, a predetermined (e.g., threshold) value of power per unit area of the energy beam may control the temperature (e.g., range) of the melt pool forming the 3D object.

A computer model (e.g., comprising a prediction model, statistical model, a thermal model, or a thermo-mechanical model) may predict and/or estimate one or more physical parameters of the forming 3D object. The computer model may comprise a geometric model (e.g., comprising OPC), or a physical model. The computer model may provide feed-forward information to the controller. The computer model may provide the open loop control. There may be more than one computer models (e.g. at least 1, 2, 3, 4, 5, 6, 7, 8, 9 or 10 different computer models). The controller may (e.g., dynamically) switch between the computer models to predict and/or estimate the one or more physical parameters of the forming 3D object. Dynamic includes changing computer models (e.g., in real time) based on a user input, or based on a controller decision that may in turn be based on monitored target variables of the forming 3D object. The dynamic switch may be performed in real-time (e.g., during the forming of the 3D object). Real time may be, for example, during the formation of a layer of transformed material, during the formation of a layer of hardened material, during formation of a portion of a 3D object, during formation of a melt pool, during formation of an entire 3D object, or any combination thereof. The controller may be configured (e.g., reconfigured) to include additional one or more computer models and/or readjust the existing one or more computer models. A prediction of the one or more parameters of the forming 3D object may be done offline (e.g. predetermined) and/or in real-time. The at least one computer model may receive sensed parameter(s) value(s) from one or more sensors. The sensed parameter(s) value(s) may comprise temperature sensed within and/or in the vicinity of one or more melt pools. Vicinity may be within a radius of at least about 1, 2, 3, 4, or 5 average melt pool FLS from a forming melt pool. The computer model may use (e.g., in real-time) the sensed parameter(s) value(s) for a prediction and/or adjustment of the target parameter. The computer model may use (e.g., in real-time) geometric information associated with the requested and/or forming 3D object (e.g. melt pool geometry). The use may be in real-time, and/or off-line. Real time may comprise during the operation of the energy beam and/or source. Off-line may be during the time a 3D object is not printed and/or during "off" time of the energy beam and/or source. The computer model may compare a sensed value (e.g., by the one or more sensors) to an estimated value of the target parameter. The computer model may (e.g., further) calculate an error term (e.g., 2426) and readjust the at least one computer model to achieve convergence (e.g., of a desired or requested 3D model with the printed 3D object).

The computer model may estimate a target variable (e.g., 2472). The target variable may be of a physical-attribute that may or may not be (e.g., directly) detectable. For example, the target variable may be of a temperature that may or may not be (e.g., directly) measurable. For example, the target variable may be of a physical location that may or may not be (e.g., directly) measurable. For example, a physical location may be inside the 3D object at a depth that may be not be directly measured by the one or more sensors. An estimated value of the target variable may be (e.g., further) compared to a critical value of the target variable. At times, the target value exceeds the critical value, and the computer model may provide feedback to the controller to attenuate (e.g., turn off, or reduce the intensity of) the energy beam (e.g., for a specific amount of time). The computer model may set up a feedback control loop (e.g., 2430), for example, by providing feedforward information. The feedback control loop may be for the purpose of adjusting one or more target parameters to achieve convergence (e.g., of a desired or requested 3D model with the printed 3D object). In some embodiments, the computer model may predict (i) an estimated temperature of the melt pool, (ii) local deformation within the forming 3D object, (iii) global deformation and/or (iv) temperature fields. The computer model may (e.g. further) predict corrective energy beam adjustments (e.g. in relation to a temperature target threshold). The adjustment predictions may be based on the (i) measured and/or monitored temperature information at a first location on the forming 3D object (e.g. a forming melt pool) and/or (ii) at a second location (e.g. in the vicinity of the forming melt pool) and/or (iii) geometric information (e.g. height) of the forming 3D object. The energy beam adjustment may comprise adjusting at least one control variable pertaining to a characteristics of the energy beam (e.g. power per unit area, dwell time, cross-sectional diameter, and/or speed). In some embodiments, the control system may comprise a closed loop (e.g., and feed forward) control, that may override one or more (e.g., any) corrections and/or predictions by the computer model. The override may be effectuated by forcing a predefined amount of energy (e.g. power per unit area) to supply to the portion (e.g., of the material bed and/or of the 3D object). Real time may be during formation of at least one: 3D object, layer within the 3D object, dwell time of an energy beam along a path, dwell time of an energy beam along a hatch line, dwell time of an energy beam forming a melt pool, or any combination thereof. The control may comprise controlling a cooling rate (e.g., of the material bed, the 3D object, or a portion thereof), control the microstructure of a transformed material portion, or control the microstructure of at least a portion of the 3D object. Controlling the microstructure may comprise controlling the phase, morphology, FLS, volume, or overall shape of the transformed (e.g., and subsequently solidified) material portion. The material portion may be a melt pool.

In some embodiments, the control system comprises a first temperature sensor and a second temperature sensor. The first temperature sensor may provide sensed information to the control system (e.g., to the PID controller). The second temperature sensor may be compared to a critical temperature threshold in the control model. The control model may change based on the input from the second and/or first temperature sensor. The first temperature sensor may sense a temperature designated for the melt pool (e.g., FIG. 26A, 2605). The second temperature sensor may sense a temperature designated for the melt pool vicinity (e.g., FIG. 26A, 2610). In some embodiments, when a temperature sensed by the first and/or second sensor reaches and/or exceeds a certain (e.g., respective) threshold value, the irradiation of that area by the transforming energy beam may alter (e.g., reduce, e.g., cease). Altered irradiation may comprise irradiation with an altered power density, cross section, dwell time, and/or focus. The temperature sensed by the two sensors may be used to evaluate (e.g., calculate) the temperature gradient in the vicinity of the area designated for the melt pool (e.g., temperature gradient between 2605 and 2610). The control model may be operatively coupled (e.g., inform) the controller (e.g., comprising close loop or feedback control loop). (E.g., 2442, 2426 and/or 2430).

The 3D object may be generated by providing a first layer of pre-transformed material (e.g., powder) in an enclosure; transforming at least a portion of the pre-transformed material in the first layer to form a transformed material. The 3D object may be generated by providing a pre-transformed material (e.g., stream) to a target surface (e.g., platform); transforming at least a portion of the pre-transformed material (i) prior to reaching the target surface or (ii) at the target surface, to form a transformed material. The stream can be a stream of a particulate material. The transforming may be effectuated (e.g. conducted) with the aid of an energy beam. The energy beam may travel along a path. The path may comprise hatching. The path may comprise a vector or a raster path. The method for generating the 3D object may further comprise hardening the transformed material to form a hardened material as part of the 3D object. In some embodiments, the transformed material may be the hardened material as part of the 3D object. The method may further comprise providing a second layer of pre-transformed material adjacent to (e.g., above) the first layer and repeating the transformation process delineated herein (e.g., above). The method may further comprise providing pre-transformed material adjacent to (e.g., above) the first layer of hardened material (as part of the 3D object) and repeating the transformation process delineated herein.

Figure 5:
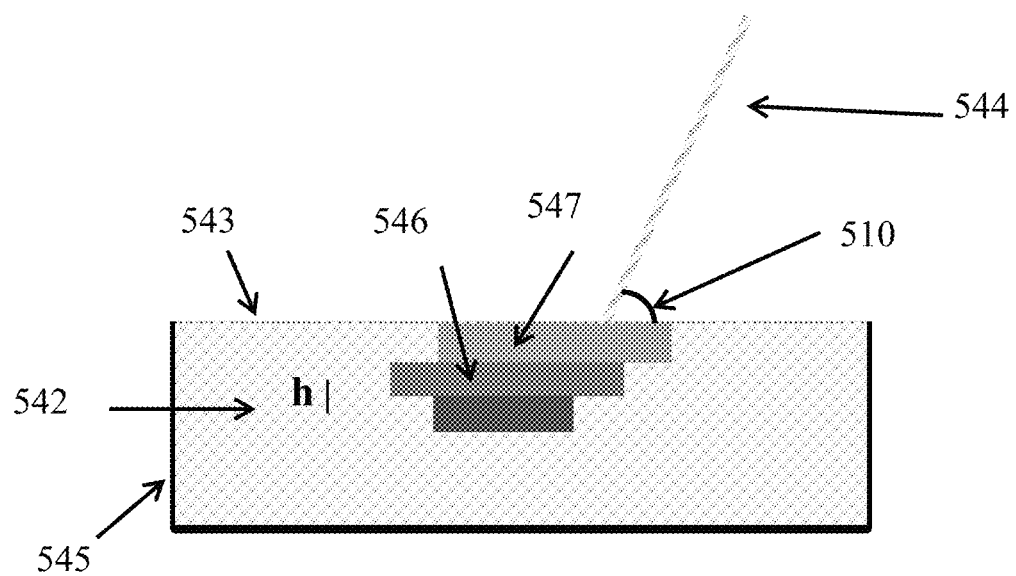
FIG. 5 shows a schematic side view of a 3D printing system and apparatuses.
Figure 8:
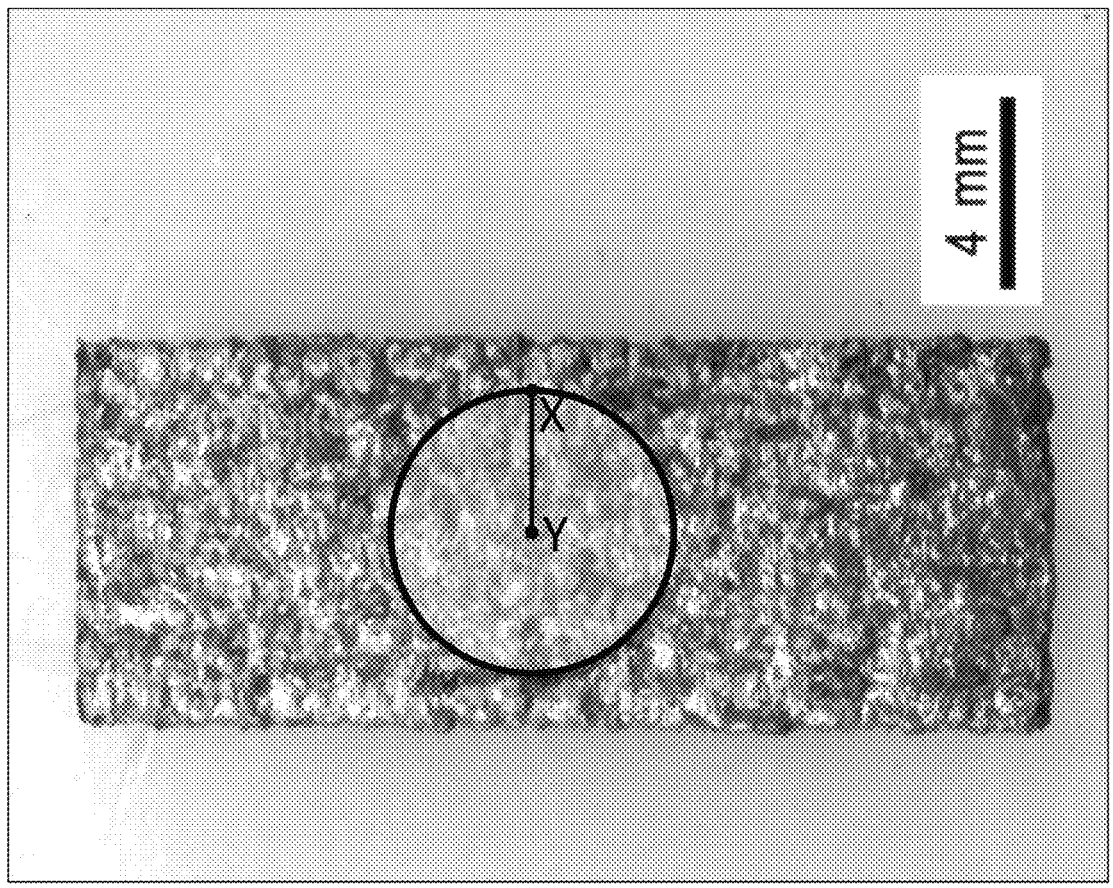
FIG. 8 shows a horizontal view of a 3D object.

The 3D object can be an extensive and/or complex 3D object. The 3D object can be a large 3D object. The 3D object may comprise a large hanging structure (e.g., wire, ledge, or shelf). Large may be a 3D object having a fundamental length scale of at least about 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. In some instances, The fundamental length scale (e.g., the diameter, spherical equivalent diameter, diameter of a bounding circle, or largest of height, width and length; abbreviated herein as "FLS") of the printed 3D object can be at least about 25 micrometers (μm), 50 μm, 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases, the FLS of the printed 3D object may be in between any of the afore-mentioned FLSs (e.g., from about 50 μm to about 1000 m, from about 120 μm to about 1000 m, from about 120 μm to about 10 m, from about 200 μm to about 1 m, from about 1 cm to about 100 m, from about 1 cm to about 1 m, from about 1 m to about 100 m, or from about 150 μm to about 10 m). The FLS (e.g., horizontal FLS) of the layer of hardened material may have any value listed herein for the FLS of the 3D object (e.g., from about 25 μm to about 2000 μm). The example in FIG. 10C shows a horizontal portion 1001 of the layer of hardened material (e.g., the top layer in the 10C scheme). The example in FIG. 8 shows a top view of the layer of hardened material, which is a horizontal portion of the layer of hardened material. The example in FIG. 5 shows a vertical portion "hl" of the layer of hardened material 546, indicating its height.

The methods, systems, software and/or apparatuses may include measuring, controlling and/or monitoring the deformation (e.g., curvature) of the forming and/or formed layer of hardened material (e.g., as it forms). The methods, systems, software and/or apparatuses may include measuring, controlling and/or monitoring the deformation of the forming and/or formed layer of hardened material or portion thereof (e.g., during formation of the 3D object). During the formation of the 3D object may comprise during formation of the layer or a portion thereof. During the formation of the 3D object may in some instances include subsequent to the formation of the entire 3D object (e.g., a hardening period). During the formation of the 3D object may in some instances exclude subsequent to the formation of the entire 3D object (e.g., exclude a period at which the 3D object has been formed, and it is left for complete hardening).

At times, some portions of the 3D object may deform during its formation (e.g., during the transformation and/or hardening). The deformation may comprise an undesired or a desired deformation. In some instances, the deformation is undesired. The deformation may cause the 3D object to (e.g., substantially) deviate from the desired (e.g., requested) 3D object. For example, at least some portions of the 3D object may deform. Deform may comprise warp, buckle, bend, twist, shrink, or expand (e.g., during formation or subsequent thereto) in a substantial and/or undesirable manner. Substantial may be relative to the intended purpose of the 3D object. For example, some portions of the 3D object may form warped, buckled, bent, twisted, shrunk, or expanded portions that are substantial and/or not desirable. In some instances, it is desirable to control (e.g., regulate and/or manipulate) the manner in which at least a portion of the 3D object is formed (e.g., regarding any deformation and/or deviation from the desired 3D object). Control may comprise regulate, manipulate, restrict, direct, monitor, adjust, or manage. In some instances, it is desirable to control the manner in which at least a portion of the 3D object is formed (e.g., hardened). In some instances, it is desired to control at least one characteristic of the at least a portion of the 3D object as it is formed (e.g., and hardened). The portion may be at least a portion of a layer of the 3D object. The portion may be a portion of the layer of the 3D object or the entire layer thereof. The at least one characteristic of the at least portion of the 3D object may comprise a curvature. The curvature may be of the at least one layer (or portion thereof) that forms the 3D object. The curvature may be a positive or negative curvature. The curvature may have a radius of curvature.

The radius of curvature, "r," of a curve at a point can be a measure of the radius of the circular arc (e.g., FIG. 7, 716) which best approximates the curve at that point. The radius of curvature can be the inverse of the curvature. In the case of a 3D curve (also herein a "space curve"), the radius of curvature may be the length of the curvature vector. The curvature vector can comprise of a curvature (e.g., the inverse of the radius of curvature) having a particular direction. For example, the particular direction can be the direction towards the platform (e.g., designated herein as negative curvature), or away from the platform (e.g., designated herein as positive curvature). For example, the particular direction can be the direction towards the direction of the gravitational field (e.g., designated herein as negative curvature), or opposite to the direction of the gravitational field (e.g., designated herein as positive curvature). A curve (also herein a "curved line") can be an object similar to a line that is not required to be straight. A straight line can be a special case of curved line wherein the curvature is (e.g., substantially) zero. A line of (e.g., substantially) zero curvature has an (e.g., substantially) infinite radius of curvature. A curve can be in two-dimensions (e.g., vertical cross section of a plane), or in three-dimension (e.g., curvature of a plane). The curve may represent a cross section of a curved plane. A straight line may represent a cross section of a flat (e.g., planar) plane. The platform may be a building platform. The platform may comprise the substrate, base, or bottom of the enclosure. The material bed may be operatively coupled and/or disposed adjacent to (e.g., on) the platform.

The methods, systems, software, and/or apparatus may comprise anticipating (e.g., calculating) the deformation. Anticipation may take into account a position and/or temperature measurements from at least one sensor. The sensor may measure at least one position of a target surface (e.g., an exposed surface of the material bed) (e.g., as described herein).

In some embodiments, the energy beam irradiates (e.g., flash, flare, shine, or stream) energy on a position of the exposed surface of the material bed for a period of time (e.g., predetermined period of time) to transform at least a portion of the pre-transformed material in the material bed into a transformed material. The remainder of the material bed that has not been irradiated, may be at an average (or mean) ambient temperature. The remainder of the material bed that has not been irradiated, may be cooled (e.g., using a cooling member). The remainder of the material bed that has not been irradiated, may be not be actively heated (e.g., using a radiative heater). The energy beam that transforms a pre-transformed material into a transformed material is designated as "transforming energy beam." The transforming energy beam may travel along a path (e.g., vector or raster path). The transformed material may be a welded material. The transformed material may be a fused material. Fused may comprise molten (e.g., completely molten) or sintered. The time during which the transforming energy beam irradiates the material bed may be referred to as a dwell time of the (transforming) energy beam. The irradiation of the material bed by the transforming energy beam may form a transformed portion of the pre-transformed material within the material bed. For example, the irradiation of the powder bed by the transforming energy beam (e.g., laser) may form a fused portion of the powder material within the powder bed. During this period of time (i.e., dwell time) the energy flux of the transforming energy beam may be substantially homogenous. Without wishing to be bound to theory, Energy flux may refer to the transfer rate of energy per unit area (e.g., having SI units: $W \cdot m^{-2} = J \cdot m^{-2} \cdot s^{-1}$). Homogenous may refer to the flux of energy during the dwell time. Homogenous may refer to the distribution of energy density across the cross section of the energy beam. In some instances, the distribution of energy density across the cross section of the energy beam may substantially resemble a Gaussian distribution.

In some embodiments, at a certain period of time, the distribution of energy across the cross section of the energy beam may substantially differ from a Gaussian distribution. During this period of time, the transforming energy beam may (e.g., substantially) not translate (e.g., neither in a raster form nor in a vector form). During this period of time the energy density across the cross section of the transforming energy beam may be (e.g., substantially) constant. In some embodiments, (e.g., during this period of time) the energy density of the transforming energy beam may vary. In some embodiments, (e.g., during this period of time) the power of the energy source generating of transforming energy beam, may vary. The variation may be predetermined. The variation may be controlled (e.g., by a controller). The controller may determine the variation based on a signal received by one or more sensors (e.g., temperature and/or positional sensors). The controller may determine the variation based on an algorithm.

In some embodiments, at least one controller is employed to effectuate (e.g., using control) a desired behavior of an apparatus and/or system (e.g., using at least one sensor). The control may comprise closed loop control. The control may comprise feedback control. The control may comprise feed forward control. The closed loop control may be based on data obtained from one or more sensors. The closed loop control may comprise closed loop control while processing one or more layers disposed within the material bed (e.g., build planes). The closed loop control may comprise closed loop control while processing at least a portion of the one or more build planes (e.g., the entire build). The controlled variation may be based on closed loop and/or open loop control. For example, the controlled variation may be based on (e.g., utilizes) closed loop control. The closed loop control may be performed during the 3D printing process. The closed loop control may rely on in situ measurements (e.g., of an exposed surface). The in situ measurements may be in the chamber where the 3D object is generated (e.g., processing chamber). The closed loop control may rely on real time measurements (e.g., during the 3D printing process of the at least one 3D object). The closed loop control may rely on real time measurements (e.g., during formation of a layer of the 3D object). The variation may be determined based on one or more signals obtained from a temperature sensor and/or positional sensor (e.g., imaging). The positional sensor may be a metrology sensor (e.g., as described herein). The variation may be determined based on height variation measurements. The variation may be determined by height evaluation of the exposed surface of the material bed, portions thereof, or any protruding object therefrom. The variation may be determined by temperature measurements of the exposed surface of the material bed, portions thereof, or any protruding object therefrom. The variation may be determined by temperature measurements of the transformed material (e.g., a melt pool therein). The variation may be determined by melt pool size (e.g., FLS) evaluation of the transformed material.

In some embodiments, the control system evolves during at least a portion of the 3D printing (e.g., in real time, e.g., as delineated herein). The evolution may utilize one or more parameters which vary in real-time (e.g., during formation of a melt pool, or two successive melt pools). The evolution may use uncertain parameter values (e.g., which uncertain parameter values may be roughly estimated). The (e.g., real-time) evolution may rely on at least one changing condition during at least a portion of the 3D printing. The changing conditions may comprise a temperature of a portion at the target surface (e.g., target surface area of a footprint of the energy beam, and/or its vicinity), at least one characteristic of the energy beam, and/or power of the energy source. The changing condition may comprise amount of plasma, oxygen, and/or moisture above the target surface (e.g., in the atmosphere of the processing chamber). The control system may comprise adaptive control. The adaptive control may comprise feed forward adaptive control, or feedback adaptive control. The adaptive control may comprise a direct adaptive control method (e.g., the estimated parameters are directly used in the adaptive controller), or an indirect adaptive control method (e.g., the estimated parameters are used to calculate the controller parameters). The adaptive control may comprise parameter estimation. For example, the computer-model may comprise an initial parameter estimation. For example, the physical-model and/or control-model may comprise an initial parameter estimation. The estimated parameter may be geometric, temperature (e.g., emitted from the target surface), power of the energy source, and/or power density of the energy beam. The adaptive control may comprise recursive parameter estimation. The adaptive control may comprise reference adaptive control scheme (MRAC). The MRAC may comprise one-step-ahead adaptive control (OSAAC) scheme. In some embodiments, the control system may comprise a control algorithm that evolves (e.g., changes) during the (e.g., real-time) control. The adaptive control may comprise a parametric control scheme.

In some embodiments, the control system comprises a model predictive control. The model predictive control may comprise the adaptive control. The control system may alter the physical model in real time. The physical model may comprise an electronic circuit. The physical model may comprise changing the electronic circuit in real time. For example, (i) changing the electronic connectivity in the electronic circuit in real time, and/or (ii) changing the components (e.g., in type, number, and/or configuration) of the electronic circuit in real time. The control system may comprise changing the physical model (e.g., in real-time) based on the timing of measured one or more events in the 3D printing (e.g., as sensed and/or detected, e.g., in real-time). The computer model (e.g., physical model) may be a coarse prediction of one or more aspects of the 3D printing. The measured (e.g., sensed and/or detected) one or more parameters may allow fine tuning of that coarse prediction (e.g., in real time) to more accurately predict the 3D printing. The model predictive control may comprise an arbitrary model (e.g., any physical model, e.g., the electronic circuitry model). The arbitrary model may comprise imitation of the 3D printing process. The arbitrary model may comprise simulation of the 3D printing process. The imitation and/or prediction may be a coarse (e.g., simplistic) prediction. Measured one or more parameters may allow fine tuning of the arbitrary model to better imitate and/or predict the 3D printing. The physical model may change dynamically in real time (e.g. during printing of a layer of the 3D object).

In some embodiments, the control system comprises robust control. The control system may comprise bounds to one or more variables. In some embodiments, the control system comprises an algorithm that is unchanging during the (e.g., real-time) control. The robust control may comprise a non-parametric control scheme.

In some embodiments, the control comprises a closed loop control, or an open loop control (e.g., based on energy calculations comprising an algorithm). The closed loop control may comprise feed back or feed forward control. The control may comprise generating a slicing plan of a desired model of the 3D object. The control may comprise generating a path plan (e.g., comprising a hatching plan) of a particular 3D model slice, along which path the energy beam (e.g., transforming energy beam) may travel. Various path plans are delineated in Provisional Patent Application Ser. No. 62/317,070, filed on Apr. 1, 2016, titled "APPARATUSES, SYSTEMS AND METHODS FOR EFFICIENT THREE-DIMENSIONAL PRINTING" and PCT application number PCT/US16/66000 filed on Dec. 9, 2016 titled "SKILLFUL THREE-DIMENSIONAL PRINTING", both of which are incorporated by reference in their entirety. The path plan may be used to generate at least one 3D printing direction according to which the 3D printing is conducted and/or controlled. The control may comprise using an algorithm (e.g., comprised in a script). The algorithm may be embedded in a script. In some examples, a script is a language specific computer readable media (e.g., software) implementation of the algorithm. For example, the model may combine feedback or feed-forward control based on an algorithm. The algorithm may take into account one or more temperature measurements (e.g., as delineated herein), one or more power measurements, one or more power density measurements, geometry of at least part of the 3D object, heat depletion/conductance profile of at least part of the 3D object, or any combination thereof. The controller may modulate the energy beam (e.g., transforming energy beam). The algorithm may take into account geometric pre-correction of an object (i.e., object pre-print correction, OPC) to compensate for any distortion of the final 3D object (e.g., after its hardening). FIG. 6 shows various examples of OPC. The algorithm may comprise an instruction to form a correctively deformed object. The algorithm may comprise modification applied to the model of a desired 3D object. Examples of modifications (e.g., corrective deformations) can be found in patent application No. 62/239,805, titled "SYSTEMS, APPARATUSES AND METHODS FOR THREE-DIMENSIONAL PRINTING, AS WELL AS THREE-DIMENSIONAL OBJECTS" that was filed on Oct. 9, 2015, and PCT application number PCT/US16/34857 titled "THREE-DIMENSIONAL PRINTING AND THREE-DIMENSIONAL OBJECTS FORMED USING THE SAME" that was filed on May 27, 2016, both of which are incorporated herein by reference in their entirety. The algorithm may consider the geometry of one or two different portion of the 3D object. The algorithm may be different for at least two (e.g., geometrically different) portion of the 3D object. The different portions of the 3D object may comprise a bulk (e.g., interior) of the 3D object, bottom skin layer, surface of the 3D object, interior of the 3D object immediately close to the surface. The algorithm may be differ depending on the angle of the bottom skin layer, with respect to the platform. The bulk of the 3D object may comprise transformed (e.g., and hardened) material that is thick enough to withstand stress deformation upon adding transformed material to it (e.g., additional layer of transformed material). For example, the control may comprise a thermoplastic simulation. The thermo-mechanical simulation can comprise elastic or plastic simulation. The thermoplastic simulation may comprise metrological and/or temperature measurements taken during the 3D printing process (e.g., of a previously formed layer of hardened material). The thermoplastic simulation may be used to revise the 3D printing plan, path plan, and/or path directionality. The analysis (e.g., thermoplastic simulation) may be performed before, during, and/or after a layer of hardened material is formed. The transforming energy beam can be any energy beam delineated in Provisional Patent Application Ser. No. 62/317,070 that is entirely incorporated by reference herein.

In some embodiments, the printing instructions for two geometrically different portions of the 3D object may be different. Different may be by at least one printing parameters. For example, different may be by at least one characteristic of the transforming energy beam and/or energy source. The printing instructions be different for at least two (e.g., geometrically different) portion of the 3D object. The different portions of the 3D object may comprise a bulk (e.g., interior) of the 3D object, bottom skin layer, surface of the 3D object, interior of the 3D object immediately close to the surface. The printing instruction may be differ depending on the angle of the bottom skin layer, with respect to the platform.

At times, one or more 3D model slices are adjusted by the operation comprising an algorithm to form an adjusted 3D model slice (e.g., an algorithm comprising OPC). A slice is a virtual portion of the requested model of the 3D object that is materialized as a layer in the printed (e.g., physical) 3D object. The slice may be a cross section of the model of the requested 3D object. The adjusted 3D model slice may be fed into the controller to control the printing of the 3D object. For example, the adjusted 3D model slice may be fed into the controller to control at least one apparatus within the 3D printing system (e.g., the energy source and/or beam).

In some embodiments, the control (e.g., open loop control) comprises a calculation. The control may comprise using an algorithm. The control may comprise feedback loop control. In some examples, the control may comprise open loop (e.g., empirical calculations), closed loop (e.g., feed forward and/or feed back loop) control, or any combination thereof. The control setpoint may comprise a calculated (e.g., predicted) setpoint value. The setpoint may comprise adjustment according to the closed loop control. The controller may use metrological and/or temperature measurements. The controller may use material measurements. For example, the controller may use porosity and/or roughness measurements (e.g., of the layer of hardened material). The controller may direct adjustment of one or more systems, software module, and/or apparatuses in the 3D printing system. For example, the controller may direct adjustment of the force exerted by the material removal mechanism (e.g., force of vacuum suction).

At times, a portion of the material within the material bed (e.g. FIG. 1, 104) or a portion of the exposed material of the material bed (e.g. FIG. 1, 106) may part from the material bed (e.g., due to heating). The energy beam may irradiate the material bed and cause the at least a portion to heat (e.g., overheat). Parting of the at least a portion may form a suspended material in the atmosphere above the exposed surface. (e.g., in the enclosure 116). Parting from the material bed may cause the at least a portion to become airborne. Heating may cause the at least a portion to undergo phase transformation. The phase transformation may comprise transformation into a gas or into plasma. The phase transformation may occur during the formation of the one or more 3D objects (e.g., during the transformation and/or hardening). The parting from the material bed (e.g., evaporation) may lead to generation of debris (e.g., upon reaction and/or condensation). For example, the 3D printing process may comprise transforming a pre-transformed material to a transformed material by exposing it to a transforming energy beam for a (e.g. predefined) time period. The time at which the energy source emits a transforming energy beam may be referred herein as "dwell time". The dwell time may be at least about 1 μsec, 2 μsec, 3 μsec, 4 μsec, 5 μsec, 10 μsec, 20 μsec, 30 μsec, 40 μsec, 50 μsec, 60 μsec, 70 μsecs, 80 μsec, 90 μsec, 100 μsec, 200 μsec, 500 μsec, 1 millisecond (msec), 3 msec, 5 msec, or 10 msec. The dwell time may be any value between the aforementioned values (e.g., from about 1 μsec to about 60 μsec, from about 1 μsec to about 500 μsec, from about 1 μsec to about 10 msec, from about 500 μsec to about 5 msec, or from about 60 μsec to about 1001 μsec). The power per unit area of the energy beam may be at least about 100 Watt per millimeter square (W/mm$^2$), 200 W/mm$^2$, 300 W/mm$^2$, 400 W/mm$^2$, 500 W/mm$^2$, 600 W/mm$^2$, 700 W/mm$^2$, 800 W/mm$^2$, 900 W/mm$^2$, 1000 W/mm$^2$, 2000 W/mm$^2$, 3000 W/mm$^2$, 5000 W/mm2, 7000 W/mm$^2$, or 10000 W/mm$^2$. The power per unit area of the energy beam may be any value between the afore-mentioned values (e.g., from about 100 W/mm$^2$ to about 3000 W/mm$^2$, from about 100 W/mm$^2$ to about 5000 W/mm$^2$, from about 100 W/mm$^2$ to about 10000 W/mm$^2$, from about 100 W/mm$^2$ to about 500 W/mm$^2$, from about 1000 W/mm$^2$ to about 3000 W/mm$^2$, from about 1000 W/mm$^2$ to about 3000 W/mm$^2$, or from about 500 W/mm$^2$ to about 1000 W/mm$^2$). The power per unit area of the energy beam may be any power per unit are disclosed herein. The dwell time or the amount of heat deposited by the energy beam may be used to transform the pre-transformed material to a transformed material. The transformation may occur at a temperature that may cause one or more phase transformation of the at least a portion of the material bed (e.g., forming liquid, evaporation, and/or plasma formation). In some instances, the at least a portion that is heated (e.g., by the energy beam) may comprise a pre-transformed material or a transformed material. At times, the at least a portion that is heated (e.g., by the energy beam) may comprise a hardened material.

Some materials (e.g. pre-transformed and/or transformed) comprise elements (e.g. chromium) which materials have a different vapor pressure in their elemental state (e.g., metallic state) relative to their oxide state. When a pre-transformed material is being transformed, the element (as part of the pre-transformed material), may evaporate and/or form plasma. The evaporated material and/or its plasma may chemically react. The chemical reaction may comprise oxidation (e.g. form an oxide). The chemical reaction may comprise reacting with a gas (e.g., in the enclosure). The chemical reaction may comprise reacting with a residual chemical (e.g., in the enclosure). The chemical reaction may comprise reacting with oxygen (e.g., molecule or radical). The chemical reaction may comprise reacting with an oxygen and/or water molecule. The evaporation and/or plasma formation of such (e.g., metallic) material, as well as its (e.g., subsequent) condensation and/or chemical reaction, may lead to generation of debris (e.g. in the form of soot). Without wishing to be bound to theory, the generation of debris may be a result of condensation and/or chemical reaction (e.g., oxidation). At times, the reaction product of the material may have a higher vapor pressure relative to its respective elemental state. For example, the oxide of the element may have a higher vapor pressure relative to its respective elemental state. At times, the material at its elemental state will tend to evaporate and/or form plasma quicker than its respective reaction product (e.g., oxide). Material examples comprise Molybdenum or Tungsten, which have a low vapor pressure in their elemental state (e.g., metallic) as compared to their respective oxides. Metal may comprise an elemental metal or metal alloy.

Figure 25:
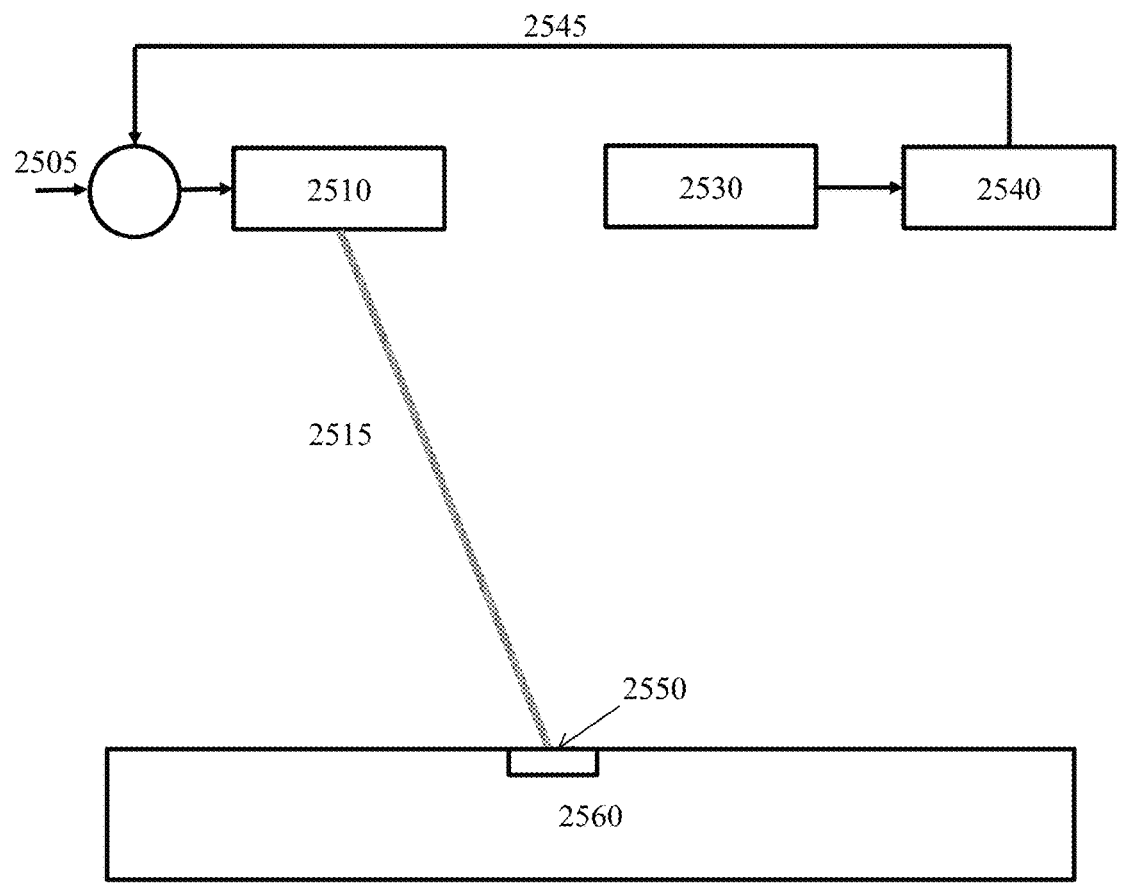
FIG. 25 schematically illustrates a control system that is programmed or otherwise configured to facilitate debris reduction (e.g., avoidance) during formation of one or more 3D objects.

To reduce (e.g., avoid) evaporation and/or plasma formation of materials (e.g., and thus formation of debris) the temperature of the heated area (e.g., by the energy beam) may be controlled using a controller (e.g. comprising a GPU, CPU, FPGA or any other such computing element, e.g., as described herein). FIG. 25 shows a schematic example of a system for adjusting a temperature of a heated area 2550 using a controller 2540 (e.g. a control system, e.g., as shown in FIG. 24). The heated area (e.g., a melt pool) may be in the material bed (e.g., 2560), and/or on a target surface. The heated area may comprise a portion of the exposed surface of the material bed. The temperature of the heated area (e.g., a location of the transformation) may be monitored using one or more sensors 2530 (e.g., optical sensors, and/or thermal sensors). In some examples, the monitored temperature is compared (e.g., by the controller) to a predetermined threshold temperature value (or range) as a control parameter. The predetermined threshold value may be provided by a feed forward control element (e.g., 2505). The control parameter may comprise a specific location, and/or a specific time, of the transformation. As the monitored temperature deviates from the predetermined threshold value (or range), the temperature may be adjusted (e.g. using a feed-back control) to alter (e.g., reduce) the temperature deviation. In an analogous manner to the temperature adjustment, the power of the energy source generating the energy beam, and/or at least one characteristic of the energy beam (e.g., power density thereof) may be adjusted additionally or alternatively thereto.

In some examples, the control comprises a closed loop control. The closed loop control may comprise a feedback, or feed-forward control. The control variable (e.g. power per unit area) of the energy beam (e.g., 2515) may be adjusted, e.g., by adjusting the energy source (e.g., 2510) parameters (e.g., by the controller). The control variable (e.g. power per unit area) of the energy beam may be pre-programmed. Pre-programming may be for a particular path of the energy beam. In some embodiments, both feed forward and feed-back control may be used in combination. The control variable (e.g. power per unit area) of the energy beam may be adjusted locally. Locally may refer to a particular heated area, adjacent to a particular heated area, a hatching within a path, a path of the energy beam, or a layer. The control variable (e.g. temperature) may be controlled by a closed loop control (e.g., 2545). The control may rely on the temperature measurements (e.g., by the one or more sensors).

The control may comprise pre-defining a value, or a set of values, for the control variable (e.g. power per unit area profile, power profile, and/or a temperature profile). The control variable may be pre-defined for one or more transformation locations on the target surface. The control may comprise controlling the control variable (e.g. temperature, power, and/or power per unit area) in relation to a transformation location, in real time. Controlling may comprise regulating, monitoring, modulating, varying, altering, restraining, managing, checking, and/or guiding. Real time may be during transforming at least a portion of a material within the energy beam footprint, hatch, path, or slice. Real time may be during the formation of the 3D object or portion thereof. In some embodiments, the control may comprise adjusting (e.g. correcting) for at least one deviation of the temperature at the heated area, power of the energy source generating the energy beam, and/or power per unit area of the energy beam directed to the heated area. The adjustment may be relative to a pre-defined power, power per unit area (e.g., value and/or profile), or temperature (e.g., value and/or profile) at the heated area respectively. The feed forward controller may pre-identify one or more locations at the (virtual) model of the requested 3D object that may be more challenging to correct using feedback control (e.g. U-turns, long hatches, and/or short hatches). The pre-identification locations (e.g., and operation) may comprise performing geometry analysis of a 3D printing model associated with the desired 3D object. The printing model may comprise an OPC of the desired 3D object.

In some embodiments, the control comprises generating a physical model. In some embodiments, the control-model comprises the physical model. In some embodiments, the computer-model comprises the physical model. In some embodiments, the control-model excludes the physical model. In some embodiments, the computer-model excludes the physical model. The physical model may imitate and/or be analogous to a thermo-mechanical model (e.g., of the 3D printing). The physical model may comprise one or more elements that represent (e.g., are analogous to, or imitate) one or more physical properties (e.g., heat profile of an energy beam, thermal history of an energy beam, dwell time sequence of an energy beam, power profile over time of an energy beam, energy beam distribution (i.e., spot size)) associated with one or more components involved in the process of building a 3D object (e.g., energy beam, pre-transformed, or transformed material). The physical model may be used to pre-determine one or more target parameters (e.g., a temperature threshold at one or more points on the target surface, a power density of the energy beam, a FLS of the energy beam footprint on the target surface, a focus of the energy beam footprint, a dwell time of the energy beam, an intermission time of the energy beam).

In some embodiments, the physical model is a complex model. The complex model may include a high order model (e.g., a high dimension mathematical model, and/or a high polynomial order model). High dimension refers to a dimension that is greater than one. For example, a mathematical polynomial with a power of two, three, four, or more. The complex model may comprise information related to (i) one or more metrological properties of the forming 3D object (or portion thereof), (ii) physical properties of the pre-transformed and/or transformed material, or (iii) thermal properties of the energy beam (e.g., along at least a portion of the path used for building a 3D object). The complex model may include properties associated with more than one dimension of the 3D object. The complex model may include properties related to one or more layers of the 3D object (e.g., previously formed and/or to be formed layers). The complex model may include geometry parameters (e.g., contours, curves, slices) of the requested 3D object to be build. The complex model may include one or more prediction models. The prediction may pertain to the way at least a portion of the 3D object is hardened during and/or subsequent to the transformation of the pre-transformed material which forms at least a portion of the 3D object. A prediction model may predict at least one physical property (e.g., thermal map of the 3D object) during its formation (e.g., during building one or more layers of a 3D object), and/or a dwell time sequence of the energy beam (e.g., across one or more layers forming the 3D object).

In some embodiments, the physical model is a simplified (e.g., simple) model. A simplified model may include one or more properties related to at least a building portion of the 3D object (e.g., a single dimension of the 3D object, or two dimensions of the 3D object). The simplified model may include one or more assumptions. The assumptions may comprise pre-determining values (e.g., assuming stable values) for one or more properties of the 3D object. The assumptions may include simplifying the geometry of the 3D object (e.g., a single dimension of a portion of the 3D object). The assumptions may include predicting at least one physical property (e.g., temperature over time, temperature distribution within at least a portion of the 3D object (e.g., over time), power density of the energy beam over time, heat profile of the material bed over time, and/or heat distribution within the material bed (e.g., over time)). The simplified model may be a discretized version of the complex model (e.g., may include predictions for a portion of the geometry of the 3D object). The simplified model may be a subset of the complex model (e.g., may include a single property). The complex model may comprise a plurality of simplified models.

Figure 27A:
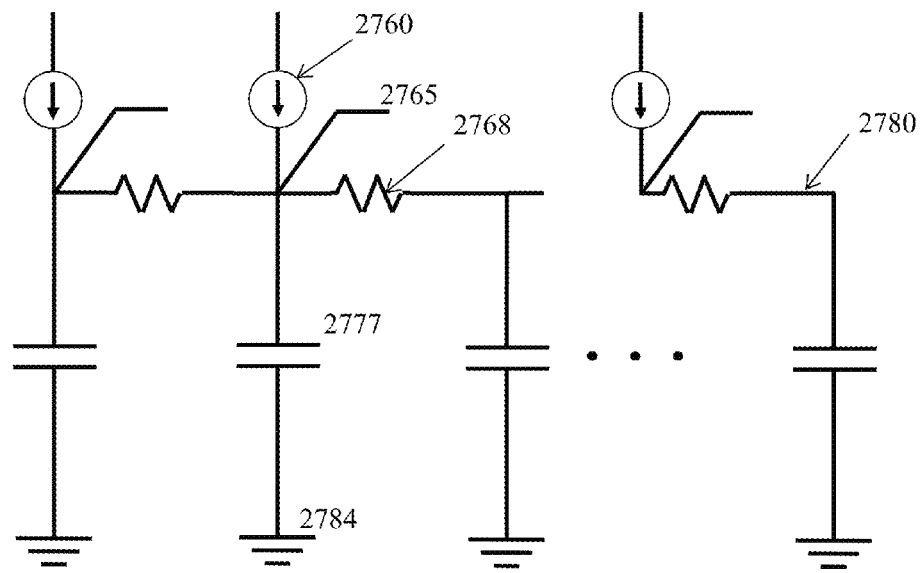
FIGS. 27A-27B schematically illustrate various physical models.
Figure 27B:
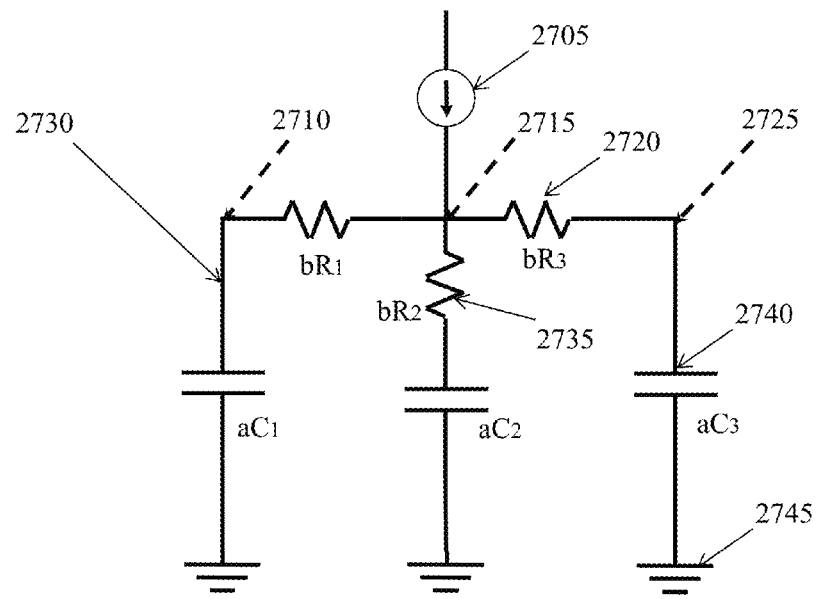

In some embodiments, the physical model is represented by an analogous model (e.g., an electrical model, an electronic model, and/or a mechanical model). FIGS. 27A-27B illustrate examples of an electrical analogous model. FIG. 27A illustrates an example of a simplified electrical analogous model (e.g., a first order of complexity model). The electrical model may include one or more basic elements, for example, a current source (e.g., FIG. 27A, 2760), a resistor (e.g., FIG. 27A, 2768), a capacitor (e.g., FIG. 27A, 2777), an inductor, and/or a ground component (e.g., FIG. 27A, 2784). The basic elements may represent one or more physical properties of building a 3D object. At times, the basic elements may represent one or more components of the 3D printer. For example, the energy beam may be represented by a current source. In some examples, the angle of at least a portion of the 3D object (e.g., an overhang thereof) may affect the capacitance and/or resistor values representing a point on the edge of that at least a portion of the 3D object (e.g., this overhang). For example, the larger the overhang angle with respect to the target (e.g., exposed) surface (e.g., the stepper the overhang), the smaller the resistor will be in the physical-model, and the larger the capacitance in the physical-model. The value of at least one resistor and/or capacitance may be related to (i) the discretization distance and/or (ii) the fundamental material properties forming the 3D object. The discretization distance may be the physical length of a unit element (e.g., electrical element) which is represented by the basic discrete elements. The fundamental material properties of the build material may comprise the thermal conductivity, the heat capacity, or the density of the build material (e.g., material forming the 3D object). In some examples, the measured voltage probe points (in the physical-model), such as 2765, represent a measurement of the surface temperature (in the forming/formed 3D object). Closed loop and/or feedback control may be modeled by a change of the current source as a response to a change in the measured voltage, at the probe point (e.g., 2765). The model can also predict the measured voltages (e.g., that can represent measured temperature). Measuring the temperature levels during the build and/or comparing them to the modeled voltage, may allow (i) a (e.g., systematic) study of the error in the physical-model, (ii) fine tuning of the model, (iii) finding a relationship between the physical process of 3D printing and the (e.g., simplified) physical-model representing it, or (iv) any combination thereof. The voltage may be measured at the intersection of the current source and the branch of a resistor and/or capacitor (e.g., FIG. 27A, 2765). The simplified (e.g., reduced) model may not be limited to simple and/or constant value components. As an example, the capacitors and/or resistors can depend on the voltage C(V) and/or R(V) respectively. Additional components that can be used are, for example, current multiplier. The value of the current multiplier can represent in the physical-model a change in the absorption efficiency of the energy beam by the material in the 3D printing. For example, as the value of the current multiplier can depend on the voltage (imitating the physical property of the absorption that can depend on the temperature). The voltage may be used to simulate a dependence (e.g., a temperature) of the capacitor and/or the resistor (e.g., C(V), and/or R(V)). The analogous model may include input from at least one sensor and/or detector. The sensor and/or detector may detect a physical property of at least one position on the target surface (e.g., temperature of a position at the target surface, power of the energy beam, and/or thermal map of the path of the energy beam). The sensor input may be fed into one or more branches of the physical model.

In some embodiments, the physical model comprises an analog or digital model. The model may comprise an electronic model. The model may comprise a basic element. The basic element may be an electrical (e.g., electronic) element. The electrical element may comprise active, passive, or electromechanical components. The active components may comprise a diode, transistor, an integrated circuit, an optoelectronic device, display device, vacuum tube, discharge device, or a power source. The passive components may comprise a resistor, a capacitor, a magnetic (inductive) device, a memristor, a network, a transducer, a sensor, a detector, an antenna, an oscillator, a display device, a filter (e.g., electronic filter), a wire-wrap, or a breadboard. The electromechanical components may comprise a mechanical accessory, a (e.g., printed) circuit board, or a memristor. The basic elements may be variable devices and/or have a variable value (for example, a variable resistor, and/or a variable capacitor). The resistor may be a linear resistor, non-linear resistor, carbon composition resistor, wire wound resistor, thin film resistor, carbon film resistor, metal film resistor, thick film resistor, metal oxide resistor, cermet oxide resistor, fusible resistor, variable resistor, potentiometer, rheostat, trimmer, thermistor, varistor, light dependent resistor, photo resistor, photo conductive cell, or a surface mount resistor. The capacitor may be a ceramic, film, paper, polarized, non-polarized, aluminum electrolytic, a tantalum electrolytic, niobium electrolytic, polymer, double layer, pseudo, hybrid, silver, mica, silicon, air-gap, or a vacuum capacitor. The inductor may be an air core inductor, ferro magnetic core inductor, iron core inductor, ferrite core inductor, toroidal core inductor, bobbin based inductor, multi layer inductor, thin film inductor, coupled inductor, plastic molded inductor, ceramic molded inductor, power inductor, high frequency inductor, radio frequency inductor, choke, surface mount inductor, or a laminated core inductor. The physical model may be incorporated in a processor (e.g., computer). The physical model may comprise a circuit analog (e.g., in a processor). For example, the physical model may comprise a virtual circuit analog. The physical model may comprise a tangible circuit. The physical model may comprise a circuit board. The circuit boards may comprise the one or more electrical elements.

FIG. 27B illustrates an example of a more complex electrical analogous model (e.g., a second order of complexity model) relative to the one in FIG. 27A. The more complex electrical analogous model may include one or more basic electrical elements (e.g., a current source 2705, a resistor 2720, a capacitor 2740, and/or a ground element 2745). The basic element may include a multiplier (e.g., a constant value represented in the FIG. 27B, as "a" for the capacitor or "b" for the resistor). The multiplier may be variable. The multiplier may be adjusted. Adjustment may be done before, after, or during build of the 3D object (e.g., in real-time). Adjustment may be done manually and/or automatically (e.g., by a controller). At times, the complex electrical analogous model may be (e.g., substantially) complete (e.g., include representation for all dimensions, and/or properties of a physical model of the 3D object). Substantially may be relative to the intended purpose of the 3D object. The complex (e.g., more complex) electrical analogous model may include input from one or more sensors and/or detectors. A sensor or detector may sense or detect (respectively) a physical property of at least one position on the target surface (e.g., temperature of the target surface (e.g., temperature distribution thereof), power density of the energy beam, thermal map of the path of the energy beam, thermal map of the forming 3D object, and/or thermal map of the material bed). The sensor/detector input may be fed (e.g., FIG. 27B, 2710, 2715, 2725) into one or more branches (e.g., FIG. 27B, 2730) of the analogous electrical model (for example, a single branch may receive input from a single sensor, a single branch may receive input from more than one sensor, or multiple branches may receive input from a single sensor). The one or more sensor inputs may provide an (e.g., substantially) accurate measurements of the process of building the 3D object. The sensor input may use a signal sensed using at least one optical fibers (e.g., fiber bundle). An example for at least one fiber (e.g., fiber bundle) that is connected to a sensor/detector is described in Provisional Patent Application Ser. No. 62/442,896, filed on Jan. 5, 2017, titled "OPTICAL CALIBRATION IN THREE-DIMENSIONAL PRINTING" that is incorporated herein by reference in its entirety.

In some embodiments, the measurements (e.g., thermal, or power density) based on the sensor/detector input are detailed (e.g., accurate measurements from one or more sensors, smaller number of assumptions than a first order complexity model). The detailed measurements may allow observation of complex physical properties (e.g., diffusion of the heat through the forming 3D object and/or material bed). Detailed (e.g., accurate, and/or pertaining to more than one physical property) adjustments may be made based on the detailed measurements. The detailed adjustments may minimize uncertainties (e.g., uncertainties related to assumptions of physical properties, uncertainties such as location of the energy beam, uncertainties related to temperature profile of the energy beam, uncertainties related to geometry of the forming 3D object). The adjustments may be done by a controller. The analogous model (e.g., physical model) may act as a state observer. The analogous model may provide one or more measurements to the controller. Based on the measurements, the controller may adjust one or more components of the 3D printer. For example, the controller may adjust one or more characteristics of the energy beam. The controller may adjust one or more physical properties (e.g., electrical charge, e.g., position of an optical element). Adjustment may be done before, after and/or during 3D printing. The controller may be a part of a processing (e.g., computer) system. The controller may comprise a processor. The controller may be any controller described herein. The processor and/or processing system may be any computer and/or computer system described herein.

In some examples, one or more sensors/detectors are used to sense/detect (respectively) one or more physical parameters within the 3D printer system. Sensing and/or detecting may be done in real time (e.g., during build of the 3D object). Sensing and/or detecting may be done offline (e.g., before and/or after building the 3D object). The sensor may be any sensor described herein. The detector may be a detector array. The sensor and/or detector may be coupled to an optical fiber. A detector array and/or sensor array may be coupled to an optical fiber bundle. Various sensors and/or detectors can be found in Provisional Patent Application No. 62/430,723 titled "OPTICS, DETECTORS, AND THREE-DIMENSIONAL PRINTING", that was filed on Dec. 6, 2016, which is incorporated herein by reference in its entirety. The sensor and/or detector may sense and/or detect (respectively) one or more physical parameters of at least one layer of a forming 3D object. The sensor and/or detector may be translatable (e.g., movable, e.g., attached to a gimbal). The sensor and/or detector may move back and forth (e.g., along a path of an energy beam). The movement may be controlled (e.g., manually or automatically, e.g., using a controller).

FIGS. 30A-30E illustrate an example of retro scan. A retro scan may include moving the irradiated energy back and forth in the same general plane (e.g., of the target surface) along a path (e.g., line). Moving the irradiated energy may include moving one or more steps in the forward direction. The steps may be continuous or discontinuous. The steps may be isolated. For example, the steps may be tiles (e.g., overlapping or non-overlapping tiles). For example, FIG. 30A illustrates an example of moving the irradiated energy (e.g., 3015) in six steps (e.g., 3010) in a forward direction (e.g., 3020) on a target surface (e.g., 3005) along a line. FIG. 30B illustrates an example of moving the irradiated energy (e.g., 3035) four steps (e.g., 3030) in a backward direction (e.g., 3040) on the target surface (e.g., 3025) along the line. FIG. 30C illustrates an example of moving the irradiated energy beam (e.g., 3055) six steps (e.g., 3050) in the forward direction (e.g., 3060), on the target surface (e.g., 3045) along the line. In the retro scan procedure, the operation illustrated in FIG. 30A is executed, followed by the operation illustrated in FIG. 30B, which is subsequently followed by the operation in FIG. 30C. Moving the irradiated energy may include moving one or more steps selected from (i) moving in a forward direction to form a first forward path, (ii) irradiating to at least partially overlap the first forward path in a backwards direction to form a backwards path, and (iii) irradiating to at least partially overlap the backwards path in a forward direction. Operations (i) to (iii) can be conducted sequentially. In some embodiments, the backwards path overlaps the first forward path (at least) in part. In some embodiments, the second forward path overlaps the backwards path (at least) in part. Moving the energy beam may include overall moving in the forward direction (e.g., two steps forward and one step backward). For example, when the non-overlapping second forward path exceeds the first forward path in the direction of forward movement (e.g., difference between positions 7-8 on the target surface irradiated at time 15-16 in FIG. 30E). For example, FIG. 30D illustrates an example of moving the energy beam in three iterations, which circles (e.g., 3080) show an expansion of a superposition of irradiated positions on the target surface 3065. In the first iteration, the energy beam moves six steps in the forward direction (e.g., 3080). In the second iteration, the energy beam moves four steps in the backward direction (e.g., 3075) from the previous iteration. In the third step, the energy beam moves six steps in the forward direction (e.g., 3070) from the earlier iteration, thus overall moving eight steps in the forward direction on the target surface (e.g., 3025). In the illustrated example, the earliest irradiation position (e.g. first step) is indicated by the darkest gray circle. The shades of gray are lightened to indicate the subsequent steps (from the earliest to the most recent irradiated position, e.g., step two to step six) in the iteration, and the last irradiation position is indicated by a white circle. FIG. 30E illustrates the graphical representation of the retro scan, wherein the graphical representation illustrates the position of the irradiated energy on the target surface (e.g., 3085. E.g., position along an X axis) as time (e.g., 3090) progresses. The retro scan may be performed with the transforming energy beam having an elliptical (e.g., circular) cross section. The retro scan may be performed with the transforming energy beam having an oval (e.g., Cartesian oval) cross section. The retro scan may be performed continuously (e.g., during the 3D printing transformation operation, or a portion thereof). The retro scan may be performed during printing of the 3D object. The movement of the energy beam may be controlled statically (e.g., before or after printing of the 3D object). The movement of the energy beam may be controlled dynamically (e.g., during printing of the 3D object). The retro scan can be performed with any cross section of the irradiated energy (e.g., transforming energy) disclosed herein. For example, the retro scan can be performed using a circular cross sectional energy beam (e.g., focused, defocused; having small or large FLS), or an elliptical cross sectional energy beam (e.g., using the astigmatism mechanism). The energy beam used for the retro scan can be any transforming energy beam disclosed herein (e.g., focused, defocused; having small or large FLS).

Figure 31:
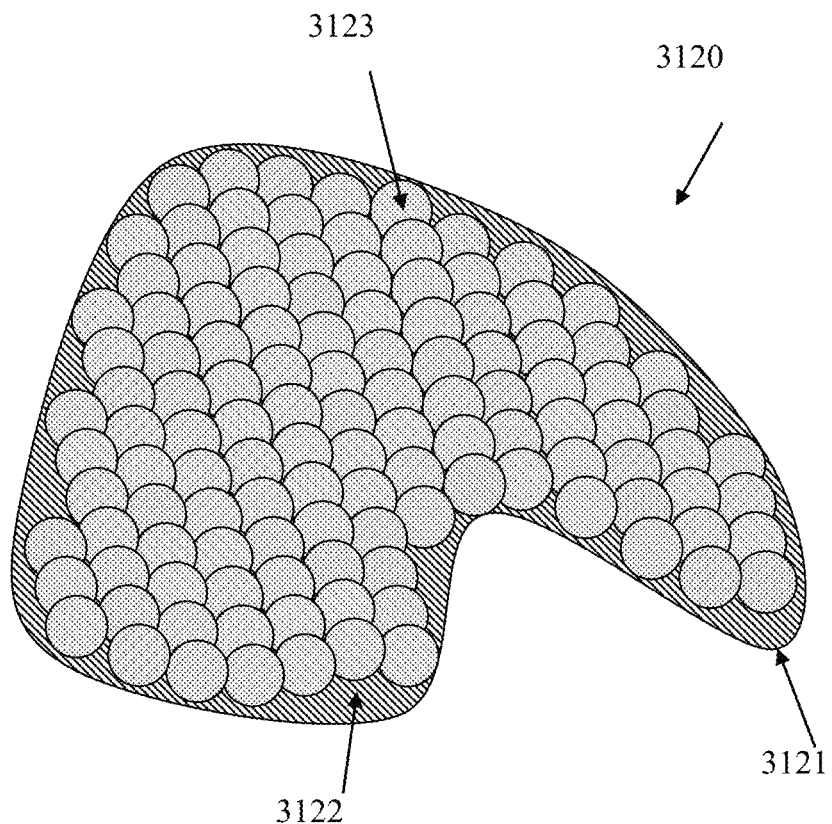
FIG. 31 shows a schematic top view of a layer of material.
Figure 33:
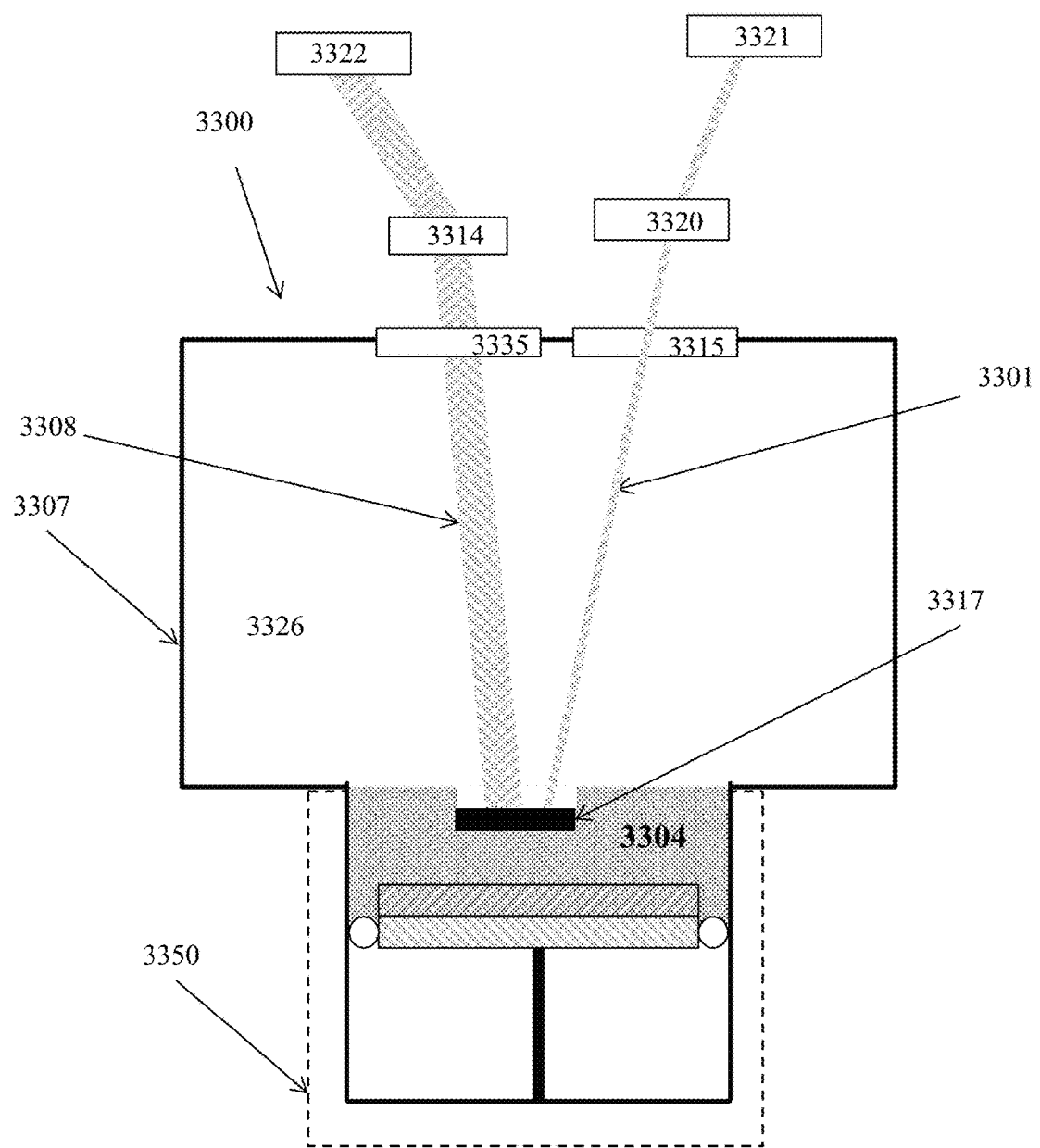
FIG. 33 shows a schematic side view of a 3D printing system and apparatuses.

In some embodiments, the layer of hardened material (as part of the 3D object) is formed with a scanning energy beam, tiling energy beam, or any combination thereof. The tiling energy beam can have a cross section that is larger than the scanning energy beam. Larger may be by at least about 1.5*, 2*, 5*, 10*, 25*, 50*, or 100*. The symbol "*" designates the mathematical operation "times." The scanning energy beam may have a power per unit area that is larger than the power per unit area of the tiling energy beam. The tiling energy beam may have a dwell time that is longer than the one of the scanning energy beam. The scanning energy beam may form feature that have a smaller FLS as compared to the features formed by the tiling energy beam. FIG. 31 shows an example of a layer 3120 that is at least a part of a 3D object. The layer is formed using a tiling energy beam that form tiles (e.g., 3123), and a scanning energy beam that form hatches (e.g., 3122) and a rim (e.g., 3121). FIG. 33 shows an example of a 3D printer comprising a build module 3350and a processing chamber comprising atmosphere 3326. The 3D printer 3300 comprises a scanning energy source 3321 generating a scanning energy beam 3301 that travels through a scanner 3320, through an optical window 3315 to transform a portion of a material bed 3304 to a transformed material 3317 (e.g., to form a 3D object).The 3D printer 3300 comprises a tiling energy source 3322 generating a tiling energy beam 3308 that travels through a scanner 3314, through an optical window 3335 to transform a portion of a material bed 3304 to a transformed material 3317 (e.g., to form a 3D object). The 3D printer may comprise one or more energy sources. The energy source may generate one or more energy beams. The energy beams may travel through the same or different optical window. The energy beams may be directed by the same or different scanners. Tiles may be formed by a (e.g., substantially) stationary tiling energy beam, which periodically moves along a path (e.g., path of tiles). The tiling energy beam may be of a lower power density than the scanning energy beam. Hatches may be formed by a continuously moving scanning energy beam. The dwell time of the tiling energy beam at a position of the target surface that forms the tile, may be longer than the dwell time of the scanning energy beam at a position of the target surface which forms the hatch. The cross section of the tiling energy beam may be larger than the cross section of the scanning energy beam.

At times, a single sensor and/or detector may be used to sense and/or detect (respectively) a plurality of physical attributes (e.g., parameters), for example, power density over time of an energy beam, temperature over time of an energy beam, and/or energy source power over time. At times, a single pixel sensor and/or detector may be used to sense and/or detect (respectively) a physical attribute (e.g., power density (e.g., over time) of an energy beam, temperature (e.g., over time) of an energy beam, and/or energy source power (e.g., over time). FIG. 28A shows an example of irradiating an energy beam at three positions $X_1$, $X_2$ and $X_3$. The irradiations at the positions may form three melt pools. The irradiations at the position may form three tiles. The irradiations at the portions may be by a non-oscillating energy beam (e.g., traveling along path 2825). The irradiation may be by an oscillating (e.g., retro scanning, dithering) energy using an energy beam that travels along an oscillating path, 2820. The energy beam can be the transforming energy beam. For example, the energy beam can be a tiling energy beam. A position of the energy beam (e.g., FIG. 28A, 2810) may be measured as a function of time (e.g., FIG. 28A, 2815), e.g., as the oscillating (e.g., retro scan) energy beam performs oscillations 2820, or as the non-oscillating energy beam travel along its path 2810. The oscillating energy beam can perform oscillations that comprise a back and forth movement along the path of the non-oscillating energy beam. The oscillations can have an amplitude that is equal to, or smaller than, a melt pool diameter. The oscillations can have an amplitude that is equal to, or smaller than, a melt pool diameter smaller than the diameter of the cross section of the energy beam. As compared to the non-oscillating energy beam (e.g., 2825), irradiating at position $X_1$ during the period $t_1$-$t_2$, the oscillating beam (e.g., 2820) travels back and forth between $X_{1-d}$ and $X_{1+d}$, as shown in the example of FIG. 28A. FIG. 28B illustrates an example that depicts temperature measurements 2830 as a function of time 2835, while forming tiles (e.g., having center positions FIG. 28A, $X_1$, $X_2$ and $X_3$). In the example shown in FIG. 28B, during the spatial oscillations of the energy beam (e.g., 2820), the temperature measured 2840 that is emitted from the target surface at the footprint of the energy beam, oscillates as well. As the footprint of the oscillating energy beam at the target surface physically oscillates between the center of the area that is heated by the energy beam (e.g., FIG. 28A, $X_1$, e.g., tile center) and the outskirts of that center (e.g., FIG. 28A, $X_{1-d}$, or $X_{1+d}$, e.g., tile outskirts), the measured temperature emitted from the target surface at the footprint fluctuate between a maximum temperature value (e.g., at the tile center) and a minimum temperature value (at the tile outskirts). FIG. 28B shows temperature measurement profile 2845 as a function of time, of a non-oscillatory energy beam that travels along path 2825 (in FIG. 28A), during $t_1$ to $t_2$. In the example shown in FIG. 28B, the power stays (e.g., substantially) constant during the period from $t_1$ to $t_2$. FIG. 28D illustrates an example that depicts temperature measurements 2880 as a function of time 2885, while forming a tile that is centered at $X_1$ (in FIG. 28A). In the example shown in FIG. 28D, during the spatial oscillations of the energy beam, the measured temperature from the target surface at the footprint of the energy beam oscillates as well 2850. As the oscillating energy beam footprint at the target surface physically oscillates between the center of the area heated by the energy beam (e.g., FIG. 28A, $X_1$, e.g., tile center) and the outskirts of that center (e.g., FIG. 28A, $X_{1-d}$, or $X_{1+d}$, e.g., tile outskirts), the measured temperature from the target surface at the energy beam footprint 2850 fluctuates between a local maximum temperature value (e.g., at the tile center) and a minimum temperature value (at the tile outskirts). FIG. 28B shows temperature measurement profile 2855 as a function of time, of a non-oscillatory energy beam that travels along path 2825 during $t_1$ to $t_2$. In the example shown in FIG. 28B, the power 2857 of the energy source that generates the energy beam is kept (e.g., substantially) constant during the period from $t_1$ to $t_{1+d}$, until the temperature approaches a (e.g., predetermined) value of $T_4$; and decreases in order to keep the temperature at a (e.g., substantially) constant value $T_4$ during the period from $t_{1+d}$ to $t_2$. One or more detectors may measure the temperature distribution along the path (e.g., of the scanning and/or non-scanning energy beam), by detecting the temperature. The speed (e.g., moving speed) and/or amplitude of the backwards and forwards movements of the oscillating beam can be (e.g., substantially) similar or different with respect to each other. The speed and/or amplitude of at least two of the forwards movements of the oscillating beam may be different along the path. The speed and/or amplitude of at least two of the backwards movements of the oscillating beam may be (e.g., substantially) similar along the path.

In some embodiments, the footprint of the oscillation energy beam on the target surface translates back and forth around a position of the target surface (e.g., center of the tile). The amplitude of the oscillation may be smaller than, or equal to the FLS (e.g., diameter) of a tile. In some embodiments, at least one characteristic of the energy beam is held at a (e.g., substantially) constant value using close loop control during the oscillation, using a measured value (e.g., of the same, or another characteristics). For example, the power of the energy source that generates the energy beam may be held at a constant value, use measurements of temperature at one or more locations at the target surface (e.g., at a location and/or as the energy beam travels along the path). For example, the temperature at the irradiation location (e.g., energy beam footprint) is held at a (e.g., substantially) constant maximum value (e.g., using a controller), and the power of the energy source generating the energy beam is measured and/or observed. The temperature may be held at a constant maximum value by altering the power of the energy source. The energy source power may be held at a constant value, resulting in an alteration of the temperature at the target surface location of the energy beam footprint. The areal extent of the heated area may be extrapolated from (e.g., fluctuations of) the power and/or temperature measurements. The heated area may comprise a melt pool (e.g., FIG. 26A, 2605) or its vicinity (e.g., 2610). In some embodiments, the oscillating energy beam that is held in closed loop control may facilitate controlling at least one characteristic of the melt pool (e.g., temperature and FLS). In some embodiments, the variation in power of the energy beam may be cycling and/or may drop during the irradiation of the energy beam (e.g., during the 3D printing) at the target surface. FIG. 28C illustrates an example method of measuring power (e.g., 2860) of the energy source as a function of time (e.g., 2865), e.g., using a single sensor/detector. In this example method, a threshold temperature (e.g., temperature to be maintained at the target surface) may be specified. The threshold temperature may be kept (e.g., substantially) constant. The sensor/detector may monitor the temperature at discrete time points. The control system may adjust at least one characteristic of the energy source generating the energy beam (e.g., its power) to maintain the threshold temperature by comparing a monitored temperature to the threshold temperature. The control system may adjust at least one characteristic of the energy beam to maintain the threshold temperature by comparing a monitored temperature to the threshold temperature. For example, the control system may adjust the power of the energy source and/or the power density of the energy beam to maintain the threshold temperature by comparing a monitored temperature to the threshold temperature. Thus, the power over time may vary to maintain a threshold temperature value. FIG. 28C illustrates an example of varying power over time, as the energy beam spatially oscillates (FIG. 28A, 2820) over time in the period from $t_1$ to $t_2$. The power over time may be cyclic and dropping over time (e.g., 2875 and 2870) to maintain a constant temperature value of an oscillating energy beam during the period from $t_1$ to $t_2$. FIG. 28D shows an example of both the power profile over time 2857 and its respective temperature provide over time 2855 of a non-oscillating energy beam, that aims to maintain the temperature value at $T_4$. At times, one or more physical properties (e.g., melt pool characteristics) of the target surface may be sensed and/or detected by a single sensor and/or detector respectively. For example, the control system may adjust the at least one characteristic of the energy beam and/or energy source by comparing (i) a monitored temperature to the threshold temperature, (ii) a monitored power density to a threshold power density, (iii) a monitored power to a threshold power, (iv) or any combination thereof. The power may be of the energy source that generates the energy beam. The power density may be of the energy beam. The temperature may be of a position at the target surface (e.g., at the footprint of the energy beam).

The reduction of debris may allow reducing use of (e.g., eliminate) at least one mechanism that maintains the 3D printer (or any of its components) at a reduced debris level (e.g., free of debris). For example, the reduction of debris may reduce (e.g., eliminate) the utilization of an optical window (e.g., FIG. 1, 115) cleaning mechanism.

The hardened material (e.g., 3D object) may have a porosity of at most about 0.05 percent (%), 0.1% 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The hardened material may have a porosity of at least about 0.05 percent (%), 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The hardened material may have a porosity between any of the afore-mentioned porosity percentages (e.g., from about 0.05% to about 0.2%, from about 0.05% to about 0.5%, from about 0.05% to about 20%, from about from about 0.05% to about 50%, or from about 30% to about 80%). In some instances, a pore may transverse the formed object. For example, the pore may start at a face of the planar object and end at the opposing face (e.g., bottom skin) of the hardened material. The pore may comprise a passageway extending from one face of the planar object and ending on the opposing face of that hardened material. In some instances, the pore may not transverse the formed object. The pore may form a cavity in the formed 3D object. The pore may form a cavity on a face of the formed 3D object (e.g., the face of the 3D object). For example, pore may start on a face of a 3D plane and not extend to the opposing face of that 3D plane. The first formed layer of hardened material in the 3D object may be referred to herein as the "bottom skin." The term "bottom skin" may also refer to the first form layer (e.g., bottom most layer) of a hanging structure or cavity ceiling.

In some embodiments, the control may be effectuated by at least one controller (e.g., as disclosed herein). The controller may control the energy beam, and/or sensor(s) (e.g., gas sensor). The controller may control the enclosure comprising its pressure, humidity, oxygen, or temperature. The controller may control safety related parameters, systems and/or apparatuses (e.g., interlocks, and/or load locks). The interlocks and/or load locks may separate the processing chamber (e.g., comprising atmosphere 2926) from the build module (e.g., FIG. 29, 2940). The controller may control the "health" (e.g., proper operation) of the system(s) and/or apparatus(es). The controller may control the designated (e.g., proper) operation of the system and/or apparatuses (e.g., their proper movement (e.g., jam, or flow), any gas leak, and/or power stability). The controller may control a connection to communication systems (e.g., internet). The controller may comprise two or more processors that are connected via the cloud (e.g., internet). The controller may alert of any errors in storing information, logging, imaging, process signals, or any combination thereof. The controller may comprise a user interface software. The software may be a non-transitory computer-readable medium (e.g., in which program instructions are stored). The controller may control the system and/or apparatuses (e.g., in real time). For example, the controller may control (e.g., operate, and/or regulate) the system and/or apparatuses in test and/or 3D print mode. The controller may control one or more 3D printing parameters. The controller may save and/or load files. The controller (e.g., software thereof) may identify portions of the desired object that are difficult to build (e.g., cannot be built). The controller may recommend a scheme to design around printing of difficult portions. The controller may recommend an alternate design scheme for the 3D printing. The controller (e.g., software) may perform a risk evaluation of 3D objects (or portions thereof). The controller (e.g., software) may comprise visualization of the slicing, and/or hatching scheme (e.g., in real time, before printing the 3D object, and/or after printing the 3D object). The systems and/or apparatuses may effectuate visualization of the printed 3D object (e.g., in real-time, before printing the 3D object, and/or after printing the 3D object). The visualization may comprise the manner in which the layers of hardened material are going to be formed from their respective (e.g., virtual) slices. The controller (e.g., software thereof) may evaluate (e.g., check for) any errors in the 3D printing process. The controller (e.g., software) may evaluate (e.g., check for) any deviations of the 3D object from the desired (e.g. requested) 3D object. The evaluation may be before, during, and/or after formation of the 3D object. The evaluation may be real-time evaluation during the 3D printing process. The controller may control the energy beam, temperature of at least one position of the exposed surface of the material bed, temperature of at least one position of the interior of the material bed (e.g., based on a predictive model), or any combination thereof (e.g., in real time during the 3D printing process).

In some embodiments, the controller comprises one or more components. The controller may comprise a processor. The controller may comprise a specialized hardware (e.g., electronic circuit). The controller may be a proportional-integral-derivative controller (PID controller). The control may comprise dynamic control (e.g., in real time during the 3D printing process). For example, the control of the (e.g., transforming) energy beam may be a dynamic control (e.g., during the 3D printing process). The PID controller may comprise a PID tuning software. The PID control may comprise constant and/or dynamic PID control parameters. The PID parameters may relate a variable to the required power needed to maintain and/or achieve a setpoint of the variable at any given time. The calculation may comprise calculating a process value. The process value may be the value of the variable to be controlled at a given moment in time. For example, the process controller may control a temperature by altering the power of the energy beam, wherein the temperature is the variable, and the power of the energy beam is the process value. For example, the process controller may control a height of at least one portion of the layer of hardened material that deviates from the average surface of the target surface (e.g., exposed surface of the material bed) by altering the power of the energy source and/or power density of the energy beam, wherein the height measurement is the variable, and the power of the energy source and/or power density of the energy beam are the process value(s). The variable may comprise a temperature or metrological value. The parameters may be obtained and/or calculated using a historical (e.g., past) 3D printing process. The parameters may be obtained in real time, during a 3D printing process. During a 3D printing process, may comprise during the formation of a 3D object, during the formation of a layer of hardened material, or during the formation of a portion of a layer of hardened material.

The output of the calculation may be the power of the energy source and/or power density of the energy beam. The calculation output may be a relative distance (e.g., height) of the material bed (e.g., from a cooling mechanism, bottom of the enclosure, optical window, energy source, or any combination thereof).

In some embodiments, the controller comprises a PID controller. The PID controller (e.g., control algorithm) may comprise a proportional-integral controller (i.e., PI controller), deadband, setpoint step alteration, feed forward control, bumpless operation, PID gain scheduling, fuzzy logic, or computational verb logic. The setpoint may be a target value (e.g., target temperature, target height of the exposed surface of the material bed, or target power of the energy source). In some embodiments, the controller may comprise a plurality of setpoints (e.g., that are of different types).

In some examples, the calculations may take into account historical data (e.g., of certain types of 3D object geometries), existing 3D structure (e.g., 3D object), future 3D portion of the desired 3D object to be printed, or any combination thereof. Future portion of the desired 3D object to be printed may comprise a portion of the 3D object that should be printed later in time (e.g., a layer to be printed in the future during the 3D printing process of the desired 3D object). The calculations may utilize chemical modeling (oxides, chemical interaction). The chemical modeling may be used to understand the effect of various reaction products (e.g., oxides) and chemical interactions on the 3D printing of a 3D object. For example, understanding a reduced wetting (e.g., lack thereof) due to oxidation of the layer. The 3D printing may utilize etching (e.g., plasma etching) to reduce the amount of oxides (e.g., oxide layer) on the forming 3D object. The etching may be performed during the 3D printing.

In some embodiments, the setpoint is altered (e.g., dynamically). Altering the setpoint may comprise setpoint ramping, setpoint weighting, or derivative of the process variable. The bumpless operation may comprise a "bumpless" initialization feature that recalculates the integral accumulator term to maintain a consistent process output through parameter changes. The control may comprise high sampling rate, measurement precision, or measurement accuracy that achieve(s) (individually or in combination) adequate control performance of the method, system, and/or apparatus of the 3D printing. The control (e.g., control algorithm) may comprise increasing a degree of freedom by using fractional order of the integrator and/or differentiator.

In some embodiments, the controller comprises a temperature controller (e.g., temperature PID controller), or a metrology controller (e.g., metrology PID controller). The controller may be a nested controller. Nested may be a first controller controlled within a second controller. For example, a temperature PID controller may comprise a metrology PID controller. For example, a metrology PID controller may comprise a temperature PID controller. For example, a first temperature PID controller may comprise a second temperature PID controller. For example, a first metrology PID controller may comprise a second metrology PID controller. The metrology controller may use input from the temperature controller and/or vice versa. The temperature controller may receive input from the metrology detector (e.g., in case it comprises a nested metrology controller) and/or from the temperature detector. The metrology detector may be also referred herein as a "metrological detector." The temperature controller may consider any corrective deformation. The temperature controller may consider object pre-correction (OPC; e.g., FIG. 6). The nested controller may incorporate data of corrective deformation (e.g., OPC), from the metrology detector, and/or from the temperature detector. The nested controller may control the degree of deformation of the forming 3D object. The metrological detector and/or temperature detector (e.g., and controller) may resolve irregularities (e.g. of height less than about 1 μm, 5 μm, 8 μm, 10 μm, 15 μm, 20 μm, 30 μm, or 40 μm) of a forming 3D object. The irregularities may comprise material bed irregularities, and/or height irregularities.

Figure 20:
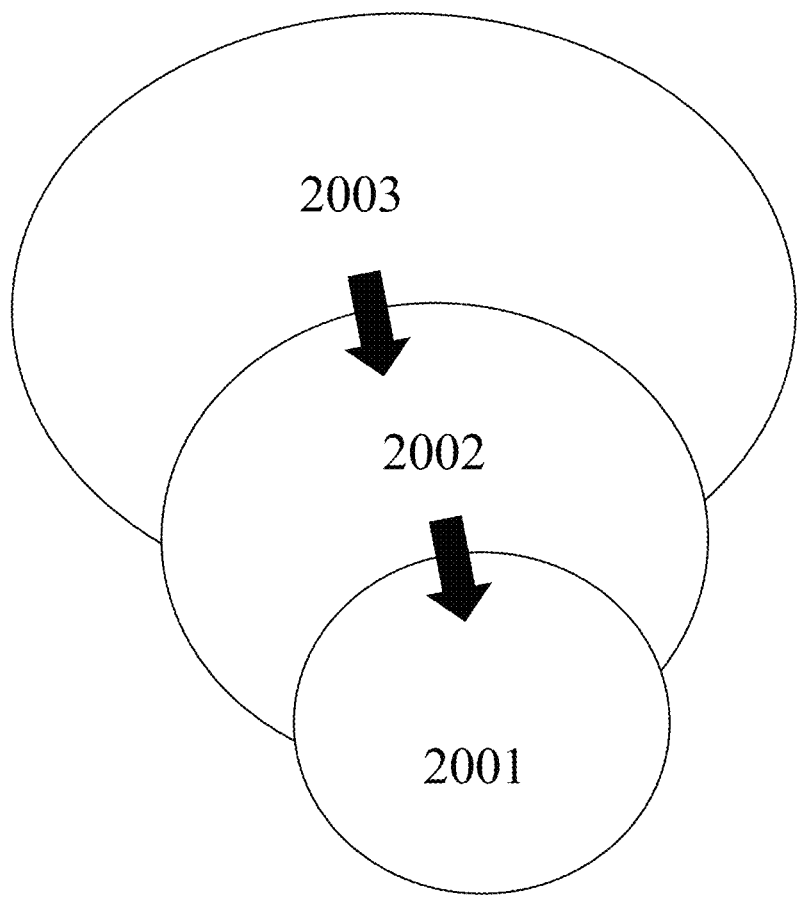
FIG. 20 shows a representation of a control scheme.

In some embodiments, a metrological detector is used in the control of the 3D printing. The metrological detector may include an imaging detector (e.g., CCD, camera) to monitor irregularities. The imaging device (e.g., as disclosed herein) may comprise an imaging detector. The imaging detector is also referred to herein as "image detector." The image detector may comprise detecting an area of the forming 3D object and convert it to a pixel in the X-Y (e.g., horizontal) plane. The height (Z-plane) of the area may be measured using one or more computer algorithms (e.g. a phase shift algorithm). The algorithm may comprise a (e.g., digital) modulation scheme that conveys data by changing (e.g., modulating) the phase of a reference signal (e.g., carrier wave). The imaging detector may capture an area of a FLS of at least about 40 μm, 50 μm, 60 μm, 70 μm, 80 μm, 90 μm, 100 μm, 200 μm, 500 μm, 1 millimeter or 2 millimeter. The FLS of the captured area by an imaging detector, may be between any of the afore-mentioned sizes (e.g., from about 40 μm to about 2 millimeter, from about 100 µm, to about 1 millimeter, from about 40 µm to about 70 µm, or from about 70 µm to about 80 µm). A pixel (X,Y) of the imaging detector may detect at least one FLS (e.g., a length or width) of at least about 40 µm, 50 µm, 60 µm, 70 µm, 80 µm, 90 µm, 100 µm, 200 µm, 500 µm, 1 millimeter, 2 millimeter, 10 millimeter, 20 millimeter, 50 millimeter, 100 millimeter, 200 millimeter, 250 millimeter, 300 millimeter or 500 millimeter. At least one FLS (e.g., length or width) of the captured area within a pixel of an imaging detector, may be between any of the aforementioned FLS values (e.g., from about 40 µm to about 200 millimeter, from about 100 µm, to about 300 millimeter, from about 40 µm to about 500 millimeter, or from about 100 to about 300 millimeter, from about 150 millimeter to about 170 millimeter). The imaging detector may operate at a frequency of at least about 0.1 Hertz (Hz), 0.2 Hz, 0.5 Hz, 0.7 Hz, 1 Hz, 1.5 Hz, 2 Hz, 3 Hz, 4 Hz, 5 Hz, 6 Hz, 7 Hz, 8 Hz, 10 Hz, 20 Hz, 50 Hz, 100 Hz, 200 Hz, 300 Hz, 400 Hz, or 500 Hz. The frequency of the imaging detector, may be between any of the afore-mentioned frequencies (e.g., from about 0.1 Hz to about 500 Hz, from about 1 Hz to about 500 Hz, from about 1 Hz to about 100 Hz, from about 0.1 Hz to about 100 Hz, from about 0.1 Hz, to about 1 Hz, from about 0.5 Hz to about 8 Hz, or from about 1 Hz to about 8 Hz). The metrological detector may perform positional detection. To perform positional detection, the metrological detector may be mounted on a stage (e.g. elevator or calibration plates). The stage may be movable, and/or controlled (e.g., manually and/or automatically; before, after, and/or during the 3D printing). Alternatively, or additionally, the metrological detector may receive metrology and/or calibration information from one or more apparatuses of the 3D printer. The one or more apparatuses may comprise the stage. natively or additionally, the metrological detector may use absolute calibration information. FIG. 20 shows an example of a logical sequence used by the nested controller in which data from the object pre-print correction (OPC) procedure 2003 is taken into account by the metrology detector 2002, which in turn feeds its output to a temperature controller 2001 that operates in a closed loop control, and takes into account measurements of the temperature controller. The OPC data may be (e.g., directly) taken into account by the temperature controller and/or metrology controller. The nested controller may incorporate a metrology controller and/or temperature controller. The (e.g., nested) controller may consider OPC data.

In some embodiments, the control system uses data from the metrological detector. The control system may use the data to control one or more parameters of the 3D printing. For example, the control system may use the metrology data to control one or more parameters of the layer dispensing mechanism (e.g., the material dispenser, the leveling mechanism, and/or the material removal mechanism). For example, the metrological measurement(s) may facilitate determination and/or subsequent compensation for a roughness and/or inclination of the exposed surface of the material bed with respect to the platform and/or horizon. The inclination may comprise leaning, slanting, or skewing. The inclination may comprise deviating from a planar surface that is parallel to the platform and/or horizon. The roughness may comprise random, or systematic deviation. The systematic deviation may comprise waviness. The systematic deviation may be along the path of the material dispensing mechanism (e.g., along the platform and/or the exposed surface of the material bed), and/or perpendicular to that path. For example, the controller may direct the material dispenser to alter the amount and/or rate of pre-transformed material that is dispensed. For example, the controller may direct alteration of a target height according to which the leveling mechanism planarizes the exposed surface of the material bed. For example, the controller may direct the material removal member to alter the amount and/or rate of pre-transformed material that is removed from the material bed (e.g., during its planarization). The control system may use the metrology data to control one or more parameters of the energy source and/or energy beam. The one or more measurements from the metrological detector may be used to alter (e.g., in real time, and/or off line) the computer model. For example, the metrological detector measurement(s) may be used to alter the OPC data. For example, the metrological detector measurement(s) may be used to alter the printing instruction of one or more successive layers (e.g., during the printing of the 3D object).

In some embodiments, the detector and/or controller averages at least a portion of the detected signal over time (e.g., period). In some embodiments, the detector and/or controller reduces (at least in part) noise from the detected signal (e.g., over time). The noise may comprise detector noise, sensor noise, noise from the target surface, or any combination thereof. The noise from the target surface may arise from a deviation from planarity of the target surface (e.g., when a target surface comprises particulate material (e.g., powder)). The reduction of the noise may comprise using a filter, noise reduction algorithm, averaging of the signal over time, or any combination thereof.

In some embodiments, the metrological detector is calibrated. For example, the metrological detector may be detected and/or calibrated in situ in the enclosure (e.g., in the processing chamber, e.g., comprising atmosphere FIG. 29, 2926). The metrological detector may use a stationary structure to calibrate at least one height position. For example, the metrological detector may use the floor of the processing chamber (e.g., FIG. 29, 2950) as a metrological (e.g., height) reference point. The metrological detector may use one or more positions at the side wall of the processing chamber as metrological reference point. The processing chamber may comprise one or more reference stationary points that are not disposed on the wall and/or floor of the processing chamber. For example, the processing chamber may comprise a stationary ruler comprising slits and/or steps at designated locations to be used as reference point for metrological calibration.

Figure 19:
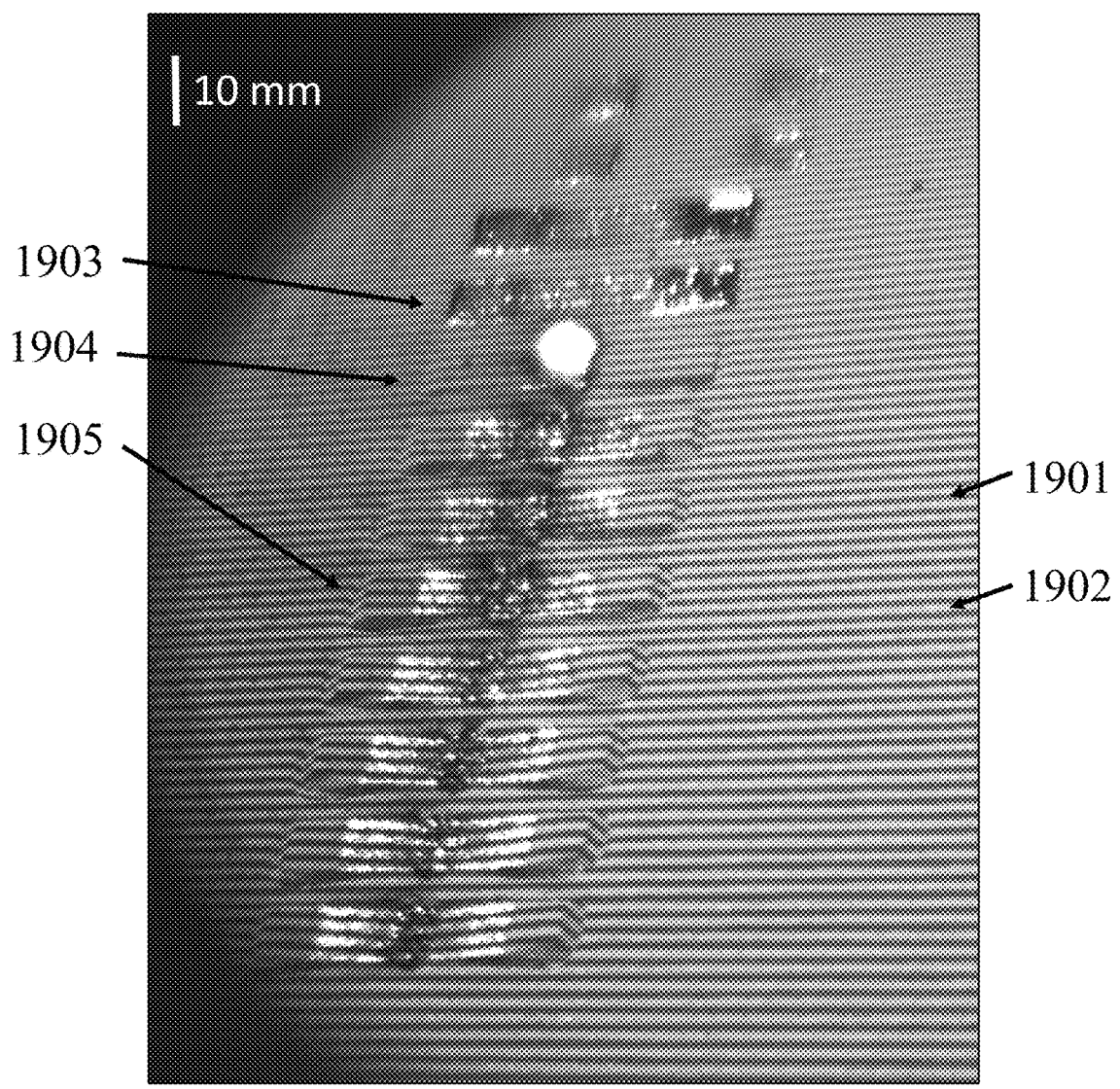
FIG. 19 shows an exposed surface of a material bed.

FIG. 19 shows an example of a metrological detector (e.g., height mapper) which projects a striped image on the exposed surface of a material bed (e.g., powder bed), which image comprises darker stripes 1901 and lighter stripes 1902. The metrological detector may operate during at least a portion of the 3D printing. For example, the metrological detector can project its image before, after, and/or during the operation of the transforming energy beam. The projected image may comprise a shape. The shape may be a geometrical shape. The shape may be a rectangular shape. The shape may comprise a line. The shape may scan the target surface (e.g., exposed surface of the material bed) laterally, for example, from one side of the target surface to its opposing side. The shape may scan at least a portion of the target surface (e.g., in a lateral scan). The scan may be along the length of the exposed surface. The projected shape may span (e.g., occupy) at least a portion of the width of the target surface. For example, the shape may span a portion of the width of the target surface, the width of the target surface, or exceed the width of the target surface. The shape may scan the at least a portion of the target surface before, after and/or during the 3D printing. The scan may be controlled manually and/or automatically (e.g., by a controller). The control may be before, after and/or during the 3D printing. For example, the shape may scan the exposed surface before, after and/or during the operation of the transforming energy beam. The shape may be detectable (e.g., using an optical and/or spectroscopic sensor). The scanning energy beam may comprise the shape. The projected shape may be of an electromagnetic radiation (e.g., visible light). The projected shape may be detectable. The projected shape may scan the target surface at a frequency of at least about 0.1 Hertz (Hz), 0.2 Hz, 0.5 Hz, 0.7 Hz, 1 Hz, 1.5 Hz, 2 Hz, 3 Hz, 4 Hz, 5 Hz, 6 Hz, 7 Hz, 8 Hz, 10 Hz, 20 Hz, 50 Hz, 100 Hz, 200 Hz, 300 Hz, 400 Hz, or 500 Hz. The projected shape may scan the target surface at a frequency between any of the aforementioned frequencies (e.g., from about 0.1 Hz to about 500 Hz, from about 1 Hz to about 500 Hz, from about 1 Hz to about 100 Hz, from about 0.1 Hz to about 100 Hz, from about 0.1 Hz, to about 1 Hz, from about 0.5 Hz to about 8 Hz, or from about 1 Hz to about 8 Hz). The image may comprise (e.g., alternating) stripes. The distance between the stripes may be constant. The distance between the stripes may be variable. The distance between the stripes may be varied (e.g., manually or by a controller) in real time. Real time may be when performing metrological detection. Real time may be when building (e.g., printing) the 3D object. The deviation from the regularity (e.g., linearity) of the stripes may reveal a height deviation from the average (or mean) exposed surface (e.g., of the material bed) height. The material bed in the example of FIG. 19 is an Inconel 718 powder bed. In the example shown in FIG. 19, a 3D object 1905 is partially buried in the material bed, and lifts a portion of the pre-transformed material (e.g., powder) of the material bed such that a deviation from the linearity of the stripes is visible. The shape of the deviation from regularity (e.g., linearity) may reveal a shape characteristics of the buried 3D object portion (that is buried in the material bed). For example, the lines above the 3D object 1904 are (e.g., substantially) linear, whereas the lines above the 3D object 1905 curve. The deviated (e.g., curved) lines above a 3D object may relate to a warping of the 3D object (e.g., 1905) that is (immediately) underneath. The regularity (e.g., linearity) of the lines detected above the 3D object may relate to the planarity of the top surface of the 3D object (e.g., 1904) that is (immediately) underneath. For example, lines above the 3D object (whether buried in the material bed, or exposed) that match the regularity of the projected image, may reveal a planar top surface of a 3D object. For example, a deviation from the regularity of the projected image above the 3D object (whether buried in the material bed, or exposed), may reveal a deformation in the top surface of a 3D object. For example, linear lines above the 3D object may reveal a planar top surface of a 3D object, when the metrology projector projects stripes. For example, non-linear (e.g., curved) lines above the 3D object may reveal a non-planar (e.g., curved) top surface of a 3D object, when the metrology projector projects stripes. The reflectivity of the target surface may indicate the planar uniformity of the exposed surface. FIG. 19, 1903 shows a 3D object in a material bed, which 3D object is reflective, whereas the material bed is substantially less reflective.

At times, formation of the 3D object by the 3D printing methodology causes one or more portions of the 3D object to deform. The deformation may comprise bending, warping, arching, curving, twisting, balling, cracking, dislocating, or any combination thereof. The deformation may occur in the layer that is currently being generated. The deformation may occur in at least a portion of the 3D object that was previously build (e.g., as it hardens). The deformation may occur during the 3D printing. The previously build portion may be disposed within the material bed. For example, the portion may be buried in the material bed. The portion may not be visible (e.g., optically) from the exposed surface of the material bed. A displacement of the layer being built may be visible (e.g., optically). The visibility may be direct using an optical sensor (e.g., a camera). The camera may be a high-resolution camera. The visibility may be indirect (e.g., using a metrological detector such as a height mapper (e.g., FIG. 19).

In some examples, temporary fixtures (termed herein as "flags") assist in controlling (e.g., monitoring) a deformation that manifests itself within the material bed, and is not visible by external means (e.g., metrology and/or optical sensors). One or more fixtures may be attached to one or portions of the 3D object that are susceptible to deformation while being disposed within the material bed. The one or more fixtures may be temporary fixtures that may be removed after the 3D printing is complete. The fixtures may not be part of the requested 3D object. The fixtures may be of the same material that the 3D object is formed from. FIG. 23A shows an example of a requested 3D object 2312 that is being formed in a material bed 2314, which 3D object is disposed on a platform 2310 and has a portion that is susceptible to deformation to which a flag 2313 is attached at position 2315. The flags may be formed during the 3D printing process. The flags may be formed as part of the 3D printing process of the 3D object. The flags may be printed simultaneously with the printing of the 3D object. The flags may be detachable. The flags may be a wire. The flag may have a FLS that is substantially similar or smaller than the FLS of the portion of the 3D object to which it is attached. The top portion of the flag (e.g., tip of the flag, top most portion of the flag) may be visible by the optical and/or metrological sensor. A displacement (e.g., movement) of the flag may be caused by a displacement of the 3D portion to which it is attached. The displacement may be relative to an expected position of the flag (e.g., that is attached to a non-deformed 3D object portion). A displacement of the flag may be indicative of at least a movement of the portion of the 3D object to which it is attached. The movement (e.g., from a position of its formation) may be due to a deformation (e.g., during its hardening and/or softening). FIG. 23B shows an example of the 3D object 2312 of FIG. 23A that is build up into the 3D object 2322, which is formed in a material bed 2324, which 3D object is disposed on a platform 2320 and has a portion that is susceptible to deformation to which a flag 2323 is attached at position 2325. As the 3D object 2312 is build up into 3D object 2322, the portion that is attached to the flag deforms and moves both horizontally and vertically from position 2325 to position 2326, resulting in a displacement of the flag from position 2323 to position 2328. In the example shown in FIG. 23B, the tip of the flag 2328 protrudes from the exposed surface of the material bed and can be detected optically.

The 3D object may be attached to the platform. FIG. 23A shows a 3D object that is attached to the platform 2310 at position 2311. The 3D object may not contact the platform. The 3D object may not be anchored to the platform. The 3D object may float (e.g., anchorlessly) in the material bed. The 3D object may be suspended (e.g., anchorlessly) in the material bed. The 3D object may comprise auxiliary support(s) or may be devoid of auxiliary support. The auxiliary support(s) may comprise the platform and/or anchor(s) to the platform. The auxiliary support may contact or not contact the platform. The auxiliary support may connect or not connect to the platform. The object with the auxiliary support may float anchorlessly in the material bed. The material bed may comprise flowable material during the 3D printing. The material bed may be devoid of a pressure gradient during the 3D printing. The material bed may be at ambient temperature and/or pressure during the 3D printing. Ambient temperature and/or pressure may comprise room temperature and/or pressure respectively.

In some embodiments, a method, system, apparatus, and/or software may comprise an algorithm that predicts and/or identifies one or more points on a surface of the desired 3D object surface that are susceptible (e.g., prone to) deformation (e.g., warp). The method, system, apparatus, and/or software may comprise generation direction (e.g., printing instruction) and/or direct the formation (e.g., printing) of the flag structure connected to the portion of the 3D object that is susceptible to deformation. The portion may be a portion that is disposed in the material bed. The portion may be a portion that is not detectable by the sensor (e.g., optical, and/or metrological). The method, system, apparatus, and/or software may comprise calculating (e.g., computing) a "flag amplification ratio." The flag amplification ratio may comprise a relation between the displacement of the flag and the deformation of the (buried, covered, and/or hidden) 3D object portion. The displacement may be horizontally and/or vertically (e.g., in X, Y, and/or Z direction). The flag amplification ratio may indicate a relationship between the displacement of a detectable portion of the flag (e.g., tip of the flag) and the deformation of the (hidden) object portion.

In some embodiments, the controller comprises a PID controller. The controller may comprise a cascade control (e.g., usage of a multiplicity of PID controllers). The control may comprise using a multiplicity (e.g., two) PID controllers. The usage of the multiplicity of PID controllers may yield better dynamic performance as compared to the usage of a single PID controller. The cascade control may comprise a first PID controller that controls the setpoint of a second PID controller. The first PID controller may be an outer loop controller. The second PID controller may be an inner loop controller.

At times, the controller samples the measured process variable. The controller may perform computations (e.g., calculations) utilizing the measured process variable. The controller may transmit a controller output signal (e.g., resulting from the computation). The controller may have a loop sample time. The loop sample time may (i) comprise the time at which the controller samples the measured process variable, (ii) perform the computation using the measured process variable, (iii) transmit a new controller output signal, or (iv) any combination or permutation thereof. The loop sample time may be at most about 1 microsecond (μsec), 2 μsec, 3 μsec, 4 μsec, 5 μsec, 6 μsec, 7 μsec, 8 μsec, 9 μsec, 10 μsec, 11 μsec, 12 μsec, 13 μsec, 14 μsec, 15 μsec, 20 μsec, 25 μsec, 30 μsec, 40 μsec, 50 μsec, 60 μsec, 70 μsec, 80 μsec, 90 μsec, 1 millisecond (msec), 5 msec, or 10 msec. The loop sample time may be between any of the afore-mentioned sample times (e.g., from about 1 μsec to about 90 μsec, from about 1 μsec to about 5 μsec, from about 5 μsec to about 15 μsec, from about 15 μsec to about 30 μsec, from about 30 μsec to about 90 μsec, from about 1 μsec to about 10 msec, or from 50 μsec to 10 msec). The calculations may be performed at a time that is (e.g., substantially) equal to any of the afore-mentioned loop sample times. The calculations may be performed during the dwell time of the (e.g., transforming) energy beam, the intermission time of the (e.g., transforming) energy beam, or any combination thereof. The calculation may be performed during the formation of one or more (e.g., successive) melt pools, between the formation of two (e.g., successive) melt pools (e.g., "between" may be inclusive or exclusive), or any combination thereof. For example, the calculation may be performed during the formation of a single melt pool. The calculation may be performed during a transformation of at least a portion of the material bed. The calculation may be performed between formation of two layers of hardened material, during formation of a layer of hardened material, during formation of the 3D object, during the 3D printing process, or any combination thereof. The dwell time, intermission time, and/or transforming energy beam (e.g., scanning energy beam and/or tiling energy beam) may be any of the ones described in Patent Application serial number PCT/US16/66000, and in Provisional Patent Application Ser. No. 62/317,070, both of which are incorporated herein by reference in their entirety. During the intermission time, the energy beam may have a reduced power density that does not elevate the pre-transformed material and/or target surface to at least a transformation temperature or higher. For example, during the intermission, the energy beam may have a power density that allows the irradiated position at the target surface to heat up, but not transform. For example, during the intermission, the energy beam may have a power density that negligibly heats up the irradiated position at the target surface. Negligibly is relative to the 3D printing process. For example, during the intermission, the energy beam may be turned off.

In some instances, the controller comprises a control loop bandwidth. The control loop bandwidth may be the frequency at which the closed loop response of the controlled variable is attenuated by about 3 dB from the setpoint (e.g., the closed-loop magnitude response). The control loop bandwidth may be approximated as the point at which the open loop gain of the system is unity (also referred herein as the "crossover" frequency). The bandwidth of the closed-loop control system may be the frequency range where the magnitude of the closed loop gain does not drop below about −3 decibel (dB). The bandwidth of the control system, $\omega_B$, may be the frequency range in which the magnitude of the closed-loop frequency response is greater than about −3 dB. The frequency $\omega_B$ may be the cutoff frequency. At frequencies greater than $\omega_B$, the closed-loop frequency response may be attenuated by more than about −3 dB. The frequency of the control loop bandwidth, $\omega_B$, may be at least about 0.1 Hertz (Hz), 0.2 Hz, 0.5 Hz, 0.7 Hz, 1 Hz, 1.5 Hz, 2 Hz, 3 Hz, or 5 Hz. The frequency of the control loop bandwidth, $\omega_B$, may be between any of the afore-mentioned frequencies (e.g., from about 0.1 Hz to about 5 Hz, from about 0.1 Hz, to about 1 Hz, from about 0.5 Hz to about 1.5 Hz, or from about 1 Hz to about 5 Hz).

In some examples, the second PID controller reads an output of the first (e.g., outer loop) controller as a setpoint. The first PID controller may control a more rapidly changing, or a less rapidly changing parameter (e.g., parameter characteristics) as compared to the parameter controlled by the second PID controller. In some examples, the second and the first PID controllers may control a parameter that changes in substantially identical speed. In some embodiments, the working frequency of the cascade controller is increased as compared to using a single PID controller. At times, the time constant may be reduced by using cascaded PID controllers, as compared to using a single PID controller. Instead of controlling the parameter (e.g., temperature parameter, power parameter, and/or power density parameter) directly, the outer PID controller may set a parameter setpoint for the inner PID controller. The inner PID controller may control the parameter directly. An error term of the inner controller may comprise a difference between the parameter setpoint and the directly measured parameter characteristics (e.g., temperature). The outer PID controller may comprise a long time constant (e.g., may have a lengthy response time). The inner loop may respond at a shorter time-scale. The parameter characteristics may comprise position, height, power, power density, or temperature. The parameter characteristics may comprise a dwell time, pulse pattern, pulse frequency, footprint, acceleration, cross section, fluence, and/or velocity of the energy beam. The footprint may be a footprint of the energy beam on the target surface (e.g., exposed layer of the material bed).

In some embodiments, the controller continuously calculates an error value during the control time. The error value may be the difference between a desired setpoint and a measured process variable. The control may be continuous control (e.g., during the 3D printing process, during formation of the 3D object, and/or during formation of a layer of hardened material). The control may be discontinuous. For example, the control may cause the occurrence of a sequence of discrete events. The control may comprise a continuous, discrete, or batch control. The desired setpoint may comprise a temperature, power, power density, or a metrological (e.g., height) setpoint. The metrological setpoint may relate to the target surface (e.g., the exposed surface of the material bed). The metrological setpoints may relate to one or more height setpoints of the target surface (e.g., the exposed (e.g., top) surface of the material bed). The temperature setpoint may relate to (e.g., may be) the temperature of the material bed (e.g., at or adjacent to the exposed surface of the material bed). The temperature setpoint may relate to (e.g., may be) the temperature of or adjacent to a transformed material (e.g., melt pool). The controller may attempt to minimize an error (e.g., temperature and/or metrological error) over time by adjustment of a control variable. The control variable may comprise a direction and/or (electrical) power supplied to any component of the 3D printing apparatus and/or system. For example, direction and/or power supplied to the: energy beam, scanner, motor translating the platform, optical system component, optical diffuser, or any combination thereof.

In some embodiments, the setpoint (also herein "set point," or "set-point") is a desired or target value for an essential variable of the 3D printing system, method, algorithm, software and/or apparatus. The setpoint may be used to describe a standard configuration or norm for the system, method, algorithm, software, and/or apparatus. Departure of the variable from its setpoint may be a basis for an error-controlled regulation. The error controlled regulation may comprise a feed back and/or feed forward loop to alter (e.g., return) the system, method, algorithm, software and/or apparatus to its desired (e.g., normal) status (e.g., condition).

In some embodiments, the transforming energy beam irradiates at a first power $P_1$ (e.g., at its maximum power) on a position of the target surface (e.g., exposed surface of the material bed). A temperature of that (first) position can be sensed by a temperature sensor. A temperature of that (first) position can be controlled by the controller. A temperature of a subsequently irradiated (second) position can be controlled by the controller (e.g., and influence the temperature in the first position). When a target temperature of the position is reached (e.g., as measured by the temperature sensor), the controller may be used to hold that target temperature at a (e.g., substantially) constant value, for example, by reducing the power of the transforming energy beam (e.g., to value $P_2$, which is less than $P_1$). The power of the energy beam may be measured as the power density of the energy beam. In some embodiments, as a result of the temperature control by the controller, the power of the energy beam reaches a minimum power $P_{min}$ (e.g., predetermined minimum power). At times, the power of the transforming energy beam may reach a minimum power; at about that time: the power of the transforming energy beam may be (e.g., substantially) turned off, the power of the transforming energy beam may be (e.g., substantially) reduced to a non-transforming power, the transforming energy beam may relocate to another (e.g., distant) position, or any combination thereof.

In some examples, the control is an active control. The control may comprise controlling the FLS of the energy beam (e.g., footprint, or spot size). The control may comprise controlling the beam (e.g., energy) profile. The beam profile control may comprise using diffusive, microlens, refractive, or diffractive elements (e.g., optical elements). The beam profile control may comprise controlling the energy profile of the energy beam (e.g., flat top, Gaussian, or any combination thereof). The beam profile (e.g., FLS of the cross section and/or energy profile) may be altered during the 3D printing (e.g., during the formation of the 3D object). During the formation of the 3D object may comprise during formation of the layer of hardened material or a portion thereof.

In some examples, the transforming energy beam travels along the target surface in a trajectory (e.g., path). The transforming energy beam may irradiate the target surface with a varied and/or constant power density. The transforming energy beam may be generated by a power source having a varied and/or constant power. FIG. 32A shows an example of energy source power or a power density of the energy beam (collectively designated as 3210), as a function of time; wherein the physical-attribute profile pertains to the power of the energy source or the power density of the energy beam respectively. For example, FIG. 32A shows an example of an initial increase in power density (e.g., on turning the energy beam) at $t_1$, followed by a plateau during a period from $t_1$ to $t_2$ (e.g., when irradiating at a constant power density), followed by a decrease during a period from $t_2$ to $t_3$ (e.g., while decreasing the power density as the transformed/transforming material heats beyond a threshold temperature), followed by a second plateau during a period from $t_3$ to $t_4$ (e.g., during an intermission when the energy beam is turned off). For example, FIG. 32A shows an example of an initial increase in the power of the energy source (e.g., on turning the energy source to generate the energy beam) at $t_1$, followed by a plateau during a period from $t_1$ to $t_2$ (e.g., when generating the energy beam at a constant power), followed by a decrease during a period from $t_2$ to $t_3$ (e.g., while decreasing the power as the transformed/transforming material heats beyond a threshold temperature), followed by a second plateau during a period from $t_3$ to $t_4$ (e.g., during an intermission when the energy source is turned off). The transforming energy beam may travel along the target (e.g., exposed) surface while having a (e.g., substantially) constant or variable power density (i.e., power per unit area). The variation may comprise initial increase in power density, followed by a decrease in the power density, or any combination thereof. The variation may comprise initial increase in power density, followed by a plateau, followed by a subsequent decrease in the power density, or any combination thereof. The increase may be linear, logarithmic, exponential, polynomial, or any combination or permutation thereof. The decrease and/or increase may be linear, logarithmic, exponential, polynomial, or any combination or permutation thereof. The plateau may comprise of a (e.g., substantially) constant energy density. FIG. 32B shows an example of energy source power, or a power density of the energy beam (collectively designated as 3220) as a function of time; wherein the physical-attribute profile pertains to the power of the energy source, or the power density of the energy beam respectively. For example, FIG. 32B shows a variation (e.g., oscillation) in the power density of the energy beam, with three peak plateau power densities 3221, 3222, and 3223, wherein each peak (plateau) is followed by a decrease (e.g., following the example in FIG. 32A) with three valleys (valley plateaus). For example, FIG. 32B shows a variation in the power of the energy source, with three peak (plateau) power values 3221, 3222, and 3223, wherein each peak is followed by a decrease (e.g., following the example in FIG. 32A) with three valleys (valley plateaus). In the example shown in FIG. 32B, all peak values correspond to the same maximum physical-attribute (e.g., power) value, and all valley plateaus correspond to the same minimum physical-attribute value, and the manner of variation in the physical-attribute profile over time is the same (e.g., the manner and time of onset, peak plateau period, manner of decline, and valley plateau period, are the same). The manner of (e.g., function used in) the variation in power density of the transforming energy beam may be influenced by (i) a measurement (e.g., a signal of the one or more sensors), (ii) theoretically (e.g., by simulations), (iii) or any combination thereof. The duration and peak of the power density plateau of the transforming energy beam may be influenced by (i) a measurement (e.g., a signal of the one or more sensors), (ii) theoretically (e.g., by simulations), (iii) or any combination thereof. The power density of the energy beam may fluctuate as a function of a sensor measurement (e.g., of a temperature at the irradiated position or close thereto) forming a sequence (e.g., of intermission times and dwell times). The fluctuated power density may comprise dwell times and intermission times. At least two of the intermission times in the sequence may be (e.g., substantially) of the same duration or of different duration. At least two of the intermission times in the sequence may be (e.g., substantially) of the same or different minimal power density value. At least two of the dwell times in the sequence may be (e.g., substantially) of the same duration or of different duration. At least two of the intermission times in the sequence may be (e.g., substantially) of the same or different maximal power density value. The power of the energy source may fluctuate as a function of a sensor measurement (e.g., of a temperature at the irradiated position or close thereto) forming a power sequence (e.g., of minimal power (e.g., off) times and maximal power times). At least two of the minimal power times in the sequence may be (e.g., substantially) of the same duration or of different duration. At least two of the minimal power times in the sequence may be (e.g., substantially) of the same or different minimal power density value. At least two of the maximal power times in the sequence may be (e.g., substantially) of the same duration or of different duration. At least two of the maximal power times in the sequence may be (e.g., substantially) of the same or different maximal power density value. FIG. 32C shows an example of energy source power, or a power density of the energy beam (collectively designated as 3230) as a function of time; wherein the physical-attribute profile pertains to the power of the energy source or the power density of the energy beam respectively. For example, FIG. 32C shows a variation (e.g., fluctuation, oscillation, or pulse) in the power density of the energy beam, with three peaks (peak plateaus) 3231, 3232, and 3233, wherein each peak is followed by a decrease (e.g., following the example in FIG. 32A) with three valleys (valley plateaus). For example, FIG. 32C shows a variation in the power of the energy source generating the energy beam, with three peak (plateau) power values 3231, 3232, and 3233, wherein each peak is followed by a decrease (e.g., following the example in FIG. 32A) with three valleys (valley plateaus). In the example shown in FIG. 33C, the peak values correspond to different maximum physical-attribute values, the valley values correspond to different minimum physical-attribute values, and the time-period of each physical-attribute pulse is the same (e.g., the time-period during peak plateau, valley plateau, and transition between them is respectively the same among all the physical-attribute pulses). FIG. 32D shows an example of energy source power, or a power density of the energy beam (collectively designated as 3240) as a function of time; wherein the physical-attribute profile pertains to the power of the energy source or the power density of the energy beam respectively. For example, FIG. 32D shows a variation (e.g., oscillation) in the power density of the energy beam, with three peak (plateau) power densities 3241, 3242, and 3243, wherein each peak is followed by a decrease (e.g., following the example in FIG. 32A) with three valleys (valley plateaus). For example, FIG. 32D shows a variation in the power of the energy source generating the energy beam, with three peak (plateau) power values 3241, 3242, and 3243, wherein each peak is followed by a decrease (e.g., following the example in FIG. 32A) with three valleys (valley plateaus). In the example shown in FIG. 33D, the peak values correspond to the same maximum physical-attribute value (e.g., power density of the energy beam, or power of the energy source respectively), the valley values correspond to the same minimum physical-attribute value, and the time periods of the physical-attribute pulses varies (e.g., the time-period during peak plateau, valley plateau, and transition between them varies among the physical-attribute pulses). The physical-attribute pulses may correspond to forming melt pools. For example, each physical-attribute pulse, may correspond to the formation of a melt pool. The physical-attribute pulses may correspond to forming tiles. For example, each physical-attribute pulse, may correspond to the formation of a tile.

FIG. 1 shows an example of a 3D printing system 100 and apparatuses. A transforming energy beam 101 is generated by an energy source 121. The generated energy beam may travel through an optical mechanism 120 and/or an optical window 115 towards the material bed 104. The transforming energy beam 101 may travel along a path to transform at least a portion of the material bed 104 into a transformed material. The transformed material may harden into at least a portion of the 3D object. In the example shown in FIG. 1, part 106 represents a layer of transformed material within the material bed 104. The material bed may be disposed above a platform. The platform may comprise a substrate 109 and/or a base 102. The platform may translate (e.g., vertically 112) using a translating mechanism (e.g., an elevator 105). The translating mechanism may travel in the direction to or away from the bottom of the enclosure 111 (e.g., vertically). For example, the platform may decrease in height before a new layer of pre-transformed material is dispensed by the material dispensing mechanism (e.g., 116). The top surface of the material bed 119 may be leveled using a leveling mechanism (e.g., comprising parts 117 and 118). The mechanism (e.g., 3D printer 100) may further include a cooling member (e.g., heat sink 113). The interior of the enclosure 126 may comprise an inert gas and/or an oxygen and/or humidity reduced atmosphere. The atmosphere may be any atmosphere disclosed in patent application number PCT/US15/36802, titled "APPARATUSES, SYSTEMS AND METHODS FOR THREE-DIMENSIONAL PRINTING" that was filed on Jun. 19, 2015, which is incorporated herein by reference in their entirety.

In one example of additive manufacturing, a layer of pre-transformed material (e.g., powder material) is operatively coupled and/or disposed adjacent to the platform using the pre-transformed material dispensing mechanism (e.g., 116); the layer is leveled using a leveling mechanism (e.g., 117 and 118 collectively); an energy beam 101 is directed towards the material bed to transform at least a portion of the material bed to form a transformed material; the platform is lowered; a new layer of pre-transformed material is disposed into the material bed; and that new layer is leveled and subsequently irradiated. The process may be repeated sequentially until the desired 3D object is formed from a successive generation of layers of transformed material (e.g., relating to a virtual model of a requested 3D object). In some examples, as the layers of transformed material harden, they may deform upon hardening (e.g., upon cooling). The methods, systems, apparatuses, and/or software disclosed herein may control at least one characteristic of the layer of hardened material (or a portion thereof), such as their planarity, resolution, and/or deformation. For example, the methods, systems, apparatuses, and/or software disclosed herein may control the degree of deformation. The control may be an in situ control. The control may be control during formation of the at least a portion of the 3D object. The control may comprise closed loop control. The portion may be a surface, layer, multiplicity of layers, portion of a layer, and/or portion of a multiplicity of layers. The layer of hardened material within the 3D object may comprise a multiplicity of melt pools. The layers' characteristics may comprise planarity, curvature, or radius of curvature of the layer (or a portion thereof). The characteristics may comprise the thickness of the layer (or a portion thereof). The characteristics may comprise the smoothness (e.g., planarity) of the layer (or a portion thereof).

The methods, systems, apparatuses, and/or software described herein may comprise providing a first layer of pre-transformed material (e.g., powder) in an enclosure to form a material bed (e.g., powder bed). The first layer may be provided on a substrate or a base. The first layer may be provided on a previously formed material bed (e.g., layer of pre-transformed material). At least a portion of the first layer of pre-transformed material may be transformed by using an energy beam. For example, an energy beam may irradiate the at least a portion of the first layer of pre-transformed material to form a first transformed material. The first transformed material may comprise a fused material. The methods, systems, apparatuses, and/or software may further comprise disposing a second layer of pre-transformed material adjacent to (e.g., above) the first layer. At least a portion of the second layer may be transformed (e.g., with the aid of the energy beam) to form a second transformed material. The second transformed material may at least in part connect to the first transformed material to form a multi-layered object (e.g., a 3D object). Connect may comprise fuse, weld, bond, and/or attach. The first and/or second layer of transformed material may comprise a first and/or second layer of hardened material respectively. The first and/or second layer of transformed material may harden into a first and/or second layer of hardened material respectively.

The methods, systems, apparatuses, and/or software may comprise controlling at least a portion of the deformation of at least the first or second layers of hardened material. The methods, systems, apparatuses, and/or software may comprise controlling at least a portion of the deformation of at least a portion of the first and/or second layers of hardened material. The methods, systems, apparatuses, and/or software may comprise controlling the deformation of at least the first or second layers of hardened material. The methods, systems, apparatuses, and/or software may comprise controlling the deformation of the multi-layered material. The deformation may comprise a curvature (or planarity).

In some embodiments, the deformation may be measured and/or controlled (e.g., regulated) during the formation of the 3D object (e.g., formation of a portion of a layer of the 3D object). In some embodiments, the curvature (or planarity) may be measured and/or controlled during the formation of the 3D object. In some embodiments, the deformation may be measured and/or controlled during the transformation operation. In some embodiments, the curvature (or planarity) may be measured and/or controlled during the transformation operation (e.g., in real-time). In some embodiments, the curvature (or planarity) may be measured and/or controlled during transforming one portion of a first layer and/or transforming a second portion of a second layer. The first and second layers can be different layers.

In some embodiments, at least one characteristic of the energy beam and/or source is controlled (e.g., regulated) and/or monitored. The control may be during the formation of the 3D object. For example, the control may be during the transformation operation (e.g., transforming at least a portion of the layer of pre-transformed material). The control may comprise controlling the deformation. The control may comprise controlling the planarity (e.g., of at least a portion of a layer). The control may comprise controlling the curvature (e.g., of at least a portion of a layer). The control may comprise controlling the degree and/or direction of deformation (e.g., of at least a portion of a layer). The control may result in reduced deformation as compared to a non-controlled process. For example, the control may result in reduced curvature as compared to a non-controlled process. The control may result in an increased radius of curvature as compared to a non-controlled process. The control may result (e.g., substantially) no deformation as compared to a non-controlled process which results in a deformation. The control may result in (e.g., substantial) lack of curvature as compared to a non-controlled process which results in curvature. The control may result in at least a portion of the layer being planar (e.g., flat), as compared to a non-controlled process generating the at least a portion of the layer as non-planar. The control may result in a (e.g., substantially) smooth surface as compared to a non-controlled process (generating a respective surface that is substantially rough).

The control may include controlling (e.g., regulating) the energy, energy flux, dwell time, pulse pattern, pulse frequency, footprint, acceleration, and/or velocity of the energy beam. The control may include controlling (e.g., regulating) the power of the energy source. The footprint may be a footprint of the energy beam on the target surface (e.g., exposed layer of the material bed). The acceleration and/or velocity may be the acceleration and/or velocity (respectively) in which the energy travels (e.g., laterally) along the target surface (e.g., exposed surface of the material bed). The energy beam may travel along a path. The energy beam may be a pulsing energy beam. The control may include controlling the pattern of the pulses, dwell time within each pulse, and/or the delay length (e.g., intermission time, or beam off time) between pulses.

Figure 22A:
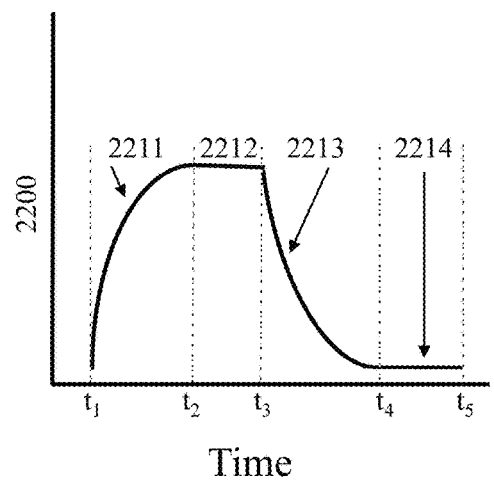
FIGS. 22A-22D show various schematic representations of physical-attribute profiles as a function of time.
Figure 22B:
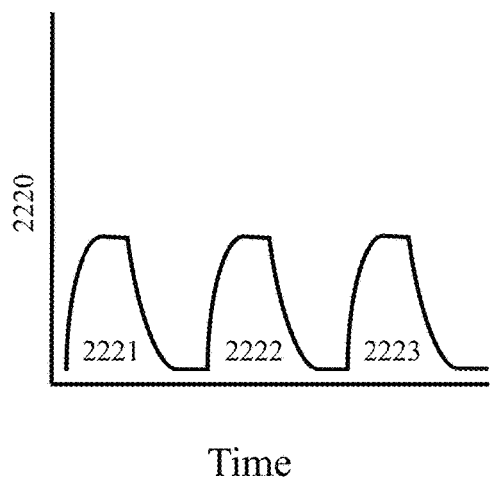

In some embodiments, an energy profile of the (e.g., transforming) energy beam may be controlled (e.g., in real time and/or in situ). In some embodiments, a measured (e.g., detectable) energy profile may be controlled (e.g., in real time and/or in situ). In some embodiments, a measured physical-attribute profile may be controlled (e.g., in real time and/or in situ). The physical-attribute may be artificially induced (e.g., using an energy source). The physical-attribute profile may be a measurement signal profile. The physical-attribute profile may comprise (i) temperature, (ii) FLS of an energy beam footprint (on the target surface), (iii) metrology (of the target surface), (iv) power of the energy source generating the transforming energy beam, (v) energy density of the transforming energy beam, (vi) radiation from the target surface (e.g., at or adjacent to the footprint) or (vii) light reflection. The light reflection may comprise scattered light reflection or specular light reflection. The irradiation may be heat irradiation (e.g., IR irradiation). The physical-attribute may be of (e.g., correspond to), for example, a melt pool, or transformed portion of the material bed. The control may be any control disclosed herein. For example, the control may comprise a closed loop control. The control may comprise a feedback control. The control may be during the 3D printing (e.g., in real time). The energy beam may comprise a pulsing energy beam comprising one or more pulses (e.g., two or more pulses). The pulse may be a pulse in terms of (e.g., in correlation with and/or affecting) the physical-attribute (e.g., detectable energy). The pulse in terms of (e.g., pertaining to) the physical-attribute (termed also herein as "physical-attribute pulse") may comprise one or more pulses of the (e.g., transforming) energy beam. For example, a physical-attribute pulse may be a result of a single energy beam pulse, or of a plurality of pulses of the energy beam. The physical-attribute pulse may be effectuated by pulse-width modulation (abbreviated as "PWM") of the energy beam. The physical-attribute pulses may correspond to formation of melt pools, wherein each physical-attribute pulse corresponds to formation of a melt pool. FIG. 22B shows an example of a pulsing (measured) physical-attribute profile over time. In the example shown in FIG. 22B, the physical-attribute may be temperature 2220. FIG. 32B shows an example of a pulsing physical-attribute profile over time. In the example shown in FIG. 32B, the physical-attribute may be a power of the energy source generating the energy beam, or a power density of the energy beam. The measured physical-attribute profile may be controlled within the physical-attribute pulse (e.g., over the physical-attribute pulse time-period). The energy profile of the energy beam may be controlled within the physical-attribute pulse in real-time (e.g., in situ) during the 3D printing process. In some embodiments, one or more individual pulses may be controlled during their pulsing time (e.g., in real time). For example, the shape of physical-attribute pulse or any of its portions may be controlled. The portions may be controlled individually (e.g., in real-time). The physical-attribute pulse portions may comprise a leading edge, plateau (if any), trailing edge, dwell time, intermission, or any combination thereof. In some embodiments, the physical-attribute pulse does not include all of the following components: a leading edge, plateau (if any), trailing edge, dwell time, and intermission. FIG. 22A shows an example of a measured physical-attribute pulse (e.g., temperature 2200 variation) profile as a function of time, having a dwell time from $t_1$ to $t_4$ and an intermission time from $t_4$ to $t_5$. The dwell time in example shown in FIG. 22A is divided into a leading edge 2211, a plateau 2212, and a tailing edge 2213. The intermission in the example shown in FIG. 22A is 2214. The physical-attribute profile (e.g., temperature profile) over time may be along a trajectory of the transforming energy beam on the target surface. The physical-attribute profile may be derived from sensor measurements. The sensor may be any sensor or detector described herein (e.g., a temperature sensor). The temperature sensor may sense a radiation (or a radiation range) that is emitted from an area at the target surface that coincides with the transforming energy beam footprint, or adjacent thereto (e.g., within a radius equal to at most about 2, 3, 4, 5, or 6 footprint diameters measured from the center of the footprint). The radiation may be IR radiation. The intensity and/or wavelength of a radiation emitted from an area may correlate to the temperature at that area.

The control may rely on at least one measurement of at least one physical-attribute (e.g., aspect, circumstance, event, experience, incident, reality, fact, incident, situation, circumstance, or any combination thereof). The physical-attribute may be susceptible to the amount and/or density of energy emitted by the energy beam. The physical-attribute may vary depending on the amount and/or density of energy emitted by the energy beam. In some embodiments, at least one physical-attribute type may be controlled (e.g., regulated, monitored, modulated, varied, altered, restrained, managed, checked, and/or guided) in real-time during the physical-attribute pulse. Real time may be during the formation of the 3D object, during the formation of the layer of hardened material, during formation of a wire (e.g., forming at least a portion of a layer of hardened material), during formation of a hatch line (e.g., while forming at least a portion of a layer of hardened material), during formation of a melt pool, during the physical-attribute pulse, or any combination thereof.

In some embodiments, the physical-attribute controlled during the physical-attribute pulse (e.g., in real time during the 3D printing process) comprises a temperature, FLS (e.g., of a melt pool), crystal phase, solid morphologies (e.g., metallurgical phase), stress, strain, defect, surface roughness, light scattering (e.g., from a surface), specular reflection (e.g., from a surface), change in polarization of reflected light (e.g., from a surface), surface morphology, or surface topography. The surface can be the target surface. The physical-attribute may correspond to at least one melt pool. The surface can be the exposed surface of the material bed, 3D object, melt pool, portion of transformed material, or any combination thereof. The defect may comprise cracking or deformation. The deformation may comprise bending, buckling, and/or warping. The physical-attribute (e.g., detectable energy) may arise at the material bed, melt pool, area just adjacent to the melt pool, target surface (e.g., exposed surface of the material bed), or any combination thereof. For example, the temperature (physical-attribute) may comprise temperature of the material bed, melt pool, area (e.g., just) adjacent to the melt pool, exposed surface of the material bed, or any combination thereof. Adjacent may be within a distance that is substantially equal to or equal to at most about 5%, 10%, 20%, 30%, 40% or 50% of the FLS of the melt pool. Adjacent may be within any distance between the afore-mentioned percentages of the melt pool FLS (e.g., from about 5% to about 50%, from about 5% to about 30%, or from about 5% to about 10% of the respective FLS of the melt pool). The FLS physical-attribute may comprise a FLS of the melt pool, hatch line, hatch spacing, layer of pre-transformed material (e.g., powder material), or any combination thereof. For example, the FLS of the melt pool may comprise the diameter or depth of the melt pool. In some embodiments, the heating profile and/or the cooling profile (e.g., of the material bed, melt pool, area just adjacent to the melt pool, exposed surface of the material bed, or any combination thereof) may be controlled during the physical-attribute pulse as a result of the amount of energy radiated into the material bed during different time-portions within the physical-attribute pulse. In some embodiments, the expansion and/or contraction profile (e.g., of the melt pool, of the hatch line, of the hatch spacing, or of the layer of pre-transformed material (e.g., powder material), or any combination thereof) may be controlled during different time-portions within the physical-attribute pulse. The shape of the physical-attribute pulse may be controlled (e.g., in real time and/or in situ during the 3D printing process). The physical-attribute pulse may comprise a dwell time and an intermission. The dwell time may comprise a time interval. In some examples, at least one-time interval of the physical-attribute pulse may be controlled. The time interval may be a portion of the physical-attribute pulse dwell time (e.g., from $t_1$ to $t_2$ in FIG. 22A), or the entire physical-attribute pulse dwell time (e.g., from $t_1$ to $t_5$ in FIG. 22A).

Figure 22C:
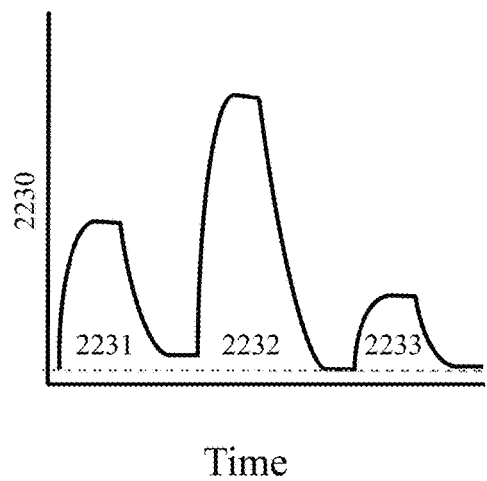
Figure 22D:
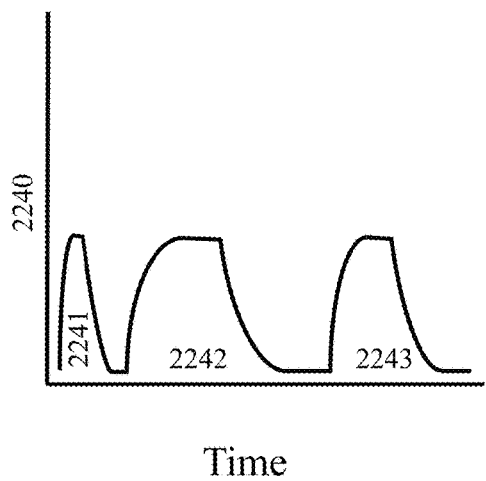

The control may comprise forming at least two physical-attribute pulses (e.g., all the physical-attribute pulses) that are substantially identical (e.g., completely identical, or almost identical) in terms of the measured physical-attribute profile (as a function of time). FIG. 22B shows an example of three physical-attribute pulses (2221, 2222, and 2223, wherein the physical-attribute correlates to temperature as a function of time) that are identical with respect to the measured energy (as a function of time). The control may comprise forming at least two physical-attribute pulses that are different from one another with respect to the physical-attribute profile (as a function of time), in a controlled manner (e.g., by keeping the temperature physical-attribute and/or FLS physical-attribute controlled). Different may be with respect to the physical-attribute amplitude, its duration, or any combination thereof (e.g., within the pulse). Different may be with respect to way in which the physical-attribute reaches its maximum, way it reaches its minimum, or any combination thereof (e.g., within the pulse). Different may be with respect to peak maximum, and/or peak minimum of the a physical-attribute (e.g., a measured energy). FIG. 22C shows an example of measured temperature 2230 over time of three pulses (2231, 2232, and 2233) that are different with respect to the physical-attribute amplitude and (e.g., substantially) identical with respect to time-period of the pulse. FIG. 22D shows an example of measured temperature 2240 over time of three physical-attribute pulses (2241, 2242, and 2243) that are different in their pulse duration of the physical-attribute pulse and (e.g., substantially) identical with respect to their maximum and minimum peak intensities (e.g., minimum and maximum temperatures). FIG. 22C shows an example of two pulses (2231, and 2232) that are different in their minimum peak intensity position (e.g., minimum temperature).

The control may comprise forming at least two physical-attribute pulses (e.g., all the physical-attribute pulses) that are (e.g., substantially) identical in terms of temperature profile as a function of time. The control may comprise forming at least two phenomenon pulses that are different in terms of temperature profile versus time in a controlled manner (e.g., by keeping the energy profile of the energy beam and/or the FLS physical-attribute controlled). The FLS physical-attribute may comprise a FLS of the melt pool, hatch line, hatch spacing, layer of pre-transformed material (e.g., powder material), or any combination thereof. The control may comprise forming at least two physical-attribute pulses (e.g., all the pulses) that are identical in terms of FLS profile (e.g., of a melt pool) versus (e.g., as a function of) time. The control may comprise forming at least two physical-attribute pulses (e.g., all the pulses) that are different in terms of temperature profile versus (e.g., as a function of) time in a controlled manner (e.g., by keeping the energy profile of the energy beam and/or the temperature physical-attribute controlled). The temperature physical-attribute may comprise temperature of the material bed, melt pool, area just adjacent to the melt pool, exposed surface of the material bed (e.g., position(s) therein), or any combination thereof. The physical-attribute may comprise a physical-attribute, occurrence, or event.

The physical-attribute profile may comprise a temperature profile of a melt pool. A physical-attribute pulse may be a temperature pulse of the exposed surface of the material bed (e.g., an area therein). For example, at time $t_1$ (e.g., in FIG. 22A), the temperature of a position in the powder bed in which a melt pool is to be formed, begins to raise, and reaches a maximum level at $t_2$ (e.g., in FIG. 22A); the temperature of the melt pool is then held in (e.g., substantially) the same maximum level until time $t_3$ (e.g., in FIG. 22A); after which it begins to decline (e.g., as the melt pool cools down) until it reaches a certain minimum level at $t_4$ (e.g., in FIG. 22A). The temperature of the exposed surface of the material bed may be held in an (e.g., substantially) identical temperature until time $t_5$ (e.g., in FIG. 22A), in which a new melt pool is being formed and a new physical-attribute pulse is generated. The designation $t_{1-5}$ can refer to those in FIG. 22A.

In some embodiments, the physical-attribute profile comprises a power pulse profile of an energy source that generates the energy beam. For example, at time $t_1$ (e.g., in FIG. 32A), the power of the energy source may be turned on to reach a maximum power threshold value; the power may be held at that maximum power value until a different physical-attribute that is affected by the energy beam (e.g., corresponding to the temperature at the irradiated position) reaches a desired threshold value of that different physical-attribute (e.g., corresponding to the temperature), at time $t_2$ (e.g., in FIG. 32A); in order to (e.g., substantially) keep that different physical-attribute at its desired threshold value, the power of the energy source may be reduced until it reaches a minimum level is reached at $t_4$ (e.g., in FIG. 32A). The power may be held at that minimum value, or entirely turn off until time $t_5$ (e.g., in FIG. 32A), in which a new power pulse may be generated. The times $t_1$-$t_5$ in FIG. 22A may be the same as the times $t_1$-$t_5$ in FIG. 32A.

In some embodiments, the physical-attribute profile comprises a power density pulse profile of an energy beam that generates a transformed material. For example, at time $t_1$ (e.g., in FIG. 32A), the power density of the energy beam may be turned on to reach a maximum power density threshold value; the power density may be held at that maximum value until a different physical-attribute that is affected by the energy beam radiation (e.g., temperature at the irradiated position) reaches a desired threshold at time $t_2$ (e.g., in FIG. 32A); in order to (e.g., substantially) keep that different physical-attribute at a desired threshold value of that different physical-attribute, the power density of the energy beam may be reduced until it reaches a minimum level is reached at $t_4$ (e.g., in FIG. 32A). The power density may be held at that minimum value, or entirely turn off until time $t_5$ (e.g., in FIG. 32A), in which a new power density pulse may be generated. The times $t_1$-$t_5$ FIG. 22A may be the same as the times $t_1$-$t_5$ in FIG. 32A.

The physical-attribute profile may comprise a diameter profile of a melt pool. The physical attribute may be an artificially induced phenomenon. A physical-attribute pulse may be a diameter pulse of a melt pool. For example, at time $t_1$ (e.g., in FIG. 22A), an area at a position of a target surface (e.g., an exposed surface of a material bed) begins to transform into a melt pool; the diameter of the melt pool may begin to expand, and reaches a maximum level at $t_2$ (e.g., in FIG. 22A, wherein 2200 represents the diameter of the melt pool); the diameter of the melt pool is then held in (e.g., substantially) the same maximum diameter until time $t_3$ (e.g., in FIG. 22A); after which it begins to shrink (e.g., as the melt pool cools down) until it reaches a certain minimum level at $t_4$ (e.g., in FIG. 22A). The diameter of the melt pool may be held in an (e.g., substantially) identical temperature until time $t_5$ (e.g., in FIG. 22A), in which a new melt pool is being formed and a new physical-attribute pulse is generated. By controlling the shape of one or more portions of the physical-attribute pulse (e.g., by controlling the temperature at the target surface, at least one characteristic of the energy beam, and/or at least one characteristic of the energy source such as its power), the size of the melt pool can be controlled. For example, the size of a plurality of melt pools can be controlled (e.g., to be (e.g., substantially) identical, see FIG. 35). The designation $t_{1-5}$ can refer to those in FIG. 22A. The control may comprise directly (e.g., gradually) adjusting the power of the energy beam. Additionally or alternatively, the control may comprise modulating the energy beam by using pulse width modulation (PWM). The control may comprise generating (e.g., irradiating) pulses of the energy beam that are short relative to the duration of the physical-attribute pulse. The control may alter one or more functions of the 3D printing. For example, the control may vary the size of transformed area. The size may be the volume and/or the FLS. The transformed area may be on the surface of at least a portion of the layer as part of the 3D object. The transformed area may be a transformed area in the material bed. The transformed area may be a transformed area in the target surface. The transformed area may comprise a melt pool. The transformed area may be the melt pool. The transformed area may include an adjacent area to the afore-mentioned areas (e.g., within at least about 2, 3, 4, 5, 6, 7, or 8 melt pool diameters). The control may take into account at least one temperature measurement at the irradiation position and/or adjacent thereto. The irradiation position may be a position in which the energy beam interacts with the target surface (e.g., to transfer a portion of it into a transformed material). Adjacent may be within at least about 0.1micrometer (μm),0.5 μm, 1 μm, 1.5 μm, 2 μm, 3 μm, 4 μm, 5 μm, 6 μm, 7 μm, 8 μm, 9 μm, or 10 μm from the irradiation position (e.g., center or rim of the irradiation position). Adjacent may be within at most about 50μm, 10 μm, 9 μm, 8 μm, 7μm, 6μm, 5μm, 4.5μm, 4μm, 3.5μm, 3μm, 2.5μm, 2μm, 1.5μm, 1μm, 0.75μm, 0.5μm, 0.4μm, 0.3μm, 0.2μm, or 0.1μm from the irradiation position. Adjacent may be of any value between the afore-mentioned values (e.g., from about 0.1μm to about 1 μm, from about 1 μm to about 10μm, or from about 0.1 μm to about 50μm). These values may correspond to "adjacent to the irradiation position", or to "adjacent to the transformed area."

Figure 14:
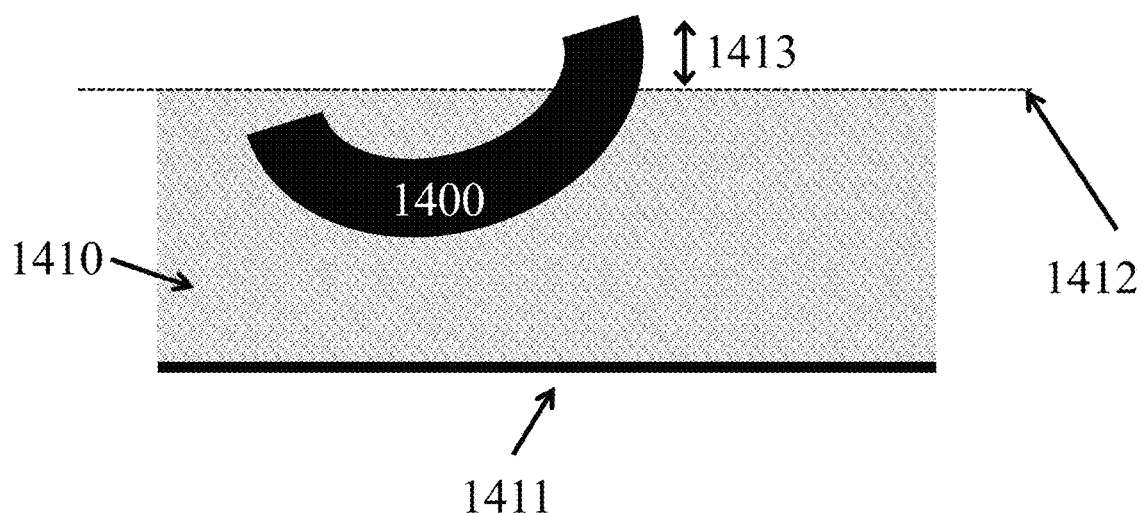
FIG. 14 illustrates a schematic side view (as a vertical cross sectional) of a 3D printing system portion.
Figure 15:
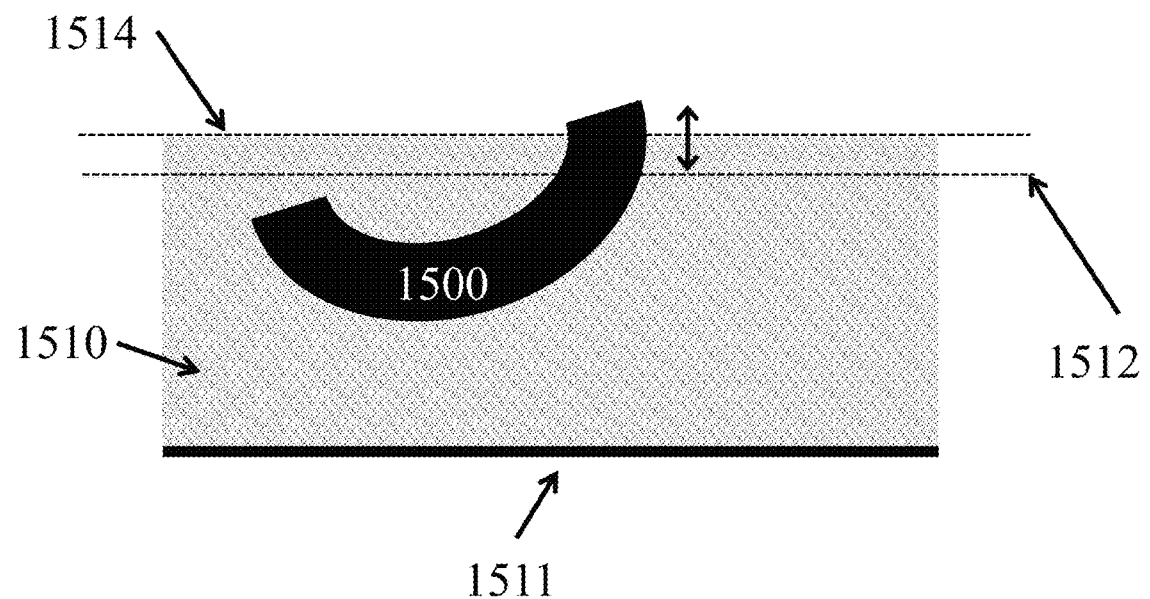
FIG. 15 illustrates a schematic side view (as a vertical cross sectional) of a 3D printing system portion.

In an aspect, the one or more sensors sense one or more positions of the target (e.g., exposed) surface. The exposed surface may be of the material bed, of the transformed material, of the 3D object, or any combination thereof. The exposed surface of the material bed may comprise a layer of material disposed prior to the formation of the 3D object. The exposed surface of the material bed may comprise a layer of material that was used to form the last (e.g., previously) formed hardened layer of the 3D object. The exposed surface of the material bed may comprise a layer of material that was disposed subsequent to the formation of the last formed hardened layer of the 3D object. FIG. 14 shows an example of a material bed 1410 having an exposed surface 1412; and the exposed surface 1412 is disposed before formation of the last hardened layer of 3D object 1400. The exposed surface of the material bed may comprise a newly dispensed layer of pre-transformed material in the material bed. In some instances, the 3D object may protrude from the newly dispensed layer of pre-transformed material. In some instances, the 3D object may be completely covered by the newly dispensed layer of pre-transformed material. FIG. 15 shows an example of a material bed 1510, with an exposed surface 1514; the surface 1512 is of a previously dispensed layer of pre-transformed material; and the exposed surface 1514 is of a newly dispensed layer of pre-transformed material (e.g., subsequent to the formation of the last layer of hardened material of the 3D object 1500). In the example of FIG. 15, the 3D object protrudes the newly dispensed layer of pre-transformed (e.g., powder) material. The data from the one or more sensors may be used (e.g., by the controller and/or a processing unit) to provide a map of at least a portion of the target surface. The map may be generated during the process of printing (e.g., forming) the 3D object. The processing unit may be a part of the controller. The processing unit may be separate from the controller. The map may be generated during the 3D printing process. The map may be altered during the 3D printing process (e.g., based on sensor input). The map may be generated and/or altered during the 3D printing process. The map may be generated with a relatively high frequency and/or resolution. For example, the frequency may substantially equal any of the frequencies recited herein for the sensor measurement frequency. The resolution may be any resolution mentioned herein. For example, the resolution of the sensor may be from about 10% to about 190% of the average or mean FLS of the particulate material in the material bed.

Figure 4:
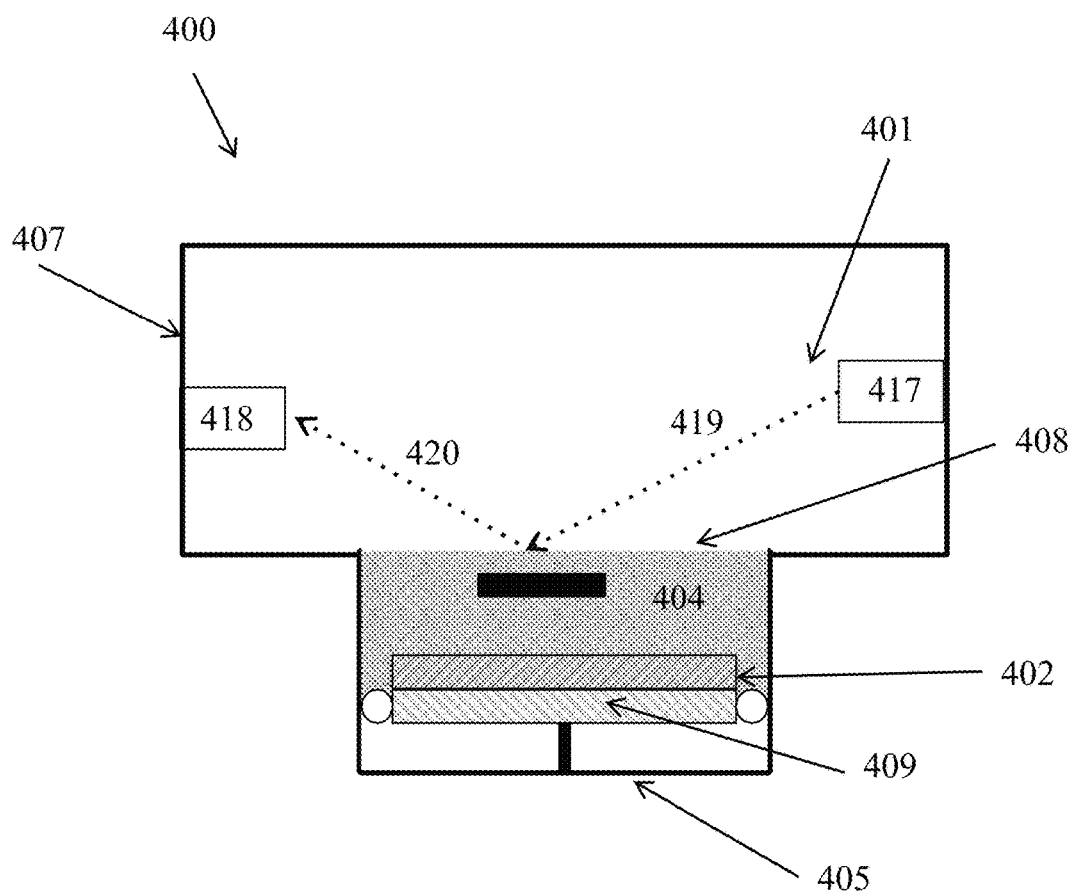
FIG. 4 shows a schematic side view of a 3D printing system and apparatuses.

In some embodiments, the one or more sensors sense one or more positions of at least a portion of the 3D object. The one or more sensors may sense one or more positions of at least a portion of the 3D object that protrudes from the exposed surface of the material bed. FIG. 14 shows an example of a 3D object 1400 that protrudes from the exposed surface 1412 of the material bed 1410 that is operatively coupled and/or disposed adjacent to a platform 1411. In the example of FIG. 14, the 3D object protrudes by a height 1413 from the exposed surfaced 1412 of the material bed 1410. The one or more sensors may measure the one or more positions of the exposed surface using a contact method, non-contact method, or any combination thereof. The one or more positions of the exposed surface may comprise vertical, horizontal, and/or angular positions. The angular position may include compound or planar angle. The measurement may comprise the height (e.g., thickness) of the pre-transformed material disposed above a layer of hardened material. The sensors may sense an energy beam. The positions sensed by the one or more sensors may be effectuated by sensing an energy beam. The energy beam may comprise the transforming energy beam or the sensing energy beam. The energy beam may be reflected from the target (e.g., exposed) surface. The reflected energy beam may be sensed by the one or more sensors. FIG. 4 shows an example of an energy beam 420 that is reflected from the target surface 408 and is sensed by the sensor receiver part

Figure 16:
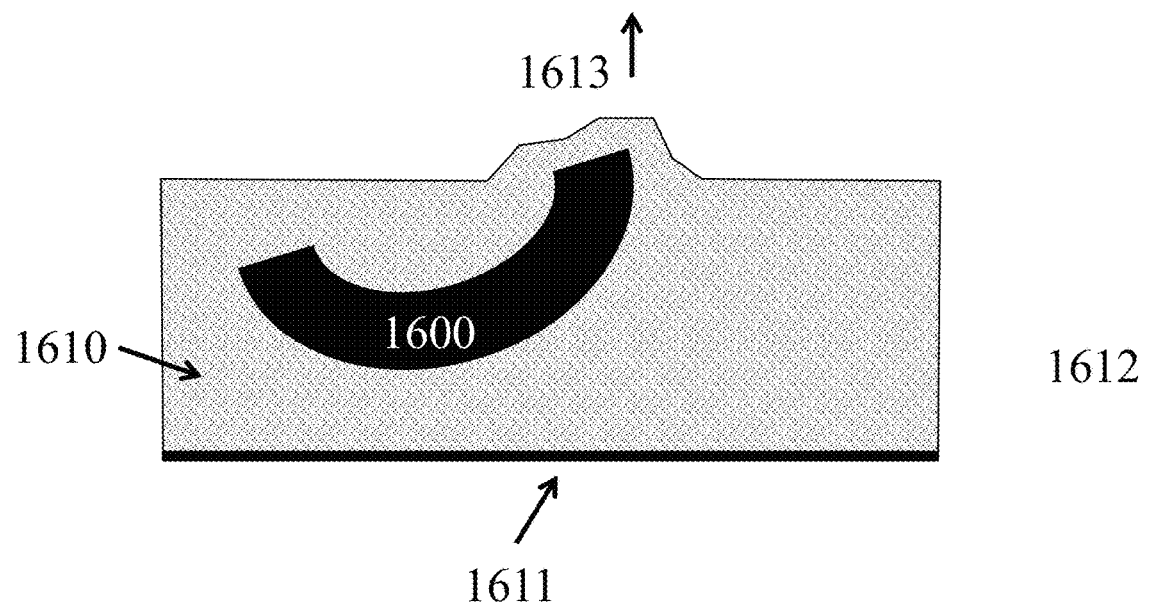
FIG. 16 illustrates a schematic side view (e.g., vertical cross sectional) of a 3D printing system portion.

418. The exposed surface may comprise the exposed surface of the material bed, or of the at least a portion of the 3D object. The exposed surface may be of a transformed portion of the material bed that is not a portion of the 3D object (e.g., debris, flag, or auxiliary support). The exposed surface may comprise an exposed surface of the material bed that has altered its position due to the formation of at least a portion of the 3D object, which portion is covered by pre-transformed material as part of (e.g., within) the material bed. For example, the exposed surface may comprise an exposed surface of the powder bed that has altered its position due to the formation of at least a portion of the 3D object, which 3D object is covered by powder material within the powder bed. FIG. 16 shows an example of a 3D object 1600 that is covered by a material bed 1610, which formation of the 3D object caused a portion of the exposed surface of the material bed to alter in the direction of the arrow 1613.

At times, a new layer of hardened material is deposited on a portion of a 3D object. The portion of the 3D object may include one or more layers (e.g., of hardened material). The portion of the 3D object may substantially adhere to (e.g., not substantially deviate from) a model of the desired 3D object. The one or more layers within the portion of the 3D object may substantially adhere to (e.g., not substantially deviate from) a model of the desired 3D object. The one or more layers of the 3D object may be substantially non-deformed. Substantially may be relative to the intended purpose of the 3D object.

In certain instances, the portion of the 3D object deviates from the model of the desired 3D object. The deviation may comprise a corrective deviation. The deviation may comprise a corrective deformation. The portion of the 3D object may deviate from a model of the desired 3D object. The one or more layers within the portion of the 3D object may deviate from a model of the desired 3D object. The one or more layers of the 3D object may be substantially deformed as compared to the respective one or more slices in the model of the desired 3D object. The manner of forming (e.g., printing) the one or more layers may deviate from a model of the desired 3D object. The path in which the transforming energy beam progresses, may deviate from a slice of the model of the desired 3D object. The model of the desired 3D object may be a desired model. In some examples, a deviated model may be used to provide (3D printing) instructions for the transformation of at least a portion of the material bed (e.g., to form the 3D object). In some examples, a deviated model may be used to provide instructions for the energy beam path. The deviated model may allow the transformed material to take a shape that (e.g., substantially) corresponds to the desired 3D object (e.g., upon hardening, e.g., upon solidifying). At least a portion of the desired model (e.g., slice thereof) may undergo a deviation conversion to form the deviated model The deviation may be a corrective deviation. The deviation may be substantial (e.g., measurable). The deviation may be controlled (e.g., by at least one function used in the 3D printing). The deviation of the portion of transformed material that is materialized during the printing (e.g., material transformation) operation, may substantially correspond to the deviation that is recommended by the deviated model. The (virtual) model of the requested 3D object that underwent the deviation may be referred herein as the "deviated model." A desired deviation of the portion (e.g., layer) may be effectuated when a portion of transformed material (e.g., layer), which was generated according to the deviated model (e.g., slice thereof), hardens (e.g., cools). The desired deviation of the portion of transformed material may be referred to herein as a "target deviation." The target deviation may be measured, anticipated by modeling (e.g., thermo-mechanical modeling), anticipated according to historical data, or any combination or permutation thereof. The target deviation may be reached generating the transformed material. The target deviation may be reached upon hardening (and/or cooling) the portion of transformed material. The deviation of the portion of transformed material may be controlled (e.g., in spatial orientation and/or magnitude). The controlling operation may comprise controlling the portion of transformed material such that it will (e.g., substantially) correspond to the target deformation (e.g., upon hardening and/or cooling). FIG. 6 shows examples of a 3D object before and after hardening (by cooling). 3D Object 601 represents an intermediate 3D object that has not completely hardened, whereas 3D object 602 represents the object 601 that has completely hardened. In some embodiments, object 603 may represent an example of a vertical cross section in a virtual model of a requested 3D object depicting the slices (e.g., layer instructions for printing the 3D object). In some embodiments, 603 may represent an example of a cross section of a 3D object that was printed but did not completely harden. Object 604 represents an example of a cross section in a completely hardened 3D object (e.g., final 3D object). Object 604 represents an example of a vertical cross section in the printed 3D object that substantially corresponds (e.g. match) the desired 3D object, with the lines depicting layer boundaries. Slice 605 was printed as a layer that deviates from the desired 3D object model, which printing was according to instructions from the deviated model. Upon complete hardening, the layer assumed a shape (e.g., 606) that allowed the printed 3D object to substantially correspond to the desired 3D object. The assumed shape may (e.g., substantially) correspond to a modeling of the hardening of the transformed material (e.g., transformed material layer). The target deformation may be determined using historical data and/or modeling (e.g., of the hardening and/or cooling). The assumed shape may (e.g., substantially) correspond to the target deformation (e.g., target shape). The manner of assuming the final shape of the at least one layer may be controlled. The control may be any of the control method disclosed herein. The control may be control of at least one function involved in 3D printing. For example, the control may be control of at least one characteristic of the energy beam. For example, the control may be control of a temperature of the hardened material and/or material bed (e.g., during the 3D printing).

Figure 17:
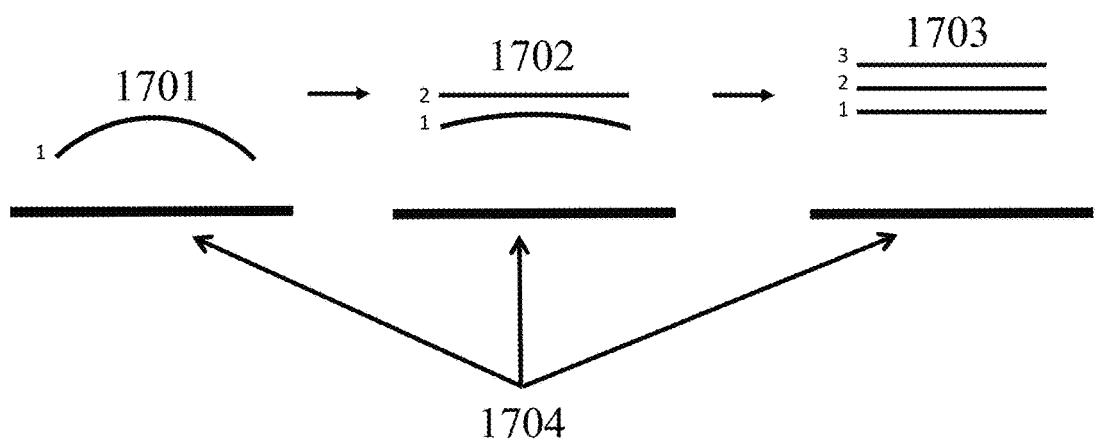
FIG. 17 shows schematics of various vertical cross sectional views of different 3D objects.

The methods, software, and systems described herein may comprise corrective deformation of a 3D model of the desired 3D structure, that substantially result in the requested 3D structure. The corrective deformation may take into account features comprising (i) stress within the forming structure, (ii) deformation of material as it hardens to form at least a portion of the 3D object, (iii) the manner of temperature depletion during the 3D printing process, or (iv) the manner of deformation of the transformed material as a function of the density of the material within the material bed (e.g., powder material within a powder bed). The modification may comprise alteration of a path of a layer (or portion thereof) in the 3D model. The alteration of the path may comprise alteration of the path filling at least a portion of the layer (e.g., cross section of the 3D object), e.g., which path may comprise hatching. The alteration of the path (e.g., hatching) may comprise alteration of the direction of path (e.g., hatching), the density of the path (e.g., hatch) lines, the length of the path (e.g., hatch) lines, or the shape of the path (e.g., hatch) lines. The modification may comprise alteration of the thickness of the 3D object (or a portion thereof, e.g., layer), for example, during its transformed state (e.g., before complete hardening). The modification may comprise varying at least a portion of a cross section (e.g., slice) of the 3D model by an angle (e.g., planer or compound angle), or inflicting to at least a portion of a cross section a radius of curvature (i.e., bending at least a portion of the cross section of a 3D model). Corrective deformation may be any corrective deformation disclosed in patent application No. 62/239,805, and PCT application number PCT/US16/34857, both of which are incorporated herein by reference in their entirety. The corrective deviation from the intended 3D structure may be termed herein as "geometric correction." FIG. 17 shows examples of various stages in formation of a 3D object 1703 represented as three layers (e.g., numbered 1-3 in object 1703), which is shown as a vertical cross section and is situated on a platform 1704. The first formed layer is formed as a negatively curved layer #1 of object 1701. Once the second layer (#2 of object 1702) is formed, the first layer #1 may flatten out (e.g., its radius of curvature is increased, its curvature is reduced (e.g., approaches zero)). Once the third layer (#3 of object 1703) is formed, the layers of the 3D object become substantially flat (e.g., planar). Layer #1 may be said to be formed as a correctively deformed layer. The corrective deformation may enable a formation of a (e.g., substantially) non-deformed 3D object. The manner of printing one or more subsequent layers to the correctively deformed layers may take into account the (e.g., in situ and/or real time) measurements from the one or more sensors. The corrective deformation may be of an entire layer of hardened material, or a portion thereof. The corrective deformation may be of at least a portion of the layer of hardened material as part of a 3D object.

In some embodiments, the sensor comprises an imaging device. The imaging device may comprise multi-spectral imaging, single spectral imaging, or non-spectral imaging. The non-spectral imaging may comprise acoustic, electro, or magnetic imaging (e.g., electromagnetic imaging). The multi-spectral imaging may comprise detecting red body radiation (e.g., emitted from the target surface). The imaging device may comprise a camera. The imaging device may image a target surface (e.g., exposed surface of the material bed, 3D object, or melt pool). The imaging device may image the temperature and/or metrology (e.g., dimensionality). The imaging device may image a melt-pool temperature, shape and/or FLS (e.g., diameter, or depth). The imaging device may image a vicinity of melt-pool temperature, shape and/or FLS (e.g., diameter, or depth). The imaging device may image a zone affected by the melt pool (e.g., heat thereof). The zone affected by the heat of the melt pool is termed herein "heat affected zone" (e.g., FIG. 26A, 2610). The imaging device may image the generation and/or hardening of at least a portion of the melt pool.

In some embodiments, the non-contact measurement includes at least one optical measurement. The optical measurement (e.g., by the optical sensor) may comprise measurement by an image sensor (e.g., CCD camera), optical fiber (e.g, optical fiber bundle), laser scanner, or interferometer. The interferometer may comprise a white light or a partial coherence interferometer.

In some embodiments, the optical measurement and/or the analysis thereof comprise (e.g., superimposed) waves (e.g., electromagnetic waves). The superimposed waves may be used to extract information about a reflection(s) of these waves from the target surface. The information may comprise relative location, location alteration (e.g., displacement), refractive index alteration, or surface changes (e.g., irregularities). The optical measurement of the reflection(s) and/or the analysis thereof may comprise using Fourier transform spectroscopy (e.g., of continuous waves). The optical measurement of the reflection(s) and/or the analysis thereof may comprise combining two or more waves (e.g., super positioning waves). The optical sensor may comprise a mirror or a beam splitter. The mirror may be substantially fully reflective, or partially reflective (e.g., a half-silvered mirror). The mirror may be (e.g., controllable) translating (e.g., horizontally, vertically, and/or rotationally, e.g., along an axis). The partially reflective mirror may be a beam splitter. The interferometer may comprise homodyne or heterodyne detection. The interferometer may comprise a double path or common path interferometer. The interferometer may comprise wave front splitting or amplitude splitting. The interferometer may comprise a Michelson, Twyman-Green, Mach-Zehnder, Sagnac (e.g., zero-area Sagnac), point diffraction, lateral shearing, Fresnel's biprism, scatter plate, Fizeau, Mach-Zehnder, Fabry-Perot, Laser Unequal Path, or Linnik interferometer. The interferometer may comprise a fiber optic gyroscope, or a Zernike phase contrast microscope.

The sensor (e.g., optical, or temperature) may be any sensor described in patent application number PCT/US15/65297, filed on Dec. 11, 2015, titled "FEEDBACK CONTROL SYSTEMS FOR THREE-DIMENSIONAL PRINTING," which is incorporated by reference in its entirety.

In some embodiments, the 3D object is supported during the 3D printing. For example, the 3D object may be supported by the base. For example, the 3D object may be anchored to the enclosure (e.g., to the base). The 3D object may comprise auxiliary supports. The auxiliary support may be the enclosure (e.g., the base) and/or structures that connect the 3D object to the enclosure (e.g., the base) and are not part of the intended (e.g., desired) 3D object. The 3D object may be devoid of auxiliary supports. The 3D object may be supported by at least a portion of a fused material bed. The fused material bed (or a portion thereof) may or may not fully enclose (e.g., surround) the 3D object. The 3D object may be suspended in a material bed, which material bed comprises flowable material (e.g., powder and/or liquid). The 3D object (e.g., with or without auxiliary supports) may be floating in the material bed without being anchored to the enclosure (e.g., to the base). In some embodiments, the 3D object is devoid of auxiliary supports.

In some embodiments, the 3D object may comprises a reduced amount of constraints (e.g., supports) during the 3D printing. The reduced amount may be relative to prevailing 3D printing methodologies (e.g., respective methodologies). The 3D object may be less constraint (e.g., relative to prevailing 3D printing methodologies). The 3D object may be constraintless (e.g., supportless) during the 3D printing.

In some embodiments, the control includes imaging a surface. The imaging may include stills or video imaging. The imaging may be at a direction perpendicular to the average or median plane of the exposed layer of the material bed. The imaging may be at a non-perpendicular direction to the average or median plane of the exposed layer of the material bed. The imaging may be at a grazing angle with respect to the average or median plane of the exposed layer of the material bed. The imaging may be detected at an acute angle of at least about 1°, 5°, 10°, 15°, 20°, 30°, 40°, 50°, 60°, 70°, or 80° relative to the average or mean plane of the exposed surface of the material bed. The symbol "°" designates the word degrees. The imaging may be detected at an acute angle of at most about 1°, 5°, 10°, 15°, 20°, 30°, 40°, 50°, 60°, 70°, or 80° relative to the average or mean plane of the exposed surface of the material bed. The imaging may be detected at an acute angle between any of the above-mentioned angles (e.g., from about 1° to about 80°, from about 1° to about 40°, or from about 40° to about 80°) relative to the average or mean plane of the exposed surface of the material bed.

In some examples, the imaging is performed during the formation of the 3D object. The control may include processing the images obtained from the one or more sensors. The processing may comprise image processing. The image processing may reveal a variation in the surface (e.g., planarity thereof). The revealed variation may trigger a modulation of at least one function of (e.g., component participating in) the 3D printing process. The at least one functions of the 3D printing process may comprise one or more characteristics of the energy beam as disclosed herein.

In some embodiments, the imaging comprises use of one or more imaging devices (e.g., cameras). The control may comprise use of a position sensor. The position sensor may comprise an absolute position sensor. The position sensor may comprise a relative position sensor. The position sensor may be a metrological sensor. The relative position sensor may take into account a comparison between two or more images of the surface, which images are taken at different (e.g., known) times.

Figure 3:
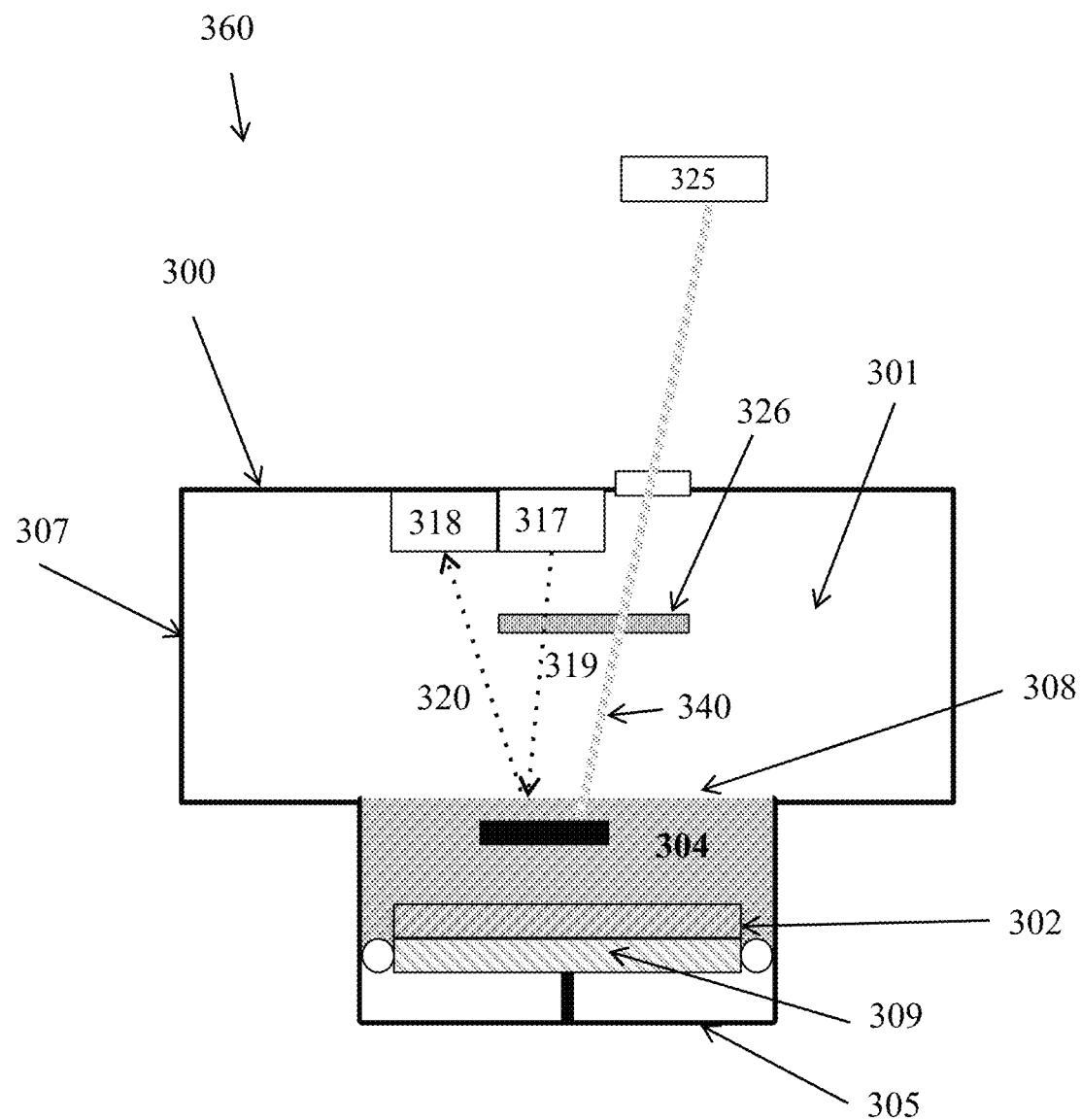
FIG. 3 shows a schematic side view of a 3D printing system and apparatuses.

In some embodiments, the sensor comprises projecting a sensing energy beam. FIG. 3 shows an example of a 3D printer 360 that includes a sensor that includes parts 317 (emitter) and 318 (receiver), which sensor (e.g., part 317) emits a sensing energy beam towards the exposed surface 308 of the material bed 304. The sensing energy beam may be projected from a direction above the exposed layer of the material bed (e.g., from part 317). Above may be in a direction opposite to the direction of the gravitational force, platform (e.g., substrate 309 and/or base 302), and/or bottom of the enclosure (e.g., 305). The direction above the exposed layer may form an angle with the exposed layer. The angle may be (e.g., substantially) perpendicular. The angle may be acute. In some examples, the sensor is disposed above the exposed layer of the material bed (e.g., FIG. 3, sensor parts 317 (emitter) and 318 (receiver)). In some embodiments, the sensor is disposed at the sides of the enclosure (e.g., FIG. 4, sensor parts 417 and 418). The sensor may be disposed at the ceiling of the enclosure (e.g., FIG. 3, sensor parts 317 and 318). In some embodiments, parts of the sensor may be disposed at the sides of the enclosure, and other parts may be disposed at the ceiling of the enclosure. The sensor may be disposed within the enclosure (e.g., FIG. 3, sensor parts 317 and 318). The sensor may be disposed outside of the enclosure. At least a part of the sensor may be disposed within and/or outside the walls of the enclosure. At least a part of the sensor may be disposed within the enclosure. Within the walls of the enclosure may refer to a situation where the part may form an integral part of the wall(s). The walls may comprise the side walls, the ceiling, or the bottom of the enclosure. Within the enclosure may refer to within the interior of the enclosure. The sensing energy beam may be projected from a direction on the sides of the enclosure (e.g., 407). FIG. 4 shows an example of a 3D printer 400 that includes a sensor comprising parts 417 (emitter) and 418 (receiver). In the example of FIG. 4, the sensing energy beam is emitted from the side of the enclosure (e.g., from part 417). The sensing energy beam may be projected from a direction residing on the ceiling of the enclosure (e.g., FIG. 3, from part 317). The ceiling may or may not be substantially parallel to the exposed layer of the material bed, to the substrate, and/or to the bottom of the enclosure. The sensing energy beam may be projected from a direction residing on the sides of the enclosure (e.g., FIG. 4, from part 417). The sides may be substantially perpendicular to the exposed layer of the material bed, to the substrate, and/or to the bottom of the enclosure.

In some embodiments, the sensor may sense radiation (e.g., electromagnetic radiation) from a surface (e.g., exposed surface of the material bed, or of the 3D object), which radiation progresses to a direction above the exposed layer of the material bed. FIG. 3 shows an example of a 3D printer 360, where the radiation 320 is projected from the exposed surface 308 of the material bed 304 towards the ceiling of the enclosure 300 and detected in the sensor part 318 (e.g., the receiver). The direction above the exposed layer may be at an angle relative to the exposed layer of the material bed. The angle may be (e.g., substantially) perpendicular. The angle may be acute. The sensor may sense radiation from a surface, which radiation progresses towards the sides of the enclosure. FIG. 4 shows an example where the radiation 420 is projected from the exposed surface 408 of the material bed 404 towards the side of the enclosure 407 and detected in the sensor part 418 (e.g., the receiver). The sensor may sense radiation from a surface, which radiation progresses towards the ceiling of the enclosure.

In some embodiments, the radiation sensed by the sensor is that of the transforming energy, which is reflected from the target surface.

The enclosure may comprise a window. The window may be an optical window. FIG. 1 shows an example of an 3D printer 100 having an enclosure comprising an optical window 115. The optical window may allow radiation from the surface to pass through (e.g., without substantial alteration and/or loss). The optical window may allow the sensing energy beam and/or the transforming energy beam to travel through (e.g., without substantial alteration and/or loss).

The sensor has a resolution. The resolution of the sensor may be lower (e.g., coarser) than the average or mean FLS of the particulate material forming the material bed (e.g., powder particles in the powder bed). Lower may be by at least about 1%, 5%, 10%, 20%, 30%, 40%, 50%, 60%, 70%, 80%, or 90% of the average or mean FLS of the particulate material in the material bed. Lower may be by at most about 1%, 5%, 10%, 20%, 30%, 40%, 50%, 60%, 70%, 80%, or 90% of the average or mean FLS of the particulate material in the material bed. Lower may be by any value between the afore-mentioned percentage values (e.g., from about 1% to about 90%, from about 1% to about 50%, or from about 40% to about 90%) of the average or mean FLS of the particulate material in the material bed. Lower by a value from about 1% to about 90% of the average or mean FLS of the particulate material in the material bed, means that the resolution of the sensor may be from 101% to 190% of the average or mean FLS of the particulate material in the material bed respectively.

In some embodiments, the sensor detects one or more movements that are a fraction of the average or mean FLS of the particular material in the material bed (e.g., powder particles in the powder bed). The fraction may be at least about 1%, 5%, 10%, 20%, 30%, 40%, 50%, 60%, 70%, 80%, or 90% of the average or mean FLS of the particulate material in the material bed. The fraction may be at most about 1%, 5%, 10%, 20%, 30%, 40%, 50%, 60%, 70%, 80%, or 90% of the average or mean FLS of the particulate material in the material bed. The fraction may be any value between the afore-mentioned percentage values (e.g., from about 1% to about 90%, from about 1% to about 50%, or from about 40% to about 90%) of the average or mean FLS of the particulate material.

In some embodiments, the control system (e.g., computing device) tracks the position alteration that is detected at the surface. As a reaction to the position alteration, the controller may direct adjustment of one or more functions of the 3D printing (e.g., using a software). For example, the controller may direct adjustment (e.g., alteration) of one or more characteristics of the transformation (e.g., fusion) operation. The controller may direct adjustment (e.g., alteration) of at least one function of at least one mechanism based on the position alteration. The adjustment may be before or during formation of a subsequent portion of the 3D object. For example, the controller may direct adjustment of one or more characteristics of the transforming energy beam.

In some embodiments, the sensor measures a fraction of the surface. In some embodiments, the sensor measures the entire surface (e.g., entire protruding surface, entire exposed surface of the material bed, and/or entire target surface). The controller may take into account the positions (whether altered or non-altered) in the entire surface. The controller may take into account the sensor measurement of a fraction of the surface. The fraction may comprise an area of at least about 1 $mm^2$, 2 $mm^2$, 3 $mm^2$, 4 $mm^2$, 5 $mm^2$, 6 $mm^2$, 8 $mm^2$, 9 $mm^2$, 10 $mm^2$, 50 $mm^2$, 100 $mm^2$, or 1000 $mm^2$. The fraction may comprise an area of at most about 1 $mm^2$, 2 $mm^2$, 3 $mm^2$, 4 $mm^2$, 5 $mm^2$, 6 $mm^2$, 8 $mm^2$, 9 $mm^2$, 10 $mm^2$, 50 $mm^2$, 100 $mm^2$, 1000 $mm^2$, or of at least the entire exposed are of the material bed. The fraction may comprise an area of any value between the afore mentioned values (e.g., from about 1 $mm^2$ to about 1000 $mm^2$, from about 1 $mm^2$ to about 5 $mm^2$, from about 5 $mm^2$ to about 10 $mm^2$, from about 10 $mm^2$ to about 50 $mm^2$, from about 50 $mm^2$ to about 1000 $mm^2$, or from about 1 $mm^2$ to about the entire exposed surface area of the material bed).

In some embodiments, the controller takes into account sensor measurements that are distant from the position at which the transforming energy beam interacts with the material bed (e.g., the irradiated position). Distant can be at most about the edge of the last formed layer of hardened material. Distant can be at the vicinity of the edge of the last formed layer of transformed (e.g., and/or hardened) material. Distant can be at least about 1 mm, 2 mm, 3 mm, 4 mm, 5 mm, 6 mm, 7 mm, 8 mm, 9 mm, or 10 mm from the center of the transforming energy beam footprint on the exposed surface of the material bed. Distant can be at most about 1 mm, 2 mm, 3 mm, 4 mm, 5 mm, 6 mm, 7 mm, 8 mm, 9 mm, or 10 mm from the center of the transforming energy beam footprint on the exposed surface of the material bed. Distant can be any value between the afore-mentioned values (e.g., from about 1 mm to about 10 mm, from about 1 mm to about 5 mm, or from about 5 mm to about 10 mm) relative to the center of the transforming energy beam footprint on the exposed surface of the material bed.

In some embodiments, the controller may takes into account one or more sensor measurements that are in the vicinity of a position of an edge of the last formed layer of hardened material. In the vicinity of the position of the edge of the last formed layer of hardened material can be at least about 1 mm, 2 mm, 3 mm, 4 mm, 5 mm, 6 mm, 7 mm, 8 mm, 9 mm, or 10 mm. In the vicinity of the position of the edge of the last formed layer of hardened material can be at most about 1 mm, 2 mm, 3 mm, 4 mm, 5 mm, 6 mm, 7 mm, 8 mm, 9 mm, or 10 mm. In the vicinity of the position of the edge of the last formed layer of hardened material can be any value between the afore-mentioned values (e.g., from about 1 mm to about 10 mm, from about 1 mm to about 5 mm, or from about 5 mm to about 10 mm). The sensor may sense the positions and/or areas that are taken into account by the controller.

In some embodiments, the sensor conducts frequent measurements. The sensor may conduct measurements at a frequency of at least about every 1 second (sec), 2 sec, 3 sec, 4 sec, 4 sec, 5 sec, 6 sec, 7 sec, 8 sec, 9 sec, 10 sec, 15 sec, 20 sec, 25 sec, 30 sec, 35 sec, 40 sec, 45 sec, 50 sec, 60 sec, 70 sec, 75 sec, 80 sec, 90 sec, 95 sec, or 100 sec. The sensor may conduct measurements at a frequency of at most about every 1 sec, 2 sec, 3 sec, 4 sec, 4 sec, 5 sec, 6 sec, 7 sec, 8 sec, 9 sec, 10 sec, 15 sec, 20 sec, 25 sec, 30 sec, 35 sec, 40 sec, 45 sec, 50 sec, 60 sec, 70 sec, 75 sec, 80 sec, 90 sec, 95 sec, or 100 sec. The sensor may conduct measurements at a frequency of any of the above-mentioned frequencies (e.g., from about every 1 sec to about every 100 sec, from about every 5 sec, to about every 50 sec, from about every 5 sec to about every 30 sec, from about every 30 sec to about every 50 sec, from about every 20 sec to about every 40 sec, or from about every 50 sec to about every 100 sec). The controller may be programmed to direct taking into account the measurements at a corresponding frequency. The controller may be programmed to direct performing an image processing of the measurements at a corresponding frequency. The controller may be programmed to direct changing one or more functions of the 3D printing process (e.g., transforming energy beam characteristics) at a corresponding frequency.

In some embodiments, the image processing provides a positional map of at least a fraction of the surface. The positional map may comprise vertical, horizontal, or angular (e.g., planar or compound) positions. The positional map may be provided at any of the frequencies mentioned herein. The positional map may be provided at a frequency of at least about 5 times/second (*/sec), 10*/sec, 20*/sec, 30*/sec, 40*/sec, 50*/sec, 60*/sec, 70*/sec, 80*/sec, 90*/sec, or 100*/sec. The positional map may be provided at a frequency of at most about 5*/sec, 10*/sec, 20*/sec, 30*/sec, 40*/sec, 50*/sec, 60*/sec, 70*/sec, 80*/sec, 90*/sec, or 100*/sec. The positional map may be provided at a frequency between any of the afore-mentioned frequencies (e.g., from about 5*/sec to about 100*/sec, from about 5*/sec to about 50*/sec, from about 50*/sec to about 100*/sec, or from about 10*/sec to about 1000*/sec). The character "*" designates the mathematical operation "times."

In some embodiments, the radiative energy is reflected from a target surface (e.g., exposed surface of at least a portion of the material bed, or exposed surface of at least a portion of a 3D object). The 3D object may be embedded (e.g., buried) in the material bed. FIG. 16 shows an example of a 3D object 1600 that is completely embedded in the material bed 1610. FIG. 14 shows an example of a 3D object 1400 that is partially embedded in the material bed 1410, and includes a portion that protrudes (e.g., sticks out) of the exposed surface 1412 of the material bed by a distance 1413.

In some embodiments, the radiative energy can be detected by an optical detector. The radiative energy can be detected by an imaging device (e.g., camera) and/or by a spectrum analyzer. The controller may vary one or more characteristics of the transforming energy beam based on an output of the sensor. The controller may vary one or more functions (e.g., characteristics) of at least one mechanism involved in the 3D printing (e.g., transforming energy source, scanner, layer dispensing mechanism, or any combination thereof) based on an output of the sensor. The characteristics of the transforming energy beam may comprise power per unit area, speed, cross section, or average footprint on the exposed surface of the material bed. The controller may comprise performing image analysis (e.g., image processing) using the output of the sensor (e.g., optical sensor, and/or imaging device), to provide a result. The image analysis may be conducted by a non-transitory computer readable medium. The radiative energy may be sensed (e.g., imaged) from one or more angles (e.g., sequentially, simultaneously, or at random). The result may be used in the control of at least one functions of the 3D printing (e.g., altering the transforming energy beam (e.g., to alter the at least one of its characteristics)), and/or altering at least one mechanism associated with the transforming energy beam. The mechanism associated with the transforming energy beam may be an optical mechanism (e.g., comprising a scanner, lens or a mirror), and/or an energy source. The result may be used in evaluating one or more positions at the target surface. The result may be used in evaluating the height at various positions of the target surface. The height may be relative to a known height (e.g., height baseline, or predetermined height), to the platform, the floor of the processing chamber, or to other positions within the 3D object or within the target surface. The result may be used in the evaluation of the deviation from planarity of the target surface. The result may provide a vertical and/or horizontal height profile of the target surface. The result may provide a height and/or planarity profile of the target surface. The resolution of the height and/or planarity profile may correspond to the FLS of a cross section of the sensing energy beam, or the FLS of a footprint of the sensing energy beam on the target surface. The resolution of the height and/or planarity profile may correspond to the sensor resolution. The resolution of the height and/or planarity profile may correspond to the FLS of a cross section of the transforming energy beam, or the FLS of a footprint of the transforming energy beam on the target surface.

In some embodiments, the radiative energy beam sensed by the metrology (e.g., position) sensor is the reflection of the transforming energy beam from the target surface. In some examples, the radiative energy sensed by the metrology sensor is an energy beam different from a reflection of the transforming energy beam. For example, the radiative energy may be a reflection of the sensing energy beam from the target surface. The detector (e.g., FIG. 3, 318) may be coupled to the controller. For example, the detector (e.g., FIG. 3, 318) may be coupled to the computer (e.g., through a communication channel). The controller may analyze the signal detected by the detector. The output of the detector may be taken into account by the systems, software, and/or apparatuses (e.g., by the controller) to direct alteration of at least one function of the 3D printing as a result of an analysis of the detector output. The at least one function may include at least one characteristic of the transforming energy beam.

In some embodiments, the optical detector (e.g., temperature detector) comprises an optical setup. The optical setup may comprise a lens arrangement. The optical setup may comprise a beam splitter. The detector may comprise a focusing lens. The detector may view (e.g., detect) a focused point (e.g., of the exposed surface of the material bed). The optical setup may be the same optical setup used by the transforming energy beam (e.g., through which the transforming energy beam travels). The optical setup may be different from the optical setup used by the transforming energy beam. The sensing (e.g., and detecting) energy beam and the transforming energy beam may be confocal. The sensing energy beam and the transforming energy beam may travel in different paths. The sensing energy beam and transforming energy beam may travel through the same different optical windows. The sensing energy beam and the transforming energy beam may be translated by the same or by different scanners. For example, the transforming energy beam may be translated by a first scanner, and the sensing energy beam may be translated by a second scanner, wherein the second scanner tracks (e.g., chases) the first energy beam. The detector (e.g., optical detector) may control (e.g., monitor and/or regulate) the reflected energy from the target surface (e.g., exposed surface of the material bed). The detector energy beam (e.g., the reflected sensing energy beam from the target surface) may be coaxial or non-coaxial with a reflection of the transforming energy beam. The detected energy beam that is reflected from the target surface (e.g., from the exposed surface of the material bed and/or forming layer of hardened material) may be used to image these respective exposed surfaces.

In some embodiments, the optical sensor is used for temperature measurements and/or for metrological measurements. The temperature sensor and/or positional sensor may comprise the optical sensor. The optical sensor may include an analogue device (e.g., CCD). The optical sensor may include a p-doped metal-oxide-semiconductor (MOS) capacitor, charge-coupled device (CCD), active-pixel sensor (APS), micro/nano-electro-mechanical-system (MEMS/NEMS) based sensor, or any combination thereof. The APS may be a complementary metal-oxide-semiconductor (CMOS) sensor. The MEMS/NEMS sensor may include a MEMS/NEMS inertial sensor. The MEMS/NEMS sensor may be based on silicon, polymer, metal, ceramics, or any combination thereof. The optical sensor may comprise laser scanner, or an interferometer. The interferometer may comprise a coherent (e.g., white) light, or partial coherence interferometer. The temperature sensor (e.g., thermal sensor) may sense a IR radiation (e.g., photons). The thermal sensor may sense a temperature of at least one melt pool. The metrology sensor may comprise a sensor that measures the FLS (e.g., depth) of at least one melt pool. The transforming energy beam and the sensing energy beam (e.g., thermal sensor beam and/or metrology sensor energy beam) may be focused on (e.g., substantially) the same position. The transforming energy beam and the sensing energy beam (e.g., thermal sensor beam and/or metrology sensor energy beam) may be confocal.

The methods, systems, software, and/or apparatuses described herein may take into account (e.g., by a controller) sensor signals from at least a portion of the surface (e.g., of the exposed material bed, and/or of the protruding 3D object from the material bed). The signals may correspond to positional signals. The positions may include vertical, horizontal, and/or angular positions. The signals may correspond to height and/or lateral differences of corresponding surface positions.

In some embodiments, the methods, systems, apparatuses, and/or software described herein may take into account at least one or more sensor measurements. As a consequence of the measurements, the controller may direct alteration of one or more functions of the 3D printing process (e.g., of the transforming energy beam). The direction may include the use of a software that is coupled to the sensor through a first communication channel. The software may be coupled to at least one function of the 3D printer through a second communication channel. The first and second communication channels may be the same communication channel or different communication channels.

In some embodiments, the methods, systems, apparatuses, and/or software described herein may take into account at least one or more temperature sensor measurements. As a consequence of the temperature measurements, the controller may direct alteration of one or more functions of the 3D printing process (e.g., of the transforming energy beam). The temperature measurements may comprise temperature measurements of the surface (e.g., target surface, e.g., exposed surface of the material bed, and/or of the 3D object). The temperature measurements may include contact or non-contact temperature measurements. The controller may take into account both the positional sensor measurements and the temperature sensor measurements. As a consequence of the temperature measurements, one or more functions of the 3D printing process (e.g., of the transforming energy beam) may be altered (e.g., directed by the controller). The temperature measurements may comprise temperature measurements of one or more positions of the surface.

In some embodiments, the methods, systems, software, and/or apparatuses described herein may consider at least one or more measurements of the transforming energy beam. The measurements may comprise measuring the cross section of the energy beam (e.g., in a direction perpendicular to its propagation), footprint on the exposed surface of the material bed, energy flux, energy per unit area, dwell time, delay time (e.g., beam off time), pulsing beam frequency, wavelength, or velocity at which the transforming energy beam travels on the exposed surface of the material bed. The measurements may comprise measuring the path (e.g., hatch) spacing of the transforming energy beam path traveled on the target surface (e.g., exposed surface of the material bed). For example, the controller may take into account at least one or more measurements of the transforming energy beam characteristics. As a consequence of the transforming energy beam characteristics measurement(s), the controller may direct alteration of one or more functions of the 3D printing process (e.g., of and/or associated with the transforming energy beam). The controller may take into account two or more of (i) positional sensor measurements, (ii) temperature sensor measurements, (iii) energy-source power measurement, and (iv) measurement of at least one characteristic of the transforming energy beam. For example, the methods, systems, software and/or apparatuses may consider both the positional sensor measurements and the transforming energy beam characteristics measurements. As a consequence of the transforming energy beam characteristics measurements, one or more functions of the 3D printing process (e.g., of the and/or associated with the transforming energy beam) may be altered. The alteration may be directed by the controller. For example, the alteration may be using a software. For example, the alteration may be through a communication channel.

The methods, systems, apparatuses, and/or software described herein may control (e.g., regulate) the deformation of at least a portion of the 3D object by controlling at least one function of the 3D printing (e.g., at least one characteristic of the transforming energy beam and/or its energy source) while measuring a position of the surface and/or while measuring the temperature of the surface. The control may be during the formation of the 3D object. The control may be during the 3D printing process. The control may be real-time control. The control may be in situ control. The control may be at least during the transforming operation. The control may be at least during the hardening of the transformed material. The control may be at least during the formation of a hardened layer (or a portion thereof) as part of the 3D object.

In some embodiments, the material (e.g., pre-transformed material, transformed material, or hardened material) comprises elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The ceramic material may comprise cement. The ceramic material may comprise alumina. The material may comprise sand, glass, or stone. In some embodiments, the material may comprise an organic material, for example, a polymer or a resin. The organic material may comprise a hydrocarbon. The polymer may comprise styrene. The organic material may comprise carbon and hydrogen atoms, carbon and oxygen atoms, carbon and nitrogen atoms, carbon and sulfur atoms, or any combination thereof. In some embodiments, the material may exclude an organic material (e.g., polymer). The polymer may comprise plastic, polyurethane, or wax. The polymer may comprise a resin. The material may comprise a solid or a liquid. In some embodiments, the material may comprise a silicon-based material, for example, silicon based polymer or a resin. The material may comprise an organosilicon-based material. The material may comprise silicon and hydrogen atoms, silicon and carbon atoms, or any combination thereof. In some embodiments, the material may exclude a silicon-based material. The material may comprise a particulate material. The particulate material may comprise solid or semi-solid (e.g., gel). The particulate material may comprise powder. The powder material may comprise a solid. The powder material may be coated by a coating (e.g., organic coating such as the organic material (e.g., plastic coating)). The material may be devoid of organic material. In some examples, the material may not be coated by organic and/or silicon based materials. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) or wires.

In some embodiments, the pre-transformed material comprises a powder material. The pre-transformed material may comprise a solid material. The pre-transformed material may comprise one or more particles or clusters. The term "powder," as used herein, generally refers to a solid having fine particles. Powders may be granular materials. The powder particles may comprise micro particles. The powder particles may comprise nanoparticles. In some examples, a powder comprising particles having an average FLS of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, or 100 μm. The particles comprising the powder may have an average FLS of at most about 100 μm, 80 μm, 75 μm, 70 μm, 65 μm, 60 μm, 55 μm, 50 μm, 45 μm, 40 μm, 35 μm, 30 μm, 25 μm, 20 μm, 15 μm, 10 μm, 5 μm, 1 μm, 500 nm, 400 nm, 300 nm, 200 nm, 100 nm, 50 nm, 40 nm, 30 nm, 20 nm, 10 nm, or 5 nm. In some cases, the powder may have an average fundamental length scale between any of the values of the average particle fundamental length scale listed above (e.g., from about 5 nm to about 100 μm, from about 1 μm to about 100 μm, from about 15 μm to about 45 μm, from about 5 μm to about 80 μm, from about 20 μm to about 80 μm, or from about 500 nm to about 50 μm). The powder can be composed of individual particles. The individual particles can be spherical, oval, prismatic, cubic, wires, or irregularly shaped. The particles can have a FLS. The powder can be composed of a homogenously shaped particle mixture such that all of the particles have substantially the same shape and FLS magnitude within at most 1%, 5%, 8%, 10%, 15%, 20%, 25%, 30%, 35%, 40%, 50%, 60%, or 70%, distribution of FLS. In some cases, the powder can be a heterogeneous mixture such that the particles have variable shape and/or FLS magnitude.

In some embodiments, at least a portion of the layer can be transformed to a transformed material (e.g., using an energy beam) that may subsequently form at least a fraction (also used herein "a portion," or "a part") of a hardened (e.g., solidified) 3D object. At times a layer of transformed or hardened material may comprise a cross section of a 3D object (e.g., a horizontal cross section). The layer may correspond to a cross section of a desired 3D object. At times a layer of transformed or hardened material may comprise a deviation from a cross section of a model of a requested 3D object. The deviation may include vertical and/or horizontal deviation. A pre-transformed material may be a powder material. In some embodiments, the pre-transformed material is deposited above a platform in (e.g., planar) one or more planar layers. A pre-transformed material layer (or a portion thereof) can have a thickness (e.g., layer height) of at least about 0.1 micrometer (μm), 0.5 μm, 1.0 μm, 10 μm, 50 μm, 100 μm, 150 μm, 200 μm, 300 μm, 400 μm, 500 μm, 600 μm, 700 μm, 800 μm, 900 μm, or 1000 μm. A pre-transformed material layer (or a portion thereof) can have a thickness of at most about 1000 μm, 900 μm, 800 μm, 700 μm, 600 μm, 500 μm, 450 μm, 400 μm, 350 μm, 300 μm, 250 μm, 200 μm, 150 μm, 100 μm, 75 μm, 50 μm, 40 μm, 30 μm, 20 μm, 10 μm, 5 μm, 1 μm, or 0.5 μm. A pre-transformed material layer (or a portion thereof) may have any value in between the afore-mentioned layer thickness values (e.g., from about 1000 μm to about 0.1 μm, 800 μm to about 1 μm, from about 600 μm to about 20 μm, from about 300 μm to about 30 μm, or from about 1000 μm to about 10 μm). At times, the controller directs adjustment of the thickness (e.g., height. E.g., FIG. 15, the distance from surface 1512 to surface 1514) of a layer of pre-transformed material (e.g., that is disposed to form the material bed). The material composition of at least one layer within the material bed may differ from the material composition within at least one other layer in the material bed. The difference (e.g., variation) may comprise difference in crystal or grain structure. The variation may comprise variation in grain orientation, material density, degree of compound segregation to grain boundaries, degree of element segregation to grain boundaries, material phase, metallurgical phase, material porosity, crystal phase, or crystal structure. The microstructure of the printed object may comprise planar structure, cellular structure, columnar dendritic structure, or equiaxed dendritic structure. The controller may direct formation of a certain type of metallurgical microstructure to be (e.g., predominantly) formed during the 3D printing. The systems, apparatuses, and/or methods may form a desired metallurgical structure during (e.g., a specific stage of) the 3D printing.

In some examples, the pre-transformed material in one or more layers of the material bed, differs from the pre-transformed material in a different one or more layers of the material bed. For example, the pre-transformed materials of at least one layer in the material bed may differ in the FLS of its particles (e.g., powder particles) from the FLS of the pre-transformed material within at least one other layer in the material bed. For example, the pre-transformed materials of at least one layer in the material bed may differ in material type and/or composition from the material type and/or composition (respectively) of the pre-transformed material within at least one other layer in the material bed. A layer may comprise two or more material types at any combination. For example, two or more elemental metals, two or more metal alloys, two or more ceramics, two or more allotropes of elemental carbon. For example, an elemental metal and a metal alloy, an elemental metal and a ceramic, an elemental metal and an allotrope of elemental carbon, a metal alloy and a ceramic, a metal alloy and an allotrope of elemental carbon, or a ceramic and an allotrope of elemental carbon. All the layers of pre-transformed material deposited during the 3D printing process may be of (e.g., substantially) the same material type and/or composition. In some instances, a metal alloy is formed in situ during the process of transforming at least a portion of the material bed. In some instances, a metal alloy is not formed in situ during the process of transforming at least a portion of the material bed. In some instances, a metal alloy is formed prior to the process of transforming at least a portion of the material bed. In a multiplicity (e.g., mixture) of pre-transformed (e.g., powder) materials, one pre-transformed material may be used as support (i.e., supportive powder), as an insulator, as a cooling member (e.g., heat sink), or as any combination thereof.

In some instances, adjacent components in the material bed are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size.

In some embodiments, the pre-transformed material (e.g., powder material) is chosen such that the material is (or forms in situ) the desired and/or otherwise predetermined material for the 3D object. A layer of the 3D object may comprise a single type of material. For example, a layer of the 3D object may comprise a single elemental metal type, or a single metal alloy type. In some examples, a layer within the 3D object may comprise several types of material (e.g., an elemental metal and an alloy, an alloy and ceramics, or an alloy and an allotrope of elemental carbon). In certain embodiments, each type of material comprises only a single member of that type. For example, a single member of elemental metal (e.g., iron), a single member of metal alloy (e.g., stainless steel), a single member of ceramic material (e.g., silicon carbide or tungsten carbide), or a single member (e.g., an allotrope) of elemental carbon (e.g., graphite). In some cases, a layer of the 3D object comprises more than one type of material. In some cases, a layer of the 3D object comprises more than one member of a material type.

The elemental metal can be an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare-earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth.

The metal alloy can be an iron based alloy, nickel based alloy, cobalt based alloy, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel. For example, the super alloy may comprise Inconel 600, 617, 625, 690, 718, or X-750. The nickel base alloy may comprise MAR-246. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising, devices, impellers, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, i-pad), air conditioning, generators, furniture, musical equipment, art, jewelry, cooking equipment, or sport gear. The metal (e.g., alloy or elemental) may comprise an alloy used for products for human and/or veterinary applications comprising implants, or prosthetics. The metal alloy may comprise an alloy used for applications in the fields comprising human and/or veterinary surgery, implants (e.g., dental), or prosthetics. The metal (e.g., alloy or elemental) may comprise an alloy used for products comprising a rotating part. The rotating part may be of a centrifugal pump, compressor, or other machine designed to move a fluid (e.g., fuel) by rotation.

The alloy may include a superalloy. The alloy may include a high-performance alloy. The alloy may include an alloy exhibiting excellent mechanical strength, resistance to thermal creep deformation, good surface stability, resistance to corrosion, resistance to oxidation, or any combination thereof. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may comprise cast iron, or pig iron. The steel may comprise Bulat steel, Chromoly, Crucible steel, Damascus steel, Hadfield steel, High speed steel, HSLA steel, Maraging steel, Reynolds 531, Silicon steel, Spring steel, Stainless steel, Tool steel, Weathering steel, or Wootz steel. The high-speed steel may comprise Mushet steel. The stainless steel may comprise AL-6XN, Alloy 20, celestrium, marine grade stainless, Martensitic stainless steel, surgical stainless steel, or Zeron 100. The tool steel may comprise Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade steel such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H, or 304H. The steel may comprise stainless steel of at least one crystalline structure selected from the group consisting of austenitic, superaustenitic, ferritic, martensitic, duplex, and precipitation-hardening martensitic, or any combination thereof. Duplex stainless steel may comprise lean duplex, standard duplex, super duplex, or hyper duplex. The stainless steel may comprise surgical grade stainless steel (e.g., austenitic 316, martensitic 420, or martensitic 440). The austenitic 316 stainless steel may comprise 316L, or 316LVM. The steel may comprise 17-4 Precipitation Hardening steel (e.g., type 630, a chromium-copper precipitation hardening stainless steel, or 17-4PH steel).

The titanium-based alloy may comprise alpha alloy, near alpha alloy, alpha and beta alloy, or beta alloy. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38, or higher. In some instances, the titanium base alloy comprises Ti-6Al-4V or Ti-6Al-7Nb.

The Nickel alloy may comprise Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Permalloy, Supermalloy, or Brass. The brass may comprise Nickel hydride, Stainless or Coin silver. The cobalt alloy may comprise Megallium, Stellite (e.g. Talonite), Ultimet, or Vitallium. The chromium alloy may comprise chromium hydroxide, or Nichrome.

The aluminum alloy may comprise AA-8000, Al—Li (aluminum-lithium), Alnico, Duralumin, Hiduminium, Kryron Magnalium, Nambe, Scandium-aluminum, or Y alloy. The magnesium alloy may comprise Elektron, Magnox, or T-Mg—Al—Zn (Bergman phase) alloy.

The copper alloy may comprise Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may comprise Calamine brass, Chinese silver, Dutch metal, Gilding metal, Muntz metal, Pinchbeck, Prince's metal, or Tombac. The Bronze may comprise Aluminum bronze, Arsenical bronze, Bell metal, Florentine bronze, Guanin, Gunmetal, Glucydur, Phosphor bronze, Ormolu, or Speculum metal.

In some examples, the material (e.g., powder material) comprises a material, wherein the constituents of that material (e.g., atoms or molecules) readily lose their outer shell electrons, resulting in a free-flowing cloud of electrons within their otherwise solid arrangement. In some examples the material is characterized in having high electrical conductivity, low electrical resistivity, high thermal conductivity, and/or high density (e.g., as measured at ambient temperature (e.g., R. T., or 20° C.)). The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times," or "multiplied by." The high electrical conductivity can be any value between the afore-mentioned electrical conductivity values (e.g., from about $1*10^5$ S/m to about $1*10^8$ S/m). The low electrical resistivity may be at most about $1*10^{-5}$ ohm times meter ($\Omega*m$), $5*10^{-6}$ $\Omega*m$, $1*10^{-6}$ $\Omega*m$, $5*10^{-7}$ $\Omega*m$, $1*10^{\Omega 7}$ $\Omega*m$, $5*10^{-8}$, or $1*10^{-8}$ $\Omega*m$. The low electrical resistivity can be any value between the afore-mentioned electrical resistivity values (e.g., from about $1\times10^{-5}$ $\Omega*m$ to about $1\times10^{-8}$ $\Omega*m$). The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the afore-mentioned thermal conductivity values (e.g., from about 20 W/mK to about 1000 W/mK). The high density may be at least about 1.5 grams per cubic centimeter (g/cm$^3$), 2 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore-mentioned density values (e.g., from about 1 g/cm$^3$ to about 25 g/cm$^3$).

A metallic material (e.g., elemental metal or metal alloy) can comprise small amounts of non-metallic materials, such as, for example, comprising the elements oxygen, sulfur, or nitrogen. In some cases, the metallic material can comprise the non-metallic material (e.g., and/or elements) in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (on the basis of weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (based on weight, w/w) of non-metallic material (and/or elements). A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

Figure 7:
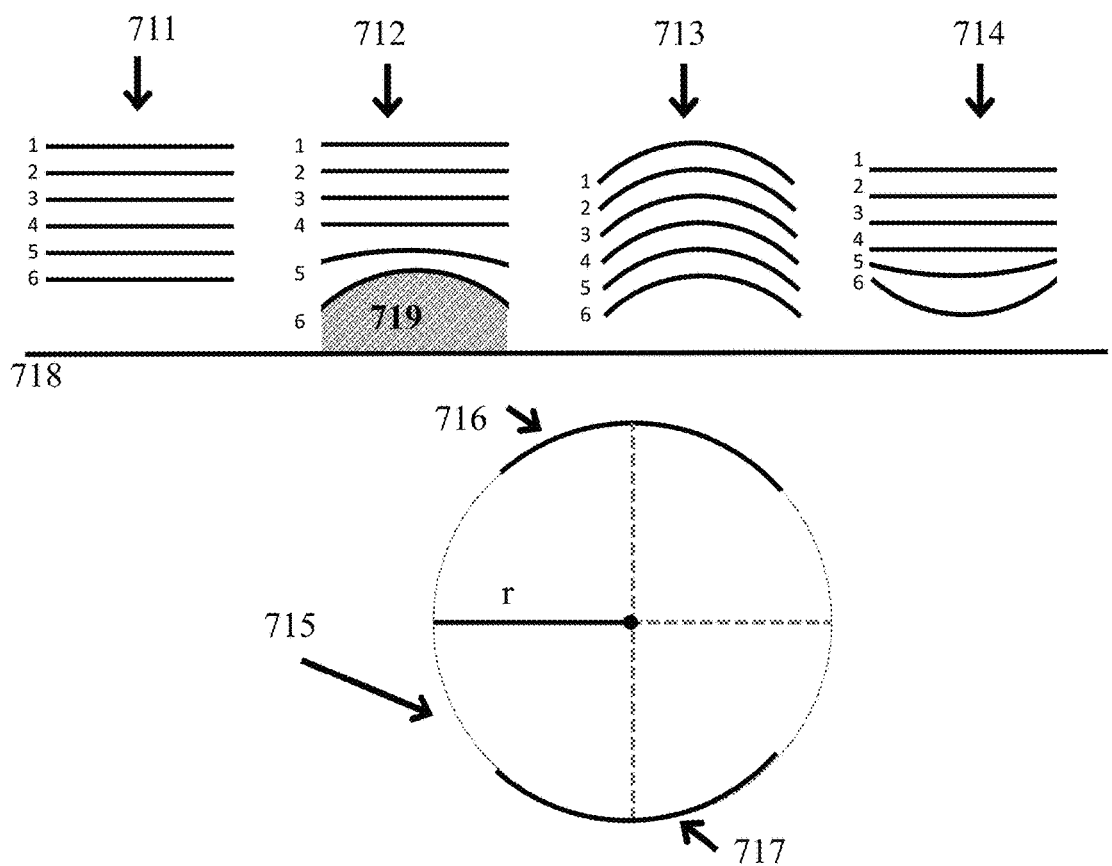
FIG. 7 shows schematics of various vertical cross sectional views of different 3D objects.

The one or more layers within the 3D object may be substantially planar (e.g., flat). The planarity of the layer may be substantially uniform. The height of the layer at a position may be compared to an average plane of that layer. The average plane may be defined by a least squares planar fit of the top-most part of the surface of the layer of hardened material. The average plane may be a plane calculated by averaging the material height at each point on the top surface of the layer of hardened material. The deviation from any point at the surface of the planar layer of hardened material may be at most 20% 15%, 10%, 5%, 3%, 1%, or 0.5% of the height (e.g., thickness) of the layer of hardened material. The substantially planar one or more layers may have a large radius of curvature. FIG. 7 shows an example of a vertical cross section of a 3D object 712 comprising planar layers (layers numbers 1-4) and non-planar layers (e.g., layers numbers 5-6) that have a radius of curvature. FIGS. 7, 716 and 717 are super-positions of curved layer on a circle 715 having a radius of curvature "r." The one or more layers may have a radius of curvature (e.g., substantially) equal to the radius of curvature of the layer surface. The radius of curvature may equal infinity (e.g., when the layer is planar). The radius of curvature of the layer surface (e.g., all the layers of the 3D object) may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 3 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The radius of curvature of the layer surface (e.g., all the layers of the 3D object) may have any value between any of the afore-mentioned values of the radius of curvature (e.g., from about 0.1 cm to about 100 m, from about 10 cm to about 90 m, from about 50 cm to about 10 m, from about 5 cm to about 1 m, from about 50 cm to about 5 m, from about 5 cm to infinity, or from about 40 cm to about 50 m). In some examples, the one or more layers may be included in a planar section of the 3D object, or may be a planar 3D object (e.g., a flat plane). In some instances, part of at least one layer within the 3D object may have any of the radii of curvature mentioned herein, which will designate the radius of curvature of that layer portion.

The 3D object may comprise a layering plane N of the layered structure. FIG. 10C shows an example of a 3D object having a layered structure, wherein 1005 shows an example of a side view of a plane, wherein 1001 shows an example of a layering plane. The layering plane may be the average or mean plane of a layer of hardened material (as part of the 3D object). FIG. 8 shows an example of points X and Y on the surface of a 3D object. In some embodiments, X is spaced apart from Y by the auxiliary feature spacing distance (e.g., as described herein). A sphere of radius XY that is centered at X may lack one or more auxiliary supports or one or more auxiliary support marks that are indicative of a presence or removal of the one or more auxiliary support features (e.g., after completion of the 3D printing). An acute angle between the straight line XY and the direction normal to N may be from about 45 degrees to about 90 degrees. The acute angle between the straight line XY and the direction normal to the layering plane may be of the value of the acute angle alpha (e.g., as described herein). When the angle between the straight line XY and the direction of normal to N is greater than 90 degrees, one can consider the complementary acute angle. The layer structure may comprise any material(s) used for 3D printing. A layer of the 3D structure can be made of a single material or of multiple materials. Sometimes one part of the layer may comprise one material, and another part may comprise a second material different than the first material. A layer of the 3D object may be composed of a composite material. The 3D object may be composed of a composite material. The 3D object may comprise a functionally graded material (e.g., comprising a functionally graded microstructure).

In some embodiments, the generated 3D object may be generated with the accuracy of at least about 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 400 μm, 500 μm, 600 μm, 700 μm, 800 μm, 900 μm, 1000 μm, 1100 μm, or 1500 μm with respect to a model of the 3D object (e.g., the desired 3D object) with respect to the (virtual) model of a requested 3D object. With respect to a model of the 3D object, the generated 3D object may be generated with the accuracy of any accuracy value between the afore-mentioned values (e.g., from about 5 μm to about 100 μm, from about 15 μm to about 35 μm, from about 100 μm to about 1500 µm, from about 5 µm to about 1500 µm, or from about 400 µm to about 600 µm).

The hardened layer of transformed material may deform. The deformation may cause a vertical (e.g., height) and/or horizontal (e.g., width and/or length) deviation from a desired uniformly planar layer. The vertical and/or horizontal deviation of the surface of the layer of hardened material from planarity may be at least about 100 µm, 90 µm, 80 µm, 70 µm, 60 µm, 50 µm, 40 µm, 30 µm, 20 µm, 10 µm, or 5 µm. The horizontal and/or vertical deviation of the surface of the layer of hardened material from planarity may be at most about 100 µm, 90 µm, 80, 70 µm, 60 µm, 50 µm, 40 µm, 30 µm, 20 µm, 10 µm, or 5 µm. The horizontal and/or vertical deviation of the surface of the layer of hardened material from planarity may be any value between the afore-mentioned height deviation values (e.g., from about 100 µm to about 5 µm, from about 50 µm to about 5 µm, from about 30 µm to about 5 µm, or from about 20 µm to about 5 µm). The height uniformity may comprise high precision uniformity. The resolution of the 3D object may be at least about 100 dots per inch (dpi), 300 dpi, 600 dpi, 1200 dpi, 2400 dpi, 3600 dpi, or 4800 dpi. The resolution of the 3D object may be any value between the afore-mentioned values (e.g., from 100 dpi to 4800 dpi, from 300 dpi to 2400 dpi, or from 600 dpi to 4800 dpi). A dot may be a melt pool. A dot may be a step (e.g., layer height). A dot may be a height of the layer of hardened material. A step may have a value of at most the height of the layer of hardened material. The vertical (e.g., height) uniformity of a layer of hardened material may persist across a portion of the layer surface that has a FLS (e.g., a width and/or a length) of at least about 1 mm, 2 mm, 3 mm, 4 mm, 5 mm, or 10 mm; and have a height deviation of at least about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80 µm, 70 µm, 60 µm, 50 µm, 40 µm, 30 µm, 20 µm, or 10 µm. The height uniformity of a layer of hardened material may persist across a portion of the target surface that has a FLS (e.g., a width and/or a length) of any value between the afore-mentioned width and/or length values (e.g., from about 10 mm to about 10 µm, from about 10 mm to about 100 µm, or from about 5 mm to about 500 µm). The target surface may be a layer of hardened material (e.g., as part of the 3D object).

Characteristics of the 3D object (e.g., hardened material) and/or any of its parts (e.g., layer of hardened material) can be measured by any of the following measurement methodologies. For example, the FLS values (e.g., of the width, height uniformity, auxiliary support space, and/or radius of curvature) of the layer of the 3D object and any of its components (e.g., layer of hardened material) may be measured by any of the following measuring methodologies. The measurement methodologies may comprise a microscopy method (e.g., any microscopy method described herein). The measurement methodologies may comprise a coordinate measuring machine (CMM), measuring projector, vision measuring system, and/or a gauge. The gauge can be a gauge distometer (e.g., caliper). The gauge can be a go-no-go gauge. The measurement methodologies may comprise a caliper (e.g., vernier caliper), positive lens, interferometer, or laser (e.g., tracker). The measurement methodologies may comprise a contact or by a non-contact method. The measurement methodologies may comprise one or more sensors (e.g., optical sensors and/or metrological sensors). The measurement methodologies may comprise a metrological measurement device (e.g., using metrological sensor(s)). The measurements may comprise a motor encoder (e.g., rotary and/or linear). The measurement methodologies may comprise using an electromagnetic beam (e.g., visible or IR). The microscopy method may comprise ultrasound or nuclear magnetic resonance. The microscopy method may comprise optical microscopy. The microscopy method may comprise electromagnetic, electron, or proximal probe microscopy. The electron microscopy may comprise scanning, tunneling, X-ray photo-, or Auger electron microscopy. The electromagnetic microscopy may comprise confocal, stereoscope, or compound microscopy. The microscopy method may comprise an inverted or non-inverted microscope. The proximal probe microscopy may comprise atomic force, scanning tunneling microscopy, or any other microscopy method. The microscopy measurements may comprise using an image analysis system. The measurements may be conducted at ambient temperatures (e.g., R.T.), melting point temperature (e.g., of the pre-transformed material) or cryogenic temperatures.

The microstructures (e.g., of melt pools) of the 3D object may be measured by a microscopy method (e.g., any microscopy method described herein). The microstructures may be measured by a contact or by a non-contact method. The microstructures may be measured by using an electromagnetic beam (e.g., visible or IR). The microstructure measurements may comprise evaluating the dendritic arm spacing and/or the secondary dendritic arm spacing (e.g., using microscopy). The microscopy measurements may comprise an image analysis system. The measurements may be conducted at ambient temperatures (e.g., R.T.), melting point temperature (e.g., of the pre-transformed material), or cryogenic temperatures.

Various distances relating to the chamber can be measured using any of the measurement techniques. For example, the gap distance (e.g., from the cooling member to the exposed surface of the material bed) may be measured using any of the measurement techniques. For example, the measurements techniques may comprise interferometry and/or confocal chromatic measurements. The measurements techniques may comprise at least one motor encoder (rotary, linear). The measurement techniques may comprise one or more sensors (e.g., optical sensors and/or metrological sensors). The measurement techniques may comprise at least one inductive sensor. The measurement techniques may include an electromagnetic beam (e.g., visible or IR). The measurements may be conducted at ambient temperatures (e.g., R.T.), melting point temperature (e.g., of the pre-transformed material) or cryogenic temperatures.

In some embodiments, the methods described herein provide surface uniformity across the exposed surface of the material bed (e.g., top of a powder bed). For example, the surface uniformity may be such that portions of the exposed surface that comprises the dispensed material, which are separated from one another by a distance of from about 1 mm to about 10 mm, have a vertical (e.g., height) deviation from about 100 µm to about 5 µm. The methods described herein may achieve a deviation from a planar uniformity of the layer of pre-transformed material (e.g., powder) in at least one plane (e.g., horizontal plane) of at most about 20%, 10%, 5%, 2%, 1% or 0.5%, as compared to the average or mean plane (e.g., horizontal plane) created (e.g., formed) at the exposed surface of the material bed (e.g., top of a powder bed) and/or as compared to the platform (e.g., building platform). The vertical deviation can be measured by using one or more sensors (e.g., optical sensors).

The 3D object can have various surface roughness profiles, which may be suitable for various applications. In some examples, the surface roughness is the deviations in the direction of the normal vector of a real surface (e.g., average or mean planarity of an exposed surface of the 3D object), from its ideal form. The surface may be the exposed top or bottom surface of a layer of hardened material. The surface may be the exposed top or bottom surface of a ledge of hardened material. The ledge may be (e.g., substantially) planar, or comprising an angle with respect to the platform (e.g., a rising or declining ledge). The surface roughness may be measured as the arithmetic average of the roughness profile (hereinafter "Ra"). The 3D object can have a Ra value of at least about 300 µm, 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The formed object can have a Ra value of at most about 300 µm, 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The 3D object can have a Ra value between any of the afore-mentioned Ra values (e.g., from about 300 µm to about 50 µm, from about 50 µm to about 5 µm, from about 5 µm to about 300 nm, from about 300 nm to about 30 nm, or from about 300 µm to about 30 nm). The Ra values may be measured by a roughness tester and/or by a microscopy method (e.g., any microscopy method described herein). The measurements may be conducted at ambient temperatures (e.g., R.T.), melting point temperature (e.g., of the pre-transformed material) or cryogenic temperatures. The roughness (e.g., Ra value) may be measured by a contact or by a non-contact method. The roughness measurement may comprise one or more sensors (e.g., optical sensors). The roughness measurement may comprise using a metrological measurement device (e.g., using metrological sensor(s)). The roughness may be measured using an electromagnetic beam (e.g., visible or IR).

The 3D object may be composed of successive layers of solid material that originated from a transformed material (e.g., that subsequently hardened). The successive layers of solid material may correspond to successive cross sections of a desired 3D object (e.g., virtual slices). The transformed material may connect (e.g., weld) to a hardened (e.g., solidified) material. The hardened material may reside within the same layer as the transformed material, or in another layer (e.g., a previous layer). In some examples, the hardened material comprises disconnected parts of the 3D object, that are subsequently connected by newly transformed material (e.g., in a subsequently formed layer). Transforming may comprise fusing, binding or otherwise connecting the pre-transformed material (e.g., connecting the particulate material). Fusing may comprise sintering or melting.

A cross section (e.g., vertical cross section) of the generated (i.e., formed) 3D object may reveal a microstructure or a grain structure indicative of a layered deposition. Without wishing to be bound to theory, the microstructure or grain structure may arise due to the solidification of transformed (e.g., powder) material that is typical to and/or indicative of the 3D printing method. For example, a cross section may reveal a microstructure resembling ripples or waves that are indicative of (e.g., successive) solidified melt pools that may be formed during the 3D printing process. FIGS. 10A and 10B show examples of successive melt pool in a 3D object that are arranged in rows (e.g., layers).

The repetitive layered structure of the solidified melt pools relative to an external plane of the 3D object may reveal the orientation at which the part was printed, as the deposition of the melt pools is in a substantially horizontal plane. FIG. 10C shows examples of 3D objects that are formed by layerwise deposition, which layer orientation with respect to an external plane of the 3D object reveals the orientation of the object during its 3D printing. For example, a 3D object having an external plane 1001 was formed in a manner that both the external plane 1001 and the layers of hardened material (e.g., 1005) were formed substantially parallel to the platform 1003. For example, a 3D object having an external plane 1002 was formed in a way that the external plane 1002 formed an angle with the platform 1003, whereas the layers of hardened material (e.g., 1006) were formed substantially parallel to the platform 1003 (e.g., in accordance with a layerwise deposition technique). The 3D object having an external plane 1004 shows an example of a 3D object that was generated such that its external plane 1004 formed an angle (e.g., alpha) with the platform 1003; which printed 3D object was placed on the platform 1003 after its generation was complete (e.g., in its natural orientation); wherein during its generation (e.g., build), the layers of hardened material (e.g., 1007) were oriented substantially parallel to the platform 1003. The natural orientation is an orientation in which the 3D object would be expected to reside in during everyday use. FIGS. 10A and 10B show 3D objects comprising layers of solidified melt pools that are arranged in layers having layering planes (e.g., 1020).

In some embodiments, the (e.g., vertical and/or horizontal) cross section of the 3D object reveals a substantially repetitive microstructure (or grain structure). The microstructure (or grain structure) may comprise (e.g., substantially) repetitive variations in material composition, grain orientation, material density, degree of compound segregation or of element segregation to grain boundaries, material phase, metallurgical phase, crystal phase, crystal structure, material porosity, or any combination thereof. The microstructure (or grain structure) may comprise (e.g., substantially) repetitive solidification of layered melt pools. (e.g., FIGS. 10A-10B). The (e.g., substantially) repetitive microstructure may have an average height of at least about 0.5 µm, 1 µm, 5 µm, 10 µm, 20 µm, 30 µm, 40 µm, 50 µm, 60 µm, 70 µm, 80 µm, 90 µm, 100 µm, 150 µm, 200 µm, 250 µm, 300 µm, 350 µm, 400 µm, 450 µm, 500 µm, or 1000 µm. The (e.g., substantially) repetitive microstructure may have an average height of at most about 1000 µm, 500 µm, 450 µm, 400 µm, 350 µm, 300 µm, 250 µm, 200 µm, 150 µm, 100 µm, 90 µm, 80 µm, 70 µm, 60 µm, 50 µm, 40 µm, 30 µm, 20 µm, or 10 µm. The substantially repetitive microstructure may have an average height of any value between the afore-mentioned values (e.g., from about 0.5 µm to about 1000 µm, from about 15 µm to about 50 µm, from about 5 µm to about 150 µm, from about 20 µm to about 100 µm, or from about 10 µm to about 80 µm). The microstructure (e.g., melt pool) height may correspond to the height of a layer of hardened material. The layer height can be seen in the example of FIG. 5 showing a layer of hardened material with a height that is designated by "hl".

In some examples, the pre-transformed material within the material bed (e.g., that was not transformed to form the 3D object) can be configured to provide support to the 3D object. For example, the supportive pre-transformed material (e.g., powder) may be of the same type of pre-transformed material from which the 3D object is generated, of a different type, or any combination thereof. The pre-transformed material may be a particulate material (e.g., powder). The pre-transformed material may be flowable during at least a portion of the 3D printing (e.g., during the entire 3D printing). The material bed may be at a (e.g., substantially) constant pressure during the 3D printing. The material bed may lack a pressure gradient during the 3D printing. The pre-transformed material within the material bed (e.g., that was not transformed to form the 3D object) can be at an ambient temperature during the 3D printing. The pre-transformed material in any of the layers in the material bed may be flowable. Before, during and/or at the end of the 3D printing process, the pre-transformed material (e.g., powder) that did not transform to form the 3D object may be flowable. The pre-transformed material that did not transform to form the 3D object (or a portion thereof) may be referred to as a "remainder." In some instances, a low flowability pre-transformed material can be capable of supporting a 3D object better than a high flowability pre-transformed material. A low flowability particulate material can be achieved inter alia with a particulate material composed of relatively small particles, with particles of non-uniform size or with particles that attract each other. The pre-transformed material may be of low, medium, or high flowability. The pre-transformed material may have compressibility of at least about 1%, 2%, 3%, 4%, 5%, 6%, 7%, 8%, 9%, or 10% in response to an applied force of 15 kilo Pascals (kPa). The pre-transformed material may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The pre-transformed material may have basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The pre-transformed material may have basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The pre-transformed material may have basic flow energy in between the above listed values of basic flow energy values (e.g., from about 100 mJ to about 1000 mJ, from about 100 mj to about 600 mJ, or from about 500 mj to about 1000 mJ). The pre-transformed material may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0 mJ/g. The powder may have a specific energy of at most 5.0 mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The pre-transformed material may have a specific energy in between any of the above values of specific energy (e.g., from about 1.0 mJ/g to about 5.0 mJ/g, from about 3.0 mJ/g to about 5 mJ/g, or from about 1.0 mJ/g to about 3.5 mJ/g).

In some embodiments, during its formation (e.g., layer-wise generation), the 3D object has one or more auxiliary features. In some embodiments, during its formation (e.g., layerwise generation), the 3D object is devoid of any auxiliary features. The auxiliary feature(s) can be supported by the material (e.g., powder) bed and/or by the enclosure. In some instances, the auxiliary supports may connect (e.g., anchor) to the enclosure (e.g., the platform). In some instances, the auxiliary supports may not connect (e.g., not be anchored) to the enclosure (e.g., the platform). In some instances, the auxiliary supports may not connect to the enclosure, but contact the enclosure. The 3D object comprising one or more auxiliary supports, or devoid of auxiliary support, may be suspended (e.g., float anchorlessly) in the material bed. The floating 3D object (with or without the one or more auxiliary supports) may contact the enclosure.

The term "auxiliary feature," or "auxiliary support" as used herein, generally refers to a feature that is part of a printed 3D object, but is not part of the desired, intended, designed, ordered, modeled, requested or final 3D object delivered to the requesting entity. Auxiliary feature(s) (e.g., auxiliary supports) may provide structural support during and/or subsequent to the formation of the 3D object. Auxiliary feature(s) may enable the removal of energy from the 3D object while it is being formed. Examples of an auxiliary feature comprise (heat) fin, wire, anchor, handle, support, pillar, column, frame, footing, scaffold, flange, projection, protrusion, mold (a.k.a. mould), platform (e.g., base), or any other stabilization feature. In some instances, the auxiliary support is a scaffold that encloses the 3D object or part thereof. The scaffold may comprise lightly sintered or lightly fused pre-transformed (e.g.,) material. The scaffold may comprise a continuously sintered (e.g., lightly sintered) structure that spans at most about 1 millimeter (mm), 2 mm, 5 mm or 10 mm. The scaffold may comprise a continuously sintered structure that spans at least about 1 millimeter (mm), 2 mm, 5 mm or 10 mm. The scaffold may comprise a continuously sintered structure having a FLS between any of the afore-mentioned dimensions (e.g., from about 1 mm to about 10 mm, or from about 1 mm to about 5 mm). In some examples, the 3D object may be printed without a supporting scaffold. The supporting scaffold may engulf at least a portion of the 3D object (e.g., the entire 3D object). For example, a supporting scaffold that floats anchorlessly in the material bed, or that is connected to at least a portion of the enclosure. The supporting scaffold may comprise a dense arrangement (e.g., array) of support structures. The support(s) or support mark(s) can stem from or appear on the surface of the 3D object. The auxiliary supports or support marks can stem from or appear on an external surface and/or on an internal surface (e.g., a cavity within the 3D object). The 3D object can have auxiliary features that are supported by the material bed (e.g., powder bed) and not touch the base, substrate, container accommodating the material bed, and/or the bottom of the enclosure. The 3D part (3D object) in a complete or partially formed state, can be completely supported by the material bed (e.g., without being anchored to the substrate, base, container accommodating the powder bed, or otherwise to the enclosure). The 3D object in a complete or partially formed state can be (completely) supported by the material bed (e.g., without touching anything except the material constituting the material bed). The 3D object in a complete or partially formed state can be suspended anchorlessly in the material bed without resting on any additional support structures. In some cases, the 3D object in a complete or partially formed state can freely float (e.g., anchorlessly) in the material bed (e.g., during at least a portion of the 3D printing (e.g., during the entire 3D printing)). Suspended may comprise floating, disconnected, anchorless, detached, non-adhered, or free. In some examples, the 3D object may not be anchored (e.g., connected) to at least a part of the enclosure (e.g., during formation of the 3D object, and/or during formation of at least one layer of the 3D object). The enclosure may comprise a platform or wall that define the material bed. The 3D object may not touch and/or not contact enclosure (e.g., during formation of at least one layer of the 3D object).

Figure 34:
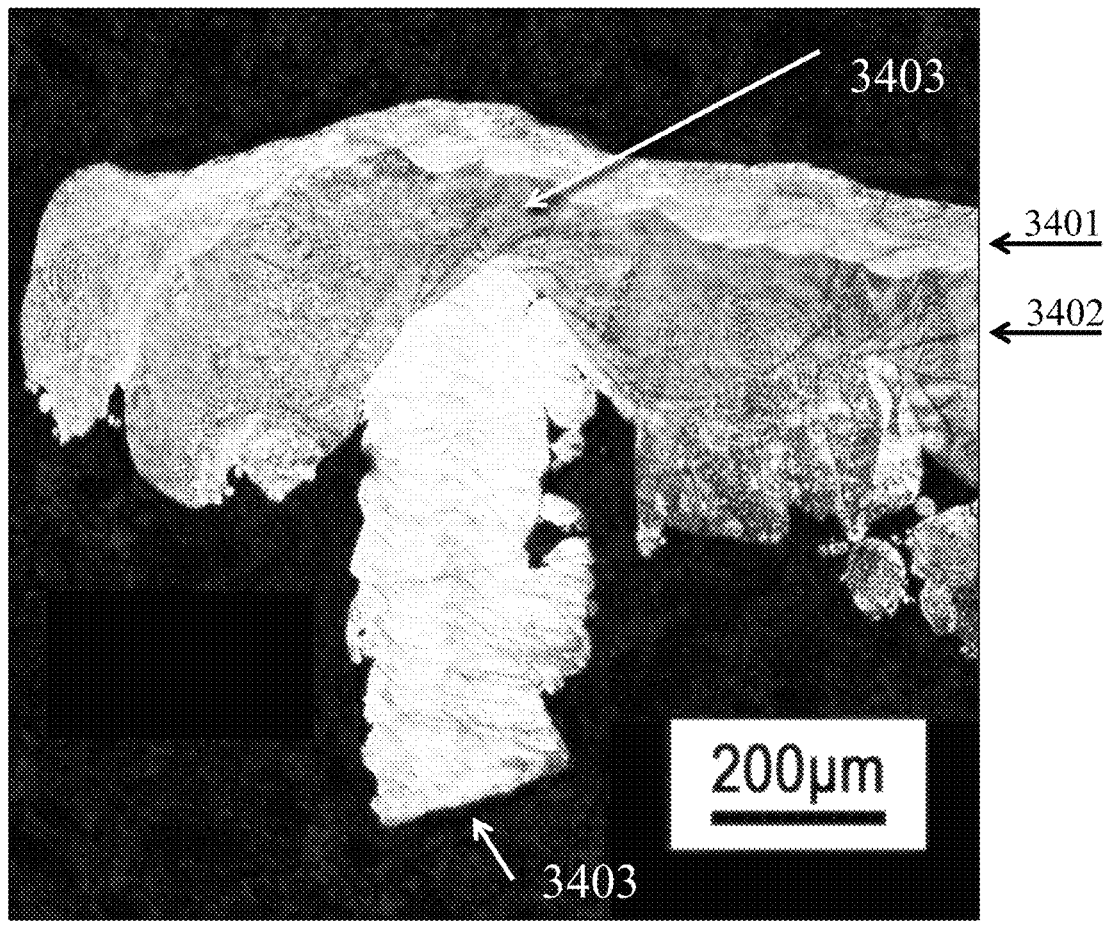
FIG. 34 shows a cross section in a 3D object.

The printed 3D object may be printed without the use of auxiliary features, may be printed using a reduced number of auxiliary features, or printed using spaced apart auxiliary features. In some embodiments, the printed 3D object may be devoid of (one or more) auxiliary support features or auxiliary support feature marks that are indicative of a (e.g., prior) presence and/or removal of the auxiliary support feature(s). The 3D object may be devoid of one or more auxiliary support features and of one or more marks of an auxiliary feature (including a base structure) that was removed (e.g., subsequent to, or contemporaneous with, the generation of the 3D object). The printed 3D object may comprise a single auxiliary support mark. The single auxiliary feature (e.g., auxiliary support or auxiliary structure) may be a platform (e.g., a building platform such as a base or substrate), or a mold. The auxiliary support may adhere to the platform and/or mold. The 3D object may comprise marks belonging to one or more (e.g., previously present) auxiliary structures. The 3D object may comprise two or more marks belonging to auxiliary feature(s). The 3D object may be devoid of marks pertaining to at least one auxiliary support. The 3D object may be devoid of one or more auxiliary support. The mark may comprise variation in grain orientation, variation in layering orientation, layering thickness, material density, the degree of compound segregation to grain boundaries, material porosity, the degree of element segregation to grain boundaries, material phase, metallurgical phase, crystal phase, crystal structure, or any combination thereof; wherein the variation may not have been created by the geometry of the 3D object alone, and may thus be indicative of a prior existing auxiliary support that was removed. The variation may be forced upon the generated 3D object by the geometry of the support. In some instances, the 3D structure of the printed object may be forced by the auxiliary support(s) (e.g., by a mold). For example, a mark may be a point and/or area of discontinuity that is not explained by the geometry of the 3D object, which does not include any auxiliary support(s). The point and/or area of discontinuity may arise form a (e.g., mechanical and/or optical) trimming of the auxiliary support(s). FIG. 34 shows an example of a vertical cross section of 3D object comprising two substantially horizontal layers (e.g., 3401 and 3402), and a vertical auxiliary support that comprises an area of discontinuity 3404 and introduces a geometrical deformation (e.g. 3403) in layers 3401 and 3402 which is caused by the presence of auxiliary support, and cannot be otherwise explained (and thus indicates its presence). A mark may be a surface feature that cannot be explained by the geometry of a 3D object, if it did not include any auxiliary support(s) (e.g., a mold). The two or more auxiliary features or auxiliary support feature marks may be spaced apart by a spacing distance (e.g., XY) of at least 1.5 millimeters (mm), 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm 300 mm, or 500 mm. The two or more auxiliary support features or auxiliary support feature marks may be spaced apart by a spacing distance of any value between the afore-mentioned auxiliary support space values (e.g., from 1.5 mm to 500 mm, from 2 mm to 100 mm, from 15 mm to 50 mm, or from 45 mm to 200 mm). This distance is collectively referred to herein as the "auxiliary feature spacing distance."

The 3D object may comprise an impeller such as, for example, a shrouded (e.g., covered) impeller that is produced as one piece (e.g., comprising blades and cover) during one 3D printing process. The impeller may be used for pumps (e.g., turbo pumps). The 3D object may comprise a turbine, stator, motor, or rotor. The 3D object may comprise a blade (e.g., 3D plane) that is formed in the material bed such that at least one blade (e.g., all blades) is substantially parallel (e.g., completely parallel or almost parallel), or at an angle of at most about 10°, 20°, 30°, 40°, 45°, or 90° with respect to the platform during the formation of the 3D object. The 3D object may comprise a blade (e.g., 3D plane) that is formed in the material bed such that the blade is at any angle between the afore-mentioned angles (e.g., from about 0° to about 10°, from about 0° to about 20°, from about 0° to about 30°, from about 0° to about 40°, from about 0° to about 45°, or from about 0° to about 90° with respect to the platform) during the formation of the 3D object. The 3D object may comprise a blade (e.g., 3D plane) that is formed in the material bed such that the blade is substantially perpendicular (e.g., completely perpendicular or almost perpendicular) or at an angle of at most 80°, 70°, 60°, 50°, or 0° with respect to the rotational axis of the 3D object (e.g., when the 3D object is an impeller, turbine, stator, motor, or rotor). The 3D object may comprise a blade (e.g., 3D plane) that is formed in the material bed such that the blade is at any angle between the afore-mentioned angles (e.g., from about 90° to about 80°, from about 90° to about 70°, from about 90° to about 60°, from about 90° to about 50°, from about 90° to about 0°, with respect to the rotational axis of the 3D object). In some examples, the hanging structure (e.g., blade) does not comprise auxiliary support (e.g., except for the rotational axis). In some examples, the hanging structure (e.g., blade) comprises at least one auxiliary support, wherein the distance between every two auxiliary supports, or a distance between an auxiliary support and the rotational axis, is of a value equating the auxiliary feature spacing distance (e.g., disclosed herein). The 3D object may comprise a complex internal structure. The 3D object may comprise a plurality of blades. A distance between two blades may be at most about 0.1 mm, 0.2 mm, 0.5 mm, 1 mm, 2 mm, 3 mm, 4 mm, 5 mm, 6 mm, 7 mm, 8 mm, 10 mm, 20 mm, 50 mm, or 100 mm. A distance between two blades may be any value between the afore-mentioned values (e.g., from about 0.1 mm to about 100 mm, from about 0.1 mm to about 5 mm, from about 0.1 mm to about 10 mm, from about 0.1 mm to about 50 mm, or from about 10 mm to about 100 mm). The distance between the blades may refer to a vertical distance. The distance between the blades may constitute an atmospheric gap.

Figure 9:
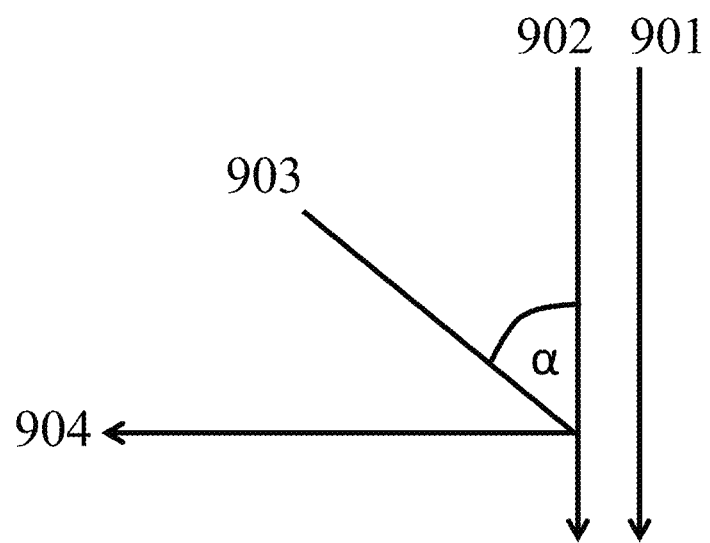
FIG. 9 schematically illustrates a coordinate system.
Figure 18:
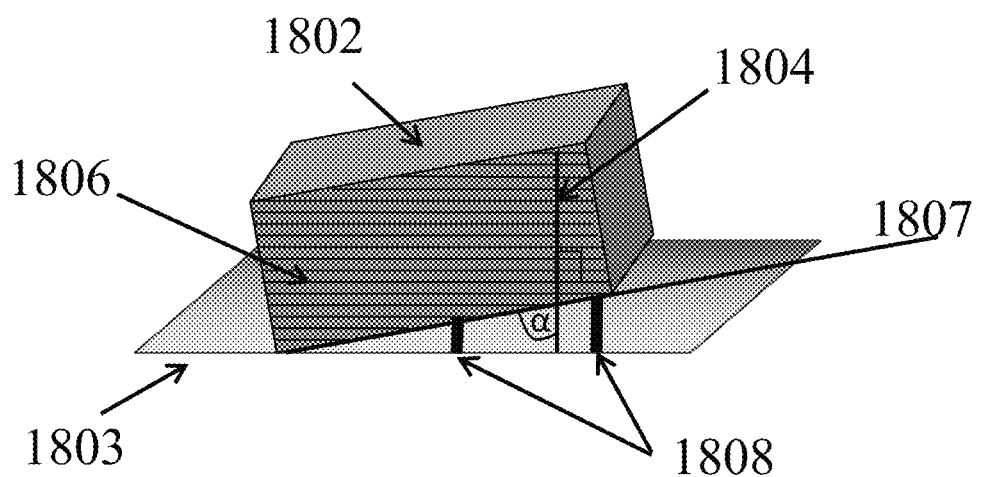
FIG. 18 shows a schematic representation of a 3D object.

FIG. 9 shows an example of a coordinate system. Line 904 represents a vertical cross section of a layering plane. Line 903 represents the (e.g., shortest) straight line connecting the two auxiliary supports or auxiliary support marks. Line 902 represent the normal to the layering plane. Line 901 represents the direction of the gravitational field. The acute (i.e., sharp) angle alpha between the straight (e.g., shortest) line connecting the two auxiliary supports or auxiliary support marks and the direction of normal to the layering plane may be at least about 45 degrees (°), 50°, 55°, 60°, 65°, 70°, 75°, 80°, or 85°. The acute angle alpha between the straight line connecting the two auxiliary supports or auxiliary support marks and the direction of normal to the layering plane may be at most about 90°, 85°, 80°, 75°, 70°, 65°, 60°, 55°, 50°, or 45°. The acute angle alpha between the straight line connecting the two auxiliary supports or auxiliary support marks and the direction of normal to the layering plane may be any angle range between the afore-mentioned angles (e.g., from about 45 degrees(°), to about 90°, from about 60° to about 90°, from about 75° to about 90°, from about 80° to about 90°, or from about 85° to about 90°). FIG. 18 shows an example of a 3D object comprising successive layers of material. Each of the layers has a (e.g., average) layering plane (e.g., 1806). The layering planes may be substantially parallel to each other. The 3D object has a top surface 1802, and is disposed above (e.g., and on) a platform 1803. The 3D object comprises two auxiliary supports 1808. The 3D object comprises an external (e.g., bottom) surface to which the auxiliary supports 1808 are connected. The shortest distance between the two auxiliary supports resides on line 1807. The line 1807 forms an acute angle alpha with the normal 1804 to the layering plane (e.g., 1806). The acute angle alpha between the shortest line connecting the two auxiliary supports (or auxiliary support marks) and the direction normal to the layering plane may be from about 87° to about 90°. An example of a layering plane can be seen in FIG. 7 showing a vertical cross section of a 3D object 711 that comprises layers 1 to 6, each of which are substantially planar. In the schematic example in FIG. 7, the layering plane of the layers can be the layer. For example, layer 1 could correspond to both the layer and the layering plane of layer 1. When the layer is not planar (e.g., FIG. 7, layer 5 of 3D object 712), the layering plane would be the average or mean plane of the layer. The two auxiliary supports or auxiliary support feature marks can be on the same surface (e.g., external surface of the 3D object). The same surface can be an external surface or an internal surface (e.g., a surface of a cavity within the 3D object). When the angle between the shortest straight line connecting the two auxiliary supports or auxiliary support marks and the direction of normal to the layering plane is greater than 90 degrees, one can consider the complementary acute angle. In some embodiments, any two auxiliary supports or auxiliary support marks are spaced apart by at least about 10.5 millimeters or more. In some embodiments, any two auxiliary supports or auxiliary support marks are spaced apart by at least about 40.5 millimeters or more. In some embodiments, any two auxiliary supports or auxiliary support marks are spaced apart by the auxiliary feature spacing distance In some embodiments, the one or more auxiliary features (which may include a base support) are used to hold and/or restrain the 3D object during formation of the 3D object. Such restraint may prevent deformation of the 3D object during its formation and/or during its (e.g., complete) hardening. In some cases, auxiliary features can be used to anchor and/or hold a 3D object or a portion of a 3D object in a material bed (e.g., with or without contacting the enclosure, and/or with or without connecting to the enclosure). The one or more auxiliary features can be specific to a 3D object and can increase the time, energy, material and/or cost required to form the 3D object. The one or more auxiliary features can be removed prior to use or delivery (e.g., distribution) of the 3D object. The longest dimension of a (e.g., horizontal) cross-section of an auxiliary feature can be at most about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension (e.g., FLS) of a (e.g., horizontal) cross-section of an auxiliary feature can be at least about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension of a (e.g., horizontal) cross-section of an auxiliary feature can be any value between the above-mentioned values (e.g., from about 50 nm to about 300 mm, from about 5 μm to about 10 mm, from about 50 nm to about 10 mm, or from about 5 mm to about 300 mm). Eliminating the need for auxiliary features can decrease the time, energy, material, and/or cost associated with generating the 3D object (e.g., 3D part). In some examples, the 3D object may be formed with auxiliary features. In some examples, the 3D object may be formed while connecting to the container that accommodates the material bed (e.g., side(s) and/or bottom of the container).

In some examples, the diminished number of auxiliary supports or lack of one or more auxiliary supports, will provide a 3D printing process that requires a smaller amount of material, energy, material, and/or cost as compared to commercially available 3D printing processes. In some examples, the diminished number of auxiliary supports or lack of one or more auxiliary supports, will provide a 3D printing process that produces a smaller amount of material waste as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the aforesaid values (e.g., from about 1.1 to about 10, or from about 1.5 to about 5).

At least a portion of the 3D object can be vertically displaced (e.g., sink) in the material bed during the 3D printing. During the 3D printing: At least a portion of the 3D object can be surrounded by pre-transformed material within the material bed (e.g., submerged). At least a portion of the 3D object can rest in the pre-transformed material without (e.g., substantial) vertical movement (e.g., displacement). Lack of (e.g., substantial) vertical displacement can amount to a vertical movement (e.g., sinking) of at most about 40%, 20%, 10%, 5%, or 1% of the layer thickness. Lack of (e.g., substantial) sinking can amount to at most about 100 μm, 30 μm, 10 μm, 3 μm, or 1 μm. Substantial may be relative to the effect on the 3D printing process. Lack of substantial sinking and/or vertical movement may refer to a negligible effect of the sinking and/or vertical movement on the 3D printing. At least a portion of the 3D object can rest in the pre-transformed material without substantial movement (e.g., horizontal, vertical, and/or angular). Lack of substantial movement can amount to a movement of at most 100 μm, 30 μm, 10 μm, 3 μm, or 1 μm. The 3D object can rest above (e.g., on) the platform (e.g., substrate) when the 3D object is vertically displaced (e.g., sunk) or submerged in the material bed.

FIG. 1 depicts an example of a system that can be used to generate a 3D object using a 3D printing process disclosed herein (e.g., a 3D printer). The system can include an enclosure (e.g., a chamber comprising a wall 107). At least a fraction of the components in the system (e.g., components of the 3D printer) can be enclosed in the chamber. At least a fraction of the chamber can be filled with a gas to create a gaseous environment (i.e., an atmosphere 126). The gas can be an inert gas (e.g., Argon, Neon, Helium, Nitrogen). The chamber can be filled with at least one other gas (e.g., a mixture of gases). The gas can be a non-reactive gas (e.g., an inert gas). The gaseous environment can comprise argon, nitrogen, helium, neon, krypton, xenon, hydrogen, carbon monoxide, or carbon dioxide. At times, the (gas) composition of the atmosphere may vary be controlled. The control may be before, during, and/or after the 3D printing. The control may be automatically (e.g., using a controller) or manual. During the 3D printing, may comprise before, after, and/or during the irradiation of the target surface by the energy beam. Varying the atmosphere may comprise reducing the oxygen and/or water content. Varying the atmosphere may comprise introducing a reactive agent (e.g., hydrogen). The reactive agent may be a reducing agent. The reactive agent may react with oxygen and/or water in the atmosphere to reduce its concentration therein. The agent may be an absorbing agent (e.g., or oxygen and/or water). The 3D printer may comprise a cryogenic apparatus (e.g., cryogenic finger) that may reduce the content of hydrogen and/or oxygen from the atmosphere (e.g., on which water and/or oxygen can condense and/or crystallize). For example, the atmosphere may comprise a forming gas. The (volume per volume) percentage of reducing agent (e.g., hydrogen) in the atmosphere may be at most about 10%, 8%, 5%, 2%, 1%, 0.5%, 0.1%, or 0.05%. The (volume per volume) percentage of reducing agent in the atmosphere may be of any value between the afore-mentioned values (e.g., from about 10% to about 0.1%, from about 2% to about 0.1%, or from about 5%, to about 0.05%). In some embodiments, the processing chamber may be pressurized above ambient atmospheric pressure. The pressure in the chamber can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The pressure in the chamber can be at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at most about $10^{-8}$ Torr, $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be of any value at a range between any of the afore-mentioned pressure values (e.g., from about $10^{-7}$ Torr to about 1200 Torr, from about $10^{-7}$ Torr to about 1 Torr, from about 1 Torr to about 1200 Torr, from about $10^{-2}$ Torr to about 10 Torr, from about $10^{-7}$ Torr to about 10 bar, from about $10^{-7}$ Torr to about 1 bar, or from about 1 bar to about 10 bar). The pressure can be measured by a pressure gauge. The pressure can be measured at ambient temperature (e.g., R.T.), cryogenic temperature, or at the temperature of the melting point of the pre-transformed material. In some cases, the pressure in the chamber can be standard atmospheric pressure. In some cases, the pressure in the chamber can be ambient pressure (e.g., neutral pressure). In some examples, the chamber can be under vacuum pressure. In some examples, the chamber can be under a positive pressure (e.g., above ambient pressure). The pressure may be ambient pressure during the 3D printing process. The chamber pressures mentioned herein may be during at least a portion of the 3D printing. In some examples, the enclosure and/or any portion thereof (e.g., the material bed) may be at a (e.g., substantially) constant pressure value during the 3D printing process. In some embodiments, the enclosure and/or any portion thereof (e.g., the material bed) may be at a non-varied (e.g., non-gradual) pressure during the 3D printing process. The ambient pressure may be standard atmospheric pressure. The enclosure and/or any portion thereof (e.g., material bed) may experience (e.g., substantial) homogenous pressure distribution throughout the enclosure during at least a portion of the (e.g., the entire) 3D printing process. The chamber can comprise two or more gaseous layers as disclosed, for example, in Provisional Patent Application Ser. No. 62/444,069 which is incorporated herein in its entirety. In some embodiments, the pre-transformed material is pre-treated to remove oxygen and/or water. The pre-transformed material may be kept in a (e.g., substantially) dry and/or oxygen free environment during at least one 3D printing cycle.

The gaseous environment can comprise a gas selected from the group consisting of argon, nitrogen, helium, neon, krypton, xenon, hydrogen, carbon monoxide, carbon dioxide, and oxygen. The gaseous environment can comprise air. The gas can be an ultrahigh purity gas. The ultrahigh purity gas can be at least about 99%, 99.9%, 99.99%, or 99.999% pure. The gas may comprise less than about 2 ppm oxygen, less than about 3 ppm moisture, less than about 1 ppm hydrocarbons, or less than about 6 ppm nitrogen. In some embodiments, the pre-transformed material (e.g., in the material bed) may be degassed before the 3D printing initiates (e.g., before its first irradiation by the transforming energy beam). The enclosure can be maintained under vacuum or under an inert, dry, non-reactive and/or oxygen reduced (or otherwise controlled) atmosphere. In some examples, the enclosure is under vacuum. The atmosphere can be furnished by providing an inert, dry, non-reactive, and/or oxygen reduced gas (e.g., Ar). The atmosphere can be furnished by flowing the gas through the enclosure (e.g., chamber).

The material layer can be supported on a platform. The platform may comprise a substrate (e.g., 109). The substrate can have a circular, rectangular, square, or irregularly shaped cross-section. The platform may comprise a base (e.g., 102) disposed above the substrate. The platform may comprise a base (e.g., 102) disposed between the substrate and a material layer (or a space to be occupied by a material layer). One or more material-bed-seals (e.g., 103) may prevent leakage of the material from the material bed (e.g., 104). A thermal control unit (e.g., a cooling member such as a heat sink or a cooling plate, or a heating plate 113) can be provided inside of the region where the 3D object is formed or adjacent to (e.g., above) the region where the 3D object is formed. The thermal control unit may comprise a thermostat. Additionally, or alternatively, the thermal control unit can be provided outside of the region where the 3D object is formed (e.g., at a predetermined distance). In some cases, the thermal control unit can form at least one section of a boundary region where the 3D object is formed (e.g., the container accommodating the material bed). Examples of thermal control unit (e.g., cooling member) can be found in Patent Application Serial Number PCT/US15/36802 which is incorporated herein by reference in its entirety.

In some embodiments, one or more of the 3D printer components are contained in the enclosure (e.g., chamber). The enclosure can include a reaction space that is suitable for introducing precursor to form a 3D object, such as pre-transformed (e.g., powder) material. The enclosure can be a vacuum chamber, a positive pressure chamber, or an ambient pressure chamber. The enclosure can comprise a gaseous environment with a controlled pressure, temperature, and/or gas composition. The control may be before, during, and/or after the 3D printing. The control may be automatic and/or manual.

In some embodiments, the concentration of oxygen and/or humidity in the enclosure (e.g., chamber) is minimized (e.g., below a predetermined threshold value). The gas composition of the chamber may contain a level of oxygen and/or humidity that is at most about 100 parts per billion (ppb), 10 ppb, 1 ppb, 0.1 ppb, 0.01 ppb, 0.001 ppb, 100 parts per million (ppm), 10 ppm, 1 ppm, 0.1 ppm, 0.01 ppm, or 0.001 ppm. The gas composition of the chamber can contain an oxygen and/or humidity level between any of the afore-mentioned values (e.g., from about 100 ppb to about 0.001 ppm, from about 1 ppb to about 0.01 ppm, or from about 1 ppm to about 0.1 ppm). The gas composition in the environment in the enclosure can comprise a (e.g., substantially) oxygen free environment. Substantially may be relative to the effect of oxygen on the 3D printing, wherein substantially free may refer to a negligible effect on the 3D printing. For example, the gas composition can contain at most about 100,000 parts per million (ppm), 10,000 ppm, 1000 ppm, 500 ppm, 400 ppm, 300 ppm, 200 ppm, 100 ppm, 50 ppm, 30 ppm, 10 ppm, 5 ppm, 1 ppm, 100,000 parts per billion (ppb), or 10,000 ppb of oxygen. The gas composition in the environment contained within the enclosure can comprise a substantially moisture (e.g., water) free environment. The gaseous environment can comprise at most about 100,000 ppm, 10,000 ppm, 1000 ppm, 500 ppm, 400 ppm, 300 ppm, 200 ppm, 100 ppm, 50 ppm, 30 ppm, 10 ppm, 5 ppm, 1 ppm, 100,000 ppb, or 10,000 ppb of water.

The gas composition may be measures by one or more sensors (e.g., an oxygen and/or humidity sensor), before, during, and/or after the 3D printing. The chamber can be opened at the completion of a formation of a 3D object. When the chamber is opened, ambient air containing oxygen and/or humidity can enter the chamber. In some embodiments, the processing chamber is accessed through a load lock mechanism that reduces the contamination of the processing chamber (comprising atmosphere 126) with the ambient atmosphere (e.g., containing oxygen and/or humidity). Exposure of one or more components in the chamber to ambient atmosphere (e.g., air) can be reduced by, for example, flowing an inert gas while the chamber is open (e.g., to prevent entry of ambient air), or by flowing a heavy gas (e.g., argon) that rests on the surface of the target surface (e.g., the exposed surface of the material bed). In some cases, components that absorb oxygen and/or humidity on to their surface(s) can be sealed while the enclosure (e.g., chamber) is open (e.g., to the ambient environment).

In some embodiments, the chamber is configured such that gas inside the chamber (e.g. 126) has a relatively low leak rate from the chamber to an environment outside of the chamber. In some cases, the leak rate can be at most about 100 milliTorr/minute (mTorr/min), 50 mTorr/min, 25 mTorr/min, 15 mTorr/min, 10 mTorr/min, 5 mTorr/min, 1 mTorr/min, 0.5 mTorr/min, 0.1 mTorr/min, 0.05 mTorr/min, 0.01 mTorr/min, 0.005 mTorr/min, 0.001 mTorr/min, 0.0005 mTorr/min, or 0.0001 mTorr/min. The leak rate may be between any of the afore-mentioned leak rates (e.g., from about 0.0001 mTorr/min to about, 100 mTorr/min, from about 1 mTorr/min to about, 100 mTorr/min, or from about 1 mTorr/min to about, 100 mTorr/min). The leak rate may be measured by one or more pressure gauges and/or sensors (e.g., at ambient temperature) before, during, and/or after the 3D printing. The enclosure can be sealed (e.g., using at least one gas-seal) such that the leak rate of the gas from inside the chamber to the environment outside of the chamber is low (e.g., below a threshold level). The gas-seal can comprise an O-ring, rubber seal, metal seal, load-lock, or bellow on a piston. In some cases, the chamber can have a controller configured to detect leaks above a specified leak rate (e.g., by using at least one sensor) before, during, and/or after the 3D printing. The detection may be using at least one sensor. The sensor may be operatively coupled to the controller. In some instances, the controller can identify and/or control (e.g., direct and/or regulate) the gas-leak. For example, the controller may be able to identify a gas-leak by detecting a decrease in pressure in side of the chamber over a given time interval. The controller may further notify (e.g., a user and/or software) of the detected leak and/or perform an emergency shut-off of the 3D printer.

In some embodiments, the system and/or apparatus components described herein are adapted and/or configured to generate a 3D object. The 3D object can be generated through a 3D printing process. A first layer of pre-transformed material (e.g., powder) can be provided adjacent to a platform. A platform (e.g., base) can be a previously formed layer of the 3D object or any other surface above (e.g., on) which a layer or material bed comprising the pre-transformed material is spread, held, placed, adhered, attached, or supported. When the first layer of the 3D object is generated, this first material layer can be formed in the material bed without a platform (e.g., base), without one or more auxiliary support features (e.g., rods), and/or without other supporting structure other than the pre-transformed material (e.g., within the material bed). Subsequent layers or hardened material can be formed such that at least one portion of the subsequent layer fused (e.g., melts or sinters), binds and/or otherwise connects to the at least a portion of a previously formed layer of hardened material (or portion thereof). The at least a portion of the previously formed layer of hardened material (e.g., a complete layer of hardened material) can act as a platform (e.g., base) for formation of the (e.g., rest of the) 3D object. In some cases, the first formed layer of hardened material comprises and/or forms at least a portion of the platform (e.g., base). This platform may be a sacrificial layer or form the bottom skin layer of the 3D object. The pre-transformed material layer can comprise particles of homogeneous or heterogeneous size and/or shape. The first formed layer of hardened material may float anchorlessly in the material bed during its formation and/or during the formation of the 3D object. The first formed layer of hardened material may or may not be planar.

In some embodiments, the system, methods, and/or apparatus described herein may comprise at least one energy source (e.g., the transforming energy source generating the transforming energy beam, and/or the sensing energy source generating the sensing energy beam). The transforming energy beam may be any energy beam (e.g., scanning energy beam or tiling energy beam) disclosed in patent application No. 62/265,817, and patent application No. 62/317,070 which are incorporated herein by reference in their entirety (in those applications the tiling energy beam may be referred to as the "(tiling) energy flux"). The energy source may be any energy source disclosed in patent application No. 62/265,817, or in 62/317,070 which are incorporated herein by reference in their entirety. The energy beam may travel (e.g., scan) along a path. The path may be predetermined (e.g., by the controller). The methods, systems and/or apparatuses may comprise at least a second energy source. The second energy source may generate a second energy (e.g., second energy beam). The first and/or second energy beams (e.g., scanning and/or tiling energy beams) may transform at least a portion of the pre-transformed material in the material bed to a transformed material. In some embodiments, the first and/or second energy source may heat but not transform at least a portion of the pre-transformed material in the material bed. In some cases, the system can comprise 1, 2, 3, 4, 5, 6, 7, 8, 9, 10, 30, 100, 300, 1000 or more energy beams and/or sources. The system can comprise an array of energy sources (e.g., laser diode array). Alternatively, or additionally the surface, material bed, 3D object (or part thereof), or any combination thereof may be heated by a heating mechanism. The heating mechanism may comprise dispersed energy beams. In some cases, the at least one energy source is a single (e.g., first) energy source.

In some embodiments, the energy source is a source configured to deliver energy to a target area (e.g., a confined area). An energy source can deliver energy (e.g., radiation, e.g., beam) to the confined area through radiative heat transfer. The energy source can project energy (e.g., heat energy). The generated energy (e.g., beam) can interact with at least a portion of the material in the material bed. The energy can heat the material in the material bed before, during and/or after the pre-transformed (e.g., powder) material is being transformed (e.g., melted). The energy can heat (e.g., and not transform) at least a fraction of a 3D object at any point during formation of the 3D object. Alternatively or additionally, the material bed may be heated by a heating mechanism projecting energy (e.g., using radiative heat and/or energy beam). The energy may include an energy beam and/or dispersed energy (e.g., radiator or lamp). The energy may include radiative heat. The radiative heat may be projected by a dispersive energy source (e.g., a heating mechanism) comprising a lamp, a strip heater (e.g., mica strip heater, or any combination thereof), a heating rod (e.g., quartz rod), or a radiator (e.g., a panel radiator). The heating mechanism may comprise an inductance heater. The heating mechanism may comprise a resistor (e.g., variable resistor). The resistor may comprise a varistor or rheostat. A multiplicity of resistors may be configured in series, parallel, or any combination thereof. In some cases, the system can have a single (e.g., first) energy source that is used to transform at least a portion of the material bed.

In some embodiments, the energy beam includes a radiation comprising an electromagnetic, or charged particle beam. The energy beam may include radiation comprising electromagnetic, electron, positron, proton, plasma, radical or ionic radiation. The electromagnetic beam may comprise microwave, infrared, ultraviolet, or visible radiation. The energy beam may include an electromagnetic energy beam, electron beam, particle beam, or ion beam. An ion beam may include a cation or an anion. A particle beam may include radicals. The electromagnetic beam may comprise a laser beam. The energy beam may comprise plasma. The energy source may include a laser source. The energy source may include an electron gun. The energy source may include an energy source capable of delivering energy to a point or to an area (e.g., confined area). In some embodiments, the energy source can be a laser source. The laser source may comprise a $CO_2$, Nd:YAG, Neodymium (e.g., neodymium-glass), an Ytterbium, or an excimer laser. The laser may comprise a fiber laser. The energy source may include an energy source capable of delivering energy to a point or to an area. The energy source (e.g., transforming energy source) can provide an energy beam having an energy density of at least about 50 joules/cm$^2$ (J/cm$^2$), 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of at most about 50 J/cm$^2$, 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 500 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of a value between the afore-mentioned values (e.g., from about 50 J/cm$^2$ to about 5000 J/cm$^2$, from about 200 J/cm$^2$ to about 1500 J/cm$^2$, from about 1500 J/cm$^2$ to about 2500 J/cm$^2$, from about 100 J/cm$^2$ to about 3000 J/cm$^2$, or from about 2500 J/cm$^2$ to about 5000 J/cm$^2$). In an example, a laser can provide light energy at a peak wavelength of at least about 100 nanometer (nm), 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, or 100 nm. The laser can provide light energy at a peak wavelength between any of the afore-mentioned peak wavelength values (e.g., from about 100 nm to about 2000 nm, from about 500 nm to about 1500 nm, or from about 1000 nm to about 1100 nm). The energy source (e.g., laser) may have a power of at least about 0.5 Watt (W), 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy source may have a power of at most about 0.5 W, 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy source may have a power between any of the afore-mentioned laser power values (e.g., from about 0.5 W to about 100 W, from about 1 W to about 10 W, from about 100 W to about 1000 W, or from about 1000 W to about 4000 W). The first energy source (e.g., producing the transforming energy beam) may have at least one of the characteristics of the second energy source. The first energy source (e.g., producing the transforming energy beam) may differ in at least one of the characteristics from the second energy source.

An energy beam generated by the energy source can be incident on, or be directed perpendicular to, the target surface. The target surface may comprise an exposed surface of the material bed or an exposed surface of a hardened material. The hardened material may be a 3D object or a portion thereof. The energy beam can be directed at an acute angle within a value ranging from being parallel to being perpendicular with respect to the average or mean plane of the target surface and/or the platform. The energy beam can be directed onto a specified area of at least a portion of the target surface for a specified time-period (e.g., dwell time). The material in target surface (e.g., powder material such as in a top surface of a powder bed) can absorb the energy from the energy beam and, and as a result, a localized region of at least the material at the target surface can increase in temperature. The energy beam can be moveable such that it may translate (e.g., horizontally, vertically, and/or in an angle). The energy source may be movable such that it can translate relative to the target surface. The energy beam can be moved via a scanner (e.g., as disclosed herein). A least two (e.g., all) of the energy beams can be movable with the same scanner. At least two of the energy source(s) and/or beam(s) can be translated independently of each other. In some cases, at least two of the energy source(s) and/or beam(s) can be translated at different rates (e.g., velocities). In some cases, at least two of the energy beams can be comprise at least one different characteristic. The characteristics may comprise wavelength, charge, power density, amplitude, trajectory, footprint, cross-section, focus, intensity, energy, path, or hatching scheme. The charge can be electrical and/or magnetic charge. In some embodiments, the energy source may be non-translatory (e.g., during the 3D printing). The energy source may be (e.g., substantially) stationary (e.g., before, after and/or during the 3D printing). In some embodiments, the energy source may translate (e.g., before, after and/or during the 3D printing).

In some embodiments, the energy source includes an array, or a matrix, of energy sources (e.g., laser diodes). At least two (e.g., each) of the energy sources in the array or matrix, can be independently controlled (e.g., by a control mechanism) such that the energy beams can be turned off and on independently. At least two of the energy sources (e.g., in the array or matrix) can be collectively controlled such that the at least two (e.g., all) of the energy sources can be turned off and on simultaneously. The energy per unit area or intensity of at least two energy sources in the matrix or array can be modulated independently (e.g., by a controller). At times, the energy per unit area or intensity of at least two (e.g., all) of the energy sources (e.g., in the matrix or array) can be modulated collectively (e.g., by a controller). The control may be manual or automatic. The control may be before, after, and/or during the 3D printing.

In some embodiments, the energy beam translates with respect to the target surface. An optical mechanism (e.g., scanner) may facilitate a translation of the energy beam can along the target surface. The energy beam can scan along the target surface by mechanical movement of the energy source(s), one or more adjustable reflective mirrors, one or more polygon light scanners, or any combination or permutation thereof. The energy source(s) can project energy to the target surface using a DLP modulator, a one-dimensional scanner, a two-dimensional scanner, or any combination thereof. The energy source(s) can be stationary. The material bed (e.g., target surface) may translate vertically, horizontally, or in an angle (e.g., planar or compound). The translation may be effectuated using one or more motors. The translation may be effectuated using a mechanically moving stage.

In some embodiments, the energy source and/or beam is moveable such that it can translate relative to the target surface (e.g., material bed). In some instances, the energy source and/or beam may be movable such that it can translate across (e.g., laterally) the exposed (e.g., top) surface of the material bed. The energy beam(s) can be moved via a scanner. The scanner may comprise a galvanometer scanner, a polygon, a mechanical stage (e.g., X-Y stage), a piezoelectric device, gimble, or any combination of thereof. The galvanometer may comprise a mirror. The scanner may comprise a modulator. The scanner may comprise a polygonal mirror. The scanner can be the same scanner for two or more energy sources and/or beams. The scanner may comprise an optical setup. At least two (e.g., each) energy beams may have a separate scanner. The energy sources can be translated independently of each other. In some cases, at least two energy sources and/or beams can be translated at different rates, and/or along different paths. For example, the movement of the first energy source may be faster (e.g., greater rate) as compared to the movement of the second energy source. For example, the movement of the first energy beam may be faster (e.g., greater rate) as compared to the movement of the second energy beam. The systems and/or apparatuses disclosed herein may comprise one or more shutters (e.g., safety shutters). The energy beam(s), energy source(s), and/or the platform can be moved (as applicable, e.g., by a motor, e.g., by the scanner.). The galvanometer scanner may comprise a two-axis galvanometer scanner. The scanner may comprise a modulator (e.g., as described herein). The energy source(s) can project energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The translation may be before, after, and/or during at least a portion of the 3D printing. The translation may be controlled manually and/or automatically (e.g., by a controller). The energy source(s) can be included in, and/or can comprise, an optical system (e.g., optical setup, or optical mechanism) that is configured to direct energy from the energy source to a predetermined position on the target surface (e.g., exposed surface of the material bed). The controller can be programmed to control a trajectory of the energy source(s) with the aid of the optical system. The controller can regulate a supply of energy from the energy source to the material (e.g., at the target surface) to form a transformed material. The controller may operate before, after, and/or during at least a portion of the 3D printing (e.g., in real-time).

In some embodiments, the energy source is modulated. The energy beam emitted by the energy source can be modulated. The modulator can include amplitude modulator, phase modulator, or polarization modulator. The modulation may alter the intensity and/or power density of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an aucusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam. The focus of the energy beam may be controlled (e.g., modulated). The modulation may be controlled (e.g., manually and/or automatically). The modulation may be controlled before, after, and/or during at least a portion of the 3D printing (e.g., in real-time).

In some embodiments, the apparatus and/or systems disclosed herein may include an optical diffuser. The optical diffuser may diffuse light (e.g., substantially) homogenously. The optical diffuser may remove high intensity energy (e.g., light) distribution and form a more even distribution of light across the footprint of the (e.g., transforming) energy beam. The optical diffuser may reduce the intensity of the energy beam (e.g., act as a screen). For example, the optical diffuser may alter an energy beam with Gaussian profile, to an energy beam having a top-hat profile. The optical diffuser may comprise a diffuser wheel assembly. The energy profile alteration device may comprise a diffuser-wheel (a.k.a., diffusion-wheel). The diffuser-wheel may comprise a filter wheel. The diffuser-wheel may comprise a filter or diffuser. The diffuser-wheel may comprise multiple filters and/or multiple diffusers. The filters and/or diffusers in the diffuser-wheel may be arranged linearly, non-linearly, or any combination thereof. The energy profile alteration device and/or any of its components may be controlled (e.g., monitored and/or regulated), and be operatively coupled thereto. The control may be manual and/or automatic (e.g., by a controller). The control may be before, after, and/or during at least a portion of the 3D printing. The diffuser-wheel may comprise one or more ports (e.g., opening and/or exit ports) from/to which an energy ray (e.g., beam and/or flux) may travel. The diffuser-wheel may comprise a panel. The panel may block (e.g., entirely or partially) the energy beam. The energy profile alteration device may comprise a shutter wheel. In some examples, the diffuser-wheel (e.g., controllably) rotates. In some examples, the diffuser-wheel may (e.g., controllably) switch (e.g., alternate) between several positions. A position of the diffuser-wheel may correspond to a filter. The filter may be maintained during the formation of a layer of hardened material or a portion thereof. The filter may change during the formation of a layer of hardened material or a portion thereof. The diffuser-wheel may change between positions during the formation of a layer of hardened material or a portion thereof (e.g., change between at least 2, 3, 4, 5, 6, 7 positions). The diffuser-wheel may maintain a position during the formation of a layer of hardened material or a portion thereof. Sometimes, during the formation of a 3D object, some positions of the diffuser-wheel may not be used. At times, during the formation of a 3D object, all the positions of the diffuser-wheel may be used.

The energy beam has one or more characteristics. The energy beam (e.g., transforming energy beam) may comprise a Gaussian energy beam. The energy beam may have any cross-sectional shape comprising an ellipse (e.g., circle), or a polygon, The energy beam may have a cross section with a FLS of any value between the afore-mentioned values (e.g., from about 50μm to about 250 μm, from about 50 μm to about 150 μm, or from about 150 μm to about 250 μm). The energy beam may be continuous or non-continuous (e.g., pulsing). The energy beam may be modulated before and/or during the formation of a transformed material as part of the 3D object. The energy beam may be modulated before and/or during the 3D printing process.

The tiling energy flux may comprise (i) an extended exposure area, (ii) extended exposure time, (iii) low power density (e.g., power per unit area) or (iv) an intensity profile that can fill an area with a flat (e.g., top head) energy profile. Extended may be in comparison with the scanning energy beam. The extended exposure time may be at least about 1 millisecond and at most 100 milliseconds. In some embodiments, an energy profile of the tiling energy source may exclude a Gaussian beam or round top beam. In some embodiments, an energy profile of the tiling energy source may include a Gaussian beam or round top beam. In some embodiments, the 3D printer comprises a first and/or second scanning energy beams. In some embodiments, an energy profile of the first and/or second scanning energy may comprise a Gaussian energy beam. In some embodiments, an energy profile of the first and/or second scanning energy beam may exclude a Gaussian energy beam. The first and/or second scanning energy beam may have any cross-sectional shape comprising an ellipse (e.g., circle), or a polygon (e.g., as disclosed herein). The scanning energy beam may have a cross section with a diameter of at least about 50 micrometers (μm), 100 μm, 150 μm, 200 μm, or 250 μm. The scanning energy beam may have a cross section with a diameter of at most about 60 micrometers (μm), 100 μm, 150 μm, 200 μm, or 250 μm. The scanning energy beam may have a cross section with a diameter of any value between the afore-mentioned values (e.g., from about 50 μm to about 250 μm, from about 50 μm to about 150 μm, or from about 150 μm to about 250 μm). The power density (e.g., power per unit area) of the scanning energy beam may at least about 5000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the scanning energy beam may be at most about 5000 W/mm$^2$, 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The power density of the scanning energy beam may be any value between the afore-mentioned values (e.g., from about 5000 W/mm$^2$ to about 100000 W/mm$^2$, from about 10000 W/mm$^2$ to about 50000 W/mm$^2$, or from about 50000 W/mm$^2$ to about 100000 W/mm$^2$). The scanning speed of the scanning energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the scanning energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the scanning energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The scanning energy beam may be continuous or non-continuous (e.g., pulsing). In some embodiments, the scanning energy beam compensates for heat loss at the edges of the target surface after the heat tiling process (e.g., forming the tiles by utilizing the tiling energy beam).

In some embodiments, the tiling energy beam has an extended cross section. For example, the tiling energy beam has a FLS (e.g., cross section) that is larger than the scanning energy beam. The FLS of a cross section of the tiling energy beam may be at least about 0.2 millimeters (mm), 0.3 mm, 0.4 mm, 0.5 mm, 0.8 mm, 1 mm, 1.5 mm, 2 mm, 2.5 mm, 3 mm, 3.5 mm, 4 mm, 4.5 mm, or 5 mm. The FLS of a cross section of the tiling energy beam may be between any of the afore-mentioned values (e.g., from about 0.2 mm to about 5 mm, from about 0.3 mm to about 2.5 mm, or from about 2.5 mm to about 5 mm). The cross section of the tiling energy beam can be at least about 0.1 millimeter squared (mm$^2$), or 0.2. The diameter of the tiling energy beam can be at least about 300 micrometers, 500 micrometers, or 600 micrometers. The distance between the first position and the second position can be at least about 100 micrometers, 200 micrometers, or 250 micrometers. The FLS may be measured at full width half maximum intensity of the energy beam. The FLS may be measured at 1/e$^2$ intensity of the energy beam. In some embodiments, the tiling energy beam is a focused energy beam. In some embodiments, the tiling energy beam is a defocused energy beam. The energy profile of the tiling energy beam may be (e.g., substantially) uniform (e.g., in the beam cross sectional area that forms the tile). The energy profile of the tiling energy beam may be (e.g., substantially) uniform during the exposure time (e.g., also referred to herein as tiling time, or dwell time). The exposure time (e.g., at the target surface) of the tiling energy beam may be at least about 0.1 milliseconds (msec), 0.5 msec, 1 msec, 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time (e.g., at the target surface) of the tiling energy beam may be at most about 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time may be between any of the above-mentioned exposure times (e.g., from about 0.1 msec to about 5000 msec, from about 0.1 to about 1 msec, from about 1 msec to about 50 msec, from about 50 msec to about 100 msec, from about 100 msec to about 1000 msec, from about 20 msec to about 200 msec, or from about 1000 msec to about 5000 msec). The exposure time may be the dwell time. The power per unit area of the tiling energy beam may be at least about 100 Watts per millimeter square (W/mm$^2$), 200 W/mm$^2$, 300 W/mm$^2$, 400 W/mm$^2$, 500 W/mm$^2$, 600 W/mm$^2$, 700 W/mm$^2$, 800 W/mm$^2$, 900 W/mm$^2$, 1000 W/mm$^2$, 2000 W/mm$^2$, 3000 W/mm$^2$, 5000 W/mm2, or 7000 W/mm$^2$. The power per unit area of the tiling energy beam may be at most about 100 W/mm$^2$, 200 W/mm$^2$, 300 W/mm$^2$, 400 W/mm$^2$, 500 W/mm$^2$, 600 W/mm$^2$, 700 W/mm$^2$, 800 W/mm$^2$, 900 W/mm$^2$, 1000 W/mm$^2$, 2000 W/mm$^2$, 3000 W/mm$^2$, 5000 W/mm$^2$, 7000 W/mm$^2$, 8000 W/mm$^2$, 9000 W/mm$^2$, or 10000 W/mm$^2$. The power per unit area of the tiling energy beam may be any value between the afore-mentioned values (e.g., from about 100 W/mm² to about 3000 W/mm², from about 100 W/mm² to about 5000 W/mm², from about 100 W/mm² to about 9000 W/mm², from about 100 W/mm² to about 500 W/mm², from about 500 W/mm² to about 3000 W/mm², from about 1000 W/mm² to about 7000 W/mm², or from about 500 W/mm² to about 8000 W/mm²). The tiling energy beam may emit energy stream towards the target surface in a step and repeat sequence.

In some embodiments, the tiling energy source is the same as the scanning energy source. In some embodiments, the tiling energy source is different than the scanning energy source. The tiling energy source and/or scanning energy source can be disposed within the enclosure, outside of the enclosure, or within at least one wall of the enclosure. The optical mechanism through which the tiling energy flux and/or the scanning energy beam travel can be disposed within the enclosure, outside of the enclosure, or within at least one wall of the enclosure.

Energy may be evacuated from the material bed. The evacuation of energy may utilize a cooling member. Energy (e.g., heat) can be transferred from the material bed to a cooling member (e.g., heat sink FIG. 1, 113). The cooling member is described in Provisional Patent Application Ser. No. 62/265,817, filed on Dec. 10, 2015," and Provisional Patent Application No. 62/317,070, field on Apr. 1, 2016, both titled "APPARATUSES, SYSTEMS AND METHODS FOR EFFICIENT THREE-DIMENSIONAL PRINTING;" and in Patent Application serial number PCT/US16/66000, filed on Dec. 9, 2016, titled "SKILLFUL THREE-DIMENSIONAL PRINTING," all three of which are incorporated herein by reference in their entirety.

In some embodiments, a layer dispensing mechanism dispenses the pre-transformed material (e.g., towards the platform), planarizes, distributes, spreads, and/or removes the pre-transformed material (e.g., in the material bed). The layer dispensing mechanism may be utilized to (e.g., layer-wise) form the material bed. The layer dispensing mechanism may be utilized to form the layer of pre-transformed material (or a portion thereof). The layer dispensing mechanism may be utilized to level (e.g., planarize) the layer of pre-transformed material (or a portion thereof). The leveling may be to a predetermined height. The layer dispensing mechanism may comprise at least one, two or three of a (i) material dispensing mechanism (e.g., FIG. 1, 116), (ii) material leveling mechanism (e.g., FIG. 1, 117), and (iii) material removal mechanism (e.g., FIG. 1, 118). The material removal mechanism may comprise a cyclonic separator (e.g., a cyclonic separation system). The cyclonic separator may separate pre-transformed material (e.g., powder), from one or more gasses that carry the pre-transformed material into the material removal mechanism (e.g., into the cyclonic separator). The pre-transformed material may be a particulate (e.g., powder) material. The layer dispensing mechanism may be controlled manually and/or by the controller (e.g., before, after, and/or during the 3D printing). The layer dispensing mechanism and any of its components can be any of those disclosed in patent application No. 62/265,817, or patent application number PCT/US15/36802, both of which are incorporated herein by reference in their entirety. The layer dispensing system may comprise a hopper. The layer dispensing system may comprise (e.g., may be) a recoater.

In some embodiments, one or more sensors (at least one sensor) detect the topology of the exposed surface of the material bed and/or the exposed surface of the 3D object (or any portion thereof). The sensor can detect the amount of pre-transformed material deposited in the material bed. The sensor can comprise a proximity sensor. For example, the sensor may detect the amount of pre-transformed (e.g., powder) material deposited on the platform and/or on the exposed surface of a material bed. The sensor may detect the physical state of material deposited on the target surface (e.g., liquid or solid (e.g., powder or bulk)). The sensor be able to detect the microstructure (e.g., crystallinity) of the pre-transformed material deposited on the target surface. The sensor may detect the amount of pre-transformed material disposed by the layer dispensing mechanism (e.g., powder dispenser). The sensor may detect the amount of pre-transformed material that is relocated by the layer dispensing mechanism (e.g., by the leveling mechanism). The sensor can detect the temperature of the pre-transformed and/or transformed material in the material bed. The sensor may detect the temperature of the pre-transformed material in a material (e.g., powder) dispensing mechanism, and/or in the material bed. The sensor may detect the temperature of the pre-transformed material during and/or after its transformation. The sensor may detect the temperature and/or pressure of the atmosphere within the enclosure (e.g., chamber). The sensor may detect the temperature of the material (e.g., powder) bed at one or more locations.

In some embodiments, a topological map is formed using at least one metrological sensor. The metrological sensor may comprise projection of a static or time varying oscillating (e.g., striped) pattern. The metrological sensor may comprise a fringe projection profilometry device. The metrological sensor may be at least a part of the height mapper. The metrological sensor may comprise an emitter generating a sensing energy beam (e.g., emitter as in FIG. 3, 317) and a receiver (e.g., FIG. 3, 318). The emitter may comprise a projector. The emitter may project the sensing energy beam on a target surface. The target surface may comprise an exposed surface of a material bed, a layer of hardened material, a 3D object, and/or a melt pool. The sensing energy beam may form a pattern on the target (e.g., exposed) surface. The pattern may comprise areas of various levels of light intensity. FIGS. 21A-21D show various light intensity profiles as a function of time. The light intensity profile may comprise an on off pattern (e.g., FIG. 21A). The light intensity profile may comprise a fluctuating pattern. The fluctuating pattern may comprise gradually fluctuating intensity pattern (e.g., FIG. 21B) or abruptly fluctuating intensity pattern (e.g., FIG. 21A). The fluctuating pattern may comprise a superposition of a multiplicity of sinusoidal waves (e.g., FIG. 21D). The fluctuating pattern may comprise a superposition of a multiplicity of frequency functions (e.g., sine function and/or cosine function). The fluctuating pattern may comprise a superposition of a sinusoidal wave and a decreasing function (e.g., 21C). The decreasing function may be decreasing linearly, logarithmically, exponentially, or any combination thereof. The fluctuating pattern may comprise multiplicity of functions (e.g., that are superpositioned). The multiplicity of functions may be shifted (e.g., by a phase and/or fringe). The multiplicity of functions may be shifted (e.g., by a phase and/or fringe) with respect to each other. At least two of the multiplicity of functions (e.g., all of the functions) may be shifted (e.g., by a phase and/or fringe) collectively. In some examples, the fluctuating pattern are shifted (e.g., by a phase and/or fringe). For example, the fluctuating pattern may be shifted during the use of the metrological detector (e.g., height mapper). For example, the fluctuating pattern may be shifted during the operation of (e.g., detection by) the metrological detector. The shift may be of at least a portion of a (e.g., a whole) wavelength ($\lambda$) of the sensing energy beam. The shift may by at least about $\lambda/10$, $\lambda/9$, $\lambda/8$, $\lambda/7$, $\lambda/6$, $\lambda/5$, $\lambda/4$, $\lambda/3$, or $\lambda/2$. The shift may by at most about $\lambda/10$, $\lambda/9$, $\lambda/8$, $\lambda/7$, $\lambda/6$, $\lambda/5$, $\lambda/4$, $\lambda/3$, or $\lambda/2$. The shift may by any value between the afore-mentioned values (e.g., from about $\lambda$ to about $\lambda/10$, from about $\lambda/2$ to about $\lambda/10$, from about $\lambda/2$ to about $\lambda/5$, from about $\lambda/5$ to about $\lambda/10$, or from about $\lambda/2$ to about $\lambda/4$,). The fluctuating pattern may be shifted by (e.g., substantially) the same (e.g., delta) value across the target surface. The fluctuating pattern may be shifted by different values across the target surface. For example, at least a first area of the target surface may be sensed with a shifting fluctuating pattern by about $\lambda/3$, and at least a second area of the target surface (that differs from the first area) may be sensed by a shifting fluctuating pattern by about $\lambda/5$. The fluctuating pattern may be shifted (i) by a first value across the target surface at a first time (or first time-period), and (ii) by a second value across the target surface at a second time (or second time-period). For example, the target surface may be sensed with a shifting and fluctuating pattern that is of $\lambda/3$ at time period $t_1$, and the target surface may be sensed by a shifting fluctuating pattern that is of $\lambda/5$ at time period $t_2$ (that differs from $t_1$). In some embodiments, the use of a certain shift in the fluctuating pattern at a certain area of the target surface relates to a certain sensitivity (e.g., resolution) of detection at that certain area. The use of different shift values in the fluctuating pattern at different areas of the target surface may allow detection of these different areas at a different sensitivity (e.g., resolution). The different shift in the fluctuating pattern may correlate to the different in material properties (e.g., phases). For example, a different shift value may be used on a target surfaced area comprising a pre-transformed material, than on a target surface area comprising a transformed material. The detector may comprise a multiplicity of sensing energy beams. The multiplicity of energy beams may form an interference pattern. The fluctuating pattern may comprise an interference pattern.

Figure 21A:
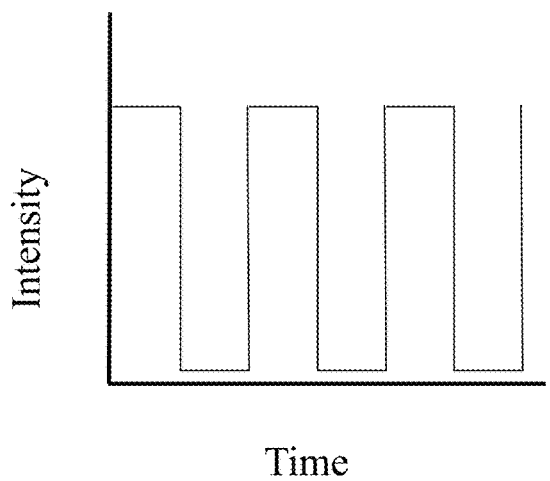
FIGS. 21A-21D show various schematic representations of intensity as a function of time.
Figure 21B:
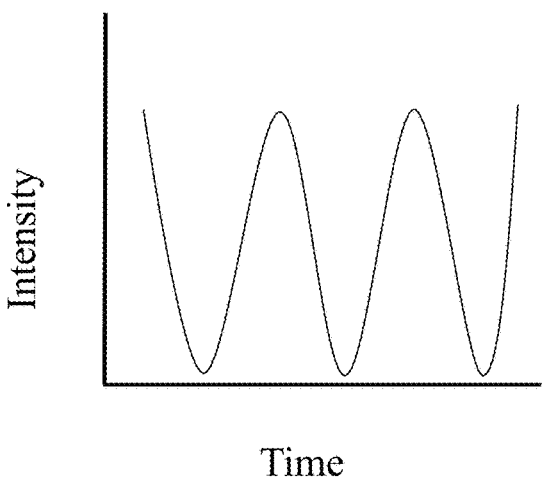
Figure 21C:
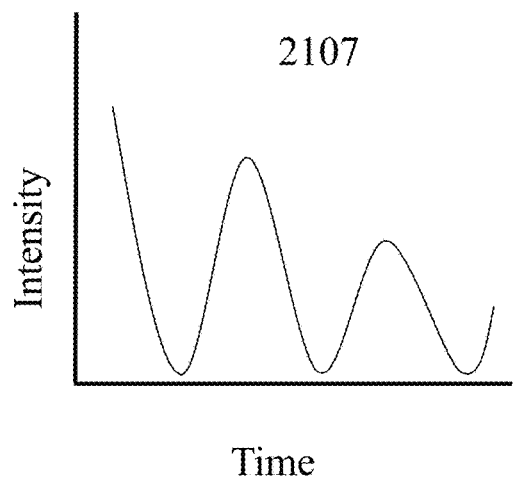
Figure 21D:
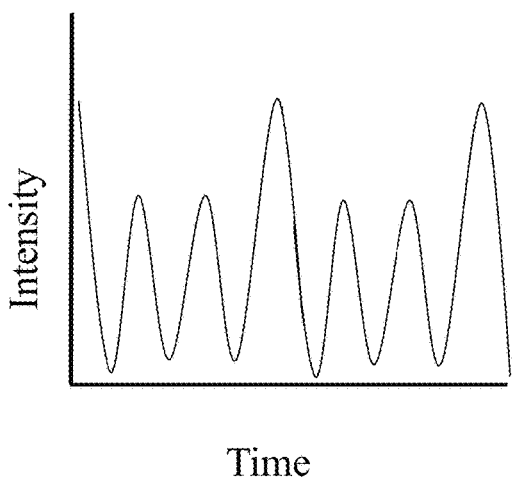

The projected sensing energy beams may be of the same or of different colors. At least two of the projected sensing energy beams may be of the same or of (e.g., substantially) the same color. At least two of the projected sensing energy beams may be of different colors. The projected sensing energy beams may be of the same or of different frequencies. At least two of the projected sensing energy beams may be of different frequencies. At least two of the projected sensing energy beams may be of the same or of (e.g., substantially) the same frequency. The various multiplicity of projected sensing energy beams may be projected simultaneously or sequentially. At least two of the projected sensing energy beams may be of projected sequentially. At least two of the projected sensing energy beams may be projected (e.g., substantially) simultaneously. Substantial may be relative to the effect on the detection (e.g., effect on the resolution of the detection). The fluctuating pattern may scan the target surface (e.g., by projecting one or more shapes). At times, the fluctuating pattern may be apparent on at least a portion of the target surface (e.g., FIG. 19, showing fluctuating rectangles (e.g., thick lines) of various intensities). In some embodiments the fluctuating pattern is detectable (e.g., may appear) on at least a portion of the target surface, wherein fluctuating intensity pattern is presented as a function of location (e.g., of at least a portion of the target surface). The fluctuating positional intensity function may be similar to the functions shown in FIGS. 21A-21B, wherein the "Time" label is changed to a "Position" label. Additionally or alternatively, the fluctuating positional pattern may change as a function of time (e.g., as shown in FIGS. 21A-21B).

Figure 29:
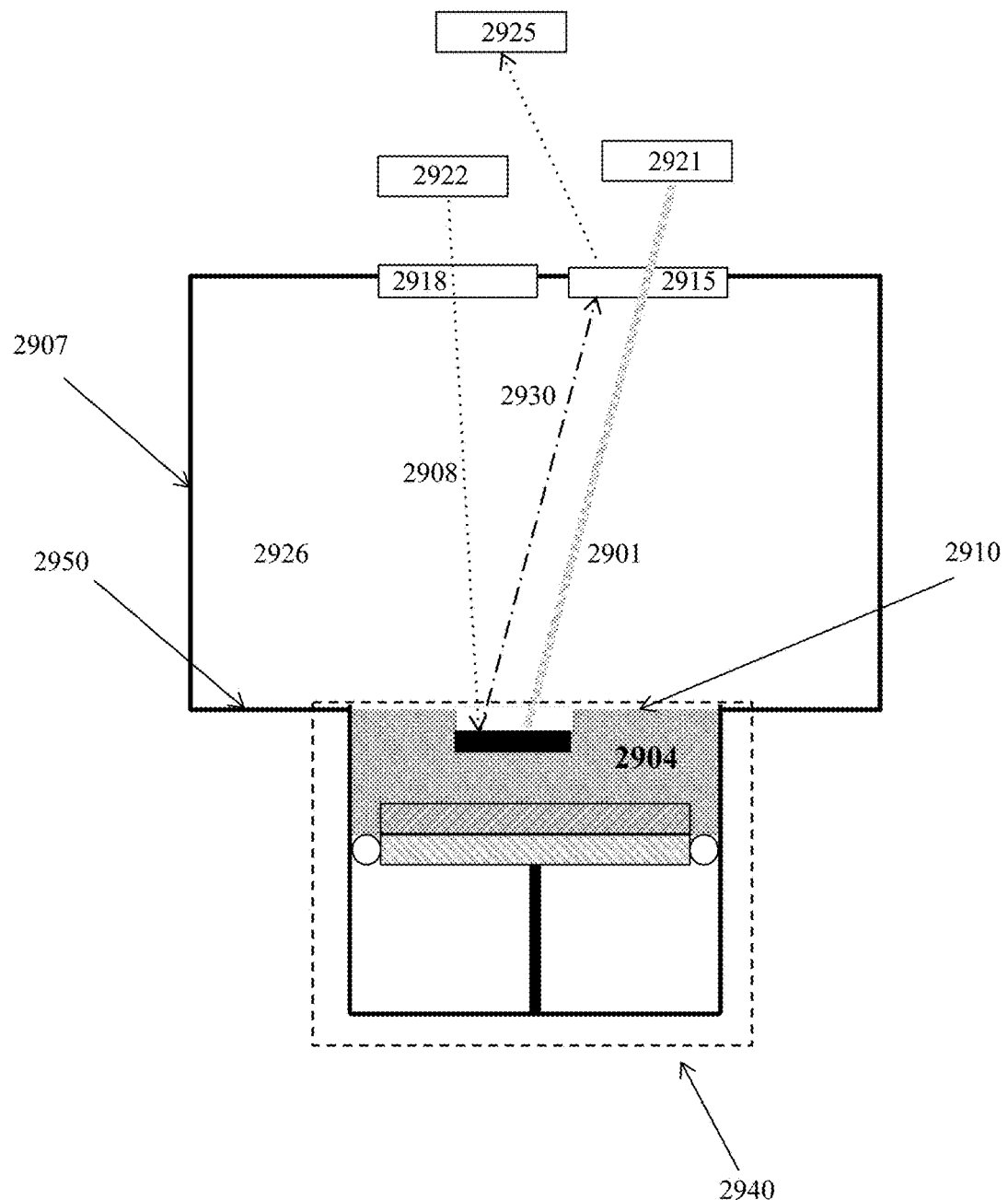
FIG. 29 shows a schematic side view of a 3D printing system and apparatuses.

In some embodiments, the (e.g., metrological or temperature) sensor (or detector) comprises a filter (e.g., FIG. 3, 326). The energy beam that is used in transforming the pre-transformed material to a transformed material (e.g., scanning energy beam and/or tiling energy beam) may be referred to herein as the "transforming energy beam." The filter may filter a sensing energy beam from the transforming energy beam (e.g., FIG. 3, 340). The sensing energy beam may comprise electromagnetic radiation (e.g., from a light emitting diode). The sensing energy beam may comprise collimated or non-collimated light. The filtering may be performed before, during and/or after building a 3D object. Filtering may reduce the amount of transforming energy beam that is sensed by the sensor. Filtering may protect the sensor from the transforming energy beam (e.g., having high intensity), e.g., during building of the 3D object. The filtering may allow measuring the sensing energy beam in real time during operation of the transforming energy beam (e.g., forming at least a portion of the 3D object). Additionally, filtering may allow sensing and/or detecting in real-time (e.g., during build of the 3D object). FIG. 29 shows an example of a sensing energy beam 2908 that is separated from the transforming energy beam 2901. FIG. 29 shows an example of a processing chamber (e.g., having a wall 2907 and an atmosphere 2926) that is engaged with a build module (e.g., 2940) to form an enclosure. The build module may include a target surface (e.g., 2910). The 3D object may be built in a material bed 2904 by irradiating it with a transforming energy beam (e.g., 2901). FIG. 29 further shows a sensing energy beam (e.g., 2908) that is irradiated on the target surface. The sensing energy beam may be used to sense a characteristic of one or more positions of the target surface (e.g., of the building 3D object). The sensing energy beam may be generated by a light energy source (e.g., FIG. 29, 2922, e.g., LED lamp). The light source may comprise a digital light projector. The light source may comprise a digital light imager. The metrology detection system may comprise digital light processing. The light source may comprise a digital mirror (e.g., micro-mirror) device. The light source may comprise a lens (e.g., a lens array). The light source may comprise a mirror (e.g., microscopic mirror). The light source may comprise an array (e.g., of microscopic) mirrors. The array may be rectangular. The mirror in the array may be movable (e.g., controllably). The control may comprise electric (e.g., electrostatic) control. The light source may comprise a micro-opto-electromechanical system (e.g., a digital micromirror device, or DMD). The mirror may comprise silicon or aluminum. The digital light projector may comprise a digital micromirror device.

The sensing energy beam may comprise a wavelength different than the transforming energy beam. The sensing energy beam may comprise a wavelength that is below a thermal radiative beam (e.g., below red or infra-red radiation). The sensing energy beam may comprise a wavelength that is above a plasma generating radiation (e.g., above ultraviolet radiation, e.g., from a purple to an orange visible light radiation). The wavelength of the sensing energy beam may be above about 100 nm, 200 nm, 300 nm, 350 nm, 400 nm, 450 nm, 500 nm, 550 nm, 600 nm, or 650 nm. The wavelength of the sensing energy beam may be below about 1000 nm, 950 nm, 900 nm, 850 nm, 800 nm, 750 nm, or 700 nm. The wavelength of the sensing energy beam may be any wavelength between the afore-mentioned wavelengths (e.g., from 100 nm to 1000 nm, from 300 nm to 800 nm, or from 400 nm to 500 nm). The sensing energy may be any energy beam described herein. At times, the transforming energy beam (e.g., 2901) may be projected through a first optical window (e.g., 2915). The sensing energy beam may be projected (e.g., optionally) through a second optical window (e.g., 2918). In some embodiments, the first and second optical window are the same optical window. In some embodiments, the first optical window is different than the second optical window. The energy beam reflected from the target surface (e.g., 2930) that reaches a receiver (e.g., 2925, a detector), may travel through the first optical window (e.g., 2915) and/or the second optical window (e.g., 2918). The detector may be (e.g., atmospherically) separated from the processing chamber by the optical window (e.g., 2925). At times, the detector may have the same atmosphere as the processing chamber (e.g., FIGS. 3, 318 and 317). The first and/or second optical window may have a coating on at least one of their respective surfaces. For example, the first and/or second optical window may have a coating at least on its surface that face the interior of the processing chamber (e.g., FIG. 29, 2926). The coating may comprise an anti-reflective, dielectric, wavelength filtering, transparent, conductive, and/or a transparent-conductive coating. The wavelength filtering coating may comprise an ultraviolet (e.g., extreme ultraviolet) filtering coating. At times, the coating may be applied on both surfaces of the optical window.

In some embodiments, the detection system comprises a multiplicity of detection systems (e.g., a multiplicity of receivers and/or transmitters). The multiplicity of receivers and/or transmitters may view the target location from a multiplicity of spatial position. The multiplicity of spatial positions may form a multi perspective image. Examples of a multiplicity of detection systems can be seen in Patent Application serial number PCT/US15/65297, filed on Dec. 11, 2015, titled "FEEDBACK CONTROL SYSTEMS FOR THREE-DIMENSIONAL PRINTING," which is fully incorporated herein by reference.

In some embodiments, at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may comprise temperature sensor, weight sensor, material (e.g., powder) level sensor, metrology sensor, gas sensor, or humidity sensor. The metrology sensor may comprise a measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, and/or electromagnetic signal. The electromagnetic signal may comprise a visible, infrared, ultraviolet, ultrasound, radio wave, or microwave signal. The metrology sensor may measure a vertical, horizontal, and/or angular position of at least a portion of the target surface. The metrology sensor may measure a gap. The metrology sensor may measure at least a portion of the layer of material. The layer of material may be a pre-transformed material (e.g., powder), transformed material, or hardened material. The metrology sensor may measure at least a portion of the 3D object. The metrology sensor may measure the FLS (e.g., depth) of at least one melt pool. The metrology sensor may measure a height of a 3D object that protrudes from the exposed surface of the material bed. The metrology sensor may measure a height of a 3D object that deviates from the average and/or mean of the exposed surface of the material bed. The gas sensor may sense any of the gas. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may be coupled to a processor that would perform image processing by using at least one sensor generated signal. The temperature sensor may comprise a camera (e.g., IR camera, CCD camera).

In some embodiments, the light sensor comprises a semi conductive device. The light sensor may comprise p-doped metal-oxide-semiconductor (MOS), or complementary MOS (CMOS). In some embodiments, the light sensor comprises a material that is sensitive to light. The material sensitive to light may alter at least one of its properties as a response to incoming light photos. For example, the material sensitive to light may alter its temperature, color, refractive index, electrical conductivity, magnetic field, and/or volume as a response to incoming light photos. The material sensitive to light may alter the energy level population of its electrons as a response to incoming light photons. The alternation may take place in the areas which were exposed to the light (e.g., areas which absorbed the photons).

In some embodiments, the systems and/or apparatuses described herein comprise a temperature sensor. The temperature sensor may comprise a gas sensor. The temperature sensor may be sensitive to a radiation (e.g., electromagnetic radiation) having a wavelength of at least about 0.5 µm, 1 µm, 1.5 µm, 2.5 µm, 3 µm, 3.5 µm, 4 µm, 4.5 µm, 5 µm, 5.5 µm, 6 µm, 6.5 µm, 7 µm, 8 µm, or 9 µm. The temperature sensor may be sensitive to a radiation (e.g., electromagnetic radiation) having a wavelength of any value between the afore-mentioned values (e.g., from about 0.5 µm to about 9 µm, from about 0.5 µm to about 3 µm, from about 1 µm to about 5 µm, from about 1 µm to about 2.5 µm, or from about 5 µm to about 9 µm). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The detector may comprise an array of optical sensors. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensors, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The weight of the material bed can be monitored by one or more weight sensors. The weight sensor(s) may be disposed in, and/or adjacent to the material bed. A weight sensor disposed in the material bed can be disposed at the bottom of the material bed (e.g. adjacent to the platform). The weight sensor can be between the bottom of the enclosure (e.g., FIG. 1, 111) and the substrate (e.g., FIG. 1, 109) on which the base (e.g., FIG. 1, 102) or the material bed (e.g., FIG. 1, 104) may be disposed. The weight sensor can be between the bottom of the enclosure and the base on which the material bed may be disposed. The weight sensor can be between the bottom of the enclosure and the material bed. A weight sensor can comprise a pressure sensor. The weight sensor may comprise a spring scale, a hydraulic scale, a pneumatic scale, or a balance. At least a portion of the pressure sensor can be exposed on a bottom surface of the material bed. The weight sensor can comprise a button load cell. The button load cell can sense pressure from the pre-transformed material (e.g., powder) adjacent to the load cell. In an example, one or more sensors (e.g., optical sensors, e.g., optical level sensors) can be provided adjacent to the material bed such as above, below, and/or to the side of the material bed. In some examples, the one or more sensors can sense the level (e.g., height and/or amount) of pre-transformed material in the material bed. The pre-transformed material (e.g., powder) level sensor can be in communication with a layer dispensing mechanism (e.g., powder dispenser). A sensor can be configured to monitor the weight of the material bed by monitoring a weight of a structure that contains the material bed. One or more position sensors (e.g., height sensors) can measure the height of the material bed relative to the platform (e.g., at one of more positions). The position sensors can be optical sensors. The position sensors can determine a distance between one or more energy beams (e.g., a laser or an electron beam.) and the exposed surface of the material (e.g., powder) bed. The one or more sensors may be connected to a control system (e.g., to a processor and/or to a computer).

In some embodiments, the systems and/or apparatuses disclosed herein comprise one or more motors. The motors may comprise servomotors. The servomotors may comprise actuated linear lead screw drive motors. The motors may comprise belt drive motors. The motors may comprise rotary encoders. The apparatuses and/or systems may comprise switches. The switches may comprise homing or limit switches. The motors may comprise actuators. The motors may comprise linear actuators. The motors may comprise belt driven actuators. The motors may comprise lead screw driven actuators. The actuators may comprise linear actuators. The systems and/or apparatuses disclosed herein may comprise one or more pistons.

In some examples, a pressure system is in fluid communication with the enclosure. The pressure system can be configured to regulate the pressure in the enclosure. In some examples, the pressure system includes one or more pumps. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump, or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valveless pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump.

In some examples, the pressure system includes one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector. The pressure system can include valves; such as throttle valves. The pressure system can include a pressure sensor for measuring the pressure of the chamber and relaying the pressure to the controller, which can regulate the pressure with the aid of one or more vacuum pumps of the pressure system. The pressure sensor can be coupled to a control system (e.g., controller). The pressure can be electronically or manually controlled.

In some embodiments, the systems, apparatuses, and/or methods described herein comprise a material recycling mechanism. The recycling mechanism can collect at least unused pre-transformed material and return the unused pre-transformed material to a reservoir of a material dispensing mechanism (e.g., the material dispensing reservoir), or to a bulk reservoir that feeds the material dispensing mechanism. The recycling mechanism and the bulk reservoir are described in patent application No. 62/265,817, and patent application No. 62/317,070, both of which are incorporated herein by reference in their entirety.

In some cases, unused material (e.g., remainder) surrounds the 3D object in the material bed. The unused material can be substantially removed from the 3D object. The unused material may comprise pre-transformed material. Substantial removal may refer to material covering at most about 20%, 15%, 10%, 8%, 6%, 4%, 2%, 1%, 0.5%, or 0.1% of the surface of the 3D object after removal. Substantial removal may refer to removal of all the material that was disposed in the material bed and remained as pre-transformed material at the end of the 3D printing process (i.e., the remainder), except for at most about 10%, 3%, 1%, 0.3%, or 0.1% of the weight of the remainder. Substantial removal may refer to removal of all the remainder except for at most about 50%, 10%, 3%, 1%, 0.3%, or 0.1% of the weight of the printed 3D object. The unused material can be removed to permit retrieval of the 3D object without digging through the material bed. For example, the unused material can be suctioned out of the material bed by one or more vacuum ports (e.g., nozzles) built adjacent to the material bed, by brushing off the remainder of unused material, by lifting the 3D object from the unused material, by allowing the unused material to flow away from the 3D object (e.g., by opening an exit opening port on the side(s) and/or on the bottom of the material bed from which the unused material can exit). After the unused material is evacuated, the 3D object can be removed. The unused pre-transformed material can be re-circulated to a material reservoir for use in future builds. The re-circulation can be before a new build, after completion of a build, and/or (e.g., continuously) during the 3D printing. The removal of the remainder may be effectuated as described in patent application No. 62/265, 817, or in patent application number PCT/US15/36802, both of which are incorporated herein by reference in their entirety. In some cases, cooling gas can be directed to the hardened material (e.g., 3D object) for cooling the hardened material during and/or following its retrieval (e.g., from the build module).

In some cases, the 3D object is fabricated (e.g., printed) with a set of transforming energy beams. The set of transforming energy beams may comprise one or more transforming energy beams (e.g., scanning and/or tiling energy beam). The rate in which the set of set of transforming energy beams fabricate the 3D object can be at least 1 cubic centimeters per hours ($cm^3/h$), 5 $cm^3/h$, 10 $cm^3/h$, 20 $cm^3/h$, 30 $cm^3/h$, 40 $cm^3/h$, 50 $cm^3/h$, 60 $cm^3/h$, 70 $cm^3/h$, 80 $cm^3/h$, 90 $cm^3/h$, 100 $cm^3/h$, 110 $cm^3/h$, 120 $cm^3/h$, 130 $cm^3/h$, 140 $cm^3/h$, or 150 $cm^3/h$. The rate in which the set of set of transforming energy beams fabricate the 3D object can be a value between the afore-mentioned values (e.g., from about 1 $cm^3/h$ to about 150 $cm^3/h$, from about 20 $cm^3/h$ to about 120 $cm^3/h$, from about 30 $cm^3/h$ to about 90 $cm^3/h$, or from about 40 $cm^3/h$ to about 80 $cm^3/h$).

In some examples, the final form of the 3D object is retrieved soon after cooling of a final layer of hardened material. Soon after cooling may be at most about 1 day, 12 hours (h), 6 h, 5 h, 4 h, 3 h, 2 h, 1 h, 30 minutes, 15 minutes, 5 minutes, 240 s, 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s. Soon after cooling may be between any of the afore-mentioned time values (e.g., from about 1 s to about 1 day, from about 1 s to about 1 hour, from about 30 minutes to about 1 day, from about 20 s to about 240 s, from about 12 h to about 1 s, from about 12 h to about 30 min, from about 1 h to about 1 s, or from about 30 min to about 40 s). In some cases, the cooling can occur by method comprising active cooling by convection using a cooled gas or gas mixture comprising argon, nitrogen, helium, neon, krypton, xenon, hydrogen, carbon monoxide, carbon dioxide, or oxygen. Cooling may be cooling to a handling temperature (e.g., ambient temperature). Cooling may be cooling to a temperature that allows a person to handle the 3D object.

In some examples, the generated 3D object requires very little or no further processing after its retrieval. In some examples, the diminished further processing (or lack thereof), will afford a 3D printing process that requires smaller amount of energy and/or less waste as compared to commercially available 3D printing processes. The smaller amount can be smaller by at least about 1.1, 1.3, 1.5, 2, 3, 4, 5, 6, 7, 8, 9, or 10. The smaller amount may be smaller by any value between the afore-mentioned values (e.g., from about 1.1 to about 10, or from about 1.5 to about 5). Further processing may comprise trimming (e.g., ablating). Further processing may comprise polishing (e.g., sanding). The generated 3D object can be retrieved and finalized without removal of transformed material and/or auxiliary features (e.g., since the 3D object does not comprise any). The 3D object can be retrieved when the 3D object, composed of hardened (e.g., solidified) material, is at a handling temperature that is suitable to permit its removal from the material bed without its substantial deformation. The handling temperature can be a temperature that is suitable for packaging of the 3D object. The handling temperature a can be at most about 120° C., 100° C., 80° C., 60° C., 40° C., 30° C., 25° C., 20° C., 10° C., or 5° C. The handling temperature can be of any value between the afore-mentioned temperature values (e.g., from about 120° C. to about 20° C., from about 40° C. to about 5° C., or from about 40° C. to about 10° C.).

In some embodiments, the methods, apparatuses, software, and systems provided herein result in fast and/or efficient formation of 3D objects. In some cases, the 3D object can be transported within at most about 120 min, 100 min, 80 min, 60 min, 40 min, 30 min, 20 min, 10 min, or 5 min after the last layer of the object hardens (e.g., solidifies). In some cases, the 3D object can be transported within at least about 120 min, 100 min, 80 min, 60 min, 40 min, 30 min, 20 min, 10 min, or 5 min after the last layer of the object forms (e.g., hardens). In some cases, the 3D object can be transported within any time between the above-mentioned values (e.g., from about 5 min to about 120 min, from about 5 min to about 60 min, or from about 60 min to about 120 min). The 3D object can be transported once it cools to a temperature of at most about 100° C., 90° C., 80° C., 70° C., 60° C., 50° C., 40° C., 30° C., 25° C., 20° C., 15° C., 10° C., or 5° C. The 3D object can be transported once it cools to a temperature value between the above-mentioned temperature values (e.g., from about 5° C. to about 100° C., from about 5° C. to about 40° C., or from about 15° C. to about 40° C.). Transporting the 3D object can comprise packaging and/or labeling the 3D object. In some cases, the 3D object can be transported directly to a consumer.

In some examples, the methods, systems, apparatuses, and/or software presented herein facilitate formation of custom and/or a stock 3D objects for a customer. A customer can be an individual, a corporation, organization, government, non-profit organization, company, hospital, medical practitioner, engineer, retailer, any other entity, or individual. The customer may be one that is interested in receiving the 3D object and/or that ordered the 3D object. A customer can submit a request for formation of a 3D object. The customer can provide an item of value in exchange for the 3D object. The customer can provide a design or a model for the 3D object. The customer can provide the design in the form of a stereo lithography (STL) file. The customer can provide a design wherein the design can be a definition of the shape and/or dimensions of the 3D object in any other numerical or physical form. In some cases, the customer can provide a 3D model, sketch, and/or image as a design of an object to be generated. The design can be transformed in to instructions usable by the printing system to additively generate the 3D object. The customer can provide a request to form the 3D object from a specific material or group of materials (e.g., a material as described herein). In some cases, the design may not contain auxiliary features (or marks of any past presence of auxiliary support features). In response to the customer request, the 3D object can be formed or generated with the printing method, system and/or apparatus as described herein. In some cases, the 3D object can be formed by an additive 3D printing process (e.g., additive manufacturing). Additively generating the 3D object can comprise successively depositing and transforming (e.g., melting) a pre-transformed material (e.g., powder) comprising one or more materials as specified by the customer. The 3D object can be subsequently delivered to the customer. The 3D object can be formed without generation or removal of auxiliary features (e.g., that is indicative of a presence or removal of the auxiliary support feature). Auxiliary features can be support features that prevent a 3D object from shifting, deforming or moving during the formation of the 3D object.

In some examples, the 3D object is produced in a substantially accurate manner, wherein substantially is relative to the intended purpose of the 3D object. The 3D object (e.g., solidified material) that is generated for the customer can have an average deviation value from the intended dimensions (e.g., specified by the customer, or designated according to a model of the 3D object) of at most about 0.5 microns (μm), 1 μm, 3 μm, 10 μm, 30 μm, 100 μm, 300 μm, or less. The deviation can be any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions in a specific direction, according to the formula $Dv+L/K_{Dv}$, wherein Dv is a deviation value, L is the length of the 3D object in a specific direction, and $K_{Dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, or 300 μm. Dv can have any value between the afore-mentioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{DV}$ can have a value of at most about 3000, 2500, 2000, 1500, 1000, or 500. $K_{DV}$ can have a value of at least about 500, 1000, 1500, 2000, 2500, or 3000. $K_{DV}$ can have any value between the afore-mentioned values (e.g., from about 3000 to about 500, from about 1000 to about 2500, from about 500 to about 2000, from about 1000 to about 3000, or from about 1000 to about 2500).

In some examples, the intended dimensions of the 3D object are derived from a model design of the 3D object. The 3D part can have the stated accuracy value immediately after its formation, without additional processing or manipulation. Receiving the order for the object, formation of the object, and delivery of the object to the customer can take at most about 7 days, 6 days, 5 days, 3 days, 2 days, 1 day, 12 hours, 6 hours, 5 hours, 4 hours, 3 hours, 2 hours, 1 hour, 30 min, 20 min, 10 min, 5 min, 1 min, 30 seconds, or 10 seconds. Receiving the order for the object, formation of the object, and delivery of the object to the customer can take a period of time between any of the afore-mentioned time periods (e.g., from about 10 seconds to about 7 days, from about 10 seconds to about 12 hours, from about 12 hours to about 7 days, or from about 12 hours to about 10 minutes). In some cases, the 3D object can be generated in a period between any of the afore-mentioned time periods (e.g., from about 10 seconds to about 7 days, from about 10 seconds to about 12 hours, from about 12 hours to about 7 days, or from about 12 hours to about 10 minutes). The time can vary based on the physical characteristics of the object, including the size and/or complexity of the object.

In some embodiments, the system, methods, software, and/or apparatus comprise at least one control mechanism (e.g., a controller). The methods, systems, apparatuses, and/or software disclosed herein may incorporate at least one controller that controls one or more of the (e.g., 3D printer) components described herein. In some embodiments, one controller controls two or more of the components. In some embodiments, at least two of the components are controlled by different controllers. The controller may comprise a computer-processing unit (e.g., a computer) that is operatively coupled to any of the systems and/or apparatuses, or their respective components (e.g., the energy source(s)). Alternatively or additionally, the systems and/or apparatuses disclosed herein may be coupled to a processing unit. Alternatively or additionally, the methods and/or software may incorporate the operation of a processing unit. The computer can be operatively coupled through a wired and/or through a wireless connection. In some cases, the computer can be on board a user device. A user device can be a laptop computer, desktop computer, tablet, smartphone, or another computing device. The controller can be in communication with a cloud computer system and/or a server. The controller can be programmed to (e.g., selectively) direct the energy source(s) to apply energy to the at least a portion of the target surface at a power per unit area. The controller can be in communication with the optical system (e.g., the scanner) configured to articulate the energy source(s) to apply energy to at least a portion of the target surface at a power per unit area. The optical system may comprise an optical setup.

Figure 2:
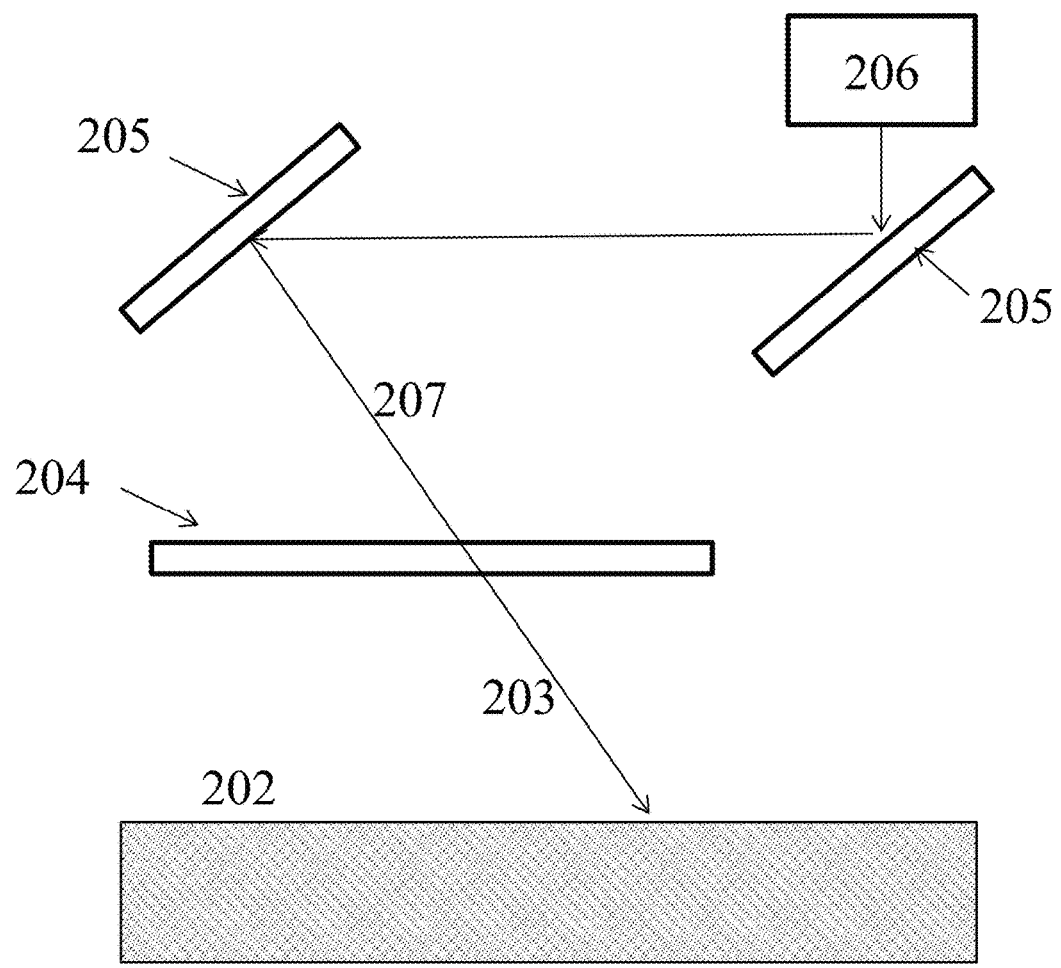
FIG. 2 schematically illustrates an optical system.

The controller may control the layer dispensing mechanism and/or any of its components. The controller may control the platform. The controller may control the one or more sensors. The controller may control any of the components of the 3D printing system and/or apparatus. The controller may control any of the mechanisms used to effectuate the methods described herein. The control may comprise controlling (e.g., directing and/or regulating) the movement speed (velocity) of any of the 3D printing mechanisms and/or components. The movement may be horizontal, vertical, and/or in an angle (planar and/or compound). The controller may control at least one characteristic of the transforming energy beam. The controller may control the movement of the transforming energy beam (e.g., according to a path). The controller may control the source of the (e.g., transforming and/or sensing) energy beam. The energy beam (e.g., transforming energy beam, and/or sensing energy beam) may travel through an optical setup. The optical setup may comprise a mirror, a lens, a focusing device, a prism, or an optical window. FIG. 2 shows an example of an optical setup in which an energy beam is projected from the energy source 206, and is deflected by two mirrors 205, and travels through an optical element 204. The optical element 204 can be an optical window, in which case the incoming beam 207 is substantially unaltered 203 after crossing the optical window. The optical element 204 can be a focus altering device (e.g., lens), in which case the focus (e.g., cross section) of the incoming beam 207 is altered after passing through the optical element 204 and emerging as the beam 203. The controller may control the scanner that directs the movement of the transforming energy beam and/or platform. The focus altering device can converge or diverge the lens. The focus altering device may alter the focus (e.g., before, after, and/or during the 3D printing) dynamically. The dynamic focus alteration may result in a range of focus alteration of the energy beam. The focus altering device may be static or dynamic. The dynamic focus altering device may be controller (e.g., manually and/or automatically by a controller). The dynamic focus alteration may be motorized (e.g., using at least one motor).

In some embodiments, the controller controls the level of pressure (e.g., vacuum, ambient, or positive pressure) in the material removal mechanism material dispensing mechanism, and/or the enclosure (e.g., chamber). The pressure level (e.g., vacuum, ambient, or positive pressure) may be constant or varied. The pressure level may be turned on and off manually and/or automatically (e.g., by the controller). The controller may control at least one characteristic and/or component of the layer dispensing mechanism. For example, the controller may control the direction and/or rate of movement of the layer dispensing mechanism and any of its components, with respect to the target surface. The controller may control the cooling member (e.g., external and/or internal). The movement of the layer dispensing mechanism or any of its components may be predetermined. The movement of the layer dispensing mechanism or any of its components may be according to an algorithm. Other control examples can be found in patent applications No. 62/265,817, or patent application number PCT/US15/36802, both of which are incorporated herein by reference in their entirety. The control may be manual and/or automatic. The control may be programmed and/or be effectuated a whim. The control may be according to an algorithm. The algorithm may comprise a 3D printing algorithm, or a motion control algorithm. The algorithm may take into account the (virtual) model of the 3D object.

Figure 11:
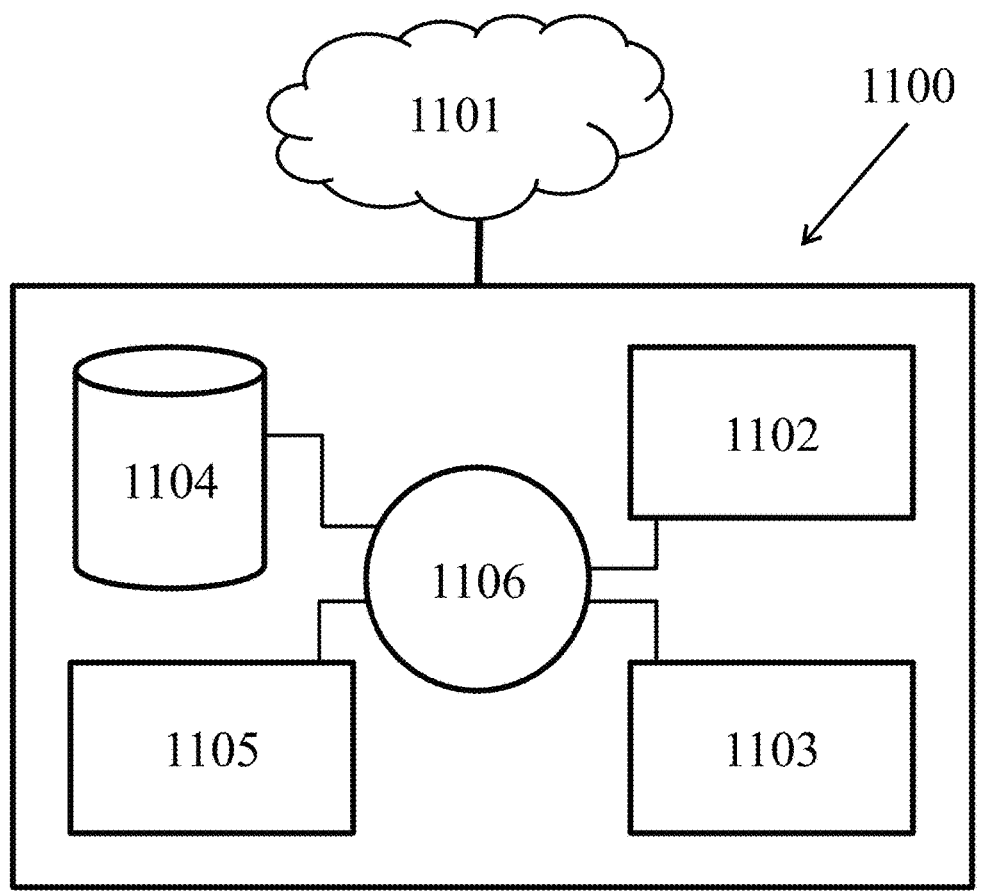
FIG. 11 schematically illustrates a computer control system that is programmed or otherwise configured to facilitate the formation of one or more 3D objects.

In some embodiments, the controller comprises a processing unit. The processing unit may be central. The processing unit may comprise a central processing unit (herein "CPU"). The controllers or control mechanisms (e.g., comprising a computer system) may be programmed to implement methods of the disclosure. The controller may control at least one component of the systems and/or apparatuses disclosed herein. FIG. 11 is a schematic example of a computer system 1100 that is programmed or otherwise configured to facilitate the formation of a 3D object according to the methods provided herein. The computer system 1100 can control (e.g., direct and/or regulate) various features of printing methods, software, apparatuses and systems of the present disclosure, such as, for example, regulating force, translation, heating, cooling and/or maintaining the temperature of a material bed (e.g., powder bed), process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 1101 can be part of, or be in communication with, a printing system or apparatus, such as a 3D printing system or apparatus of the present disclosure. The computer may be operatively coupled to one or more mechanisms disclosed herein, and/or any parts thereof. For example, the computer may be operatively coupled to one or more sensors, valves, switches, motors, pumps, optical components, or any combination thereof.

In some embodiments, the computer system 1100 includes a processing unit 1106 (also "processor," "computer" and "computer processor" used herein). The computer system may include memory or memory location 1102 (e.g., random-access memory, read-only memory, flash memory), electronic storage unit 1104 (e.g., hard disk), communication interface 1103 (e.g., network adapter) for communicating with one or more other systems, and peripheral devices 1105, such as cache, other memory, data storage and/or electronic display adapters. The memory 1102, storage unit 1104, interface 1103, and peripheral devices 1105 are in communication with the processing unit 1106 through a communication bus (solid lines), such as a motherboard. The storage unit can be a data storage unit (or data repository) for storing data. The computer system can be operatively coupled to a computer network ("network") 1101 with the aid of the communication interface. The network can be the Internet, and/or an internet and/or extranet (e.g., an intranet and/or extranet that is in communication with the Internet). In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

In some embodiments, the processing unit executes a sequence of machine-readable instructions that can be embodied in a program or software. The instructions may be stored in a memory location, such as the memory 1102. The instructions can be directed to the processing unit, which can subsequently program or otherwise configure the processing unit to implement methods of the present disclosure. Examples of operations performed by the processing unit can include fetch, decode, execute, and/or write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 1100 can be included in the circuit.

In some embodiments, the storage unit (e.g., 1104) stores files, such as drivers, libraries and/or saved programs. The storage unit can store user data (e.g., user preferences and user programs). In some cases, the computer system can include one or more additional data storage units that are external to the computer system, such as located on a remote server that is in communication with the computer system through an intranet or the Internet.

In some embodiments, the computer system communicates with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

In some embodiments, the methods described herein are implemented by way of machine (e.g., computer processor) executable code stored on an electronic storage location of the computer system, such as, for example, on the memory (e.g., 1102) or electronic storage unit (e.g., 1104). The machine executable or machine-readable code can be provided in the form of software. During use, the processor (e.g., 1106) can execute the code. In some cases, the code can be retrieved from the storage unit and stored on the memory for ready access by the processor. In some situations, the electronic storage unit can be precluded, and machine-executable instructions are stored on memory. The code can be pre-compiled and configured for use with a machine comprising a processor adapted to execute the code, or can be compiled during runtime. The code can be supplied in a programming language that can be selected to enable the code to execute in a pre-compiled or as-compiled fashion.

In some embodiments, the processing unit includes one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of at most about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of any value between the afore-mentioned values (e.g., from about 50 mm$^2$ to about 800 mm$^2$, from about 50 mm$^2$ to about 500 mm$^2$, or from about 500 mm$^2$ to about 800 mm$^2$). The close proximity may allow substantial preservation of communication signals that travel between the cores. The close proximity may diminish communication signal degradation. A core, as understood herein, is a computing component having independent central processing capabilities. The computing system may comprise a multiplicity of cores, which are disposed on a single computing component. The multiplicity of cores may include two or more independent central processing units. The independent central processing units may constitute a unit that reads and executes program instructions. The independent central processing units may constitute one or more parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the destination sending a packet back to the source (e.g., the packet making a round trip). The latency may be sufficiently low to allow a high number of floating point operations per second (FLOPS). The number of FLOPS may be at least about 0.1 Tera FLOPS (T-FLOPS), 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, from about 10 T-FLOPS to about 30 T-FLOPS, from about 50 T-FLOPS to about 1 EXA-FLOP, or from about 0.1 T-FLOP to about 10 EXA-FLOPS). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance UNPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI may refer to Message Passing Interface.

The computer system may include hyper-threading technology. The computer system may include a chip processor with integrated transform, lighting, triangle setup, triangle clipping, rendering engine, or any combination thereof. The rendering engines may be capable of processing at least about 10 million calculations per second. The rendering engine may be capable of processing at least about 10 million polygons per second. As an example, the GPU may include a GPU by Nvidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

In some examples, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

In some embodiments, the computer system includes configurable computing, partially reconfigurable computing, reconfigurable computing, or any combination thereof. The computer system may include an FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration. The reconfigurable computing environment may comprise reconfigure one or more models (e.g., physical models) used for 3D printing. The FPGA may comprise configurable FPGA logic, and/or fixed-function hardware comprising: multipliers, memories, microprocessor cores, first in-first out (FIFO) and/or error correcting code (ECC) logic, digital signal processing (DSP) blocks, peripheral component interconnect express (PCI Express) controllers, Ethernet media access control (MAC) blocks, or high-speed serial transceivers. DSP blocks can be DSP slices.

In some embodiments, the computing system includes an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond ($\mu$s), 1 $\mu$s, 10 $\mu$s, 100 $\mu$s, or 1 millisecond (ms). The physical unit may produce the algorithm output in any time between the afore-mentioned times (e.g., from about 0.1 $\mu$s, to about 1 ms, from about 0.1 $\mu$s, to about 100 $\mu$s, or from about 0.1 $\mu$s to about 10 $\mu$s).

In some instances, the controller uses calculations, real time measurements, or any combination thereof, to regulate at least one characteristic of the energy beam(s) and/or energy source(s). The sensor (e.g., temperature and/or metrological sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real time measurements may be conducted during the 3D printing process. The real-time measurements may be in situ measurements in the 3D printing system and/or apparatus. the real time measurements may be during at least a portion of the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds ($\mu$sec), 50 $\mu$sec, 20 $\mu$sec, 10 $\mu$sec, 5 $\mu$sec, or 1 $\mu$sec. In some instances, the processing unit may use the signal obtained from the at least one sensor to provide a processing unit output, which output is provided at a speed of any value between the afore-mentioned values (e.g., from about 100 min to about 1 $\mu$sec, from about 100 min to about 10 min, from about 10 min to about 1 min, from about 5 min to about 0.5 min, from about 30 sec to about 0.1 sec, from about 0.1 sec to about 1 msec, from about 80 msec to about 10 $\mu$sec, from about 50 $\mu$sec to about 1 $\mu$sec, from about 20 $\mu$sec to about 1 $\mu$sec, or from about 10 $\mu$sec to about 1 $\mu$sec).

The processing unit output may comprise an evaluation of: a temperature at a location, a map of temperatures at locations, a position at a location (e.g., vertical and/or horizontal), or a map of positions at locations. The position may be horizontal and/or vertical. The position may be in space (e.g., comprising X Y and Z coordinates). The location may be on the target surface. The map may comprise a topological and/or temperature map. The temperature sensor may comprise a temperature imaging device (e.g., IR imaging device).

In some embodiments, the processing unit uses the signal obtained from the at least one sensor in an algorithm that is used in controlling the energy beam (e.g., in the 3D printing instructions). The algorithm may comprise the path of the energy beam. In some instances, the algorithm may be used to alter the path (e.g., trajectory) of the energy beam on the target surface. The path may deviate from a cross section of a (virtual) model corresponding to the desired 3D object. The processing unit may use the output in an algorithm that is used in determining the manner in which a model of the desired 3D object may be sliced. In some embodiments, the processing unit uses the signal obtained from the at least one sensor in an algorithm that is used to configure one or more parameters, systems, and/or apparatuses relating to the 3D printing process. The parameters may comprise a characteristic of the energy beam. The parameters may comprise movement of the platform and/or material bed. The parameters may comprise relative movement of the energy beam to the material bed. In some instances, the energy beam, the platform (e.g., material bed disposed on the platform), or both may translate. Alternatively or additionally, the controller may use historical data for the control. Alternatively or additionally, the processing unit may use historical data in its one or more algorithms. The parameters may comprise the height of the layer of pre-transformed (e.g., powder)

material disposed in the enclosure and/or the gap by which the cooling element (e.g., heat sink) is separated from the target surface. The target surface may be the exposed layer of the material bed.

In some embodiments, aspects of the systems, apparatuses, and/or methods provided herein, such as the computer system, are embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. The storage may comprise non-volatile storage media. "Storage" type media can include any or all the tangible memory of the computers, processors or the like, or associated modules thereof, such as various semiconductor memories, tape drives, disk drives, external drives, and the like, which may provide non-transitory storage at any time for the software programming. The memory may comprise a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

In some embodiments, at least portions (e.g., all) of the software may at times be communicated through the Internet or various other telecommunication networks. Such communications, for example, may enable loading of the software from one computer or processor into another, for example, from a management server and/or a host computer, into the computer platform of an application server. Thus, another type of media that may bear the software elements comprises optical, electrical, or electromagnetic waves; for example, such as the ones used across physical interfaces between local devices, through wired and optical landline networks, and/or over various air-links. The physical elements that carry such waves (e.g., such as wired or wireless links, optical links, or the like) also may be considered as media bearing the software. As used herein, unless restricted to non-transitory, tangible "storage" media, terms such as computer or machine "readable medium" refer to any medium that participates in providing instructions to a processor for execution. Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

In some embodiments, the computer system includes and/or is in communication with an electronic display. The electronic display may comprise a user interface (UI) for providing, for example, a model design or graphical representation of a 3D object to be printed (e.g., before, after, and/or during the 3D printing (e.g. in real-time)). Examples of UI's include, without limitation, a graphical user interface (GUI) and web-based user interface. The computer system can monitor and/or control various aspects of the 3D printing system. The control may be manual and/or programmed. The control may rely on one or more feedback mechanisms (e.g., using signals from the one or more sensors). The control may consider historical data. The control mechanism may be pre-programmed. The control mechanisms may rely on input from sensors (described herein) that are connected to the control unit (i.e., control system or control mechanism). The computer system may store historical data concerning various aspects of the operation of the 3D printer. The historical data may be retrieved at predetermined times and/or at a whim. The historical data may be accessed by an operator and/or by a user. The historical, sensor, and/or operative data may be provided in an output unit (e.g., a display unit). The output unit (e.g., monitor) may output various parameters of the 3D printing system (as described herein) in real time and/or in a delayed time (e.g., before, after, and/or during the 3D printing). The output unit may output the current 3D printed object (e.g., build), the requested (e.g., ordered) 3D printed object, or both. The output unit may output the printing progress of the 3D printed object (e.g., in real-time). The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as an output of the output unit.

In some embodiments, the system and/or apparatus described herein (e.g., controller) and/or any of their components comprise an output and/or an input device. The input device may comprise a keyboard, touch pad, or microphone. The output device may be a sensory output device. The output device may comprise a visual, tactile, or audio device. The audio device may include a loudspeaker. The visual output device may include a screen and/or a printed hard copy (e.g., paper). The output device may include a (e.g., two-dimensional) printer (e.g., paper printer). The apparatus may record one or more operations and/or specifications of the system and/or apparatus. The record may be used for process optimization, certification, and/or specification. The input device may include a camera, a microphone, a keyboard, or a (e.g., touch) screen. The system and/or apparatus described herein (e.g., controller) and/or any of their components may comprise Bluetooth technology. The system and/or apparatus described herein (e.g., controller) and/or any of their components may comprise a communication port. The communication port may be a serial port or a parallel port. The communication port may be a Universal Serial Bus port (i.e., USB). The system and/or apparatus described herein (e.g., controller) and/or any of their components may comprise USB ports. The USB can be micro or mini USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The system and/or apparatus described herein (e.g., controller) and/or any of their components may comprise a plug and/or a socket (e.g., electrical, AC power, DC power). The system and/or apparatus described herein (e.g., controller) and/or any of their components may comprise an adapter (e.g., AC and/or DC power adapter). The system and/or apparatus described herein (e.g., controller) and/or any of their components may comprise a power connector. The power connector can be an electrical power connector. The power connector may comprise a magnetically coupled (e.g., attached) power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

Figure 13:
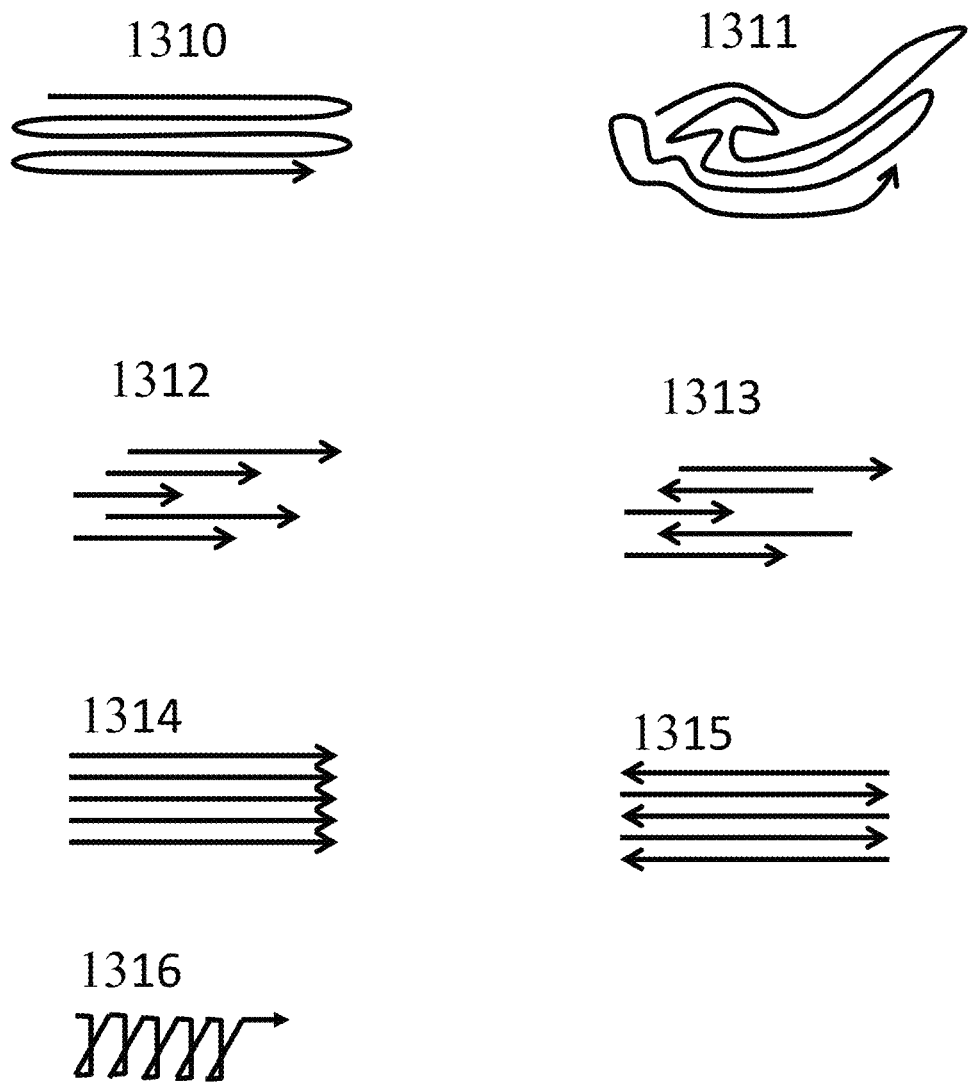
FIG. 13 illustrates various paths.

In some examples, the systems, methods, software, and/or apparatuses disclosed herein may comprise receiving a request for a 3D object (e.g., from a customer). The request can include a model (e.g., CAD) of the desired 3D object. Alternatively or additionally, a (virtual) model of the desired 3D object may be generated. The model may be used to generate 3D printing instructions. In some examples, the 3D printing instructions may exclude the 3D model (e.g., and include a modification thereof, e.g., a geometric modification). The 3D printing instructions may be based on the 3D model. The 3D printing instructions may take the 3D model into account. The 3D printing instructions may be alternatively or additionally based on simulations (e.g., thermos-mechanical simulations). The 3D printing instructions may use the 3D model. The 3D printing instructions may comprise using an algorithm (e.g., embedded in a software) that takes into account the 3D model, simulations, historical data, sensor input, or any combination thereof. The control can be of at least one characteristic of the energy beam (e.g., as disclosed herein). The control can comprise using a simulation. The computer model (e.g., physical model) may comprise one or more simulation. The simulation can comprise a temperature or mechanical simulation of the 3D printing (e.g., of the desired and/or requested 3D object). The simulation may comprise thermo-mechanical simulation. The simulation can comprise a material property of the requested 3D object. The thermo-mechanical simulation can comprise elastic or plastic simulation. The control can comprise using a graphical processing unit (GPU), system-on-chip (SOC), application specific integrated circuit (ASIC), application specific instruction-set processor (ASIPs), programmable logic device (PLD), or field programmable gate array (FPGA). The processor may compute at least a portion of the algorithm during the 3D printing process (e.g., in real-time), during the formation of the 3D object, prior to the 3D printing process, after the 3D printing process, or any combination thereof. The processor may compute the algorithm in the interval between pulses of the (e.g., transforming) energy beam, during the dwell time of the energy beam, before the energy beam translates to a new position, while the energy beam is not translating, while the energy beam does not irradiate the target surface, while the energy beam irradiates the target surface, or any combination thereof. For example, the processor may compute the algorithm while the energy beam translates and does substantially not irradiate the exposed surface. For example, the processor may compute the algorithm while the energy beam does not translate and/or irradiates the exposed surface. For example, the processor may compute the algorithm while the energy beam does not substantially translate and does substantially not irradiate the exposed surface. For example, the processor may compute the algorithm while the energy beam does translate and/or irradiates the exposed surface. The translation of the energy beam may be translation along an entire path or a portion thereof. The path may correspond to a cross section of the model of the requested 3D object. The translation of the energy beam may be translation along at least one hatching within the path. FIG. 13 shows examples of various paths. The direction of the arrow(s) in FIG. 13 represents the direction according to which the energy beam scans the target surface. The path may correspond to a position in the exposed surface of the material bed with which the energy beam interacts. The various vectors depicted in FIG. 13, 1314 show an example of various hatchings.

Figure 12:
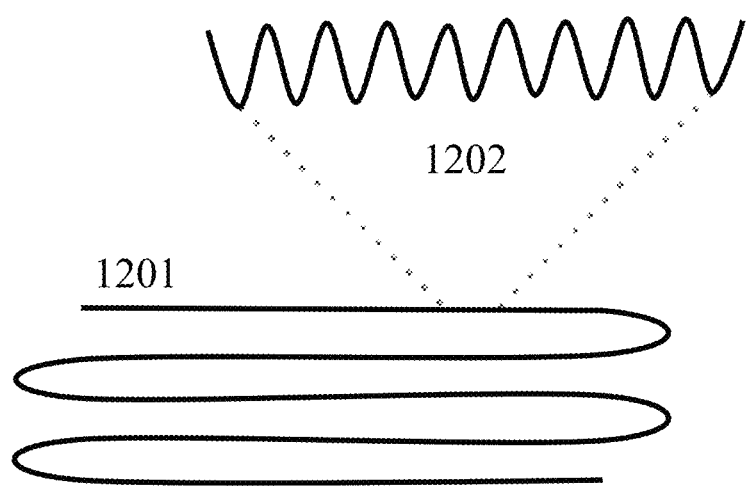
FIG. 12 illustrates a path.

The respective movement of the energy beam with respect to the material bed may oscillate while traveling along the path. For example, the propagation of the energy beam along a path may be by small path deviations (e.g., variations such as oscillations). FIG. 12 shows an example of a path 1201. The sub path 1202 is a magnification of a portion of the path 1201 showing path deviations (e.g., oscillations).

EXAMPLES

The following are illustrative and non-limiting examples of methods of the present disclosure.

Example 1

In a 25 cm by 25 cm by 30 cm container at ambient temperature and pressure, Inconel 718 powder of average particle size 32 µm is deposited to form a powder bed. A 200 W 1060 nm fiber-laser beam fabricated a plurality of rectangular 3D objects comprising elongated surfaces of approximate dimensions 6 mm by 30 mm, 3D objects were formed by melting respective portions of the powder bed. The fabricated 3D objects were anchorlessly suspended in the powder bed during and after their fabrication. The surfaces expressed various degrees of warping as depicted in FIG. 19 (e.g., 1903, 1904, and 1905). A visible light emitting diode projected a sine wave on the exposed surface of the powder bed containing these surfaces, visibly showing their planarity or the degree of deviation from planarity of various portions of the surfaces. The deviation may be correlated to the manner (e.g., magnitude and direction) of deviation from the expected projection of the oscillating light (e.g., 1901 and 1902) or lack thereof. The portion of the powder bed containing the surfaces was imaged by a 4 Mega pixel complementary metal-oxide-semiconductor (CMOS) camera. The sine wave image on the camera has a periodicity of approximately 16 pixels.

Example 2

Figure 35:
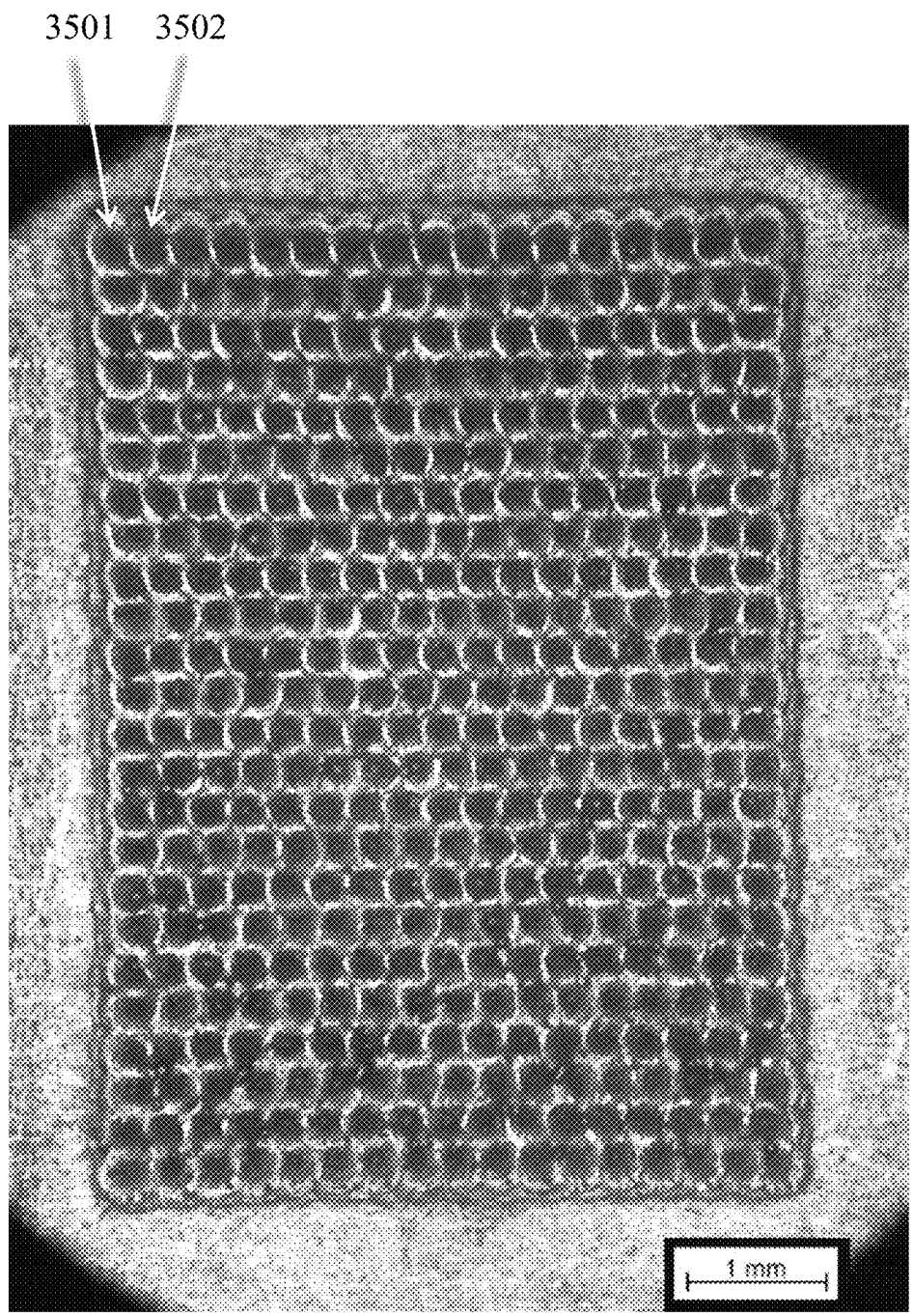
FIG. 35 shows a 3D object.

In a processing chamber at ambient atmosphere and temperature, and at a pressure of about 3,000 Pa above atmospheric pressure, a planar 3D object made of Inconel 718 was disposed above a base, which planar 3D object was 6 mm wide, 25 mm long, and 770 micrometers thick. A 400 W fiber 1060 nm laser beam fabricated a series of tiles as follows: (a) a planar exposed surface of the 3D object was irradiated with a defocused Gaussian beam of cross section diameter of about 0.5 mm (measured at $1/e^2$ of the Gaussian beam) during dwell time $t_1$, to form a first tile (e.g., FIG. 35, 3501); (b) the laser beam translated to the position of the future second tile during intermission time $t_2$; and (c) the energy beam irradiated at the second position during dwell time $t_3$ to form the second tile (e.g., FIG. 35, 3502). Steps (a)-(c) were repeated while the energy beam moved along a predetermined trajectory with predetermined dwell time scheme (e.g., using open loop control) to form the tiled surface shown in FIG. 35 as a top view that depicts a series of substantially identical tiles. The delay time $t_2$ was substantially constant during the formation of the tiled surface. The dwell times (e.g., t1 and t3) were varied to predetermined times to form melt pools of substantially constant dimensions. This was done while overcoming the preheating effect of previously formed melt pools, as well as edge effects at the edge of the melt pool array. The 3D object was not anchored to the base during irradiation of the laser. The power of the laser stayed substantially constant during its irradiation. FIG. 35 was imaged by a 2 Mega pixel charge-coupled device (CCD) camera under an optical microscope.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A system for printing a three-dimensional object comprising:
   an enclosure configured to contain a material bed;
   an energy source configured to generate an energy beam that transforms at least a fraction of the material bed into a transformed material as part of (A) the three-dimensional object and (B) a physical marker, which three-dimensional object comprises a portion that is deformable, wherein the physical marker is connected to the portion, wherein the three-dimensional object is formed while considering a model of a requested three-dimensional object, wherein the physical marker is an addition to the requested three-dimensional object, wherein upon deformation, a position of at least a segment of the physical marker deviates, wherein the energy source is operatively coupled to the material bed;
   a detector that is configured to detect the at least the segment of the physical marker, wherein the detector is operatively coupled to the material bed; and
   at least one controller that is operatively coupled to the energy source and to the detector, wherein the at least one controller is individually or collectively programmed to: (i) direct the energy beam to transform the at least the fraction of the material bed into the transformed material as part of (A) the three-dimensional object and (B) the physical marker, and (ii) evaluate, or direct evaluation of, a deviation from the position of the at least the segment of the physical marker detected with the aid of the detector, to produce a result.

2. The system of claim 1, wherein the at least one controller is individually or collectively programmed to use the result to control at least one characteristic of the (I) energy beam, (II) energy source, or (III) energy beam and energy source, to form an additional portion of three-dimensional object.

3. The system of claim 2, wherein the at least one characteristic of the energy beam comprises dwell time, intermission time, speed, trajectory, cross section, footprint on an exposed surface of the material bed, fluence, focus, or power density.

4. The system of claim 2, wherein the at least one characteristic of the energy source comprises power.

5. The system of claim 1, wherein the at least one controller is individually or collectively programmed to evaluate or direct evaluation in (ii) during the printing.

6. The system of claim 1, wherein the physical marker is connected to the portion upon formation of the portion.

7. The system of claim 1, wherein the at least one controller is individually or collectively programmed to control the deformation using the result.

8. The system of claim 7, wherein the at least one controller is individually or collectively programmed to control the deformation by reducing and/or monitoring the deformation.

9. The system of claim 1, wherein the physical marker is attached to the portion at a position of the requested three-dimensional object that is buried in the material bed.

10. The system of claim 9, wherein the physical marker is attached to the portion at a position of the requested three-dimensional object that is buried in the material bed at least during the deformation.

11. The system of claim 1, wherein the material bed comprises a particulate material.

12. The system of claim 11, wherein the particulate material comprises at least one member selected from the group consisting of a metal alloy, elemental metal, ceramic, allotrope of elemental carbon, and an organic material.

13. The system of claim 1, further comprising a layer dispensing mechanism comprising a cyclonic separator, which layer dispensing mechanism is configured to planarize an exposed surface of the material bed during at least a portion of the printing.

14. The system of claim 1, wherein the at least one controller is individually or collectively programmed to direct the detector to detect the at least the segment of the physical marker.

15. The system of claim 1, wherein the transformed material is part of an additional physical marker.

16. The system of claim 1, wherein the at least one controller comprises one or more computer processors that are individually or collectively programmed to perform (i)-(ii).

17. A method for printing a three-dimensional object comprising:
 (a) using an energy beam to transform at least a fraction of a material bed in an enclosure into a transformed material as part of (A) the three-dimensional object and (B) a physical marker, wherein three-dimensional object is printed while considering a model of a requested three-dimensional object, wherein the physical marker is an addition to the requested three-dimensional object, wherein the requested three-dimensional object comprises a portion that is deformable, wherein the physical marker is connected to the portion that is deformable, wherein upon deformation, a position of at least a segment of the physical marker deviates;
 (b) using a detector to detect at least the segment of the physical marker; and
 (c) evaluating a deviation of the position of at least the segment of the physical marker detected in (b) to produce a result.

18. The method of claim 17, further comprising altering an instruction to generate an additional fraction of the three-dimensional object upon detection of at least the segment of the physical marker.

19. The method of claim 17, wherein detection of at least the segment of the physical marker is in real time.

20. The method of claim 17, wherein detecting is from a position outside the material bed.

21. The method of claim 20, wherein the position is above the material bed.

22. The method of claim 17, wherein detecting comprises optically detecting.

23. The method of claim 22, wherein optically detecting comprises using an oscillating radiation comprising repeating projected areas of relatively low and relatively high intensity.

24. The method of claim 23, further comprising detecting a deviation of the oscillating radiation.

25. The method of claim 24, wherein detecting the deviation is during the printing.

26. The method of claim 14, wherein the physical marker is attached to the portion that is deformable at a position of the requested three-dimensional object that is buried in the material bed.

27. The method of claim 26, wherein the physical marker is attached to the portion at a position of the requested three-dimensional object that is buried in the material bed at least during deformation.

28. The method of claim 1, wherein the material bed comprises a particulate material.

29. The method of claim 28, wherein the particulate material comprises at least one member selected from the group consisting of metal alloy, elemental metal, ceramic, an allotrope of elemental carbon, and an organic material.

30. The method of claim 14, further comprising planarizing an exposed surface of the material bed using a layer dispensing mechanism comprising a cyclonic separator.

* * * * *

UNITED STATES PATENT AND TRADEMARK OFFICE
CERTIFICATE OF CORRECTION

PATENT NO. : 9,931,697 B2  
APPLICATION NO. : 15/435120  
DATED : April 3, 2018  
INVENTOR(S) : Evgeni Levin et al.

Page 1 of 1

It is certified that error appears in the above-identified patent and that said Letters Patent is hereby corrected as shown below:

In the Claims

Claim 2, Column 166, Line 38, "portion of" should read --portion of the--.

Claim 17, Column 167, Line 25, "wherein three-dimensional" should read --wherein the three-dimensional--.

Claim 26, Column 168, Line 21, "claim 14" should read --claim 17--.

Claim 28, Column 168, Line 29, "claim 1" should read --claim 17--.

Claim 30, Column 168, Line 35, "claim 14" should read --claim 17--.

Signed and Sealed this  
Nineteenth Day of June, 2018

Andrei Iancu  
*Director of the United States Patent and Trademark Office*